(12) United States Patent
Ubillos

(10) Patent No.: US 8,963,962 B2
(45) Date of Patent: Feb. 24, 2015

(54) DISPLAY OF MULTIPLE IMAGES

(71) Applicant: Apple Inc., Cupertino, CA (US)

(72) Inventor: Randy Ubillos, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 321 days.

(21) Appl. No.: 13/629,343

(22) Filed: Sep. 27, 2012

(65) Prior Publication Data

US 2013/0239055 A1  Sep. 12, 2013

Related U.S. Application Data

(60) Provisional application No. 61/607,550, filed on Mar. 6, 2012.

(51) Int. Cl.

| | |
|---|---|
| G09G 5/00 | (2006.01) |
| H04L 12/58 | (2006.01) |
| G06F 3/0482 | (2013.01) |
| G06F 3/0484 | (2013.01) |
| G06F 3/0481 | (2013.01) |
| G06F 3/0485 | (2013.01) |
| G06F 3/0488 | (2013.01) |
| G06F 17/30 | (2006.01) |

(52) U.S. Cl.
CPC .............. *H04L 51/24* (2013.01); *G06F 3/0482* (2013.01); *G06F 3/04845* (2013.01); *G06F 3/04817* (2013.01); *G06F 3/0485* (2013.01); *G06F 3/04883* (2013.01); *G06F 17/30274* (2013.01); *G06F 3/04842* (2013.01); *G06F 2203/04806* (2013.01)
USPC ......................................................... 345/661

(58) Field of Classification Search
None
See application file for complete search history.

(56) References Cited

U.S. PATENT DOCUMENTS 6,400,375 B1 * 6/2002 Okudaira ....................... 345/668
6,567,983 B1 * 5/2003 Shiimori ....................... 725/105

(Continued)

FOREIGN PATENT DOCUMENTS

| EP | 1324227 | 7/2003 |
|---|---|---|
| EP | 1521449 | 4/2005 |

(Continued)

OTHER PUBLICATIONS

Author Unknown, "How to Manage and Work with Digital Images, Using FastStone Image Viewer Version 4.5," FastStone Soft, Jun. 10, 2011, pp. 1-95.

(Continued)

*Primary Examiner* — Phi Hoang
*Assistant Examiner* — Mohammad H Akhavannik
(74) *Attorney, Agent, or Firm* — Adeli LLP

(57) ABSTRACT

Some embodiments provide an image-viewing application. The image-viewing application calculates an average aspect ratio of several images for display in an image viewing area. A first image in the several images has a first aspect ratio and a second image in the several images has a second, different aspect ratio. The application determines a number and size of regions of the image viewing area for displaying the several images. The regions have the calculated average aspect ratio, and each image is for display in a different one of the regions. The application displays the several images in the regions of the image viewing area. Each displayed image has a same visual weighting. The first image is displayed at the first aspect ratio and the second image is displayed at the second aspect ratio.

24 Claims, 98 Drawing Sheets

(56) References Cited

U.S. PATENT DOCUMENTS

| | | |
|---|---|---|
| 6,636,648 B2 | 10/2003 | Loui et al. |
| 7,148,990 B2 | 12/2006 | Atkins et al. |
| 7,188,310 B2 | 3/2007 | Schwartzkopf |
| 7,768,535 B2 | 8/2010 | Reid et al. |
| 7,849,116 B2 | 12/2010 | Jacobs et al. |
| 8,024,658 B1 | 9/2011 | Fagans et al. |
| 8,806,331 B2 * | 8/2014 | Grosz et al. .................. 715/243 |
| 2002/0040375 A1 | 4/2002 | Simon et al. |
| 2006/0109517 A1 | 5/2006 | Catalan |
| 2006/0119619 A1 | 6/2006 | Fagans et al. |
| 2006/0150091 A1 | 7/2006 | Suzuki et al. |
| 2007/0174790 A1 | 7/2007 | Jing et al. |
| 2008/0049256 A1 | 2/2008 | Ohkubo et al. |
| 2009/0067753 A1 | 3/2009 | Hanechak |
| 2009/0169132 A1 | 7/2009 | Sagawa |
| 2009/0172532 A1 | 7/2009 | Chaudhri |
| 2009/0244646 A1 * | 10/2009 | Kondo et al. ................. 358/448 |
| 2011/0265033 A1 | 10/2011 | Lindsay et al. |
| 2012/0017154 A1 | 1/2012 | Fagans et al. |
| 2012/0047459 A1 * | 2/2012 | Ejima et al. ................... 715/788 |
| 2012/0050789 A1 | 3/2012 | Bachman et al. |

FOREIGN PATENT DOCUMENTS

| | | |
|---|---|---|
| WO | WO 2010/151255 | 12/2010 |
| WO | PCT/US2013/020055 | 1/2013 |
| WO | WO 2013/133901 | 9/2013 |

OTHER PUBLICATIONS

Bederson, Benjamin B., "PhotoMesa: A Zoomable Image Browser Using Quantum Treemaps and Bubblemaps," UIST 2001, Month Unknown, 2001, pp. 71-80, ACE, Orlando, Florida, USA.

Gomi, AI, et al., "CAT: Hierarchical Image Browser Using a Rectangle Packing Technique," 12$^{th}$ International Conference Information Visualisation, Jul. 9, 2008, pp. 82-87, IEEE.

International Search Report and Written Opinion for PCT/US2013/020055, May 8, 2013 (mailing date), Apple Inc.

* cited by examiner

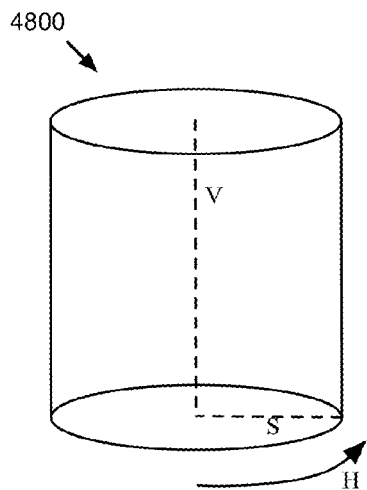
*Figure 48*
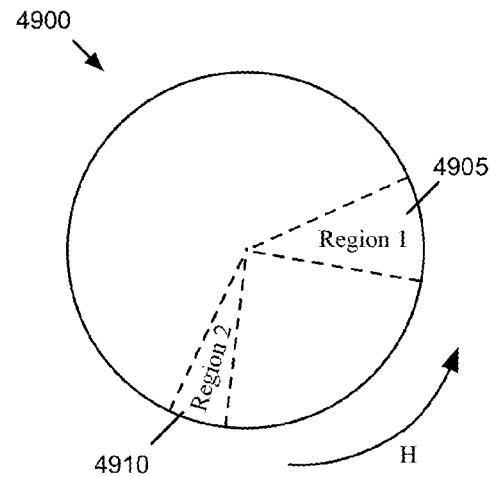
*Figure 49*
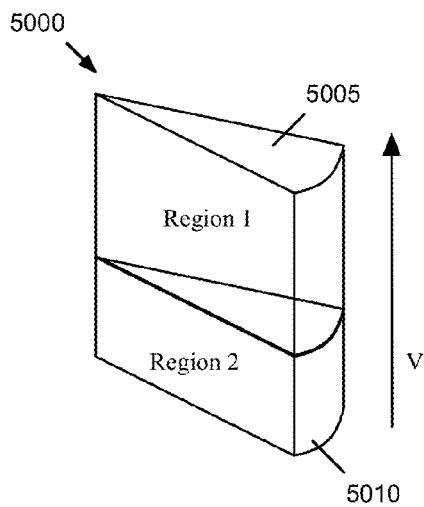
*Figure 50*
| P1 | P2 | P3 |
|----|----|----|
| P4 | P0 | P5 |
| P6 | P7 | P8 |
*Figure 51*

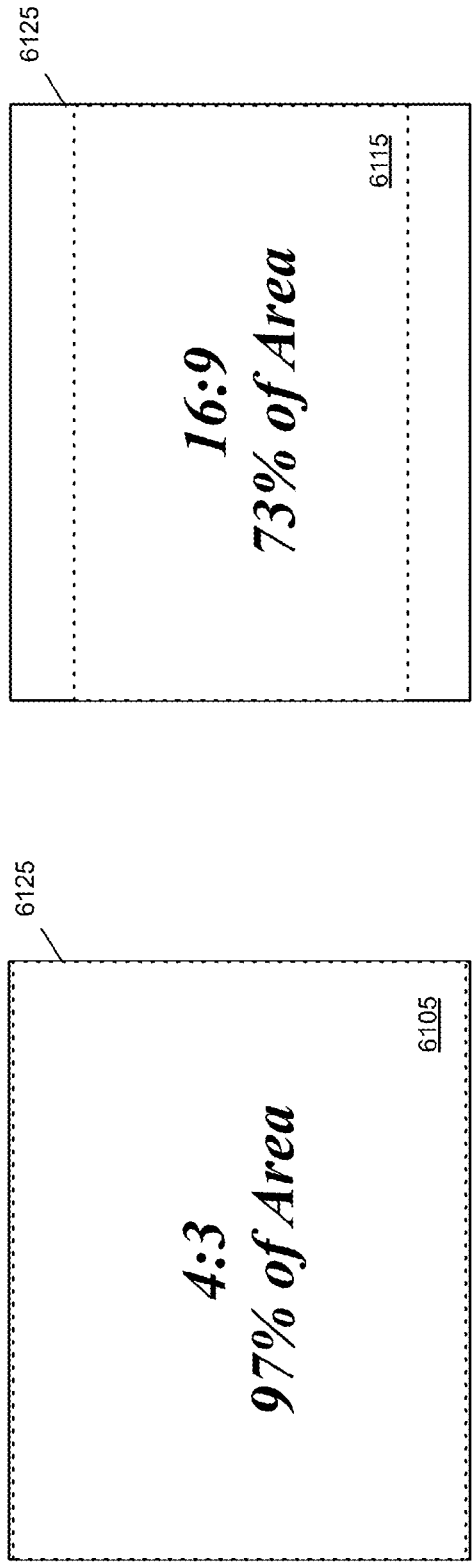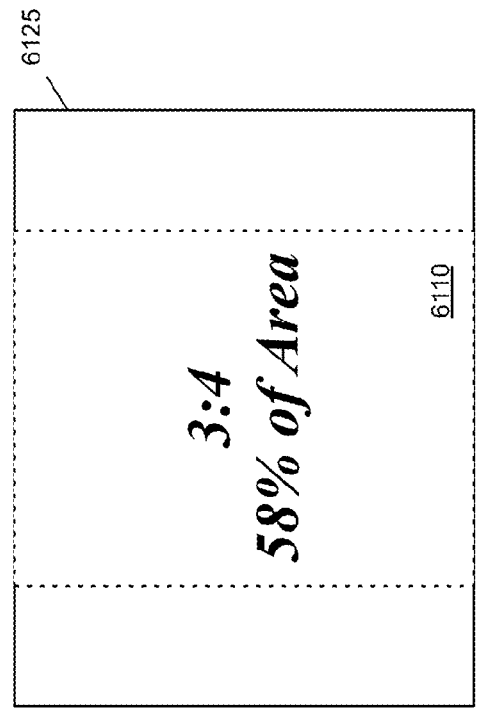
*Figure 63*

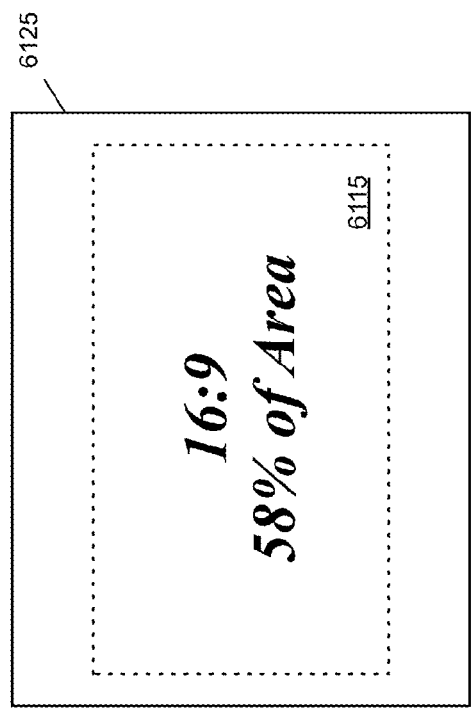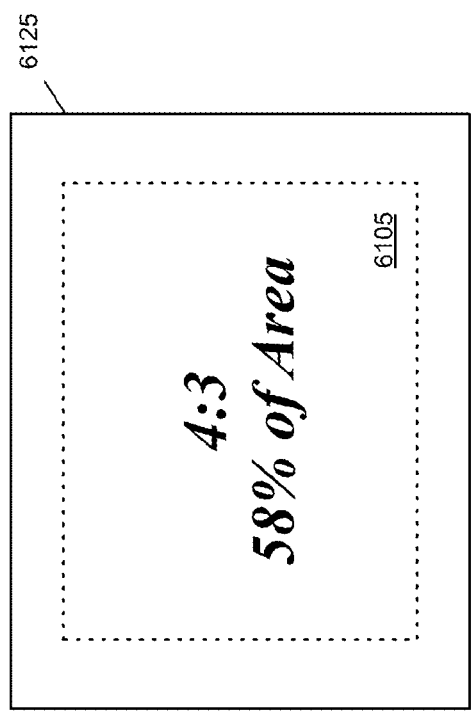
Figure 64

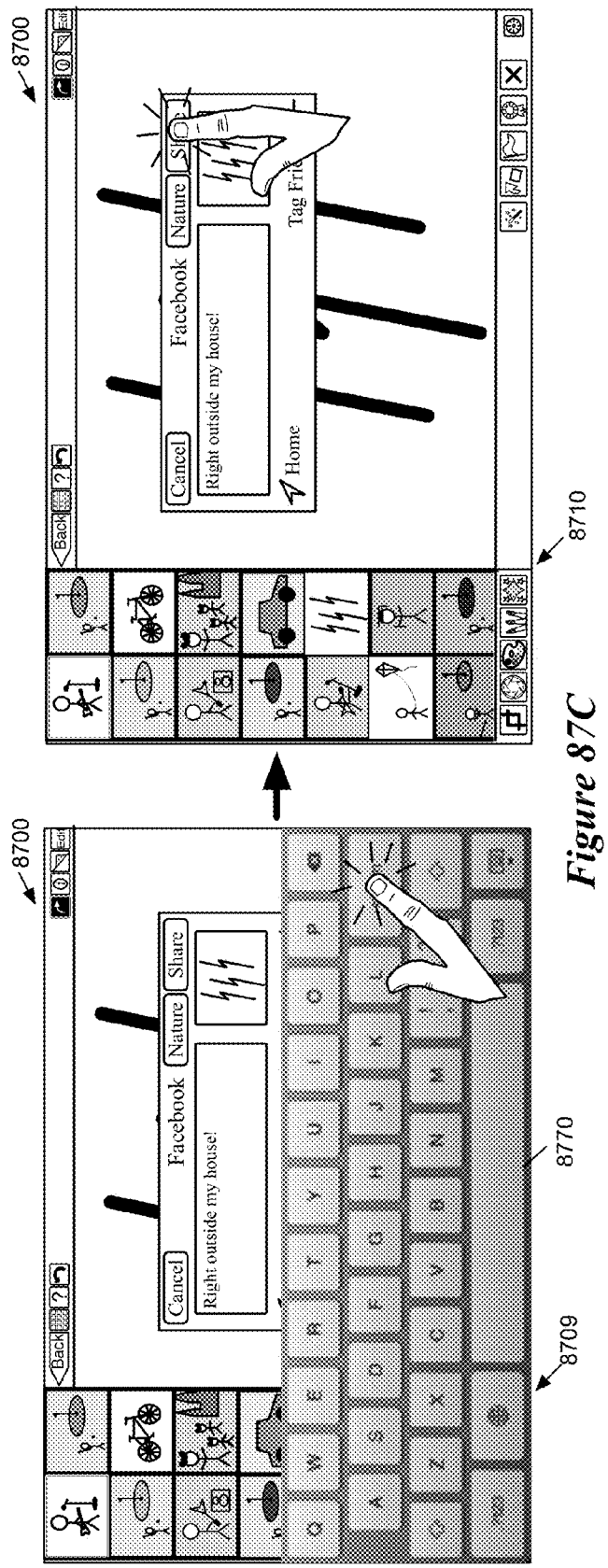

DISPLAY OF MULTIPLE IMAGES

CLAIM OF BENEFIT TO PRIOR APPLICATIONS

This application claims the benefit of U.S. Provisional Application 61/607,550, entitled "Application for Viewing Images", filed Mar. 6, 2012. U.S. Application 61/607,550 is incorporated herein by reference.

BACKGROUND

Digital image editing and viewing applications provide photographers, both professional and amateur, with tools to both organize and edit their photos. These applications give users the ability to organize collections of photos and to modify various image properties of the photos in a variety of ways.

In the modern world, touchscreen devices are becoming ubiquitous. Many tablets and smartphones on the market use touchscreens, and many people own such a touchscreen device. In addition, many users both take photographs with their portable touchscreen devices and load photographs from other sources (e.g., digital cameras) onto their portable touchscreen devices. As such, an application is needed for viewing, organizing, and editing photos that is adapted to the unique controls available for a touchscreen device.

BRIEF SUMMARY

Some embodiments of the invention provide a novel application for viewing and working with images. In some embodiments, the application operates in multiple different modes, with different graphical user interfaces (GUIs) for the different modes. For instance, in some embodiments, the application operates on a touch device in both left-handed and right-handed modes. In addition to the different GUIs for the different modes, some embodiments present specific user interface tools in different manners (e.g., different orientations) in the different modes. The application provides various features for working with one or multiple images. For instance, some embodiments enable various methods for viewing multiple different images, including (i) novel touch interactions for selecting multiple items and (ii) novel methods for identifying similar images from a group of images. In addition, the application provides various novel interactions for working with multiple selected images, such as interactions for cycling through images and tagging images.

As mentioned, the application of some embodiments provides multiple different modes (e.g., left-handed and right-handed modes). Some embodiments switch between modes according to the location in the GUI of a particular GUI item. When switching between modes, some embodiments preserve a relationship in the GUI (e.g., an order) of a first set of GUI items while modifying a relationship of a second set of GUI items. In addition, the application of some embodiments presents certain tools in different manners (e.g., orientations) when the tools are activated in the different modes.

In some embodiments, the application provides a user-interface mechanism for switching between the modes. For example, the GUI of some embodiments includes a thumbnail display area that displays thumbnails of a group of images and an image display area that displays larger (and in some cases, editable) versions of selected images. In some embodiments, the thumbnail display area is moveable, and the application switches between left- and right-handed modes based on the location in the GUI to which the thumbnail display area is moved (e.g., left-handed mode when the thumbnail display area is on the right side of the GUI and right-handed mode when the thumbnail display area is on the left side of the GUI).

When the application switches between the two modes, some embodiments preserve the order of a first set of GUI items while changing the order of a second set of GUI items. Specifically, the application preserves the order of a set of GUI items associated with various editing tools to maintain an order in which the editing tools are typically utilized. On the other hand, the application reverses the order of a second set of GUI items in order to keep the GUI items in the same location relative to the thumbnail display area.

In addition, the image viewing, editing, and organization application provides certain GUI tools in different manners in the different modes. For instance, some embodiments display specific tools in different orientations depending on whether the application is in left- or right-handed mode. One such specific tool is a zoom tool that magnifies a particular area of the image display area. The zoom tool of some embodiments is a circular magnifier capable of varying degrees of magnification. To modify the magnification, the user performs a rotation gesture of two separate touch inputs (e.g., with the thumb and index finger). When operating in right-handed mode, the application displays magnification information on the left side of the magnifier, and vice versa when operating in left-handed mode. This prevents the user's hand from blocking the view of the magnification information on the zoom tool. Furthermore, some embodiments switch the directions of rotation for zooming in and out between the two different modes.

As mentioned, in some embodiments, the thumbnail display area is moveable between two different sides of the application GUI. In addition, the application enables the user to move the thumbnail display area on and off the application GUI via swipe gestures (e.g., right and left swipe gestures on a touchscreen). Furthermore, users can modify the size (and number of columns of thumbnails) of the thumbnail display by moving the boundary between the thumbnail display area and the image display area with a drag gesture on the touchscreen.

In addition to operating in different modes, the image viewing, editing, and organization application provides a variety of novel operations and interactions for viewing and working with images. For instance, some embodiments enable several different operations for selecting multiple images to display in the image display area. One such operation involves simultaneous selection (e.g., via two different touch inputs) of first and second thumbnails in the thumbnail display area in order to select the first and second thumbnails and all thumbnails in between. In response to such a block selection, the application displays all of the images corresponding to the selected thumbnails in the image display area.

Some embodiments additionally differentiate between different types of thumbnail selection inputs. For example, when a user selects a particular thumbnail in a first manner (e.g., a tap on a touchscreen or a single click), the application selects only the particular thumbnail and displays only its corresponding image in the display area. However, when a first thumbnail is already selected and a user selects a second thumbnail in a second manner (e.g., with a press and hold on a touchscreen or a click and hold), the application maintains the selection of the first thumbnail while selecting the second thumbnail. The application displays both the first and second images (and any other selected images) in the image display area. In this manner, some embodiments allow the user to add any number of images to the image display area.

Furthermore, the image viewing, editing, and organization application of some embodiments can display all images that are similar to a selected image according to a particular set of criteria. When a user selects an image in a third manner (e.g., via a double tap on a touchscreen, a double-click, etc.), the application compares all images in a collection of associated images (e.g., the images whose thumbnails are eligible for display in the thumbnail display area) to the selected image, and identifies which of the images are within a threshold similarity to the selected image according to the particular set of criteria. Some embodiments generate histograms of the pixels of an image (e.g., based on color, texture, and gradient values for the pixels) and compare the histograms to identify similar images. In some embodiments, the application generates different histograms for different regions of the images and compares the histograms of corresponding regions. The images are divided into the regions in such a way that some pixels are part of multiple regions while other pixels are part of only one region. This enables the application to give greater consideration to the pixels that are more indicative of the content of the image (e.g., those in the center) in making the comparison between two images.

When displaying multiple images in the image display area, some embodiments maintain a constant visual weight between the different images. That is, rather than try to fill all of the space in the image display area by displaying the images as different sizes, the application displays each image as the same size irrespective of the dimensions of the image. In order to keep the visual weighting constant between different images, some embodiments calculate the average aspect ratio of all of the images to display in the image display area, then identify an optimal division of the image display area into the correct number of regions having the average aspect ratio. Within these regions, the application then displays the images such that each image is displayed using the same number of pixels.

Once multiple thumbnails are selected and multiple images displayed in the image display area, some embodiments provide various novel interactions for viewing and interacting with the images. For instance, a user can perform a selection operation (e.g., a tap on a touchscreen, a mouse click) on one of the displayed images. Some embodiments display only the selected image (i.e., the primary selection image) in the image display area, but maintain secondary selection of the other images. To indicate these selections, the application highlights the thumbnails of the secondary image selections with a first selection indicator, while highlighting the thumbnail of the primary selection image (the displayed image) with a second selection indicator (e.g., using thick and thin highlighted boundaries).

When in this viewing mode for multiple images, some embodiments allow the user to cycle through the different selected images with horizontal swipe gestures. In addition, the user can remove an image from the set of selected images with a vertical swipe gesture. When an image is removed from the set, the application removes the selection indicator from the corresponding thumbnail. When multiple images are displayed in the image display area, the user can apply a tag (e.g., a favorites tag) to all of the images, or select one of the images for primary display and then apply a tag to only the primary image selection.

While viewing images, the application of some embodiments allows the user to interact bidirectionally with image hosting and social media websites. For instance, the user can add a caption to an image, which is attached to the image both within the image-viewing application as well as when the image is exported to an external application or website. Furthermore, when a user of an external website comments on the hosted image, some embodiments automatically retrieve this information and display the external comments within the image-viewing application.

In addition to the above-described features, the application of some embodiments provides a context-sensitive help feature. Specifically, when a help tool is invoked, the application displays help indicators that are tailored to the items with which a user is currently working. When a user changes the active set of tools in use, the application displays help indicators for the active set of tools. For moveable tools (e.g., sliders), some embodiments move the help indicators along with the tools as the tools are moved.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 48 conceptually illustrates the HSV color space 4800.

FIG. 49 illustrates a circular cross section of the HSV color space (i.e., at a constant value), with two regions defined.

FIG. 50 illustrates a three-dimensional portion of the HSV color space divided into two regions.

FIG. 51 illustrates nine pixels used by some embodiments to calculate the texture for the center pixel.

FIG. 63 illustrates the different aspect ratio images fit within the grid region.

FIG. 64 illustrates the sizes of the images when fit to occupy the same area in the image display area as a particular one of the other images.

FIGS. 87A-87C illustrate a user uploading an image to Facebook®.

DETAILED DESCRIPTION

In the following description, numerous details, examples and embodiments are set forth for purpose of explanation. However, one of ordinary skill in the art will realize that the invention is not limited to the embodiments set forth and that the invention may be practiced without some of the specific details and examples discussed. In other instances, well-known structures and devices are shown in block diagram form in order not to obscure the description of the invention with unnecessary detail.

Some embodiments of the invention provide a novel application for viewing and working with images. In some embodiments, the application operates in multiple different modes, with different graphical user interfaces (GUIs) for the different modes. For instance, in some embodiments, the application operates on a touchscreen device in both left-handed and right-handed modes. In addition to the different GUIs for the different modes, some embodiments present specific user interface tools in different manners (e.g., different orientations) in the different modes. The application provides various features for working with one or multiple images. For instance, some embodiments enable various methods for viewing multiple different images, including (i) novel touch interactions to select multiple items and (ii) novel methods for identifying similar images from a group of images. In addition, the application provides various novel interactions for working with multiple selected images, such as interactions for cycling through images and tagging images.

As mentioned, the image editing, viewing, and organization application (referred to below as an image-viewing application, an image-editing application, etc.) of some embodiments provides multiple different modes (e.g., left-handed and right-handed modes). Some embodiments switch between modes according to the location in the GUI of a particular GUI item. When switching between modes, some embodiments preserve a relationship in the GUI (e.g., an order) of a first set of GUI items while modifying a relationship of a second set of GUI items. In addition, the application of some embodiments presents certain tools in different manners (e.g., orientations) when the tools are activated in the different modes.

Figure 1:
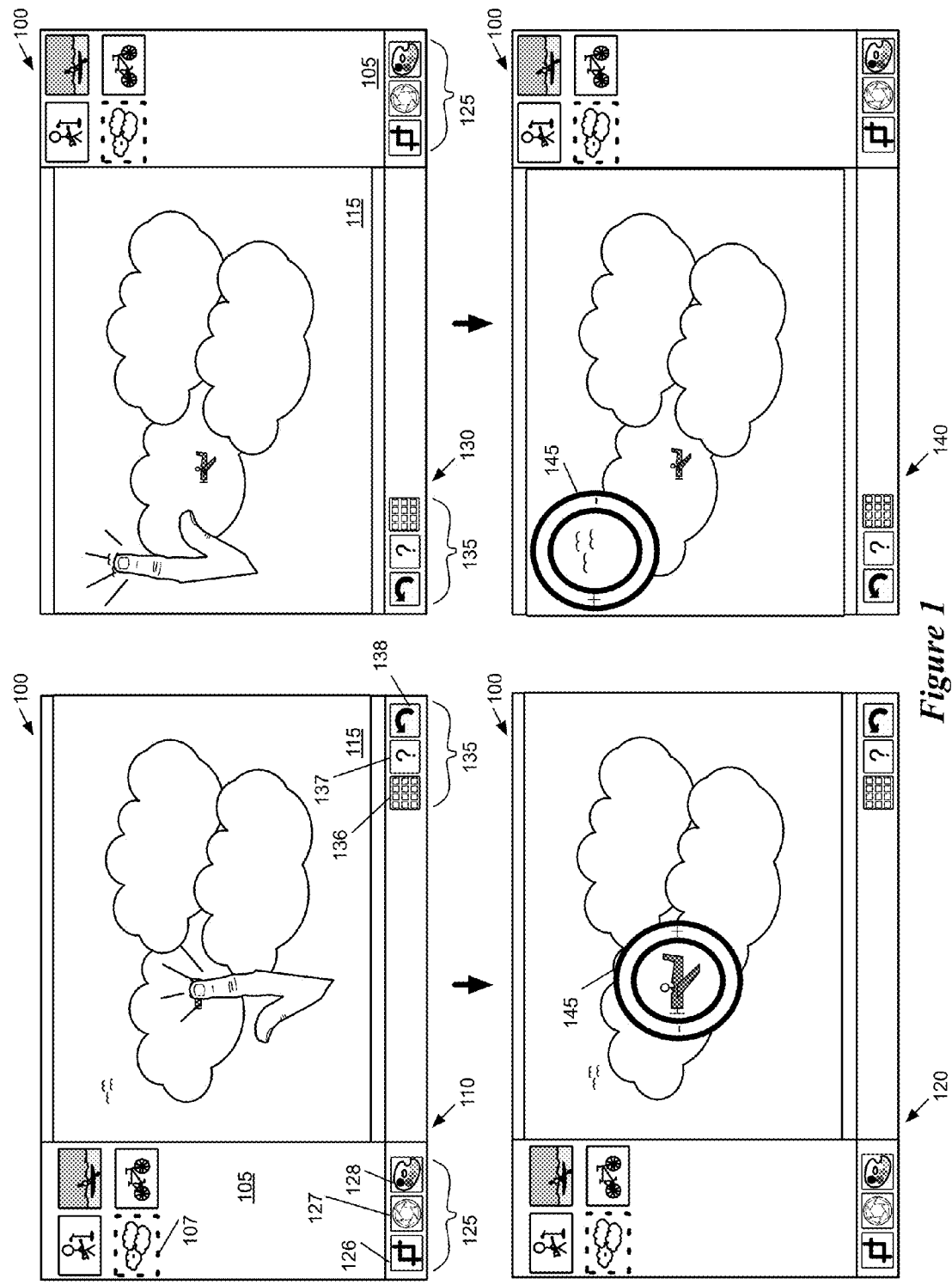
FIG. 1 illustrates two different modes of a GUI for an image-viewing application of some embodiments.

FIG. 1 illustrates two different modes of such a GUI 100 for an image-viewing application of some embodiments. Specifically, this figure illustrates the GUI 100 in a right-handed mode in two stages 110 and 120, while illustrating the GUI 100 in a left-handed mode in two stages 130 and 140.

The GUI 100 includes a thumbnail display area 105, an image display area 115, a first set of GUI items 125, and a second set of GUI items 135. The thumbnail display area 105 displays thumbnails of a set of images (e.g., a user-created album or other collection of associated images). The thumbnails are scaled down versions of the images in the collection. In some embodiments, the thumbnails do not necessarily display entire images, but instead display only a portion of each image so that each thumbnail has the same aspect ratio (e.g., a square). Users can select thumbnails (e.g., via a touch interaction, a mouse click, etc.) in order to cause the corresponding image to appear in the image display area 115.

The image display area 115 displays larger versions of one or more selected images. In this case, the thumbnail 107 is selected in the thumbnail display area 105, and thus the corresponding image is displayed in the image display area 115. As shown, some embodiments display an indication for each of any selected thumbnails in the thumbnail display area. In this case, the thumbnail 107 is shown with a thick dashed border; however, one of ordinary skill in the art will recognize that many different selection indications are possible.

In addition to providing viewing functionality in the image display area, some embodiments provide the user with various editing, tagging, and other operations to apply to the displayed images. The first set of GUI items 125 includes three items 126-128 that activate different sets of editing tools for editing images. The items 126-128 are arranged in a particular left to right order that follows the order in which a user will often want to make edits to the image. The second set of GUI items 135 includes three items 136-138 that are arranged in an order designed to provide functionality based on relative location to the other items in the GUI (e.g., the thumbnail display area 105 and image display area 115).

As stated, stage 110 illustrates the GUI 100 in the right-handed mode. In this mode, the thumbnail display area 105 is on the left side of the GUI. In addition, the GUI items 126-128 are arranged on the left side of the GUI, with item 126 on the left, item 127 in the center, and item 128 on the right. The GUI items 136-138 are arranged on the right side of the GUI, with item 136 on the left, item 137 in the center, and item 138 on the right.

The stage 130 illustrates the GUI in the left-handed mode. In this case, the thumbnail display area 105 is located on the right side of the GUI. This ensures that when a user moves her left hand over the GUI, her arm will not block the view of the thumbnail display area. Similarly, with the thumbnail display area 105 located on the left side of the GUI in right-handed mode, the user's right arm will not block their view of the thumbnail display area 105.

In the stage 130, the first set of GUI items 125 are located on the right side of the GUI 100 underneath the thumbnail display area 105, while the second set of GUI items 125 are located on the left side of the GUI 100. However, the first set of items 125 maintains the same left-to-right order that matches the order in which a user typically will use the associated editing tools, while the order is reversed for the second set of items 135 as compared to these items in right-handed mode.

In some embodiments, the application provides a user-interface mechanism for switching between these two modes. For example, in some embodiments the thumbnail display area is moveable, and the application switches between the left- and right-handed modes based on the location in the GUI to which the thumbnail display area is moved. In order to get from the stage 110 to the stage 130, the user could pick up and drag the thumbnail display area 105 from the left side of the touchscreen display to the right side of the touchscreen display. Upon doing so, the application automatically moves the first and second sets of tools 125 and 135, and reverses the order of the second set of tools 135.

In addition, the image-viewing application provides certain GUI tools in different manners in the different modes. For instance, some embodiments display specific tools in different orientations depending on whether the application is in left- or right-handed mode. FIG. 1 illustrates an example of such a GUI tool 145 that is activated in different orientations in the two different modes. In this case, the GUI tool 145 is a zoom tool that magnifies a particular area of the image display area.

As shown, in the stage 110, a user interacts with the image display area with their right hand in order to activate the zoom tool 145. While this figure shows a one-finger interaction, different embodiments respond to different types of inputs in order to activate such a tool. For example, some embodiments require two separate touch interactions that coincide at least partially in time in order to activate a zoom tool.

Stage 120 illustrates the result of this interaction while in the right-handed display mode. The application displays the zoom tool 145 over the location of the user's touch interaction. As shown, the application displays the tool 145 in a first orientation, with the + sign (indicating greater magnification) on the right and the – sign (indicating less magnification) on the left.

Correspondingly, in the stage 130, the user interacts with the image display area with their left hand in order to activate the zoom tool 145. The stage 140 illustrates the result of this interaction while in the left-handed display mode. As in stage 120, the application displays the zoom tool 145 over the location of the user's touch interaction. In this case, however, the application displays the zoom tool 145 in a second orientation, with the + sign on the left and the – sign on the right.

In some embodiments, the zoom tool is capable of varying degrees of magnification. To modify the magnification, the user performs a rotation gesture of two separate touch inputs (e.g., with the thumb and index finger). In some embodiments, when the application is operating in right-handed mode, clockwise rotation increases the magnification while counter-clockwise rotation decreases the magnification. When in left-handed mode, the opposite is true, with counter-clockwise rotation increasing the magnification and clockwise rotation decreasing the magnification.

Furthermore, some embodiments display magnification information (e.g., the level of magnification inside the active tool) as part of the tool. When in right-handed mode, this magnification information is displayed on the left side of the magnifier, while in left-handed mode the information is displayed on the right side of the magnifier. This prevents the user's hand from blocking the view of the magnification information on the zoom tool while zooming in or out.

As mentioned, in some embodiments, the thumbnail display area is moveable between two different sides of the application GUI. In addition, the image-editing application enables the user to move the thumbnail display area on and off the application GUI via swipe gestures (e.g., right and left swipe gestures on a touchscreen). Furthermore, users can modify the size (and number of columns of thumbnails) of the thumbnail display area by moving the boundary between the thumbnail display area and the image display area with a drag gesture on the touchscreen.

Figure 2:
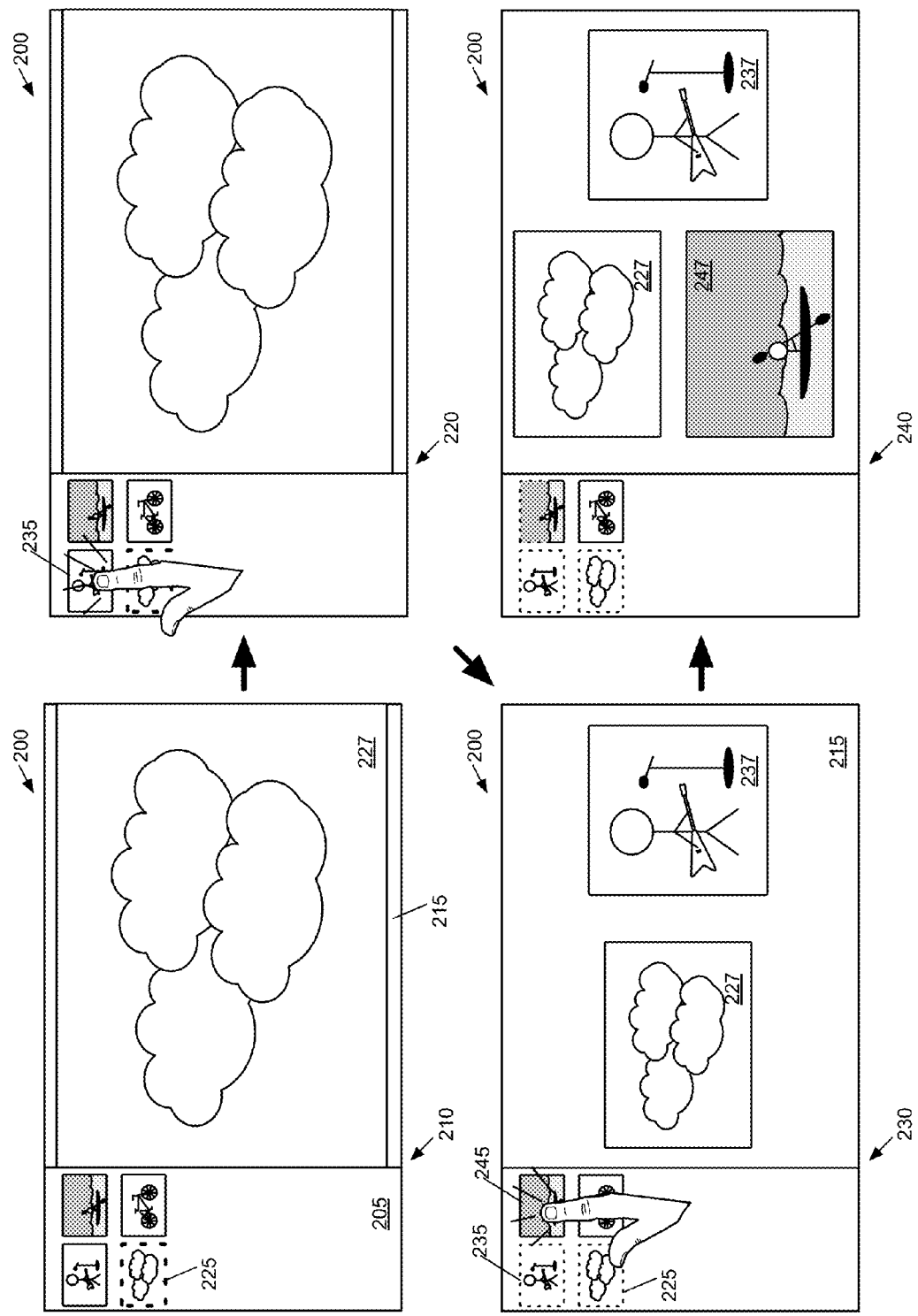
FIG. 2 illustrates the selection of multiple images to simultaneously display within the image display area of a GUI.

In addition to operating in different modes, the image-viewing application provides a variety of novel operations and interactions for viewing and working with images. For instance, some embodiments enable several different operations for selecting multiple images to display in the image display area. FIG. 2 illustrates the selection of multiple images to simultaneously display within the image display area of a GUI 200 over four stages 210-240.

The GUI 200 includes a thumbnail display area 205 and an image display area 215, which are similar to the corresponding display areas described above for the GUI 100. In this figure (and many other figures in this application) the GUI is shown in right-handed mode, with the thumbnail display area to the left. One of ordinary skill will recognize that many of the interactions shown are equally applicable to the left-handed GUI mode.

The first stage 210 illustrates that a thumbnail 225 has been selected, and the corresponding selected image 227 is displayed at the largest possible size in the image display area (while maintaining the aspect ratio of the image). In the second stage 220, the user selects a second thumbnail 235 corresponding to a second image 237 via a touch interaction. One of ordinary skill in the art will recognize that touchscreen devices provide the ability to differentiate between various types of interactions (e.g., taps, double taps, press and hold, separate simultaneous interactions, multi-finger interactions, etc.).

The third stage 230 illustrates that the image display area 215 now displays both of the selected images 227 and 237. Furthermore, the application displays the thumbnails 225 and 235 with a lighter dashed boundary than in the previous stage. Some embodiments use different selection indications in the thumbnail display area (e.g., thick and thin borders or highlights, different colors, etc.) to differentiate between a single selected image and multiple selected images.

The two images 227 and 237 shown in the image display area 215 do not have the same aspect ratio, but are displayed as approximately the same size. When displaying multiple images in the image display area, some embodiments maintain a constant visual weight between the different images. That is, rather than trying to fill all of the space in the image display area by displaying the images as different sizes, the application displays each image as the same size irrespective of the dimensions of the image. In order to keep the visual weighting constant between different images, some embodiments calculate the average aspect ratio of all of the images to display in the image display area, then identifies an optimal division of the image display area into the correct number of regions having the average aspect ratio. Within these regions, the application then displays the images such that each image is displayed using the same number of pixels.

The third stage 230 also illustrates the user selecting a third thumbnail 245 corresponding to an image 247 via another touch interaction. As a result, in the fourth stage 240, the image display area 215 displays the three selected images 227, 237, and 247. In order to display the third image, the application has not had to reduce the size of the other two images, as the same visual weighting for the three images could be maintained without a size reduction.

As mentioned, some embodiments respond to various different touch interactions in order to display multiple images in the image display area. One such touch operation involves simultaneous selection (e.g., via two different touch inputs) of first and second thumbnails in the thumbnail display area in order to select the first and second thumbnails and all thumbnails in between. In response to such a block selection, the application displays all of the images corresponding to the selected thumbnails in the image display area.

Some embodiments additionally differentiate between different types of thumbnail selection input. For example, when a user selects a particular thumbnail in a first manner (e.g., a tap on a touchscreen or a single click), the application selects only the particular thumbnail and displays only its corresponding image in the display area. However, when a first thumbnail is already selected and a user selects a second thumbnail in a second manner (e.g., with a press and hold on a touchscreen or a click and hold), the application maintains the selection of the first thumbnail while selecting the second thumbnail. The application displays both the first and second images (and any other selected images) in the image display area. In this manner, some embodiments allow the user to add any number of images to the image display area.

Figure 3:
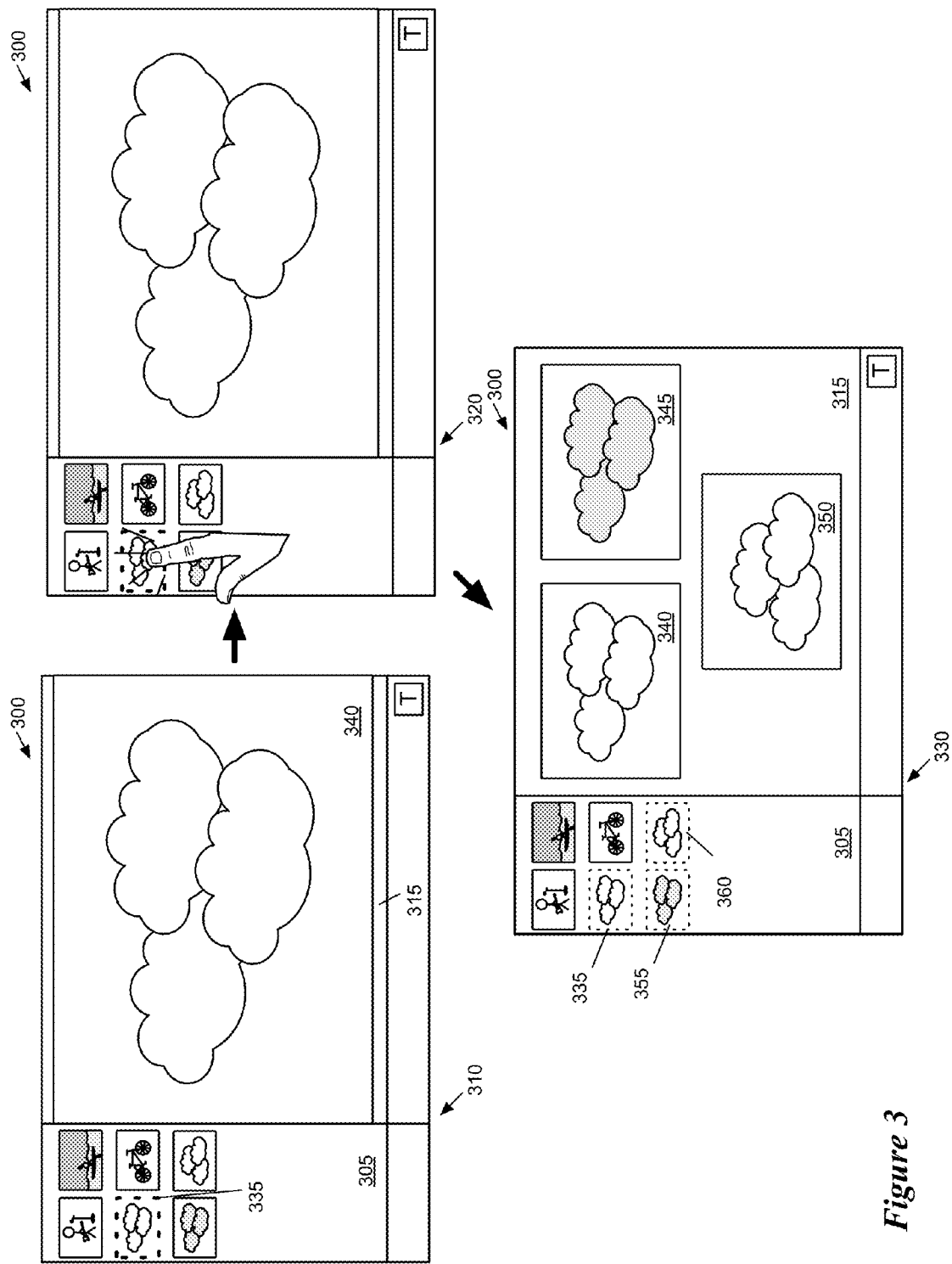
FIG. 3 illustrates a process for displaying all images that are similar to a selected image according to a particular set of criteria.

Furthermore, the image-viewing application of some embodiments can display all images that are similar to a selected image according to a particular set of criteria. FIG. 3 illustrates such a process over three stages 310-330 of a GUI 300. The GUI 300 includes a thumbnail display area 305 and an image display area 315, similar to the corresponding areas of the previous figures.

The first stage 310 of FIG. 3 illustrates that a thumbnail 335 is selected and its corresponding image 340 is displayed in the image display area 315. In the second stage 320, the user has performed a touch operation on the selected thumbnail 335. One of ordinary skill in the art will recognize that this is a generic user input, and that other embodiments might provide for the activation of the similar images feature differently (e.g., a double tap or double click of a thumbnail (whether or not already selected), a hotkey or sequence of hotkeys, a touch gesture or sequence of gestures, a menu item or UI button, etc.). The third stage 330 illustrates that the application has identified images similar to the selected image 340 and displayed the identified images 345 and 350 in the image display area 315. Furthermore, the corresponding thumbnails 335, 355, and 360 are all selected in the thumbnail display area 305, as shown by the dashed lines.

To identify these similar images, some embodiments compare all images in a collection of associated images (e.g., the images whose thumbnails are eligible for display in the thumbnail display area) to the selected image, and identify which of the images are within a threshold similarity of the selected image according to the particular set of criteria. Some embodiments generate histograms of the pixels of an image (e.g., based on color, texture, and gradient values for the pixels) and compare the histograms to identify similar images. In some embodiments, the application generates different histograms for different regions of the images and compares the histograms of corresponding regions between images. The images are divided into the regions in such a way that some pixels are part of multiple regions while other pixels are part of only one region. This enables the application to give greater consideration to the pixels that are more indicative of the content of the image (e.g., those in the center of the image) in making the comparison between two images.

Once multiple thumbnails are selected and multiple images displayed in the image display area, some embodiments provide various novel interactions for viewing and interacting with the images. For instance, a user can perform a selection operation (e.g., a tap on a touchscreen, a mouse click) on one of the displayed images (rather than its corresponding thumbnail). Some embodiments display only the selected image (i.e., the primary selection image) in the image display area, but maintain secondary selection of the other images. To indicate these selections, the application highlights the thumbnails of the secondary image selections with a first selection indicator, while highlighting the thumbnail of the primary selection image (the displayed image) with a second selection indicator (e.g., using thick and thin highlighted boundaries).

When in this viewing mode for multiple images, some embodiments allow the user to cycle through the different selected images with horizontal swipe gestures. In addition, the user can remove an image from the set of selected images with a vertical swipe gesture. When an image is removed from the set, the application removes the selection indicator from the corresponding thumbnail. When multiple images are displayed in the image display area, the user can apply a tag (e.g., a favorites tag) to all of the images, or select one of the images for primary display and then apply a tag to only the primary image selection.

Figure 4:
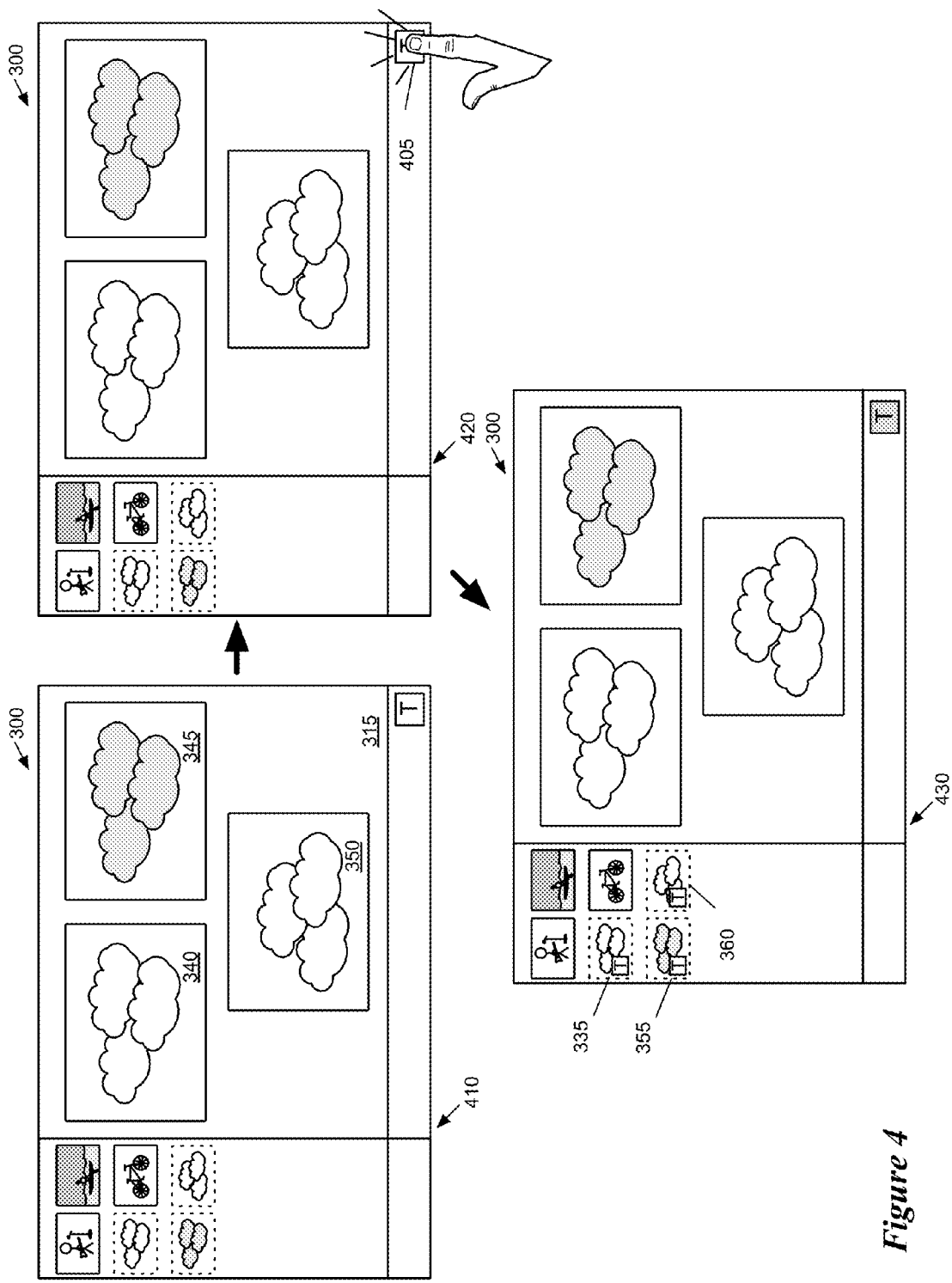
FIG. 4 illustrates the application of a tag images in a GUI.

FIG. 4 illustrates the application of such a tag to the images 340-350 in the GUI 300 over three stages 410-430. The first stage 410 illustrates the GUI 300 in the same state as the third stage 330 of FIG. 3, with the images 340-350 displayed in the image display area 315. At the second stage 420, the user selects a GUI item 405 for applying a tag to the selected images. The GUI item 405 is a conceptual item, and some embodiments of the image-editing application might implement such a functionality through a different UI item, a particular type of selection gesture, hotkeys, etc. Furthermore, the item 405 represents a generic tag, while some embodiments might include various different tags, such as a favorites tag, a flag, custom information tags, etc.

The third stage illustrates the result of the selection of the GUI item 405. The three thumbnails 335, 355, and 360 now display a marker indicating that they have been tagged. In some embodiments, the application displays icons for some tags within the thumbnails, while simply storing other tags as properties of the tagged images. In addition, the GUI item 405 is now highlighted, indicating that all of the selected images have been tagged. Some embodiments indicate that all of the images displayed in the display area are tagged with a particular tag by highlighting the tag button in the GUI. A subsequent selection of the tag button removes the tag from the selected images.

While viewing images, the application of some embodiments also allows users to interact bidirectionally with image hosting and social media websites. For instance, users can add a caption to an image, which is attached to the image both within the image-viewing application as well as when the image is exported to an external application or website. Furthermore, when a user of an external website comments on the hosted image, some embodiments automatically retrieve this information and display the external comments within the image-viewing application.

Figure 5:
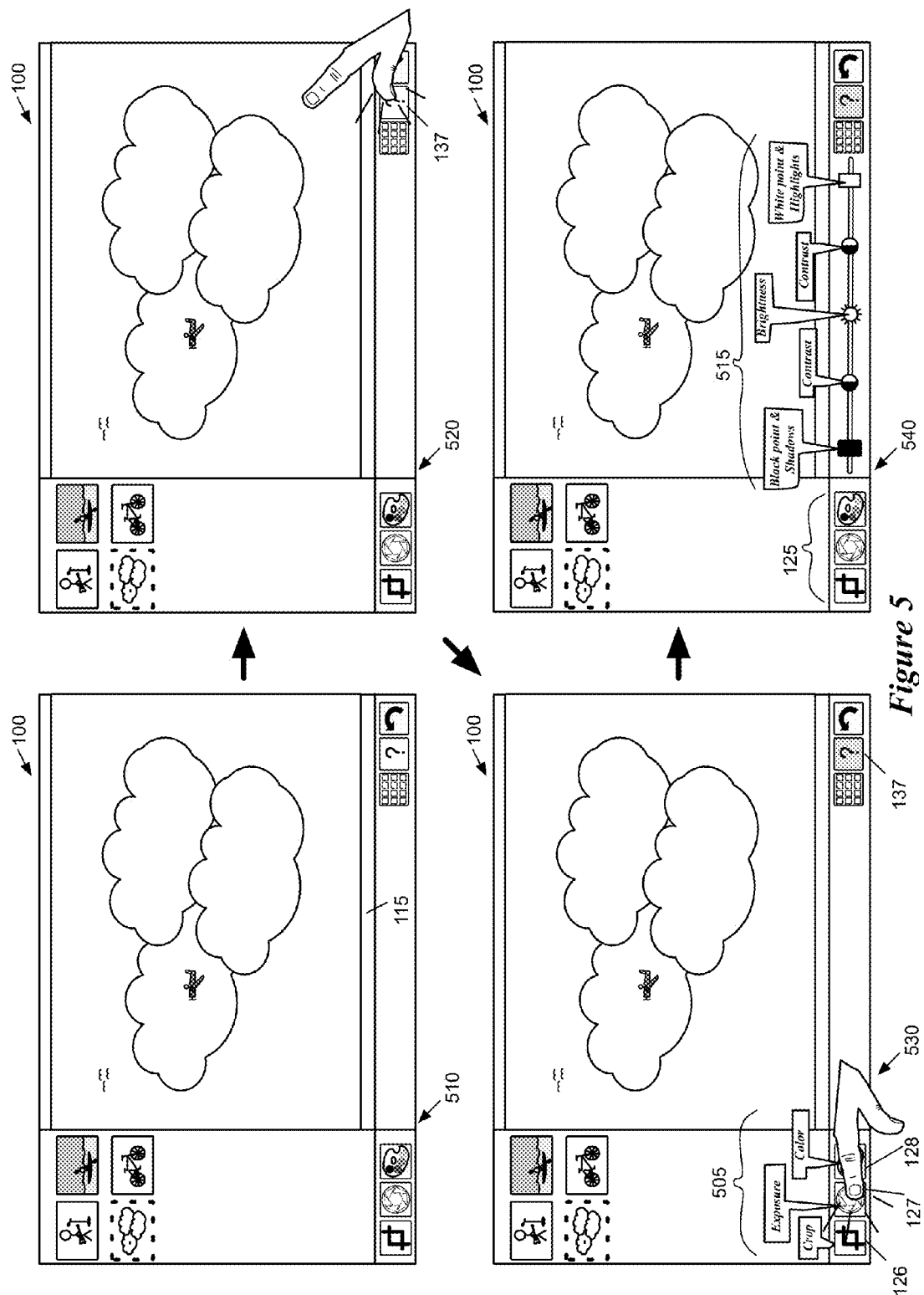
FIG. 5 illustrates the use of a context-sensitive help feature in a GUI.

In addition to the above-described features, the application of some embodiments provides a context-sensitive help feature. Specifically, when a user invokes a help tool, the application displays help indicators that are tailored to the items with which a user is currently working. FIG. 5 illustrates the use of such a context-sensitive help feature in the GUI 100 over four stages 510-540. The GUI includes a help activation item 137 for invoking the context-sensitive help feature. The first stage shows the GUI 100 with one selected image displayed in the image display area 115.

In the second stage 520, the user selects the help activation item 137 via a touch interaction. As with the other GUI items described above, the help activation item 137 is a conceptual item that could actually be invoked in a variety of different manners, including various touch interactions, cursor interactions, etc.

The third stage 530 illustrates that the help activation item 137 is now active, and help indicators 505 have appeared for the GUI items 126-128. These help indicators 505 display the purpose of the different GUI items, and in some embodiments are selectable in order to access a help manual with additional information about the selected item. The third stage also illustrates the user selecting the exposure item 127.

When a user changes the active set of tools in use, the application displays help indicators for the active set of tools. As a result, the fourth stage 540 shows a different set of help indicators 515. These help indicators 515 display the purpose of the different exposure adjustment items that have appeared in the GUI 100. The help indicators 505 for the crop, exposure, and color items are no longer displayed, because the user has navigated into a specific one of these sets of editing tools. In addition, for moveable tools (e.g., the exposure adjustment sliders), some embodiments move the help indicators along with the tools as the user moves the tools.

FIGS. 1-5 illustrate various examples of the novel features provided by some embodiments for viewing and working with images. Several more detailed embodiments are described below. Section I describes image collections and navigating between different groups of collections within the application. Before describing different GUI modes and various interactions with the GUI in the different modes in Section III, Section II describes the GUI and image data structure of some embodiments. Section IV then describes different techniques for selecting multiple images and how the application of some embodiments displays multiple images at once. Section V describes various operations that may be applied to one or more operations in some embodiments, including selection and deselection operations and tagging operations. Next, Section VI describes an image sharing feature and Section VII describes a context-sensitive help feature of some embodiments. Section VIII then describes the software architecture of the media-editing application of some embodiments. Finally, Section IX describes an electronic system with which some embodiments of the invention are implemented.

I. Image Collections

Before describing the various features involved in working with collections of images, this application will describe the creation and organization of such collections according to some embodiments of the invention. The image editing, viewing, and organization application of some embodiments enables users to import images (e.g., photographs), associate the images into collections (e.g., albums, etc.), create shareable media (e.g., journals) from the images, edit the images, etc. Some embodiments automatically associate images imported together from a separate device (i.e., a device other than the device on which the application runs) as an event. Albums, on the other hand, are user-created collections of images. While the media organized by the application is described predominantly herein as images, some embodiments of the invention also organize, view, and edit other types of media, such as videos.

Figure 6:
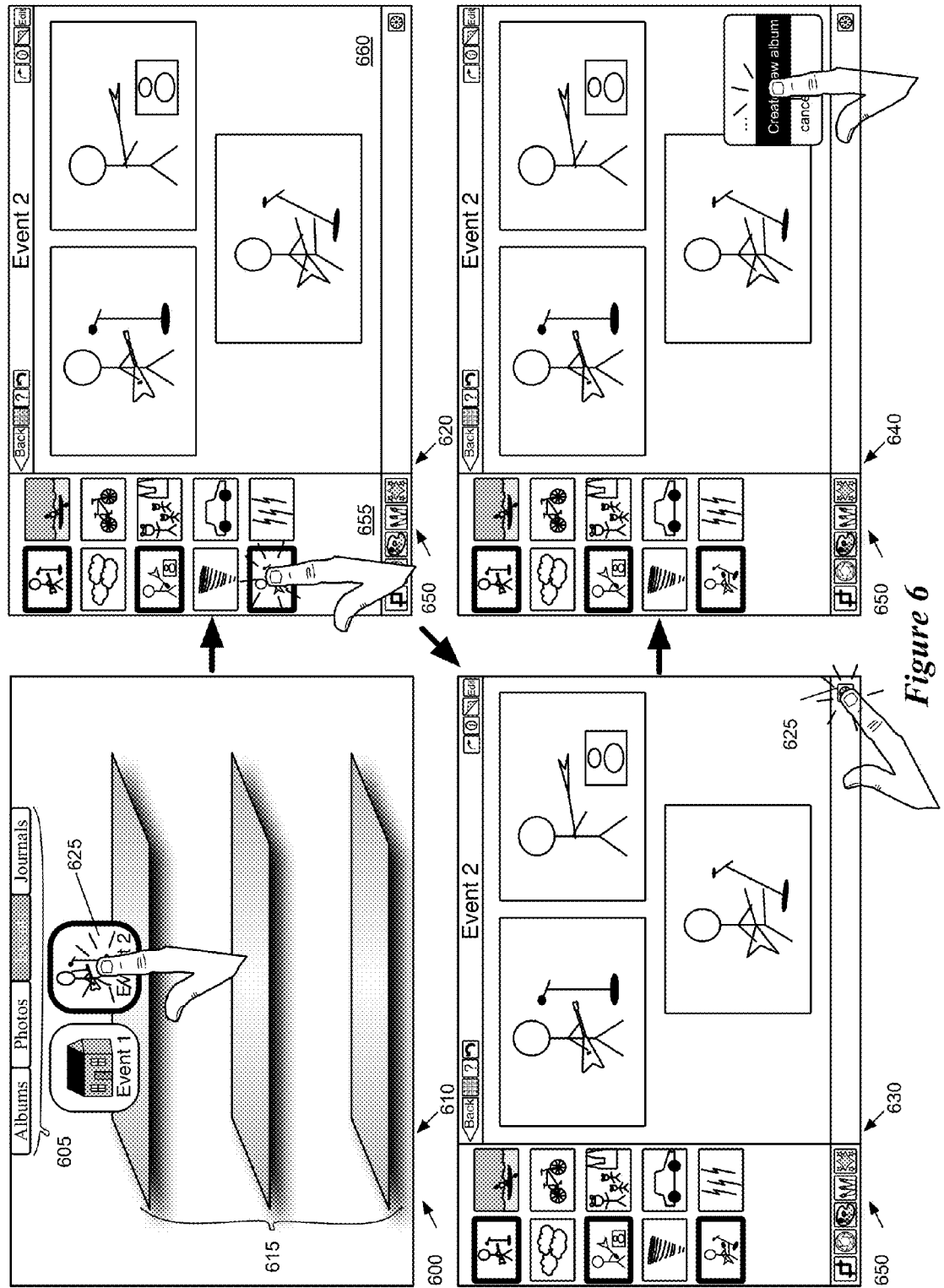
FIG. 6 illustrates the creation of a new collection of images according to some embodiments.

FIG. 6 illustrates the creation of a new collection of images over four stages 610-640 according to some embodiments. Specifically, the stages illustrate a user selecting a particular event collection, selecting several images within the event, and then forming an album from the selected images. In this figure, as well as many others within this document, user interactions are shown in a first stage and the resulting change in the GUI shown in the subsequent stage, for explanatory purposes. However, one of ordinary skill in the art will recognize that in most cases, the delay between receiving a user interaction and the change in the display will be nearly instantaneous.

The first stage 610 illustrates a collection organization GUI 600 for displaying the collections of images available on the device. The GUI 600 includes a set of tabs 605 that allow a user to switch between different types of collections. The tabs 605 allow a user to choose albums (user-created collections of images), photos (one collection that amalgamates all of the images from the various other collections), events (collections of images that were imported together to the device on which the image-viewing application operates), and journals (a specific way of presenting and sharing collections of images). In some embodiments, the user can select the different tabs 605 to switch between the different types of collections. One of ordinary skill in the art will recognize that some embodiments include different tabs (e.g., a specific videos tab, tabs for other types of shareable collections, etc.).

The GUI 600 also includes shelves 615 that display icons representing the various collections available to a user. In some embodiments, the shelves 615 are displayed to give a three-dimensional appearance of glass shelves, with reflections and shadows. The icons representing albums, photos, events, and journals have the appearance of resting on the glass shelves and casting shadows that are seen in the GUI. At stage 610, the GUI includes an icon 625 representing a collection of images called "Event 2" that the user selects (in this case, through a touch operation).

The second stage 620 illustrates a GUI 650 that results from the user selecting the icon 625, as well as the results of additional selections within the resultant GUI 650. When a particular collection is selected, the application displays a GUI for the particular collection. The GUI 650 includes a thumbnail display area 655, an image display area 660, as well as various other GUI items that will be described in further detail below by reference to FIG. 14. The GUI 650 also displays, at its top, the name of the collection that it is displaying (in this case, "Event 2").

In this stage, the user has selected three thumbnails in the thumbnail display area 655, and the application displays the three corresponding images in the image display area 660. Details regarding different manners of selecting multiple images will be described in detail below in Section IV.

In the third stage 630, the user selects a settings GUI item 665 (e.g., via a touch interaction, a cursor controller, etc.). The settings item, in some embodiments, activates a menu that is based on the context of the user's previous actions within the application. For instance, when the user has activated a particular set of editing tools, the settings menu may include options related to the activated editing tools.

In this case, however, the user is in a viewing mode, and the settings menu includes an option of "Create new album". The fourth stage 640 illustrates the user selecting this menu option to create a new album. In some embodiments, selecting this option causes the application to create a new album from the selected images. Some embodiments include other options related to albums in the settings menu, such as adding selected images to a previously-created album. In addition, some embodiments provide different mechanisms for creating a new album. For instance, in some embodiments, a user can create a new album through the collections organization GUI 600, then add new images to the album by accessing a different collection.

Furthermore, upon creating a new album, some embodiments display a new window or dialog box through which the user can set the parameters of the new album. For instance, users can enter an album name and, in some cases, determine whether to include all selected images, all images in the present collection, or choose images from another collection, as well as other options.

Some embodiments, however, do not provide the option to create new albums. Albums can be imported into the image-viewing application from additional applications running on the same device (e.g., a separate image organization application). Instead, the only form of collection that the user may create from a selection of several images is a journal. In addition, by flagging an image or setting an image as a favorite, the user causes the image to be added to an album specific to those tags.

Figure 7:
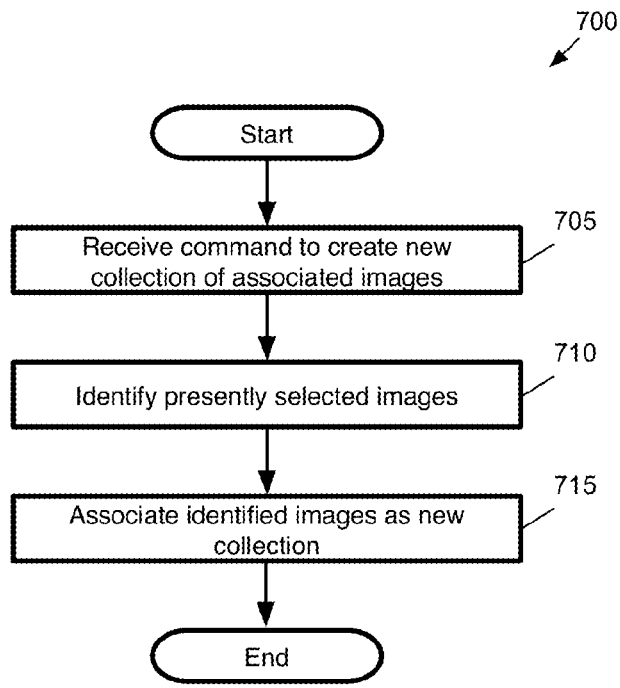
FIG. 7 conceptually illustrates a process of some embodiments for creating a new collection of images (e.g., an album).

FIG. 7 conceptually illustrates a process 700 of some embodiments for creating a new collection of images (e.g., an album). As shown, the process 700 begins by receiving (at 705) a command to create a new collection of images. In some embodiments, this command is a user command such as the "Create new album" menu option shown in FIG. 6, though one of ordinary skill will recognize that the command could be received through various different user input devices as well as through various different GUI constructs. Furthermore, as stated above, in some embodiments the only type of collection that a user could create by request is a journal.

The process 700 next identifies (at 710) the presently selected images. In some embodiments, a users can select a subset of the images in a particular collection, and then instruct the application to create a new collection from the selected images.

The process then associates (at 715) the identified images as a new collection. In FIG. 6, three images are shown as presently selected, and thus these three images will be associated as a new collection. In some embodiments, the application creates a new collection data structure for the newly generated collection, and stores references (e.g., pointers, database reference IDs, etc.) to each of the images in the collection.

Figure 8:
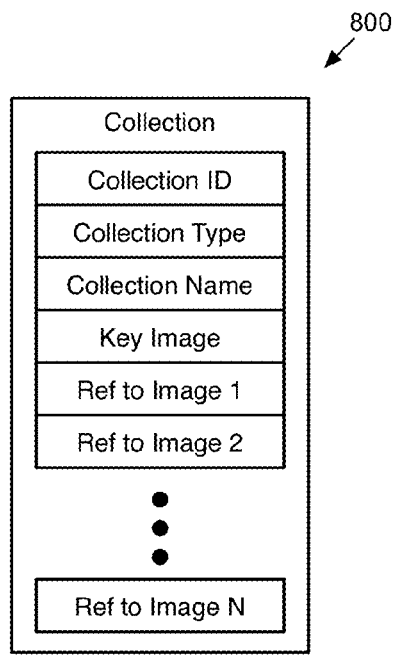
FIG. 8 conceptually illustrates a collection data structure 800 of some embodiments.

FIG. 8 conceptually illustrates a collection data structure 800 of some embodiments. When a user generates a new album or imports new images for a new event, the application automatically creates a new collection data structure for the album or event. The collection data structure 800 includes a collection ID, a collection type, a collection name, a key image, and references to a set of images. The collection ID is a unique identifier for the collection, that the application uses when referencing the collection. The collection type is the type of collection (e.g., album, event, journal, etc.). In some embodiments, the application includes the "photos" collection, which references each image imported into the application irrespective of which other collections also include the image. The collection name is the user-assigned name for the collection, which is displayed at the top of the image viewing and editing GUI when the collection is selected as well as the name used for the collection's icon in the collection organization GUI.

The key image is an image set by the user to represent the collection. In some embodiments, the application displays the key image as the selectable icon for the collection on the glass shelf in the collection organization GUI. In addition, the collection data structure 800 includes an ordered series of references to each image in the collection. The order of the images determines the order in which the thumbnails are displayed within the thumbnail display area in some embodiments. As will be described below, some embodiments store data structures for each image imported into the application, and the collections reference these data structures. These references may be pointers, references to database entries, etc.

Figure 9:
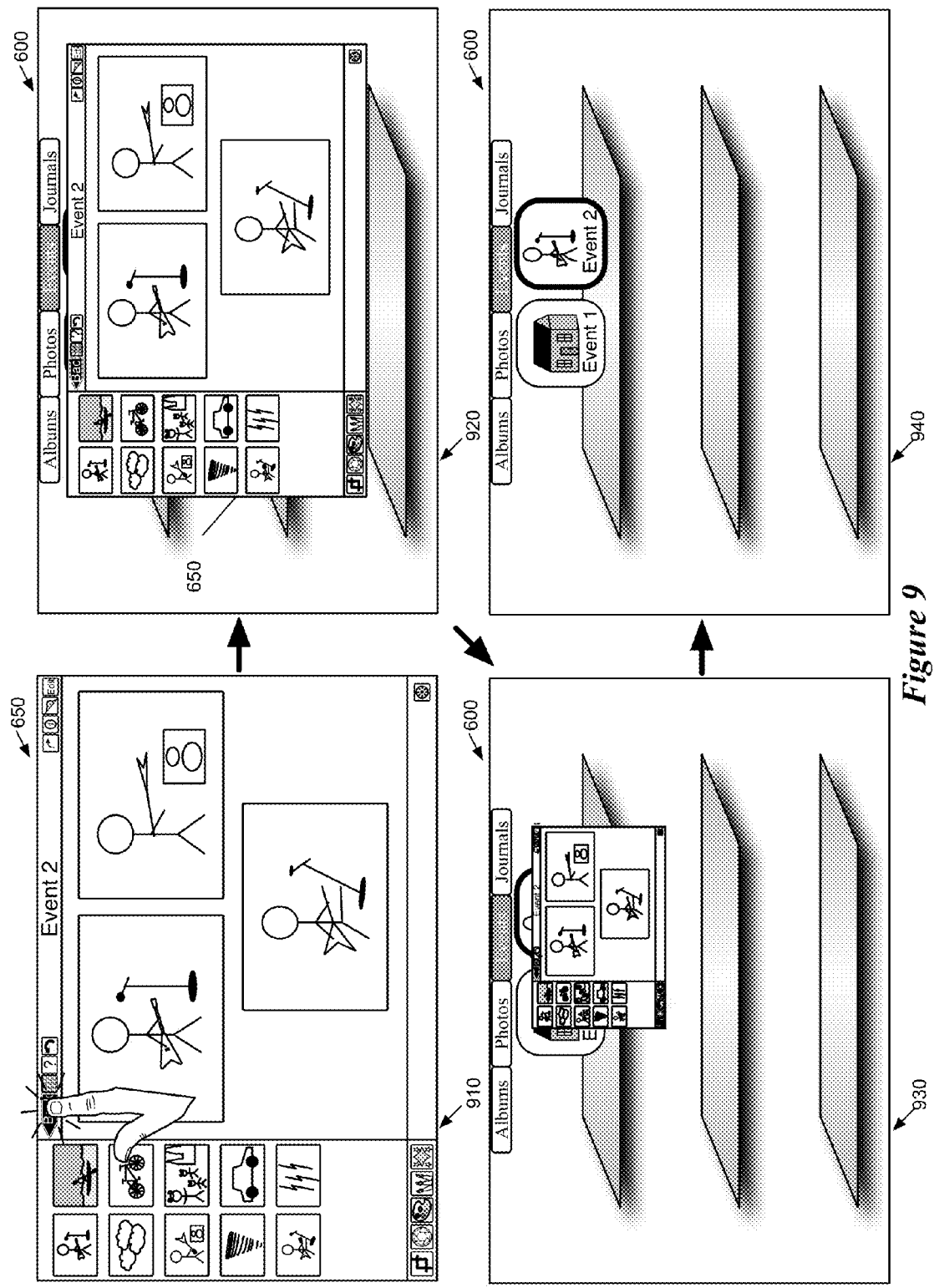
FIG. 9 illustrates navigation between the image organization, viewing, and editing GUI and the collection organization GUI.

FIG. 9 illustrates navigation between the image organization, viewing, and editing GUI 650 (referred to in some places below as an image viewing GUI, image editing GUI, etc.) and the collection organization GUI 600 over four stages 910-940. As shown, in the first stage 910, the user selects a back button 905. In some embodiments, this button causes the application to transition back to the collection organization GUI 600. In some embodiments, the application animates this transition by minimizing the image viewing GUI 650 so that it shrinks into the collection icon of the collection that had been displayed. Stages 920-940 illustrate this animation.

In the second stage 920, the image viewing GUI 650 has begun to shrink, so that the edges of the collection organization GUI 600 are visible. As shown, the application does not necessarily minimize the image viewing GUI 650 towards the center, but instead towards the location of the icon that represents the collection displayed in the GUI. The third stage 930 shows the application display at a point at which the image viewing GUI is barely larger than the collection icon 625. Finally, at the fourth stage 940, the image viewing GUI has fully minimized and only the collection display area is shown. While this figure illustrates the entire GUI 650 (i.e., the thumbnail display area, toolbars, and image display area) minimizing, some embodiments remove the thumbnail display area and toolbars from the display as soon as the user hits the back button, so that only the image display area is shown being minimized.

Figure 10:
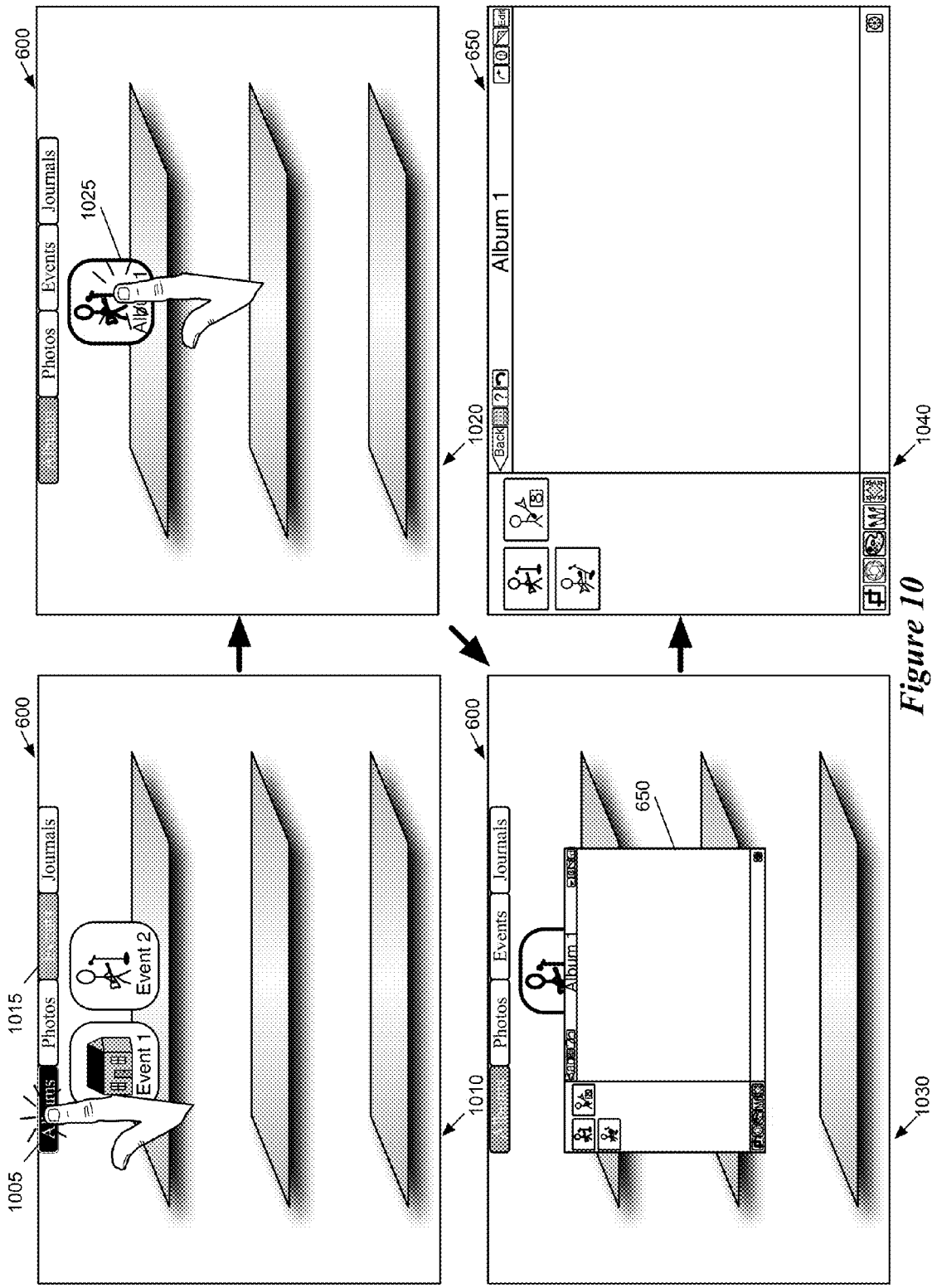
FIG. 10 illustrates a user navigating within the collection organization GUI to view a newly created album.

FIG. 10 illustrates a user navigating within the collection organization GUI 600 to view the newly created album, over four stages 1010-1040. Within the collection organization GUI 600, users can use the tabs 605 to choose between the albums, photos, events, and journals. As described below, users can also use swipe gestures to navigate between the different tabs. The first stage 1010 illustrates a selection of the albums tab 1005 while the events tab 1015 is active. As shown, some embodiments highlight the selected tab during the selection (e.g., while a finger is pressing down over the tab, while a mouse button is held down with a cursor over the tab, etc.).

The second stage 1020 illustrates that the albums tab 1005 is now active. In some embodiments, the application animates the transition between the different tabs (i.e., shows the events sliding out of the GUI while new shelves with the albums slide into the display). The shelves for the albums only include an icon 1025 that represents "Album 1". At this stage, the user selects the icon 1025 in order to access this album. In some embodiments, this causes a transition to the image viewing GUI 650.

As shown in stage 1030, the application of some embodiments animates this transition as the opposite of the minimization animation shown in FIG. 9. Thus, at stage 1030, the image viewing GUI 650 has begun to expand out of the selected icon 1025. The fourth stage 1040 illustrates the result of this selection with the application displaying the image viewing GUI 650. The GUI indicates at the top that the currently active collection is "Album 1". In the thumbnail display area, the only thumbnails are those for the three images that were shown as selected for "Album 1" in FIG. 6. Some embodiments do not initially display any of the images in the image display area, instead waiting for a user to select one or more images. Other embodiments, however, initially select the first image in the ordered series for the collection or the key image for the collection. Yet other embodiments store persistent data for each collection that indicates which image or images were selected the last time the collection was opened on the device, and use this persistent data to display the collection upon its selection.

Figure 11:
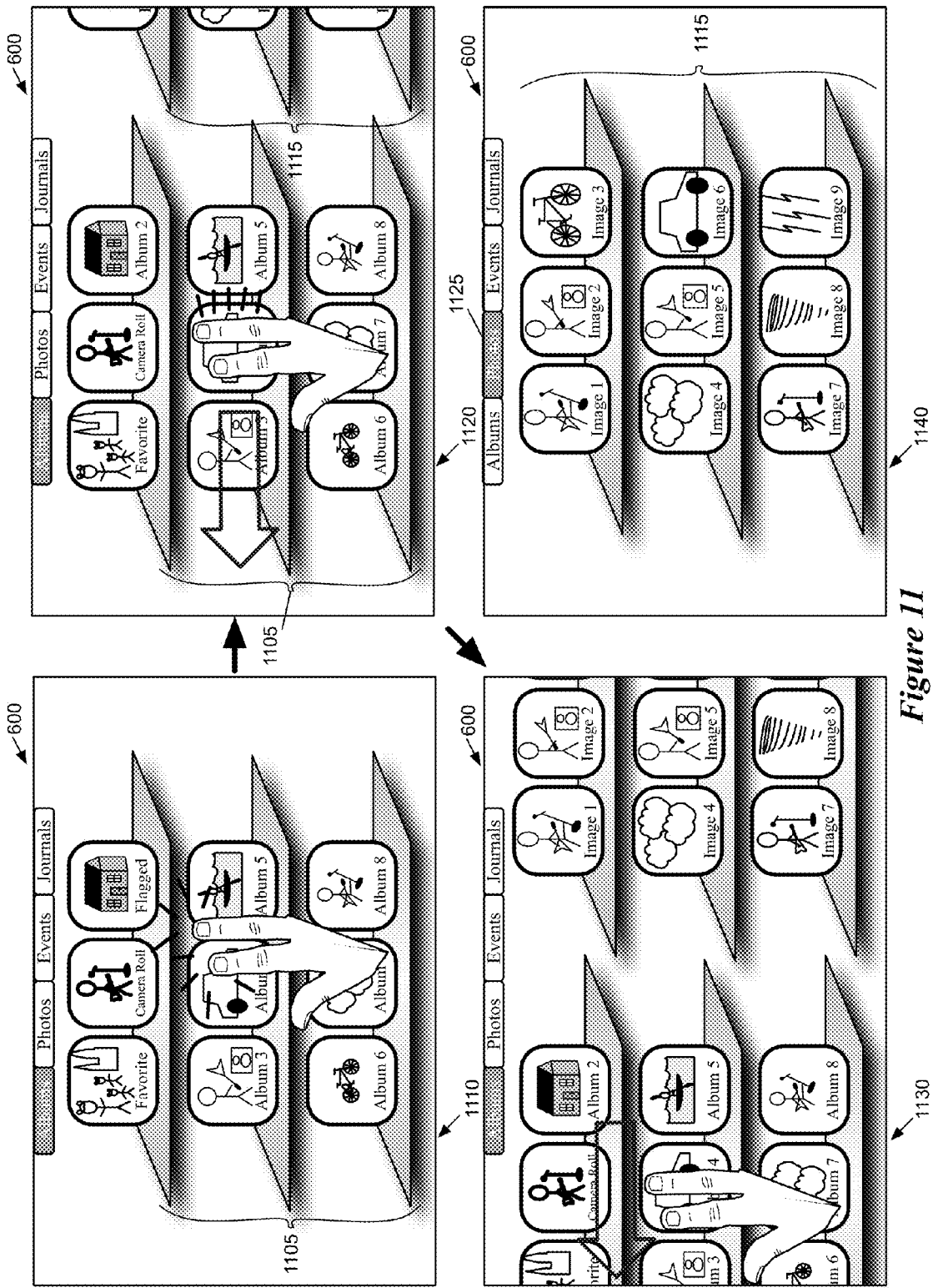
FIG. 11 illustrates a user navigating through the collection organization GUI over according to some embodiments.

FIG. 11 illustrates a user navigating through the collection organization GUI 600 over four stages 1110-1140 according to some embodiments. As shown in the first stage 1110, the application stores information on at least nine albums, including a Favorites album, a Camera Roll album, a Flagged photos album, as well as other albums. In some embodiments, users can tag an image as a favorite or flagged, which automatically places the image in the corresponding album. In addition, some embodiments automatically add to the Camera Roll album any image captured with the device on which the application operates.

In some embodiments, a swipe gesture causes the application to navigate between the tabs. FIG. 11 illustrates such a gesture. As shown, in the first stage 1110 the user contacts the touchscreen with two fingers. In the next stage 1120, the user moves the two fingers leftwards while maintaining contact with the touchscreen. As shown, the shelves 1105 begin moving to the left, as a second set of shelves 1115 approaches from the right side of the GUI. In the third stage 1130, the user has released the point of contact with the touchscreen after sliding her fingers at least a threshold distance to qualify as a swipe gesture. In addition, the new set of shelves 1115 have continued moving to the left, replacing the shelves 1105, as shown by the arrows.

The fourth stage 1140 illustrates that the shelves 1115 have fully moved into the GUI 600. Furthermore, the photos tab 1125 is now highlighted in the display. Using these swipe gestures, the user can easily navigate between the different tabs without being required to specifically select the tab. When the user navigates to the photos tab, some embodiments display a similar set of shelves as for the other tabs, but display individual image thumbnails instead of collections. These shelves include a thumbnail for each image imported into the image viewing application, which enable the user to navigate directly to a specific image (e.g., to edit the image, share the image, etc.).

Figure 12:
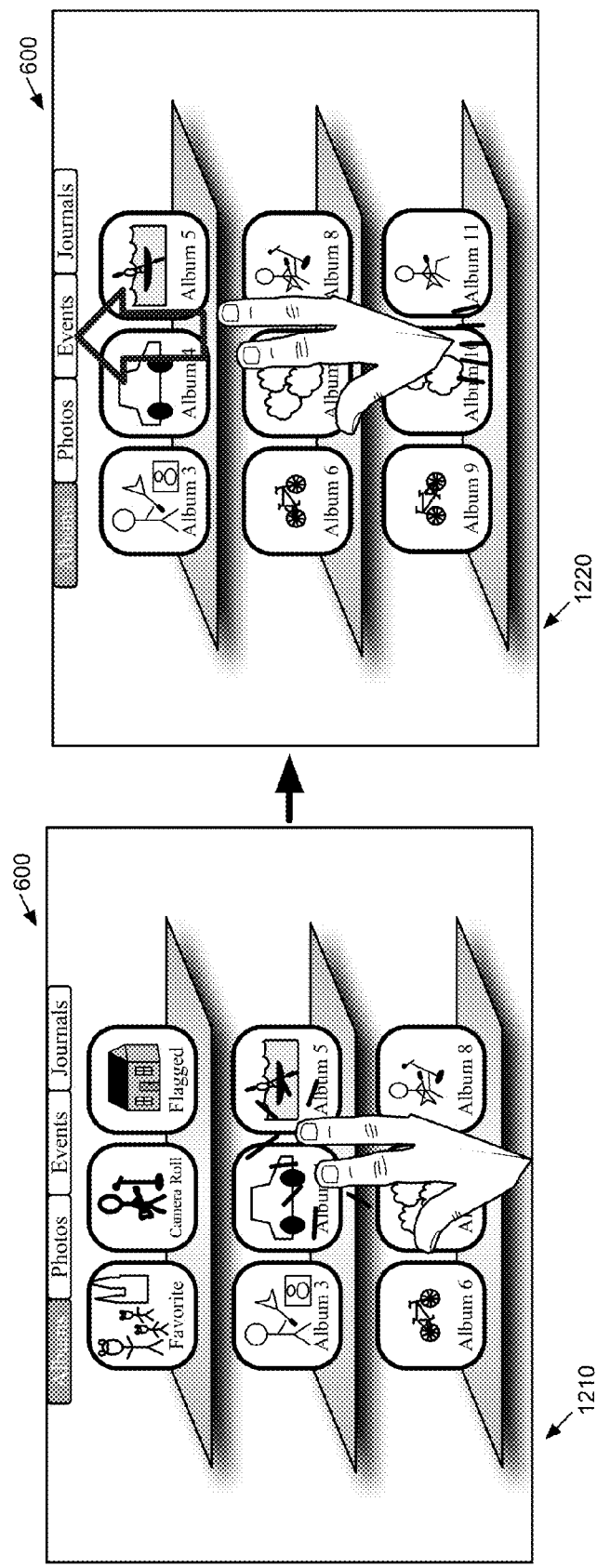
FIG. 12 illustrates a vertical scrolling technique according to some embodiments.

Although the shelves 1105 are entirely filled in the first stage 1110 of FIG. 11, a particular instance of the application might store more than the maximum number of collections that can be shown on the device at once. As such, the application of some embodiments enables users to scroll through the shelves vertically. FIG. 12 illustrates such a scrolling technique according to some embodiments over two stages 1210 and 1220 of the GUI 600.

In stage 1210, the user contacts the touchscreen with two fingers. In the next stage 1220, the user moves the two fingers upwards while maintaining contact with the touchscreen. This causes the shelves to slide upwards through the GUI 600. As a result, an additional shelf has appeared at the bottom of the GUI 600 and the top shelf has disappeared. As this is a smooth scrolling technique, in some embodiments the shelves do not move discretely, but instead may scroll partially on or off the top and bottom of the display depending on the distance of the user's swiping gesture.

The image-viewing application of some embodiments allows users to create an essentially unlimited number of albums, so long as the storage capacity is available on the device. Similarly, users can have an unlimited number of events, photos, or journals. One of ordinary skill in the art will recognize that other gestures and inputs may be used to navigate between sets of shelves. For example, some embodiments include an unlimited number of shelves stacked vertically, so that swiping upwards scrolls continuously through the shelves. In addition, some embodiments respond to tap or click inputs on the left and right sides of the screen as an alternative to or in conjunction with the swipe inputs.

The image viewing, editing, and organization application of some embodiments operates on a mobile device. Some embodiments operate on a tablet device (e.g., an iPad®), while other embodiments operate on a mobile phone (e.g., an iPhone®) or a media player (e.g., an iPod®). The GUI of the tablet implementation of some embodiments is different from the GUI of the mobile phone/media player implementation of some embodiments, though other embodiments of the tablet implementation may use the mobile phone/media player GUI, and vice versa.

Figure 13:
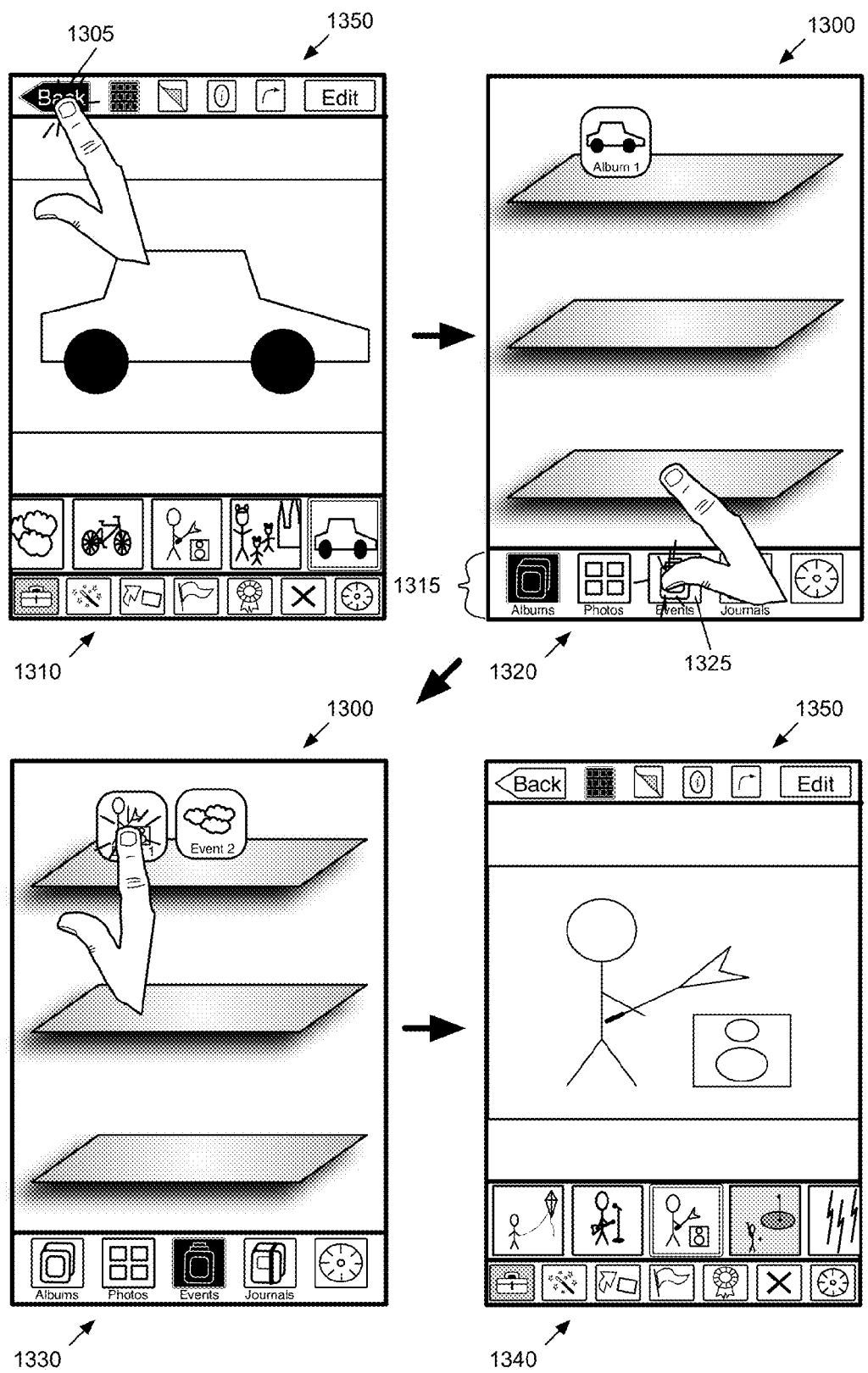
FIG. 13 illustrates navigation between the image viewing and editing GUI and the collection organization GUI over four stages for the mobile phone and media player implementation of some embodiments while in portrait mode.

FIG. 13 illustrates the navigation between the image viewing and editing GUI 1350 and the collection organization GUI 1300 over four stages 1310-1340 for the mobile phone and media player implementation of some embodiments while in portrait mode. The first stage 1310 illustrates the image viewing and editing GUI 1350, which includes many of the same features as the image viewing and editing GUI 650. This GUI will be described in greater detail below. In this stage, a user selects the back button 1305, in order to navigate back to the collection organization GUI.

The second stage 1320 illustrates the collection organization GUI 1300 of some embodiments. Like the GUI 600, this GUI displays a set of shelves (e.g., glass shelves) with icons that represent the different collections. However, whereas the GUI 600 included a set of tabs for the different types of collections, the GUI 700 includes a set of selectable icons 1315 at the bottom of the display. These icons include selections for albums (currently selected), photos, events, and journals. In addition, the display includes a settings menu.

At this stage 1320, the user selects the events icon 1325. The third stage 1325 illustrates that the events icon 1325 is now selected, and icons for different collections (two events) are shown on the shelves. The user selects one of these events, and the fourth stage 1340 illustrates the image viewing GUI 1350 for the selected collection as a result.

II. Image Viewing

Figure 14:
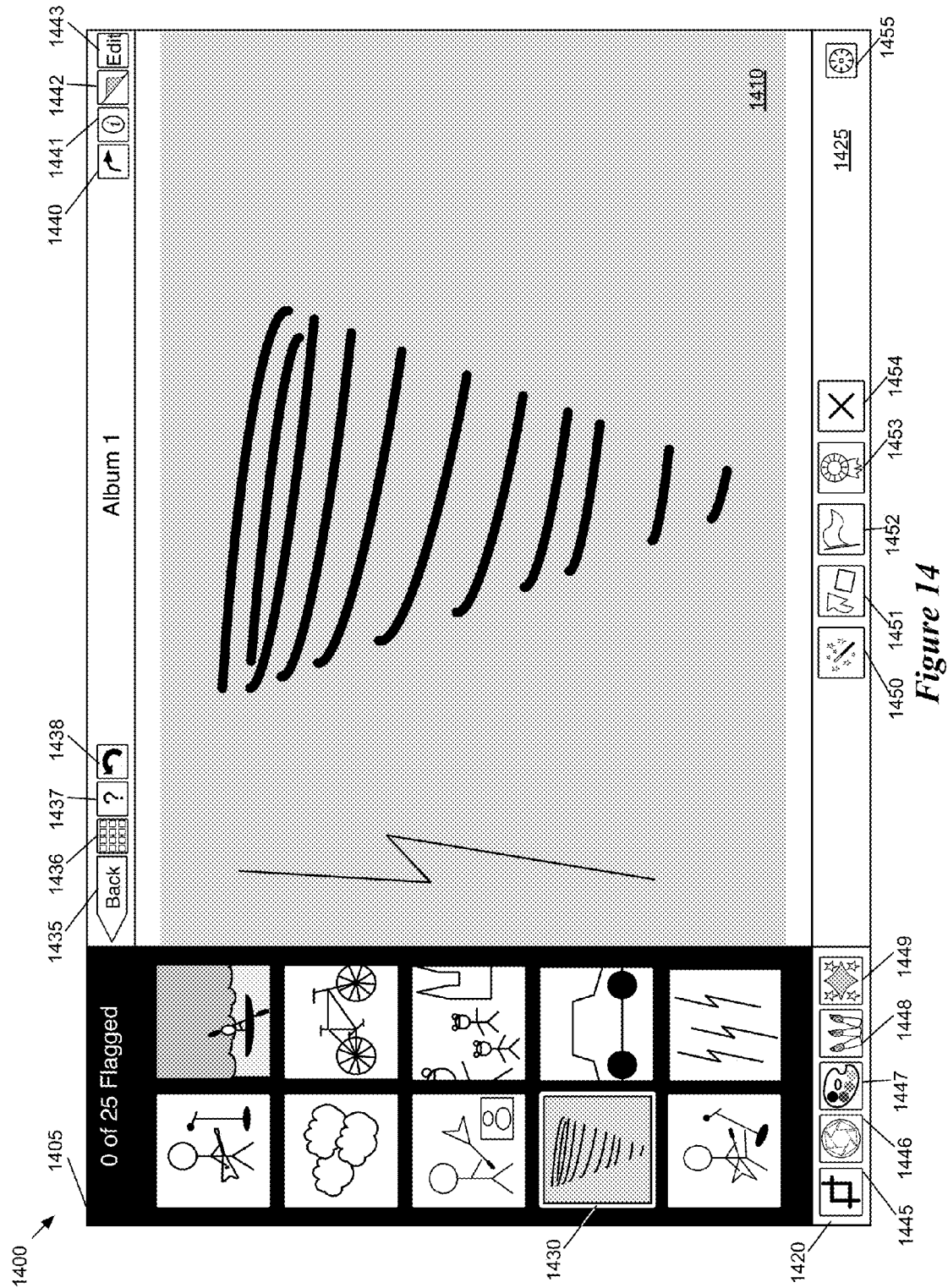
FIG. 14 illustrates a detailed view of a GUI of some embodiments for viewing, editing, and organizing images.

The above-described figures illustrated various examples of the image viewing GUI of some embodiments. FIG. 14 illustrates a detailed view of a GUI 1400 of some embodiments for viewing, editing, and organizing images. The GUI 1400 will be described in part by reference to FIG. 15, which conceptually illustrates a data structure 1500 for an image as stored by the application of some embodiments.

The data structure 1500 includes an image ID 1505, image data 1510, edit instructions 1515, Exchangeable image file format (Exif) data 1525, a caption 1530, shared image data 1535, cached versions 1540 of the image, any tags 1545 on the image, and any additional data 1550 for the image. The image ID 1505 is a unique identifier for the image, which in some embodiments is used by the collection data structures to refer to the images stored in the collection.

The image data 1510 is the actual full-size pixel data for displaying the image (e.g., a series of color-space channel values for each pixel in the image or an encoded version thereof). In some embodiments, this data may be stored in a database of the image viewing, editing, and organization application, or may be stored with the data of another application on the same device. Thus, the data structure may store a pointer to the local file associated with the application or an ID that can be used to query the database of another application. In some embodiments, once the application uses the image in a journal or makes an edit to the image, the application automatically makes a local copy of the image file that contains the image data.

The edit instructions 1515 include information regarding any edits the user has applied to the image. In this manner, the application stores the image in a non-destructive format, such that the application can easily revert from an edited version of the image to the original at any time. For instance, the user can apply a saturation effect to the image, leave the application, and then reopen the application and remove the effect at another time. The edits stored in these instructions may be crops and rotations, full-image exposure and color adjustments, localized adjustments, and special effects, as well as other edits that affect the pixels of the image. Some embodiments store these editing instructions in a particular order, so that users can view different versions of the image with only certain sets of edits applied.

The Exif data 1525 includes various information stored by the camera that captured the image, when that information is available. While Exif is one particular file format that is commonly used by digital cameras, one of ordinary skill in the art will recognize that comparable information may be available in other formats as well, or may even be directly input by a user. The Exif data 1525 includes camera settings data, GPS data, and a timestamp. The camera settings data includes information about the camera settings for a image, if that information is available from the camera that captured the image. This information, for example, might include the aperture, focal length, shutter speed, exposure compensation, and ISO. The GPS data 1525 indicates the location at which an image was captured, while the timestamp indicates the time (according to the camera's clock) at which the image was captured.

The caption 1530 is a user-entered description of the image. In some embodiments, this information is displayed with the image in the image viewing area, but may also be used to display over the image in a created journal, and may be used if the image is posted to a social media or photo-sharing website. When the user posts the image to such a website, the application generates shared image data 1535 for the image. This information stores the location (e.g., Facebook®, Flickr®, etc.), as well as an object ID for accessing the image in the website's database. The last access date is a date and time at which the application last used the object ID to access any user comments on the image from the social media or photo sharing website.

The cached image versions 1540 store versions of the image that are commonly accessed and displayed, so that the application does not need to repeatedly generate these images from the full-size image data 1510. For instance, the application will often store a thumbnail for the image as well as a display resolution version (e.g., a version tailored for the image display area). The application of some embodiments generates a new thumbnail for an image each time an edit is applied, replacing the previous thumbnail. Some embodiments store multiple display resolution versions including the original image and one or more edited versions of the image.

The tags 1545 are information that the application enables the user to associate with an image. For instance, in some embodiments, users can mark the image as a favorite, flag the image (e.g., for further review), and hide the image so that the image will not be displayed within the standard thumbnail grid for a collection and will not be displayed in the image display area when the user cycles through a collection that includes the image. Other embodiments may include additional tags. Finally, the image data structure 1500 includes additional data 1550 that the application might store with an image (e.g., locations and sizes of faces, etc.).

One of ordinary skill in the art will recognize that the image data structure 1500 is only one possible data structure that the application might use to store the required information for an image. For example, different embodiments might store additional or less information, store the information in a different order, etc.

Returning to FIG. 14, the GUI 1400 includes a thumbnail display area 1405, an image display area 1410, a first toolbar 1415, a second toolbar 1420, and a third toolbar 1425. The thumbnail display area 1405 displays thumbnails of the images in a selected collection. Thumbnails are small representations of a full-size image, and represent only a portion of an image in some embodiments. For example, the thumbnails in thumbnail display area 1405 are all squares, irrespective of the aspect ratio of the full-size images. In order to determine the portion of a rectangular image to use for a thumbnail, the application identifies the smaller dimension of the image and uses the center portion of the image in the longer direction. For instance, with a 1600×1200 pixel image, the application would use a 1200×1200 square. To further refine the selected portion for a thumbnail, some embodiments identify a center of all the faces in the image (using a face detection algorithm), then use this location to center the thumbnail portion in the clipped direction. Thus, if the faces in the theoretical 1600× 1200 image were all located on the left side of the image, the application would use the leftmost 1200 columns of pixels rather than cut off 200 columns on either side.

After determining the portion of the image to use for the thumbnail, the image-viewing application generates a low resolution version (e.g., using pixel blending and other techniques) of the image. The application of some embodiments stores the thumbnail for an image as a cached version 1540 of the image. Thus, when a user selects a collection, the application identifies all of the images in the collection (through the collection data structure), and accesses the cached thumbnails in each image data structure for display in the thumbnail display area.

The user may select one or more images in the thumbnail display area (e.g., through various touch interactions described in Section IV below). The selected thumbnails are displayed with a highlight or other indicator of selection. In thumbnail display area 1405, the thumbnail 1430 is selected. In addition, as shown, the thumbnail display area 1405 of some embodiments indicates a number of images in the collection that have been flagged (i.e., that have a tag 1545 for the flag set to yes). In some embodiments, this text is selectable in order to display only the thumbnails of the flagged images.

The application displays selected images in the image display area 1410 at a larger resolution than the corresponding thumbnails. The images are not typically displayed at the full size of the image, as images often have a higher resolution than the display device. As such, the application of some embodiments stores a cached version 1540 of the image designed to fit into the image display area. Images in the image display area 1410 are displayed in the aspect ratio of the full-size image. When one image is selected, the application displays the image as large as possible within the image display area without cutting off any part of the image. When multiple images are selected, the application displays the images in such a way as to maintain their visual weighting by using approximately the same number of pixels for each image, even when the images have different aspect ratios.

The first toolbar 1415 displays title information (e.g., the name of the collection shown in the GUI, a caption that a user has added to the currently selected image, etc.). In addition, the toolbar 1415 includes a first set of GUI items 1435-1438 and a second set of GUI items 1440-1443.

The first set of GUI items includes a back button 1435, a grid button 1436, a help button 1437, and an undo button 1438. The back button 1435 enables the user to navigate back to the collection organization GUI, as shown above in FIG. 9. Selection of the grid button 1436 causes the application to move the thumbnail display area on or off of the GUI (e.g., via a slide animation). In some embodiments, users can also slide the thumbnail display area on or off of the GUI via a swipe gesture. The help button 1437 activates a context-sensitive help feature that identifies a current set of tools active for the user and provides help indicators for those tools that succinctly describe the tools to the user. In some embodiments, the help indicators are selectable to access additional information about the tools. Selection of the undo button 1438 causes the application to remove the most recent edit to the image, whether this edit is a crop, color adjustment, etc. In order to perform this undo, some embodiments remove the most recent instruction from the set of edit instructions 1515 stored with the image.

The second set of GUI items includes a sharing button 1440, an information button 1441, a show original button 1442, and an edit button 1443. The sharing button 1440 enables a user to share an image in a variety of different ways. In some embodiments, the user can send a selected image to another compatible device on the same network (e.g., Wi-Fi or Bluetooth network), upload an image to an image hosting or social media website, and create a journal (i.e., a presentation of arranged images to which additional content can be added) from a set of selected images, among others.

The information button 1441 activates a display area that displays additional information about one or more selected images. The information displayed in the activated display area may include some or all of the Exif data 1525 stored for an image (e.g., camera settings, timestamp, etc.). When multiple images are selected, some embodiments only display Exif data that is common to all of the selected images. Some embodiments include additional tabs within the information display area for (i) displaying a map showing where the image or images were captured according to the GPS data, if this information is available and (ii) displaying comment streams for the image on any photo sharing websites. To download this information from the websites, the application uses the object ID stored for the image with the shared image data 1535 and sends this information to the website. The comment stream and, in some cases, additional information, are received from the website and displayed to the user.

The show original button 1442 enables the user to toggle between the original version of an image and the current edited version of the image. When a user selects the button, the application displays the original version of the image without any of the editing instructions 1515 applied. In some embodiments, the appropriate size image is stored as one of the cached versions 1540 of the image, making it quickly accessible. When the user selects the button again 1442 again, the application displays the edited version of the image, with the editing instructions 1515 applied.

The edit button 1443 allows the user to enter or exit edit mode. When a user has selected one of the sets of editing tools in the toolbar 1420, the edit button 1443 returns the user to the viewing and organization mode, as shown in FIG. 14. When the user selects the edit button 1443 while in the viewing mode, the application returns to the last used set of editing tools in the order shown in toolbar 1420. That is, the items in the toolbar 1420 are arranged in a particular order, and the edit button 1443 activates the rightmost of those items for which edits have been made to the selected image.

The toolbar 1420, as mentioned, includes five items 1445-1449, arranged in a particular order from left to right. The crop item 1445 activates a cropping and rotation tool that allows the user to align crooked images and remove unwanted portions of an image. The exposure item 1446 activates a set of exposure tools that allow the user to modify the black point, shadows, contrast, brightness, highlights, and white point of an image. In some embodiments, the set of exposure tools is a set of sliders that work together in different combinations to modify the tonal attributes of an image. The color item 1447 activates a set of color tools that enable the user to modify the saturation and vibrancy, as well as color-specific saturations (e.g., blue pixels or green pixels) and white balance. In some embodiments, some of these tools are presented as a set of sliders. The brushes item 1448 activates a set of enhancement tools that enable a user to localize modifications to the image. With the brushes, the user can remove red-eye and blemishes, and apply or remove saturation and other features to localized portions of an image by performing a rubbing action over the image. Finally, the effects item 1449 activates a set of special effects that the user can apply to the image. These effects include gradients, tilt shifts, non-photorealistic desaturation effects, grayscale effects, various filters, etc. In some embodiments, the application presents these effects as a set of items that fan out from the toolbar 1425.

As stated, the UI items 1445-1449 are arranged in a particular order. This order follows the order in which users most commonly apply the five different types of edits. Accordingly, the editing instructions 1515 are stored in this same order, in some embodiments. When a user selects one of the items 1445-1449, some embodiments apply only the edits from the tools to the left of the selected tool to the displayed image (though other edits remain stored within the instruction set 1515).

The toolbar 1425 includes a set of GUI items 1450-1454 as well as a settings item 1455. The auto-enhance item 1450 automatically performs enhancement edits to an image (e.g., removing apparent red-eye, balancing color, etc.). The rotation button 1451 rotates any selected images. In some embodiments, each time the rotation button is pressed, the image rotates 90 degrees in a particular direction. The auto-enhancement, in some embodiments, comprises a predetermined set of edit instructions that are placed in the instruction set 1515. Some embodiments perform an analysis of the image and then define a set of instructions based on the analysis. For instance, the auto-enhance tool will attempt to detect red-eye in the image, but if no red-eye is detected then no instructions will be generated to correct it. Similarly, automatic color balancing will be based on an analysis of the image. The rotations generated by the rotation button are also stored as edit instructions.

Figure 15:
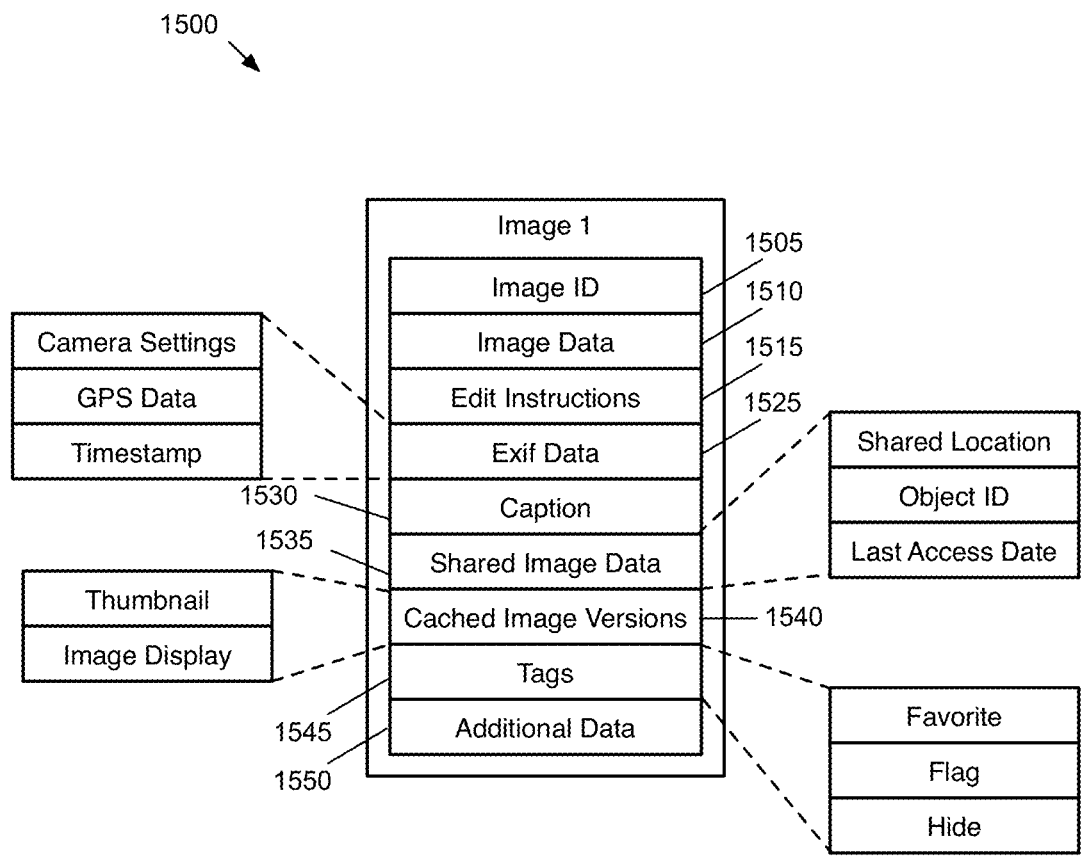
FIG. 15 conceptually illustrates a data structure for an image as stored by the application of some embodiments.

The flag button 1452 tags any selected image as flagged. In some embodiments, the flagged images of a collection can be displayed without any of the unflagged images. The favorites button 1453 allows a user to mark any selected images as favorites. In some embodiments, this tags the image as a favorite and also adds the image to a collection of favorite images. The hide button 1454 enables a user to tag an image as hidden. In some embodiments, a hidden image will not be displayed in the thumbnail display area and/or will not be displayed when a user cycles through the images of a collection in the image display area. As shown in FIG. 15, many of these features are stored as tags in the image data structure.

Finally, the settings button 1455 activates a context-sensitive menu that provides different menu options depending on the currently active toolset. For instance, in viewing mode the menu of some embodiments provides options for creating a new album, setting a key image for an album, copying settings from one image to another, and other options. When different sets of editing tools are active, the menu provides options related to the particular active toolset.

One of ordinary skill in the art will recognize that the image viewing and editing GUI 1400 is only one example of many possible graphical user interfaces for an image viewing, editing, and organizing application. For instance, the various items could be located in different areas or in a different order, and some embodiments might include items with additional or different functionalities. The thumbnail display area of some embodiments might display thumbnails that match the aspect ratio of their corresponding full-size images, etc.

III. Interaction in Different GUI Modes

FIG. 14, above, illustrated a particular graphical user interface 1400 of an image viewing, editing, and organization application. In some embodiments, the application provides multiple GUI modes, of which the GUI 1400 is only one. These modes may differentiate between portrait and landscape orientations, between left- and right-handed users, or other factors. Some embodiments have three different modes—portrait, left-handed landscape, and right-handed landscape. These modes present the same GUI items and display areas to the user, but arranged in different manners.

A. Left and Right Handed GUI

Some embodiments provide both a left-handed GUI and a right-handed GUI, between which users can switch. The different options may be presented in both portrait and landscape modes, or only in landscape. In some embodiments, to switch between the left-handed GUI and the right-handed GUI, the user moves a specific GUI item (e.g., the thumbnail display area) within the GUI. As a result of moving the specific GUI item from a first position to a second position, the application switches from providing the right-handed GUI to providing the left-handed GUI, or vice versa. The differences between the two GUIs, in some embodiments, are not only the location of the specific GUI item, but also the location and order (e.g., left to right order) of additional sets of GUI items.

Figure 16:
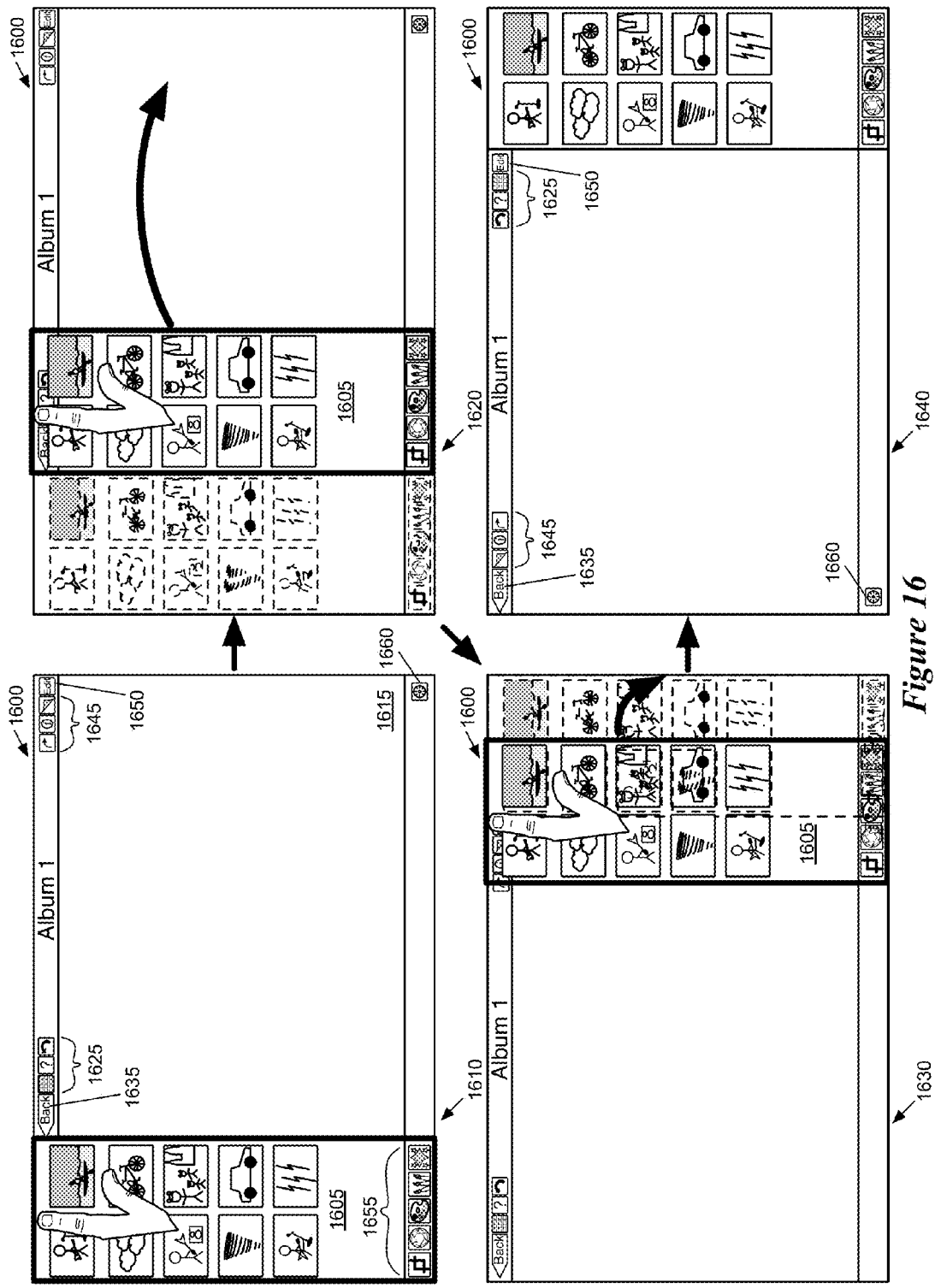
FIG. 16 illustrates a GUI over four stages in which the user moves a thumbnail display area from the left side to the right side of the GUI in order to switch from right-handed mode to left-handed mode.

FIG. 16 illustrates a GUI 1600 over four stages 1610-1640 in which the user moves a thumbnail display area 1605 from the left side to the right side of the GUI in order to switch from right-handed mode to left-handed mode. The GUI 1600 includes the thumbnail display area 1605, an image display area 1615, a first set of GUI items 1625 (the grid on/off, help, and undo buttons), a back button 1635, a second set of GUI items 1645 (the share, info, and toggle original buttons), an edit button 1650, a third set of GUI items 1655 (the edit tool activation buttons), and a settings menu button 1660

The first stage 1610 illustrates the GUI 1600 in right-handed mode. In the right-handed mode, the thumbnail display area 1605 is situated on the left-side of the GUI. The back button 1635 and the first set of GUI items 1625 are situated on the left of the upper toolbar, the edit button 1650 and the second set of GUI items 1655 are situated on the right of the upper toolbar, the third set of GUI items 1655 are situated at the bottom left (below the thumbnail display area), and the settings menu button is situated at the bottom right. This stage additionally shows that a user has placed a finger over the thumbnail display area in order to perform a touch gesture on the display area. In some embodiments, the thumbnail display area includes a header area that can be selected in order to move the display area.

The second stage 1620 illustrates that the user is in the midst of executing a drag (or swipe) gesture with one finger. To perform such a gesture, the user presses the finger down over the thumbnail display area and slides the finger along the touchscreen to the right, without releasing contact. As the user moves her fingers over the touchscreen, the application moves the thumbnail display area 1605 along with the finger.

The third stage 1630 illustrates that the user has moved the touchscreen further to the right along the touchscreen. In addition, this figure shows that as the user releases contact with the screen, the thumbnail display area 1605 snaps to the right edge of the GUI 1600. In some embodiments, when the user releases contact with the display area on the left side of the GUI, the thumbnail display area automatically snaps back to that side, and the same for the right side.

The fourth stage 1640 illustrates the GUI 1600 in left-handed mode after the user has released the thumbnail display area. In the left-handed mode, most of the GUI tools have switched sides. The settings menu button 1660 is now situated in the bottom left, while the third set of GUI items 1655 is situated in the bottom right. The third set of GUI items 1655 maintain their left to right order, from the crop activation button to the effects activation button. These items are arranged in the typical order in which the user will make edits to an image (cropping and rotating the image first, next adjusting exposure and color, then using the brushes for touchups, and finally applying any special effects to the image). As such, these tools are arranged in the same order in both GUI modes.

The sets of tools in the upper toolbar, however, switch places and reverse order. The back button 1635 and the edit button 1650 are fixed (except in that the entire toolbar slides to the left to accommodate the thumbnail display area 1605) as the leftmost and rightmost buttons, respectively. However, the first set of GUI items 1625 and the second set of GUI items 1645 switch locations and reverse their order. The first set of GUI items 1625 is now situated next to the edit button 1650, though in the opposite left to right order. Similarly, the second set of GUI items 1645 is now located next to the back button 1635, also in the opposite left to right order. These items that are not arranged in a particular order thereby maintain their relative positions to the thumbnail display area 1605.

In some embodiments, the GUI also includes the auto-enhance, rotation, flag, favorite, and hide buttons, as illustrated in FIG. 14. In some such embodiments, these GUI items remain in the bottom center of the GUI when in left-handed mode and stay in the same order. In other embodiments, however, the auto-enhance button is on the right side of this set of items while the hide button is on the left side in left-handed mode.

While this figure illustrates the user making the drag gesture with the left hand in order to switch to the left-handed GUI, some embodiments allow the user to drag the thumbnail display area in either direction with a finger of either hand (or with a different gesture, such as a two-finger drag, a swipe, etc.). In this sense, the GUIs are not responsive to which hand the user actually uses, but rather to the location of the thumbnail display area. On the other hand, the application of some embodiments can recognize which hand the user is using (e.g., based on the relative positions of different contacts of the touchscreen) and switch the display accordingly. Other embodiments can differentiate between hands for certain gestures (e.g., a simultaneous touch of all five fingers to the center of the screen) and use these gestures as commands to switch from one mode to the other.

In addition to having left- and right-handed GUI modes, some embodiments display the image viewing and editing GUI differently in portrait and landscape modes. In some embodiments, the thumbnail display area is located in a different area of the display when in portrait mode as compared to either left-handed or right-handed landscape mode. For example, in some embodiments the application displays the thumbnail display area at the bottom of the portrait GUI.

Some embodiments determine the location of the various GUI items in portrait mode based on the most recently used landscape mode for the application. For example, some embodiments operate on devices with a built-in accelerometer or gyroscope that identifies whether the device is oriented upright or sideways, and provides this information through the operating system to the applications. When the user reorients the device to portrait mode, some embodiments align the GUI elements of the image-viewing application based on the landscape mode to which the GUI was set before the reorientation.

Figure 17:
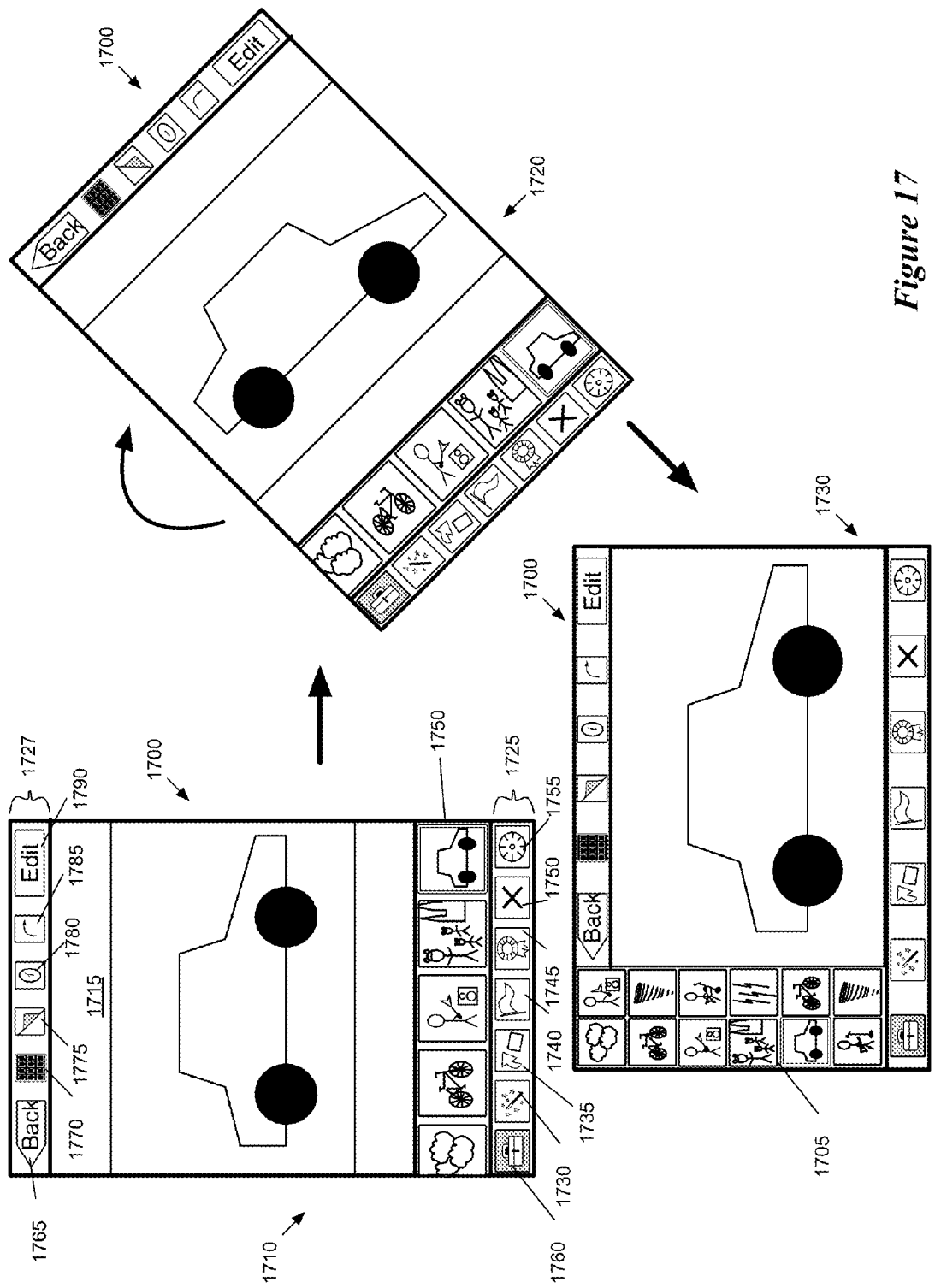
FIGS. 17-19 illustrate left-handed and right-handed GUI modes of some embodiments, in both portrait and landscape mode.
Figure 18:
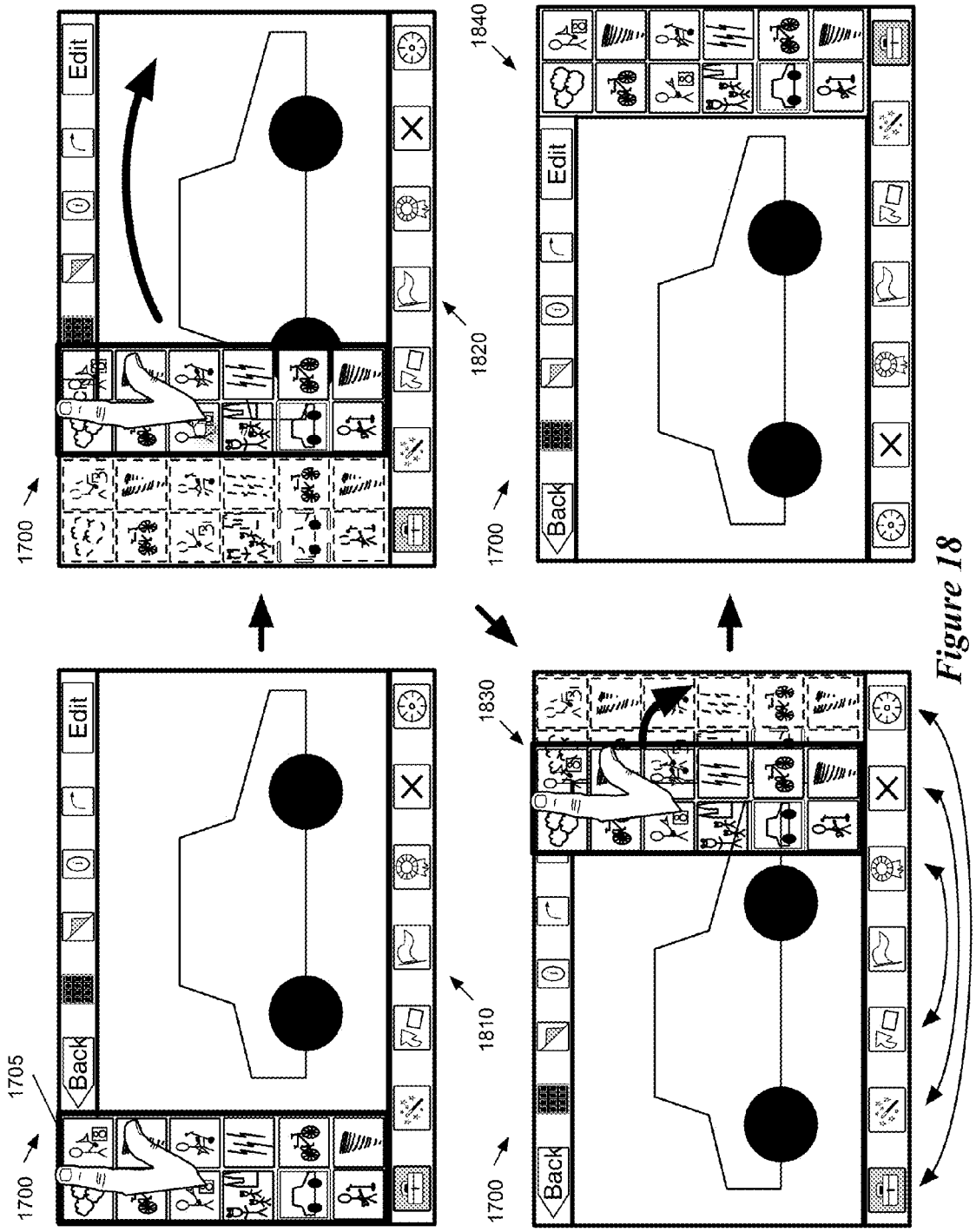
Figure 19:
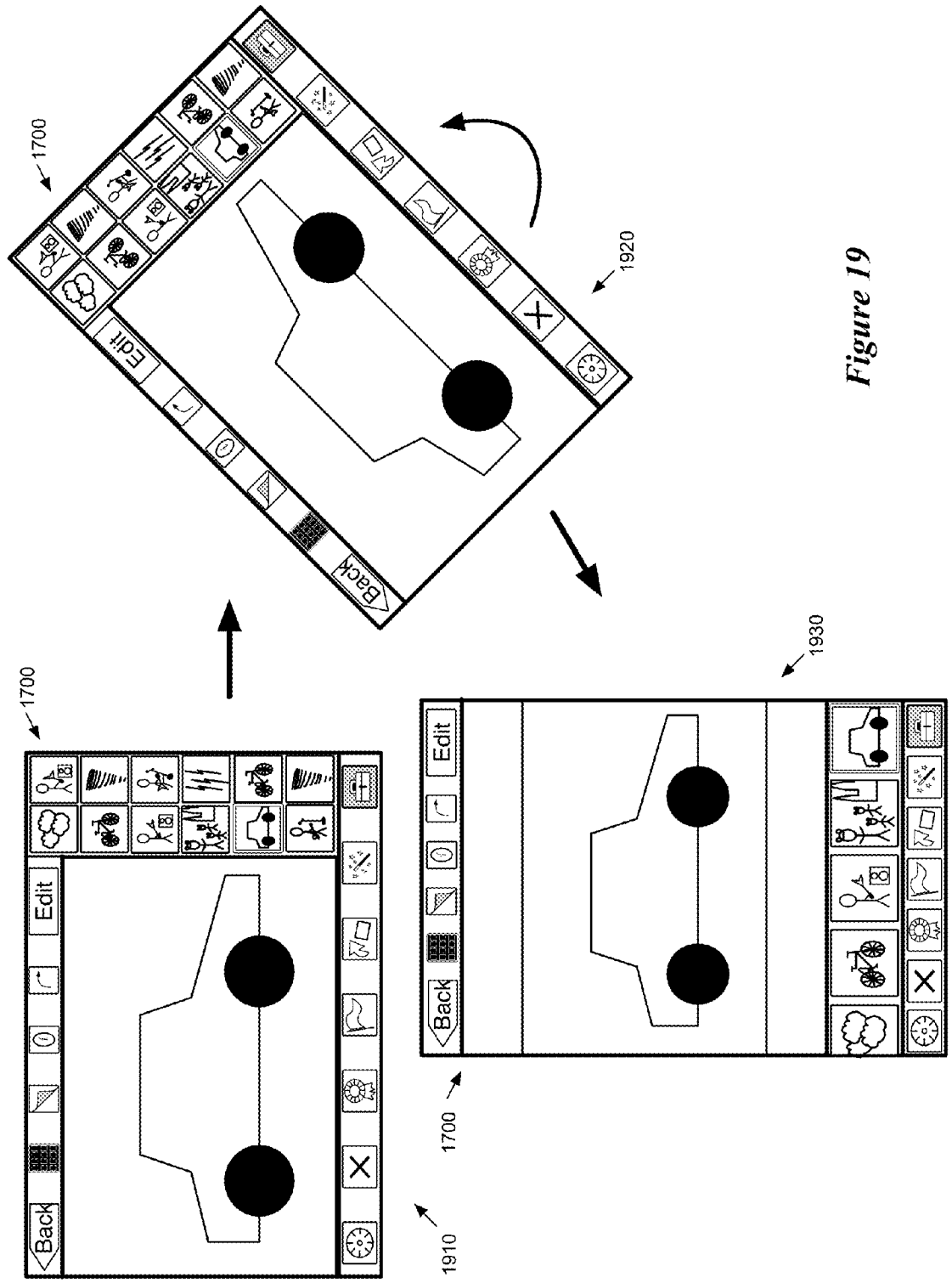

FIGS. 17-19 illustrate left-handed and right-handed GUI modes of some embodiments, in both portrait and landscape mode. Rather than illustrating the GUI implementation of some embodiments shown in FIG. 14 and other figures above, these figures illustrate an image viewing and editing GUI 1700 used for the mobile phone and media player implementation of some embodiments.

FIG. 17 illustrates the GUI 1700 over three stages 1710-1730 as a device on which the image viewing application operates is rotated from portrait mode to landscape mode. As shown in FIG. 17, the GUI 1700 includes a thumbnail display area 1705, an image display area 1715, a first toolbar 1725 (located at the bottom of the GUI), and a second toolbar 1727 (located at the top of the GUI).

The first toolbar 1725 includes an auto-enhance button 1730, a rotation button 1735, a flag button 1740, a favorites button 1745, a hide button 1750, a settings button 1755, and a toolbox button 1760. The various GUI items 1730-1755 operate in the same manner as described above by reference to FIG. 14. The toolbox 1760 of some embodiments allows a user to access various different sets of editing tools. In some embodiments, when a user selects the toolbox 1760, the items 1730-1750 disappear and are replaced by GUI items similar to the items 1445-1449 (a crop item, exposure item, color item, brushes item, and effects item).

The second toolbar 1727 includes a back button 1765, a grid button 1770, a show original button 1780, a share button 1785, and an edit button 1790. These GUI items also operate in the same manner as described above by reference to FIG. 14. In some embodiments, the help feature and undo feature can be accessed through the settings item 1755 rather than having separate items.

The first stage 1710 of FIG. 17 illustrates the GUI 1700 in portrait mode, with the device on which the application operates held in an upright position. In the second stage 1720, the user has begun to turn the device sideways. Not until the third stage 1730, when the device has been rotated a full 90 degrees, does the application switch from displaying the GUI in portrait mode to landscape mode. In some embodiments, the device contains an accelerometer or gyroscope, from which the operating system of the device determines whether the device should be in portrait or landscape mode. This determination is passed to the application, which outputs the appropriate GUI.

The third stage 1730 illustrates the landscape mode GUI 1700 of some embodiments. The GUI includes the same set of UI items in the upper and lower toolbars, although the items are more spread out. In addition, the thumbnail display area 1705 is on the left rather than the bottom of the display. In this case, the portrait mode GUI was in right-hand mode (i.e., in stages 1710 and 1720), and therefore when the application switches to landscape, it uses the right-hand landscape mode for the GUI 1700.

FIG. 18 illustrates the GUI 1700 over four stages 1810-1840 in which the user moves the thumbnail display area 1705 from the left side of the GUI to the right side of the GUI in order to switch from right-handed mode to left-handed mode. The touch gesture used to drag the thumbnail display area 1705 over the first three stages 1810-1830 is a similar gesture to that shown above in FIG. 16. The fourth stage 1840 illustrates the GUI 1700 in left-handed mode, with the thumbnail display area 1705 on the right side of the GUI. In this implementation, the application reverses the order of GUI items 1730-1760 in the toolbar 1725, with the toolbox icon 1760 now on the right and the settings icon 1755 on the left, and the auto-enhance, rotate, flag, favorites, and hide items also reversed.

FIG. 19 illustrates the GUI 1700 over three stages 1910-1930 as the user rotates the device on which the application operates back to portrait mode. In this case, however, the application is operating in left-handed mode while in landscape mode. As a result, at stage 1930, the GUI items in the toolbar 1725 are reversed as compared to the right-hand portrait mode shown in FIG. 17.

B. Interactions with Thumbnail Display Area

Figure 20:
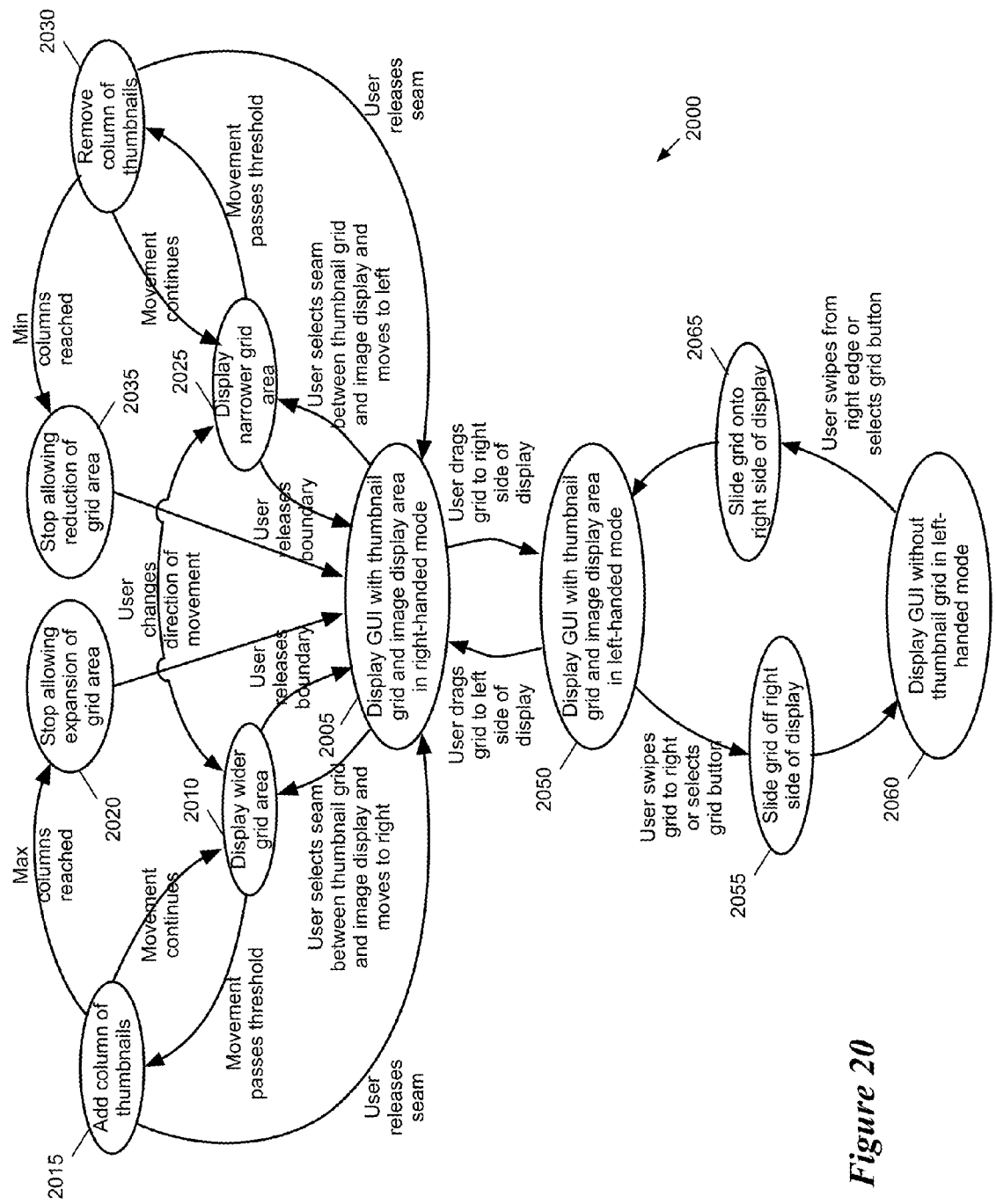
FIG. 20 conceptually illustrates a state diagram showing states and changes in the state for the thumbnail display area in the image viewing GUI of some embodiments.

In either left- or right-handed mode, the image viewing application enables various interactions with the thumbnail display area (also referred to below as the thumbnail grid). Users can change the size of the thumbnail display area, change the number of columns of thumbnails, and scroll through the thumbnails. FIG. 20 conceptually illustrates a state diagram 2000 showing states and changes in the state for the thumbnail display area in the image viewing GUI of some embodiments. One of ordinary skill will recognize that this state diagram does not cover every possible interaction with the thumbnail display area. For instance, the state diagram does not cover scrolling through the thumbnails or the selection of thumbnails. Furthermore, although the state diagram indicates different states for left- and right-handed GUI modes, the equivalents of states that are shown for one mode are omitted for the other mode in the interest of simplicity. The state diagram 2000 will be described by reference to FIGS. 21-28, which illustrate various interactions with the GUI 1600 in both left- and right-handed mode.

When the user is not interacting with the GUI, it will be in either state 2005 (right-handed mode with the thumbnail grid on the left side of the GUI) or in state 2050 (left-handed mode with the thumbnail grid on the right side of the GUI). As shown in the above FIG. 16, the user can cause a transition from state 2005 to state 2050 by dragging the thumbnail grid from the left side of the GUI to the right side of the GUI. Conversely, when the user drags the thumbnail grid from the right side of the GUI to the left side, the GUI transitions from state 2050 to state 2005.

The user can increase and decrease the width and/or number of columns of the thumbnail grid in some embodiments by dragging the boundary (or seam) between the thumbnail grid and the image display area. The state diagram 2000 illustrates the states describing such input events when the GUI is in right-handed mode (state 2005), but one of ordinary skill in the art will recognize that the opposite directions of movement will apply to otherwise equivalent states when in left-handed mode (state 2050). In some embodiments, the thumbnail grid has a default width of two columns when the application is initialized.

While in state 2005, when the user selects the boundary between the thumbnail grid and the image display area and moves to the right, the GUI transitions to state 2010 to display a progressively wider thumbnail grid. In some embodiments, the user selects the boundary by placing a single finger on the touchscreen over the boundary (i.e., so that the contact area includes both part of the thumbnail grid and part of the image display area). So long as the user continues moving her finger to the right, the thumbnail grid keeps widening. If the user releases the boundary (e.g., by removing her finger from the touchscreen), then the GUI returns to state 2005.

When the user has moved the boundary a threshold distance, the application transitions to state 2015 to add a column of thumbnails. This causes a rearrangement of the thumbnails in the thumbnail grid. The application of some embodiments orders the thumbnails (when the grid has two columns) with the first two on the top row, the next two on the second row, etc. When the number of columns expands to three, the first thumbnail from the second row moves up to the top row, both of the thumbnails from the third row move to the second row, etc.

Figure 21:
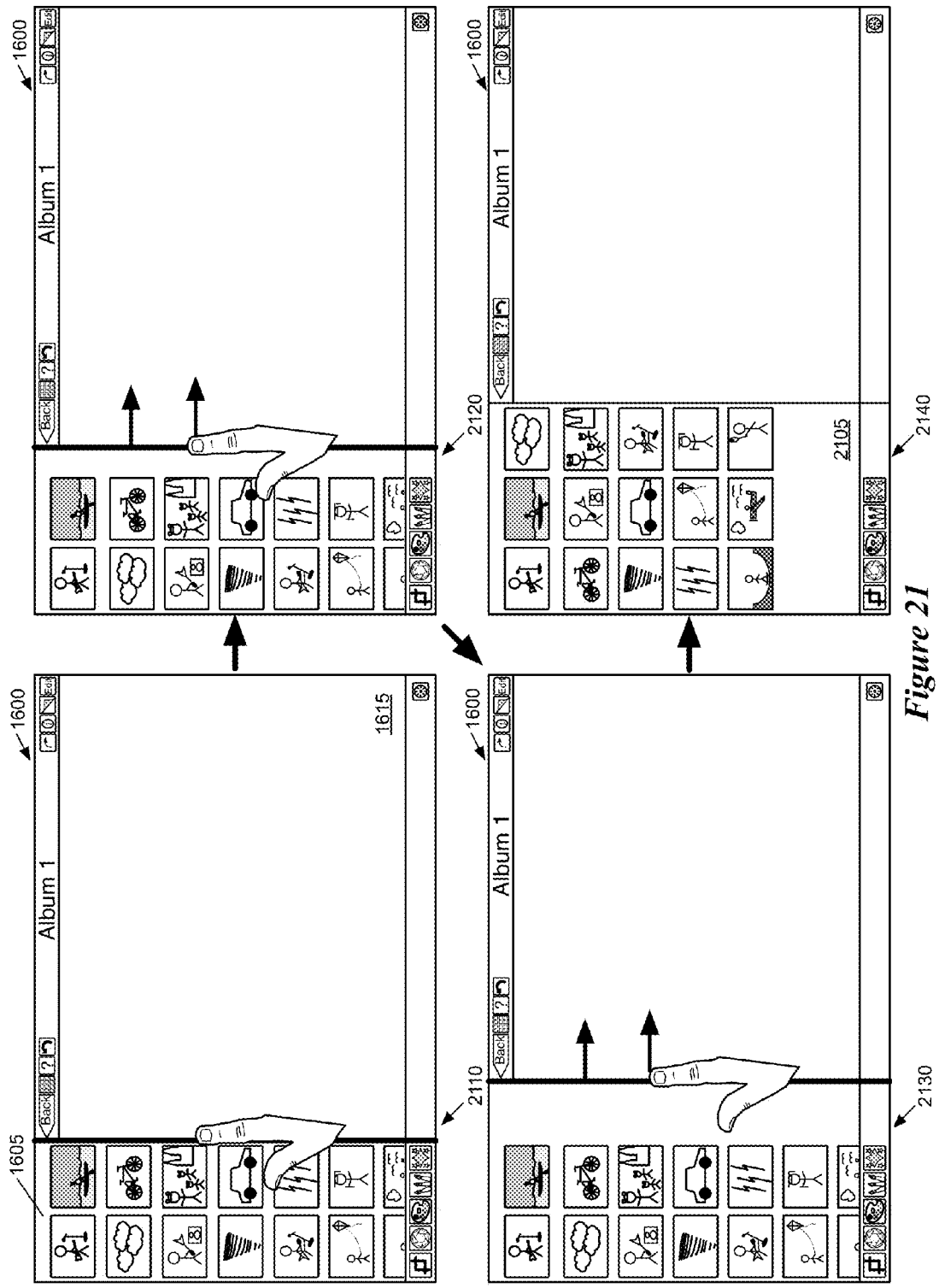
FIG. 21 illustrates a user increasing the size of the thumbnail display area.

FIG. 21 illustrates a user increasing the size of the thumbnail display area over four stages 2110-2140 of GUI 1600. As shown, in the first stage 2110, the user places a finger over the boundary between the thumbnail display area 1605 and the image display area 1615. In some embodiments, the application does not actually draw a boundary line, or seam, but instead the boundary is simply visible as a result of the change in color between the thumbnail display area and the image display area. For clarity's sake, however, these figures illustrate such a boundary.

In the second and third stages 2120 and 2130, the user drags the boundary to the right. At the fourth stage 2140, the boundary has been moved far enough for the thumbnails to rearrange into a third column. As shown, the thumbnail 2105 of the clouds moves up to the top row, and the other thumbnails rearrange as well. This figure illustrates (as does the state diagram 2000) the thumbnail display area 1605 expanding (and the image display area correspondingly shrinking) before the third column is created. However, some embodiments move the boundary only in discrete amounts—i.e., once the user's finger has moved the threshold distance over the screen, the application automatically changes the width of the thumbnail display area from a two-column width to a three-column width. That is, as the user moves her finger away from the boundary, the GUI remains static until a threshold movement has been reached, at which point the thumbnail display area dynamically rearranges to add another column as the boundary moves by a fixed amount to the right, thereby reducing the size of the image display area.

Returning to the state diagram 2000, after adding the column of thumbnails, the GUI transitions either back to state 2010 if the touch movement continues and the thumbnail grid has not reached the maximum size, or to state 2020 if the maximum number of columns has been reached. When the maximum number of columns is reached, the application stops allowing the expansion of the grid area (at state 2020). In some embodiments, the application only allows the thumbnail display area to have one, two, or three columns of thumbnails; other embodiments (e.g., those on smaller devices) only allow one or two columns. At any of these three states, if the user releases the boundary (i.e., by removing the touch input), the application transitions back to state 2005.

Similar state changes occur when the user drags the boundary between the thumbnail display area and the image display area towards the edge of the screen. Again, these state changes are shown in FIG. 20 for when the GUI is in right-handed mode, but are equally applicable to the GUI in left-handed mode (with the movement in the opposite direction).

While in state 2005, when the user selects the boundary between the thumbnail grid and the image display area and moves to the left, the GUI transitions to state 2010 to display a progressively narrower thumbnail grid. In some embodiments, the user selects the boundary by placing a single finger on the touchscreen over the boundary (i.e., so that the contact area includes both part of the thumbnail grid and part of the image display area). So long as the user continues moving her finger to the left, the thumbnail grid keeps narrowing. If the user releases the boundary (e.g., by removing her finger from the touchscreen), then the GUI returns to state 2005.

When the user has moved the boundary a threshold distance, the application transitions to state 2030 to remove a column of thumbnails. This causes a rearrangement of the thumbnails in the thumbnail grid. The application of some embodiments orders the thumbnails (when the grid has two columns) with the first two on the top row, the next two on the second row, etc. When the number of columns is reduced to one, the second thumbnail from the top row moves to the second row, the first thumbnail in the second row moves to the third row, etc.

Figure 22:
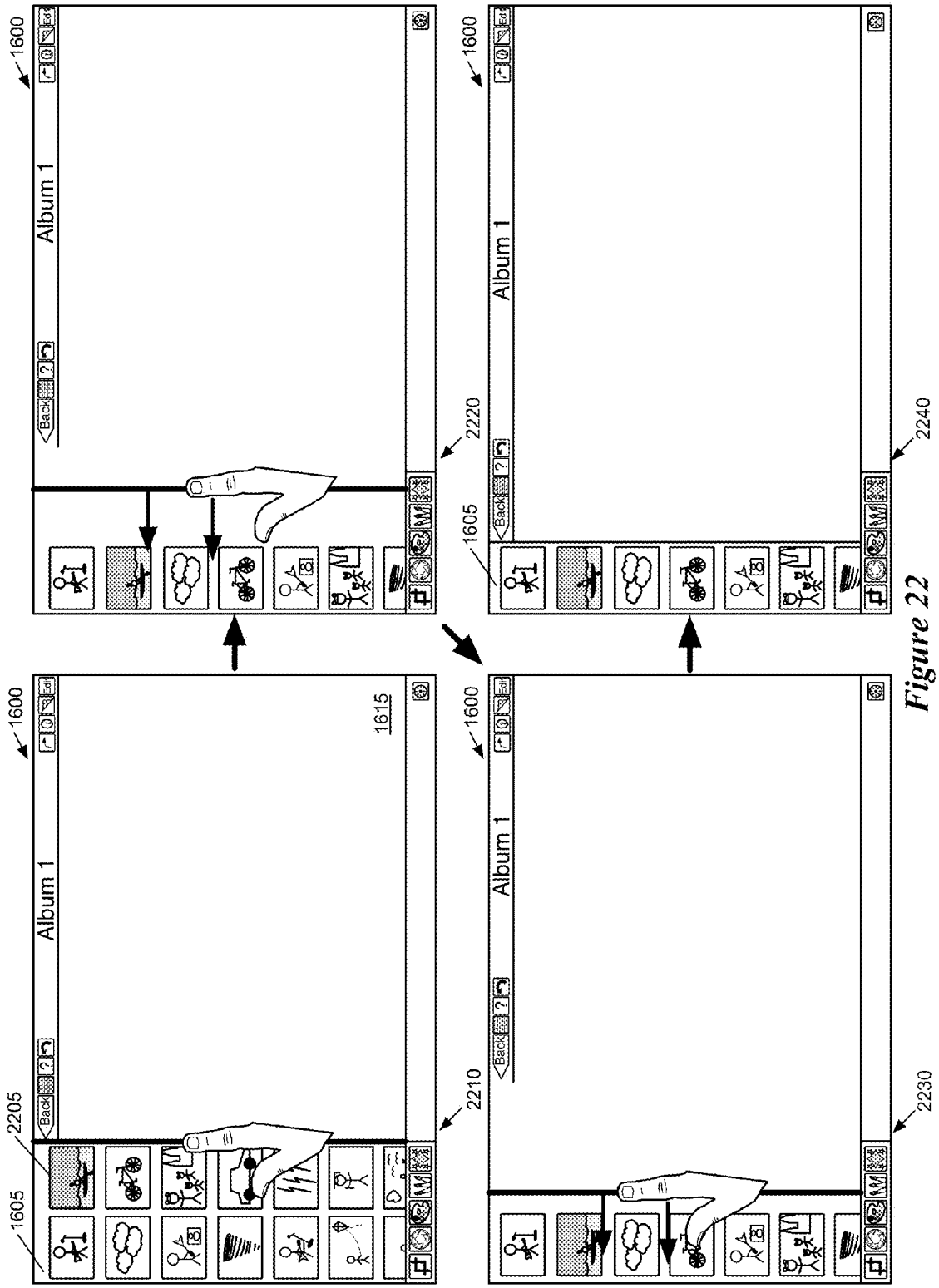
FIG. 22 illustrates a user decreasing the size of the thumbnail display area.

FIG. 22 illustrates a user decreasing the size of the thumbnail display area over four stages 2210-2240 of GUI 1600. As shown, in the first stage 2210, the user places a finger over the boundary between the thumbnail display area 1605 and the image display area 1615. In some embodiments, the application does not actually draw a boundary line, or seam, but instead the boundary is simply visible as a result of the change in color between the thumbnail display area and the image display area. For clarity's sake, however, these figures illustrate such a boundary.

In the second stage 2220, the user has started dragging the boundary to the left. In this figure, once the boundary begins to encroach on the second column, the application rearranges the thumbnails into a single column. As shown, the thumbnail

2205 of the kayak moves down to the second row, and the other thumbnails rearrange as well. In the third stage 2230, the user continues to drag the boundary to the left. Finally, at the fourth stage 2240, the thumbnail display area 1605 has reached its minimum width and cannot keep shrinking. This figure (and the state diagram 2000) illustrates the thumbnail display area 1605 shrinking (and the image display area correspondingly decreasing) in a continuous manner. However, as with the increase in the thumbnail display area described above, some embodiments move the boundary only in discrete amounts—i.e., once the user's finger has moved the threshold distance over the screen, the application automatically changes the width of the thumbnail display area from a two-column width to a one-column width.

Returning to the state diagram 2000, after removing the column of thumbnails, the GUI transitions either back to state 2025 if the touch movement continues and the thumbnail grid has not reached the maximum size, or to state 2035 if the maximum number of columns has been reached. When the maximum number of columns is reached, the application stops allowing the expansion of the grid area (at state 2020). In some embodiments, the application only allows the thumbnail display area to have one, two, or three columns of thumbnails; other embodiments (e.g., those on smaller devices) only allow one or two columns. At any of these three states, if the user releases the boundary (i.e., by removing the touch input), the application transitions back to state 2005. In addition, from the expansion state 2010, the GUI can transition to state 2025 (or vice versa) if the user reverses the direction of movement of the touch input over the boundary.

In addition to modifying the size and number of columns of the thumbnail display area, some embodiments allow the user to slide the thumbnail display area out of the GUI and back onto the GUI. This may be accomplished, in some embodiments, via a swipe gesture or the selection of GUI item, as well as other GUI interactions (e.g., a hotkey or set of hotkeys, selection of a menu option, etc.). The state diagram 2000 conceptually illustrates these interactions in the context of a left-handed GUI (with the thumbnail display area on the right side), but these interactions are equally applicable (with the directions reversed) to the right-handed GUI.

As shown, with the GUI in state 2050 (left-handed mode with the thumbnail grid displayed), when the user performs a rightwards swipe gesture over the grid, or selects the grid button UI item, the GUI transitions to state 2055 to slide the grid off the right side of the display. Once the grid has slid off the display, the GUI transitions to state 2060 to display the GUI in left-hand mode without the thumbnail grid.

Figure 23:
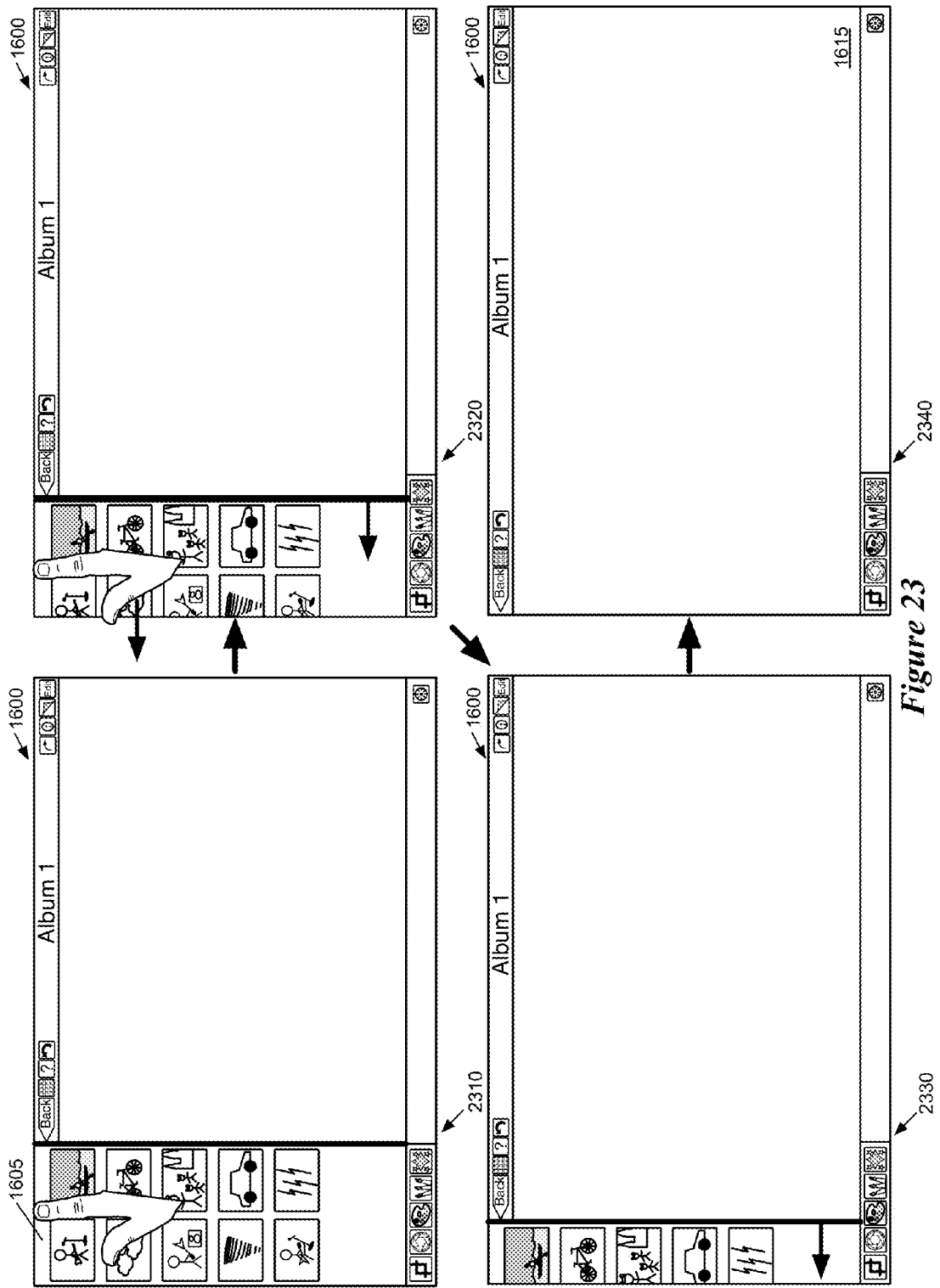
FIG. 23 illustrates a swipe gesture to remove the thumbnail display area from the GUI while in the right-handed GUI mode.

FIG. 23 illustrates such a swipe gesture to remove the thumbnail display area 1605 from the GUI 1600 while in the right-handed GUI mode over four stages 2310-2340. As shown, at the first stage 2310, the user begins to contact the touchscreen over the thumbnail display area 1605 with one finger (though other swipe gestures with different numbers of points of contact, or other gestures altogether may be used). The second stage 2320 illustrates the user moving her finger to the left, causing the thumbnail display area to being sliding in that direction. In the third stage 2330, the user has released the swipe gesture as the thumbnail display area 1605 continues to slide out of the GUI to the left. The fourth stage 2340 illustrates that the thumbnail display area is no longer shown in the GUI, and the image display area 1615 has expanded. Based on the location of the various user interface tools, the user can easily tell that the GUI is still in right-handed mode.

In some embodiments, the application requires the user's finger to remain in contact with the touchscreen for a particular threshold distance and/or move at a threshold speed in order to qualify as a swipe gesture. However, in some embodiments this determination as to whether an input qualifies as a swipe gesture is made by the operating system of the device on which the image viewing application operates, rather than the application itself. The swipe gesture and location are passed from the operating system to the application, which then translates that swipe gesture into instructions to slide the thumbnail grid out of the GUI.

Figure 24:
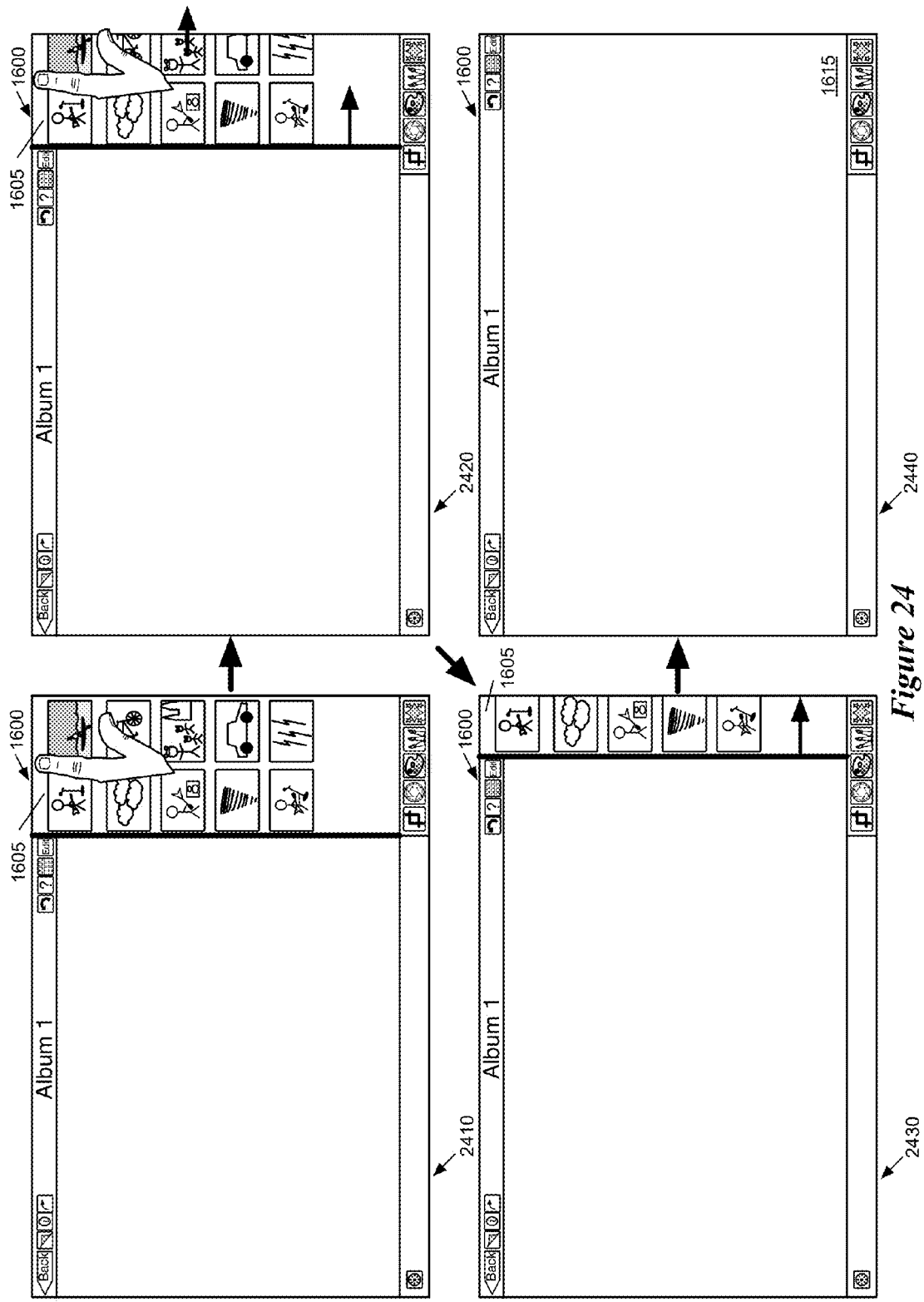
FIG. 24 illustrates a similar swipe gesture to remove the thumbnail display area from the GUI while in the left-handed mode.

FIG. 24 illustrates a similar swipe gesture to remove the thumbnail display area 1605 from the GUI 1600 while in the left-handed mode over four stages 2410-2440. These stages parallel the stages of FIG. 23. As shown, at the first stage 2410, the user begins to contact the touchscreen over the thumbnail display area 1605 with one finger (though other swipe gestures with different numbers of points of contact, or other gestures altogether may be used). The second stage 2420 illustrates the user moving her finger to the right, causing the thumbnail display area to begin sliding in that direction. In the third stage 2430, the user has released the swipe gesture as the thumbnail display area 1605 continues to slide out of the GUI to the right. The fourth stage 2440 illustrates that the thumbnail display area is no longer shown in the GUI, and the image display area 1615 has expanded. Based on the location of the various user interface tools, the user can easily tell that the GUI is still in left-handed mode.

Figure 25:
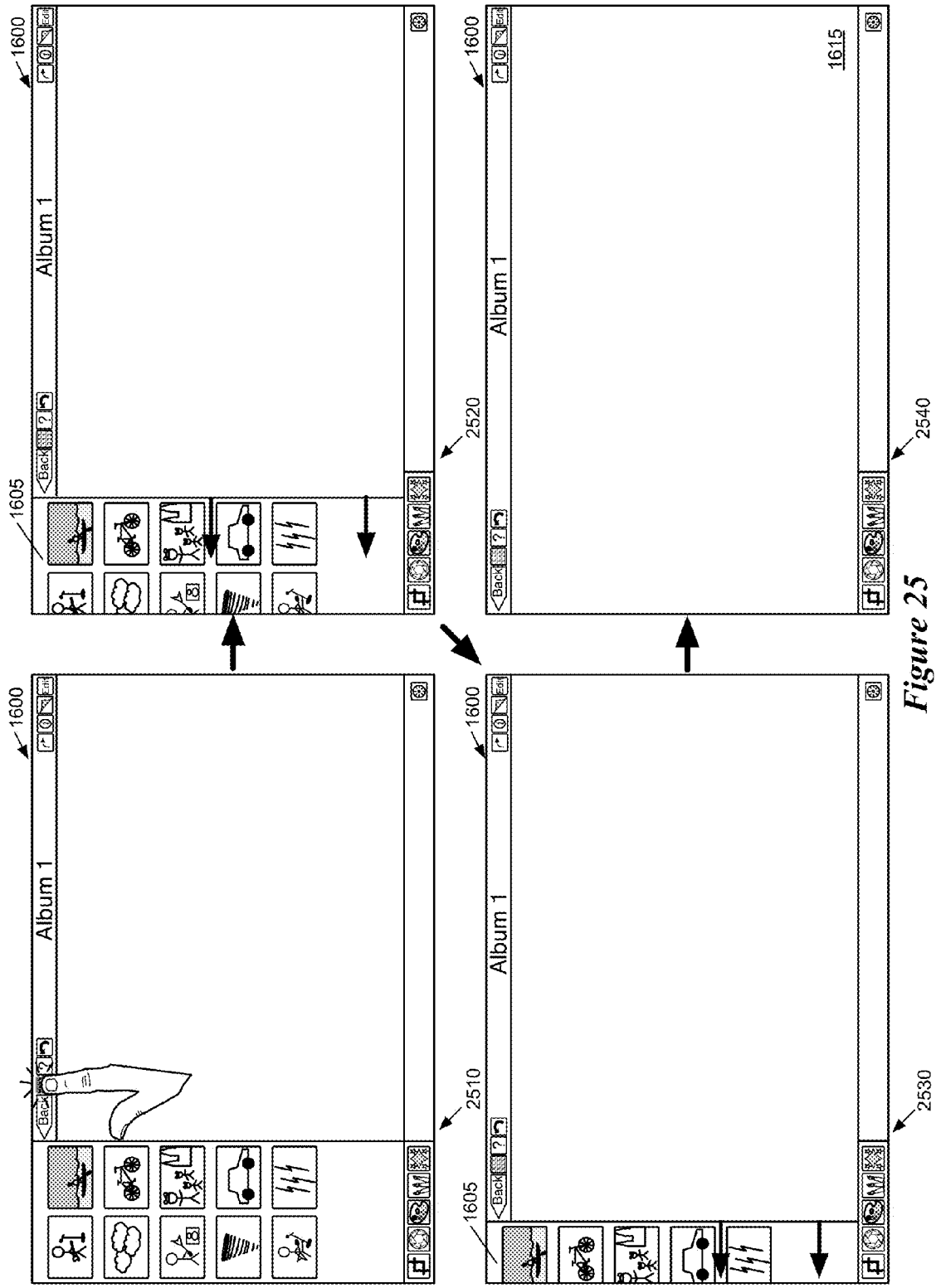
FIG. 25 illustrates the selection of a GUI item that causes the thumbnail display area to slide off of the GUI.

As shown in FIG. 20, some embodiments also transition from state 2050 to state 2055 and then 2060 when a user selects a grid button that causes the thumbnail display area to slide on and off of the GUI. FIG. 25 illustrates the selection of such a GUI item 2505 in the GUI 1600 over four stages 2510-2540. As shown, in the first stage 2510, the user taps the grid button 2505. As with the swipe gestures, in some embodiments the operating system of the device translates the screen contact information into a tap gesture and a location and passes this information to the image-viewing application. The second stage 2520 and third stage 2530 illustrate the thumbnail display area 1605 sliding out of the GUI. The resultant GUI shown in stage 2540 is the same as the resultant GUI at the end of FIG. 23, with an expanded image display area 1615.

With the GUI in state 2060 (the left-handed mode without the thumbnail grid), when the user either performs a leftward sweep gesture from the right edge of the GUI or selects the grid button UI item, the GUI transitions to state 2065 to slide the grid from the right side back onto the display. Once the grid has slid back onto the display, the GUI transitions back to state 2050 to display the GUI in left-handed mode with the thumbnail grid present.

Figure 26:
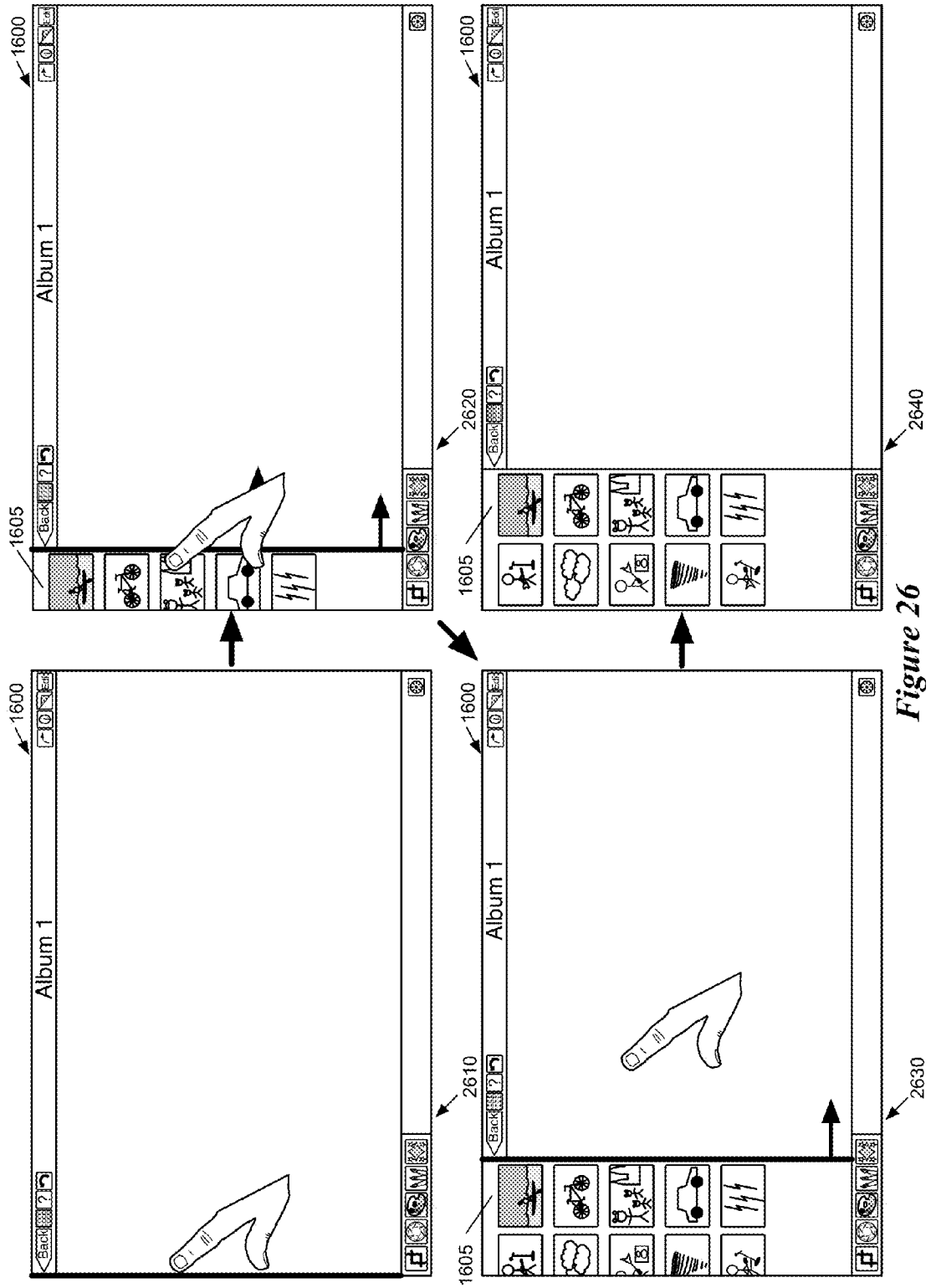
FIG. 26 illustrates a swipe gesture to return the thumbnail display area to the GUI while in the right-handed GUI mode.

FIG. 26 illustrates such a swipe gesture to return the thumbnail display area 1605 to the GUI 1600 while in the right-handed GUI mode over four stages 2610-2640. As shown, at the first stage 2610, the user begins to contact the touchscreen near the left edge of the GUI with one finger (though other swipe gestures with different numbers of points of contact, or other gestures altogether may be used). Different embodiments use different thresholds to determine how close the touch contact needs to be in order to be considered close to the edge for sliding the thumbnail display area back onto the GUI. The second stage 2620 illustrates the user moving her finger to the right, causing the thumbnail display area 1605 to begin sliding in that direction back onto the GUI. In the third stage 2630, the user has released the swipe gesture as the thumbnail display area 1605 continues to slide onto the GUI to the right. The fourth stage 2640 illustrates that the thumbnail display area 1605 is fully present in the GUI, in the right-handed mode.

Figure 27:
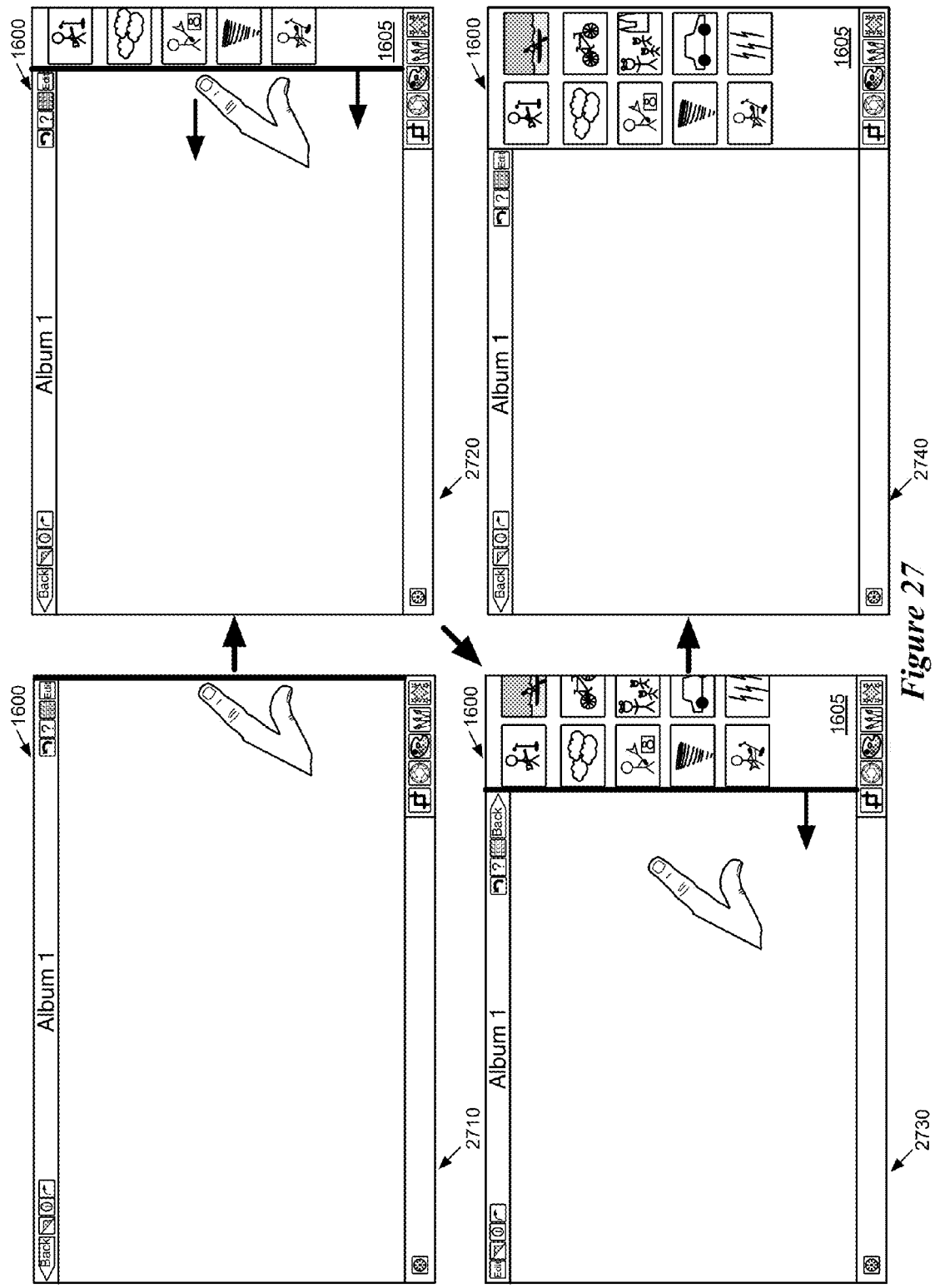
FIG. 27 illustrates a similar swipe gesture to return the thumbnail display area to the GUI while in the left-handed GUI mode.

FIG. 27 illustrates a similar swipe gesture to return the thumbnail display area 1605 to the GUI 1600 while in the left-handed GUI mode over four stages 2710-2740. As shown, at the first stage 2710, the user begins to contact the touchscreen near the right edge of the GUI with one finger (though other swipe gestures with different numbers of points of contact, or other gestures altogether may be used). Different embodiments use different thresholds to determine how close the touch contact needs to be in order to be considered close to the edge for sliding the thumbnail display area back onto the GUI. The second stage 2720 illustrates the user moving her finger to the left, causing the thumbnail display area 1605 to begin sliding in that direction back onto the GUI. In the third stage 2730, the user has released the swipe gesture as the thumbnail display area 1605 continues to slide onto the GUI to the left. The fourth stage 2340 illustrates that the thumbnail display area 1605 is fully present in the GUI, in the left-handed mode.

Figure 28:
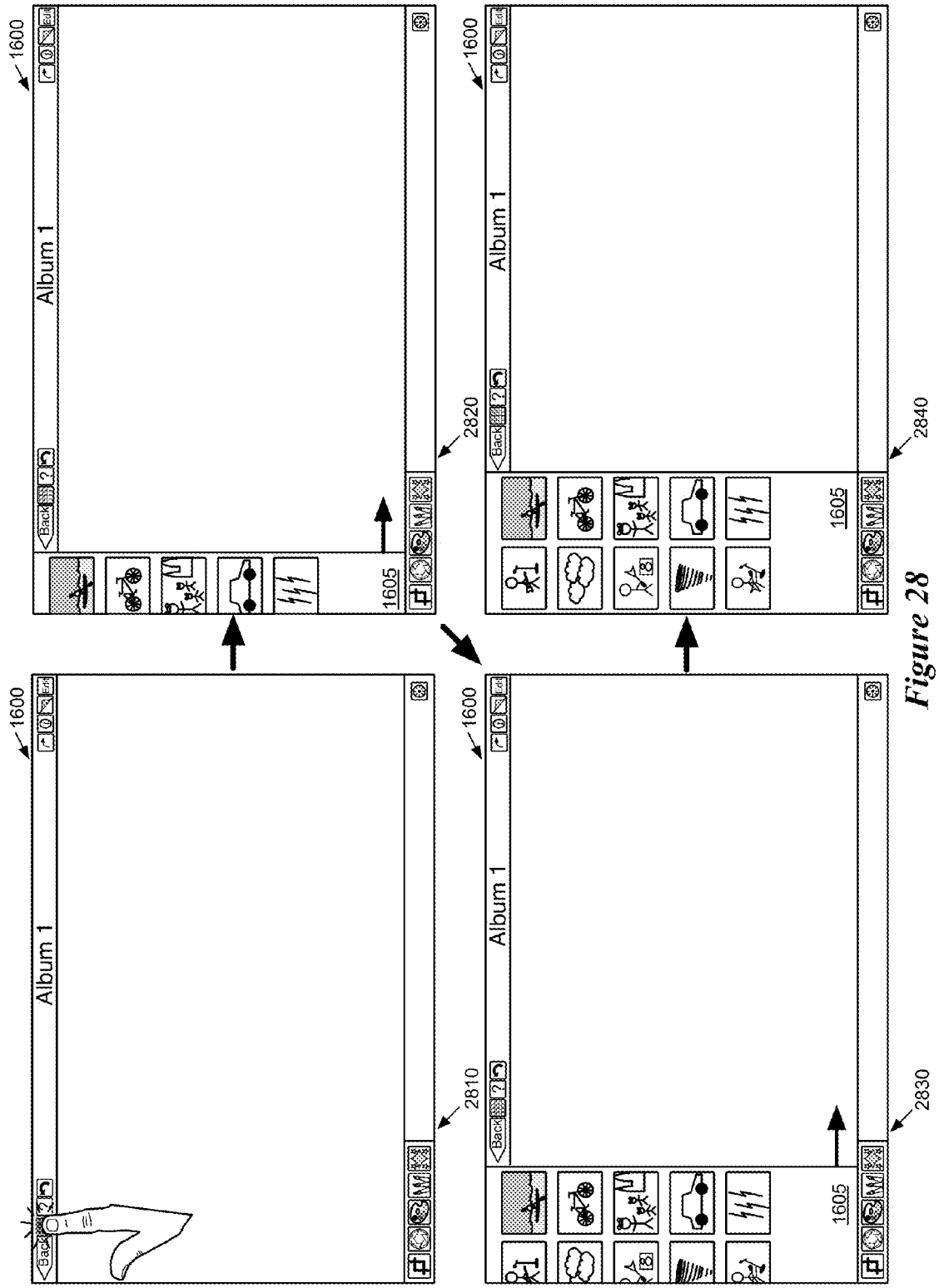
FIG. 28 illustrates the selection of a GUI item that causes the thumbnail display area to slide onto the GUI.

As shown in FIG. 20, some embodiments also transition from state 2060 to state 2065 and then 2050 when a user selects a grid button that causes the thumbnail display area to slide on and off of the GUI. FIG. 28 illustrates the selection of such a GUI item 2505 in the GUI 1600 over four stages 2810-2840 while the GUI is in right-handed mode. As shown, in the first stage 2810, the user taps the grid button 2505. As with the swipe gestures, in some embodiments the operating system of the device translates the screen contact information into a tap gesture and a location and passes this information to the image-viewing application. The second stage 2820 and third stage 2830 illustrate the thumbnail display area 1605 sliding back onto the GUI. The resultant GUI shown in stage 2840 is the same as the resultant GUI at the end of FIG. 26, with the thumbnail display area 1605 appearing on the left side of the display.

The above description and figures highlighted various aspects of interacting with the GUI in left-handed and right-handed mode. In addition, certain differences exist between landscape mode (whether right-handed or left-handed) and portrait mode. One such difference involves the location and scrolling of the thumbnail display area.

Figure 29:
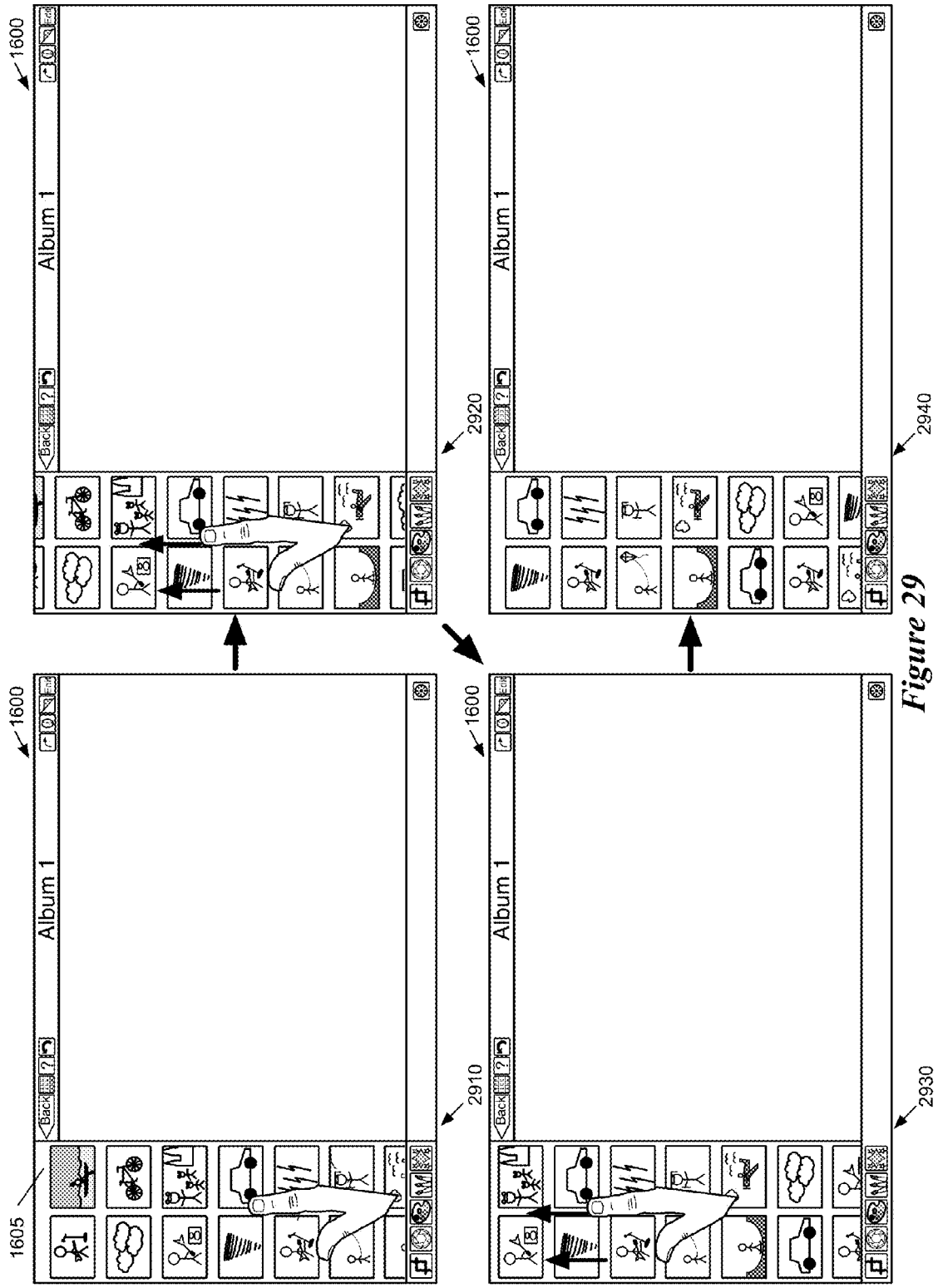
FIG. 29 illustrates a user scrolling through the thumbnail display area.

FIG. 29 illustrates a user scrolling through the thumbnail display area 1605 over four stages 2910-2940 of the GUI 1600. In the first stage 2910, the user has begun to contact the touchscreen with one finger over the thumbnail display area 1605. As shown in the second stage 2920, the user moves the finger upwards while maintaining contact with the touchscreen. This has the effect of causing the thumbnails in the thumbnail display area to slide upwards, such that the top thumbnails disappear off of the screen and additional thumbnails appear at the bottom. At stage 2930, the user continues this motion to continue scrolling through thumbnails. The fourth stage 2940 illustrates that the user has released the drag operation and the thumbnails have stopped scrolling. In some embodiments, depending on the speed of the drag/sweep gesture, the thumbnails may continue scrolling after the user releases the gesture (i.e., momentum scrolling). As all collections will contain a finite number of images, eventually the thumbnails will reach an end and stop scrolling. Furthermore, while this figure only shows scrolling down (via an upward touch gesture), users can also scroll up by dragging the thumbnail display downwards.

Figure 30:
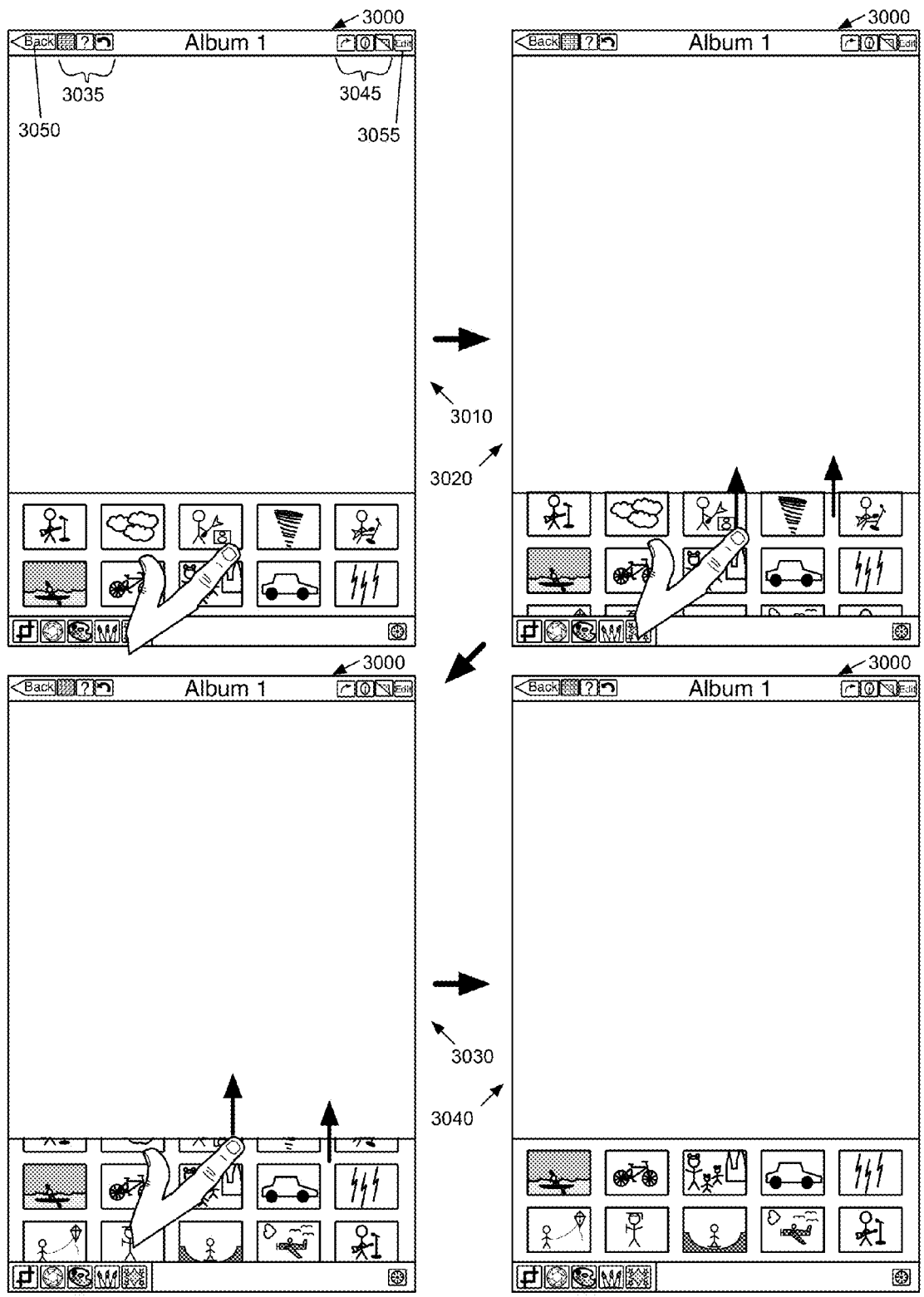
FIG. 30 illustrates a portrait mode GUI as a user scrolls through the thumbnails of a collection in the thumbnail display area.
Figure 31:
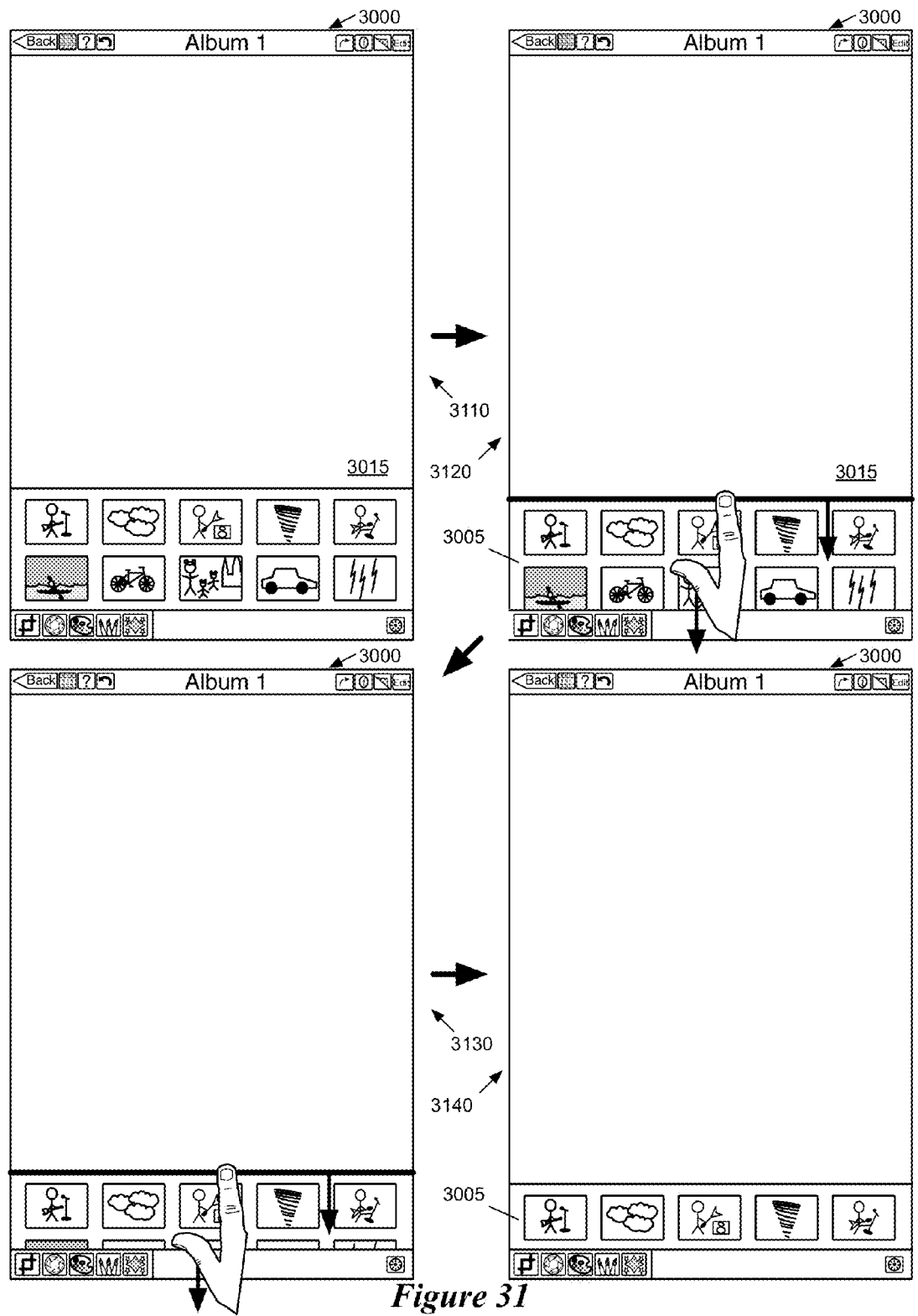
FIG. 31 illustrates the modification of the size of the thumbnail display area in the portrait GUI.
Figure 32:
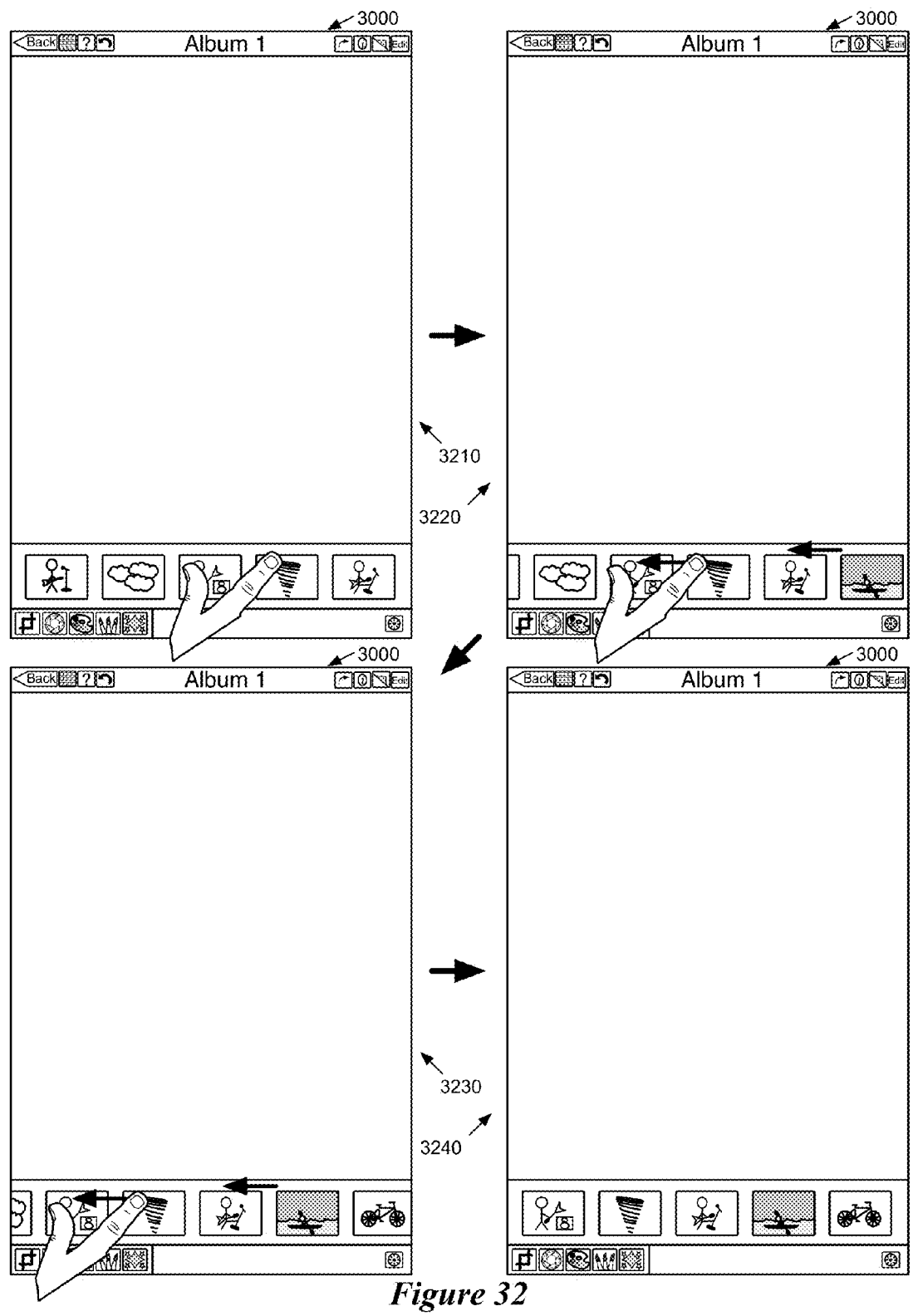
FIG. 32 illustrates the horizontal scrolling of the thumbnail display area when sized down to one row.

The above figures illustrate a GUI in both left- and right-handed landscape modes. FIGS. 30-32, on the other hand, illustrate a GUI 3000 of some embodiments in portrait mode. The GUI 3000, as shown in FIG. 30, includes a thumbnail display area 3005, an image display area 3015, a first set of GUI items 3025, a second set of GUI items 3035, a third set of GUI items 3045, a back button 3050, an edit button 3055, and a settings menu activation item 3060. These are the same items as described above by reference to the GUI 1600 of FIG. 16.

As shown in these figures, the application displays the GUI items 3025, 3035, and 3045-3060 in the same positions as in the right-handed mode of the landscape GUI 1600 (i.e., the edit activation GUI items 3025 on the bottom left, the back button 3050 and second set of GUI items 3035 on the top left, etc.). When in portrait mode, some applications do not provide a mechanism to switch from left-handed mode to right-handed mode, as the thumbnail display area 3005 is located at the bottom of the GUI anyway. Other embodiments, as mentioned above, may respond to an action indicative of the handedness of the user, such as a tap of five fingers at once (the relative locations being different for a left hand compared to a right hand). As described above, some embodiments determine the location of the various GUI items in portrait mode based on the most recently used landscape mode for the application.

FIG. 30 illustrates the GUI 3000 as a user scrolls through the thumbnails of a collection in the thumbnail display area over four stages 3010-3040. In portrait mode, as shown, the application locates the thumbnail display area 3005 at the bottom of the GUI, although in other embodiments the thumbnail display might be at the top of the GUI. The thumbnail display area 3005 spans the width of the GUI, with a fixed number of columns of thumbnails (in this case five). In this figure, the thumbnail display area has a height of two thumbnails.

In the first stage 3010, the user contacts the thumbnail display area with one finger. As shown in the second stage 3020, the user has begun to slide the finger up over the thumbnail display area. This causes the thumbnails to slide upwards through the thumbnail display area 3005, with new thumbnails beginning to appear at the bottom of the display area. The third stage 3030 illustrates that the user has continued to slide her finger upwards, with the thumbnails moving along as well. In the fourth stage 3035, the user has released contact with the touchscreen, and therefore the thumbnails are no longer moving (although in some embodiments, the user can set the application or device to continue scrolling after a swipe gesture, based on the speed of the gesture).

FIG. 31 illustrates the modification of the size of the thumbnail display area 3005 over four stages 3110-3140 of the portrait GUI 3000. As in landscape mode, the user can drag the boundary between the thumbnail display area 3005 and the image display area 3015 in order to modify the size of the thumbnail display area. However, whereas in landscape mode this boundary moves perpendicular to the direction of scrolling (and thus results in a rearrangement of the thumbnails when a threshold is passed and a column is added or subtracted), the boundary in portrait mode moves parallel to the direction of scrolling. As such, for the most part the thumbnail display area can be modified in a continuous manner without rearranging the thumbnails, rather than having discrete jumps when a column is added or subtracted.

The first stage 3110 illustrates the GUI 3000 with the thumbnail display area having a height of approximately two thumbnails. In the second stage 3120, the user places a finger over the boundary between the thumbnail display area 3005 and the image display area 3015 and begins dragging the boundary downwards. In this case, the thumbnails move along with the boundary (i.e., the relationship of the boundary to the thumbnails does not change). In other embodiments, the thumbnails remain static during such a modification to the boundary, and the boundary moves over the thumbnails.

When the user moves the boundary upwards and reaches the top row of thumbnails, some such embodiments then begin to move the thumbnails up with the boundary in order to prevent a gap from appearing at the top of the thumbnail display area.

The third stage 3130 illustrates that the user has continued to drag the boundary downwards, sliding the thumbnails further along as well. At the last stage 3140, the thumbnail display area 3005 has a height of only one row. In some embodiments, when the thumbnail display area in portrait mode is reduced to only one row of thumbnails, the application automatically prevents the thumbnail display area from being reduced in size (although the user can still tap the grid button or use a swipe gesture to remove the thumbnail display area altogether) and modifies the direction of scrolling from vertical to horizontal. The application rearranges the thumbnails into a single row in the order they are stored in the currently selected collection, although the displayed thumbnails may appear the same to the user until the user begins to scroll.

FIG. 32 illustrates the horizontal scrolling of the thumbnail display area when sized down to one row, over four stages 3210-3240 of the GUI 3000. The first stage 3210 illustrates the GUI 3000 in the same state as at stage 3140 of FIG. 31, with the thumbnail display area 3005 having a height of one row. As shown, the user has begun to contact the thumbnail display area with one finger. The user begins moving her finger to the left in the second stage 3220, and continues this movement in the third stage 3230. The result of this movement is that the thumbnails scroll to the left through the thumbnail display area 3005, with some thumbnails scrolling off the GUI to the left and new thumbnails entering from the right. In some embodiments, the scrolling stops when the user reaches the end of the collection, while other embodiments wrap the thumbnails around in a continuous scrolling fashion. The fourth stage 3240 illustrates that the user has released contact with the touchscreen, and the thumbnails are now stationary.

Figure 33:
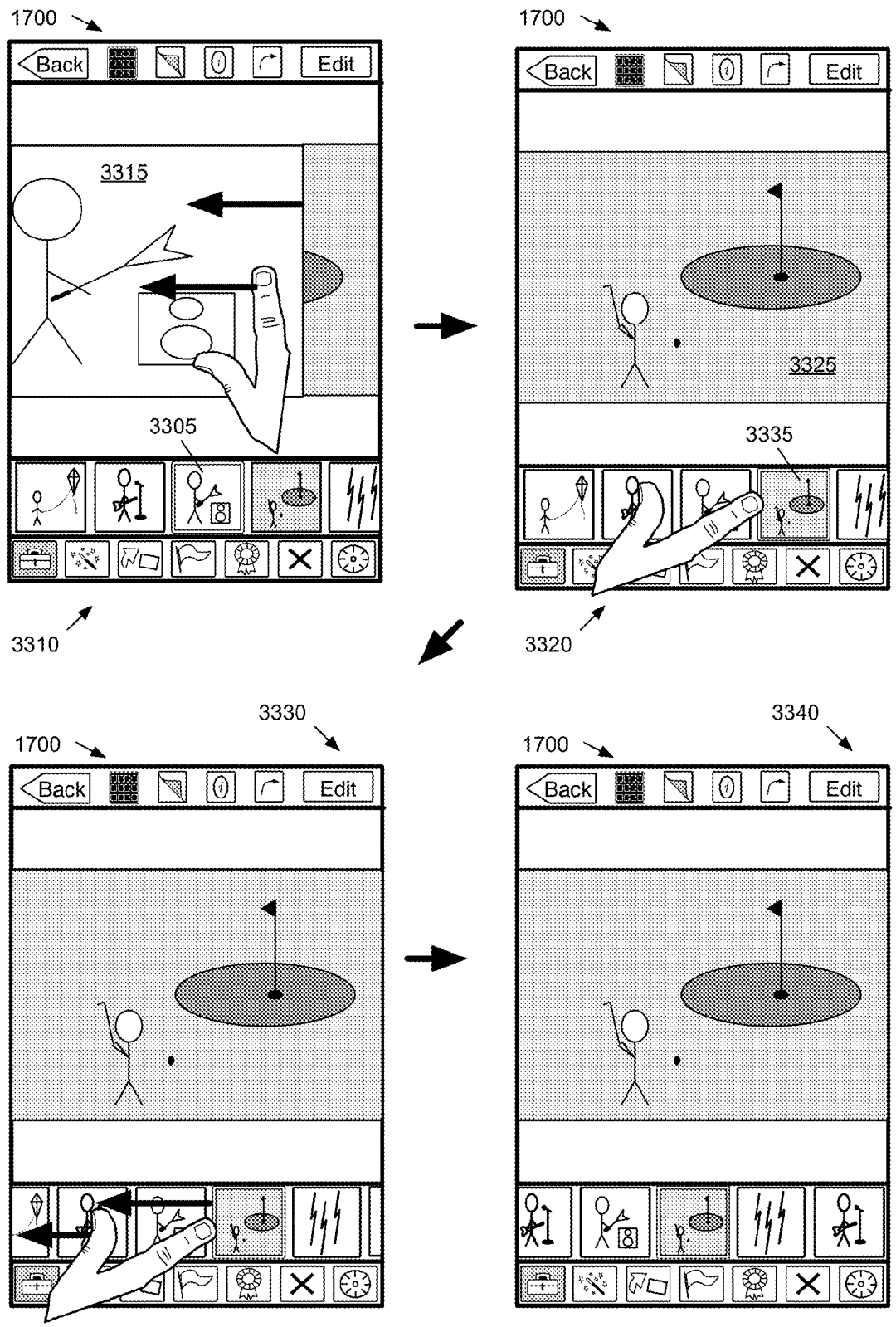
FIG. 33 illustrates a user scrolling through images in the thumbnail display area of the mobile phone and media player GUI of some embodiments.

FIG. 33 illustrates a user scrolling through images in the thumbnail display area of the mobile phone and media player GUI 1700 of some embodiments. In the first stage 3310, a first thumbnail 3305 is selected, and the corresponding image 3315 has been displayed in the image display area 1715. However, the user is currently performing a swipe gesture to the left over the image display area, beginning to reveal the next image in the collection. The second stage 3320 illustrates the result of this swipe gesture, with the image 3325 now displayed and the corresponding thumbnail 3335 selected. While not shown in the above figures, in some embodiments a user of the application on a larger (e.g., tablet) device may also use similar swipe gestures (both right and left) to quickly scan through the images in a collection. Scanning through sets of selected images with swipe gestures will also be described below in Section V.

The second through fourth stages 3320-3340 illustrate the user scrolling sideways through the thumbnail display area 1705 with a swipe gesture. As shown, the user swipes a finger sideways across the thumbnail display area, and the thumbnails slide through, as in FIG. 32 above.

While the above figures illustrate scrolling through the thumbnail display areas (whether in portrait or landscape mode) using touchscreen gestures (including multi-touch gestures), one of ordinary skill in the art will recognize that the described features of FIGS. 29-33 (as well as the other features shown throughout this document) may be performed in other manners—e.g., using a cursor controller device (which may involve a combination of button clicks, movement of the cursor controller, and touch input through the cursor controller), a keyboard, etc.

C. Zoom Tool

Subsection A of this section described an application with different GUIs for left- and right-handed modes, in which the application modifies the location and order of certain GUI elements while leaving others in the same place when switching between modes. In addition, some embodiments activate certain GUI tools differently (e.g., in different orientations) depending on whether the GUI is in the left-handed mode or the right-handed mode. One such tool is the zoom tool of some embodiments, which is displayed in different orientations and responds to certain gestures differently depending on which mode of the GUI is active.

Figure 34:
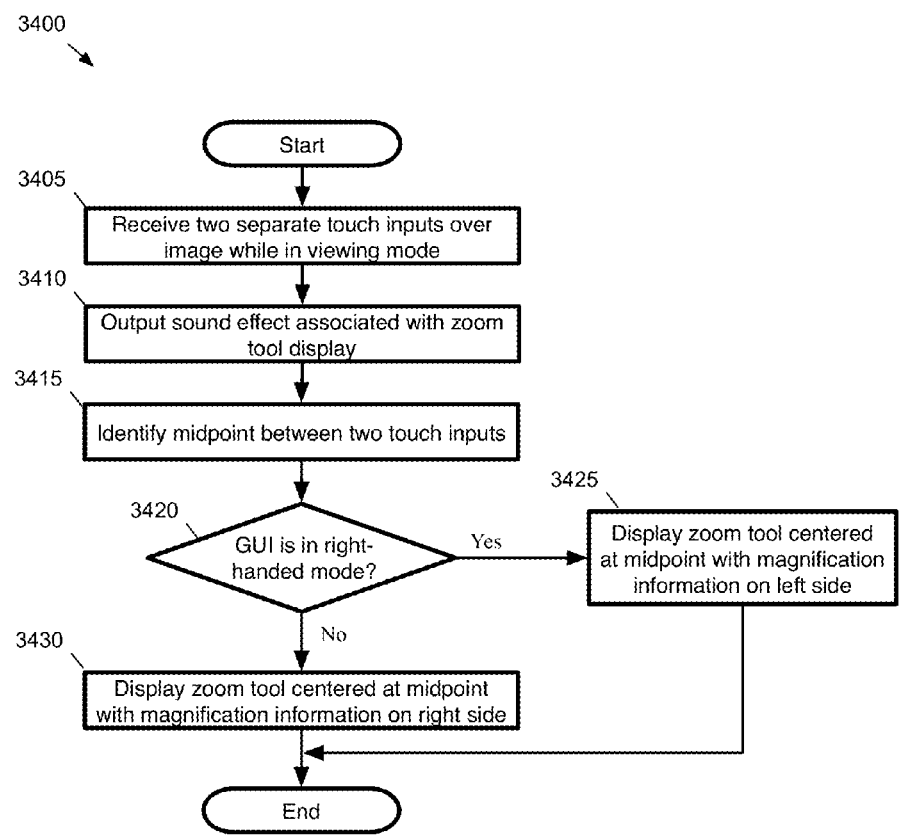
FIG. 34 conceptually illustrates a process of some embodiments for invoking a zoom tool.

FIG. 34 conceptually illustrates a process 3400 of some embodiments for invoking such a zoom tool. The process 3400 will be described by reference to FIGS. 35 and 36, which illustrate the invocation of the zoom tool within the right-handed and left-handed media-editing and viewing GUIs of some embodiments. The image viewing, editing, and organization application of some embodiments performs the process 3400 in response to a particular user input (e.g., touch) gesture received through the user interface of the application. However, some embodiments (e.g., some mobile phone and media player implementations of the application) do not include such a zoom tool.

As shown, the process begins by receiving (at 3405) two separate touch inputs over an image in the image display area while in the viewing mode. In some embodiments, the application is in viewing mode when the image display area displays one or more images and one of the sets of editing tools (e.g., the crop, exposure, color, brush, or special effects tools) have been activated. Some embodiments recognize two separate touch inputs as invoking the zoom tool when the two separate touch inputs are at least partly coincidental. That is, the two separate inputs need not contact the touchscreen at the same time (i.e., a user could place her thumb on the screen, then a second later contact the screen with her index finger in order to invoke the zoom tool so long as the thumb remains on the screen as well). Other embodiments place constraints on the time period between which the first and second touch inputs may be received (e.g., 0.5 seconds, 1 second, etc.). In addition, some embodiments only activate a zoom tool in response to touch inputs within a threshold distance (e.g., an absolute distance such as 3 inches or a distance relative to the size of the image).

Furthermore, some embodiments differentiate between a two-finger gesture and two separate gestures. Multi-touch devices can identify whether a user has placed one finger at a location on a touchscreen or multiple fingers together (e.g., for certain sweep gestures). These various touch gestures are detected by the device operating system and send to the application in some embodiments. When the application receives two separate gestures from the operating system at different locations over the displayed image, the application invokes the zoom tool.

In response to receiving the two separate touch inputs, the process 3400 outputs (at 3410) a sound effect that is associated with a zoom tool display. In some embodiments, the sound effect mimics the sound of a camera shutter opening. Among other purposes, the sound effect indicates to the user that the zoom tool is activated. In addition, some embodiments display an animation within the area covered by the zoom tool that gives the appearance of a camera shutter opening. While the process 3400 illustrates the application outputting the sound effect before displaying the zoom tool, one of ordinary skill in the art will recognize that this is a conceptual process and the sound effect may be output in parallel with the display of the zoom tool.

The process also identifies (at 3415) a midpoint between the two separate touch inputs. As indicated, in some embodiments the application receives gesture information from the operating system in response to touch inputs received from a user. The gesture information includes a location at which each gesture is centered (e.g., screen pixel coordinates). The application of some embodiments identifies the midpoint of the line connecting the center coordinates of each gesture (e.g., the mean x coordinate and mean y coordinate).

The process then determines (at 3420) whether the GUI is in a right-handed mode. As mentioned above by reference to FIG. 16, the image-editing application of provides a right-handed GUI and a left-handed GUI, between which users can switch. In some of these embodiments, the image editing application stores a parameter that indicates whether the GUI is in a right-handed mode or a left-handed mode. The application toggles the parameter when the user switches between the two modes (e.g., by moving the thumbnail display area). In these embodiments, the process determines whether the GUI is in the right-handed mode by checking this stored parameter. In other embodiments, the application uses the location of the thumbnail display area (or other GUI item) to determine whether the application is currently in left- or right-handed mode.

If the GUI is in the right-handed mode, the process displays (at 3425) a zoom tool centered at the identified midpoint, with magnification information displayed on the left side of the zoom ring. The process then ends. In some embodiments, the zoom tool is a zoom ring that appears as an ellipse (e.g., a circle) centered at the identified midpoint between the two touch inputs. Other embodiments, however, use different shapes (e.g., a square, hexagon, etc.). The magnification information, in some embodiments, indicates to the user the zoom level of the image inside the GUI control.

Figure 35:
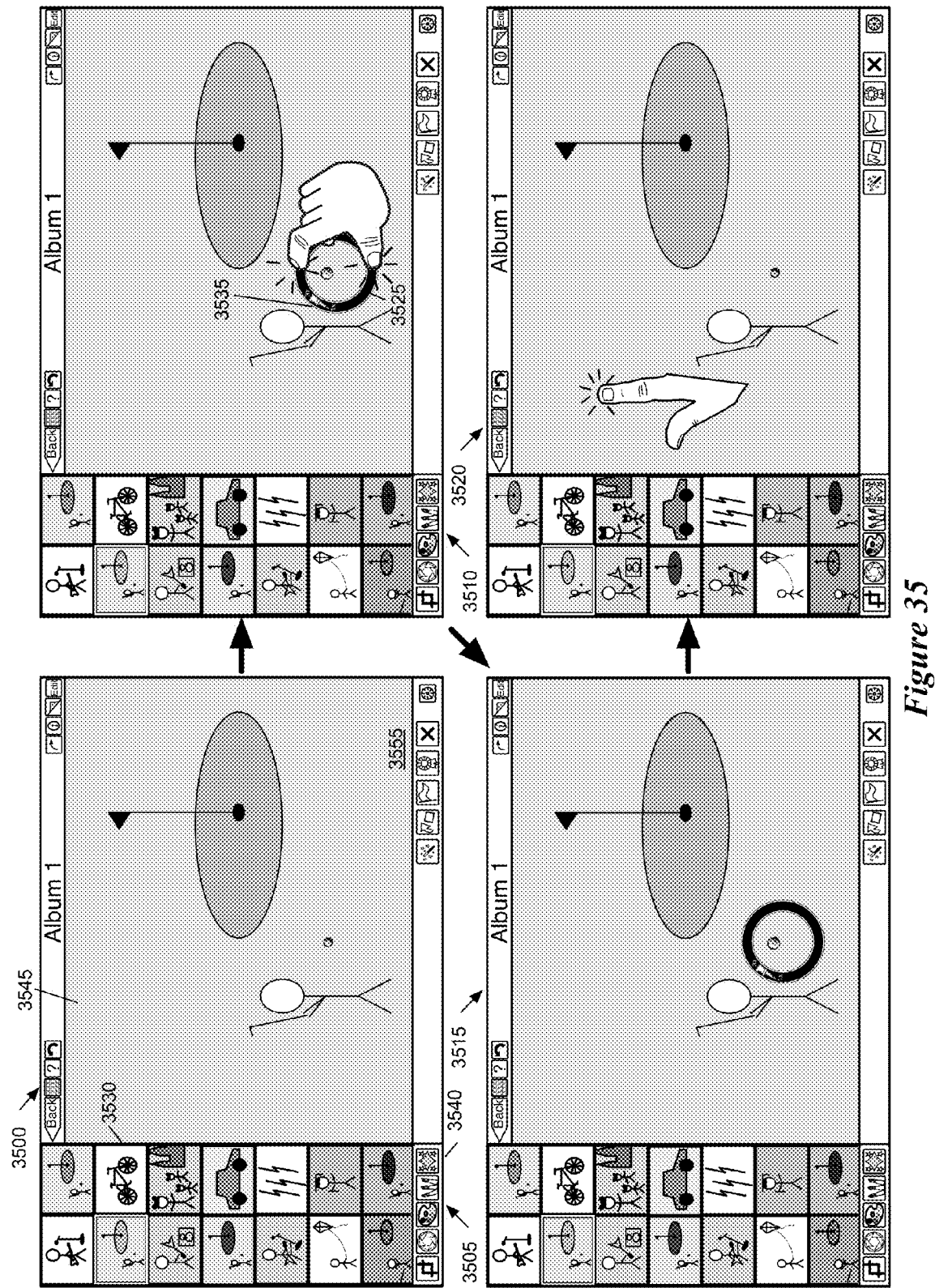
FIG. 35 illustrates an example of invoking and deselecting a zoom tool through the right-handed GUI of some embodiments.

FIG. 35 illustrates an example of invoking and de-invoking a circular zoom tool through the GUI 3500 at four stages 3505-3520 while the GUI is in right-handed mode. The first and second stages 3505 and 3510 of FIG. 35 illustrates the invocation of the zoom tool, while the third and fourth stages 3515 and 3520 illustrates the de-invocation of the zoom tool.

As shown, the GUI 3500 includes a thumbnail display area 3530 that is located on the left side of the GUI 3500, an image display area 3545, and a toolbar 3540. The application displays an image 3555 within the image display area 3545. As shown in the first stage 3505, the thumbnail display area 3530 located on the left side of the GUI 3500, which indicates that the GUI 3500 is in a right-handed mode. As none of the editing tool activation items in the toolbar 3540 are currently selected, the application is in viewing mode.

The second stage 3510 illustrates the GUI 3500 after a user has invoked a zoom tool on the image 3555. As mentioned above, the zoom tool can be invoked by providing two separate touch inputs on an image. As shown, the user invokes the zoom tool by tapping two fingers at separate locations over the image 3555, near a location that displays a golf ball.

As a result of the two touch inputs, a zoom ring 3525 is overlaid on the image 3555 centered at the midpoint between the two separate touch inputs (i.e., around a location in the image 3555 that includes a golf ball, now shown as magnified). In addition, since the GUI is in the right-handed mode as indicated by the location of the thumbnail display area 3530, the magnification information 3535 is displayed on the left side of the zoom ring 3525. This magnification information indicates that the current zoom level inside the zoom ring 3525 is 2×. Displaying the magnification information on the left side of the zoom ring 3525 makes this information easily visible to the user while her right hand is over the zoom tool. As will be explained below, the user can use rotation gestures in order to change the magnification level.

Referring back to FIG. 34, when the process 3400 determines that the GUI is not in a right-handed mode at operation 3420 (and thus that the GUI is in left-handed mode), the process displays (at 3430) a zoom tool centered at the identified midpoint, with magnification information displayed on the right side of the zoom ring. The process then ends. In some embodiments, the zoom tool is a zoom ring (e.g., a circle) that has the same shape whether in left-handed or right-handed mode.

Figure 36:
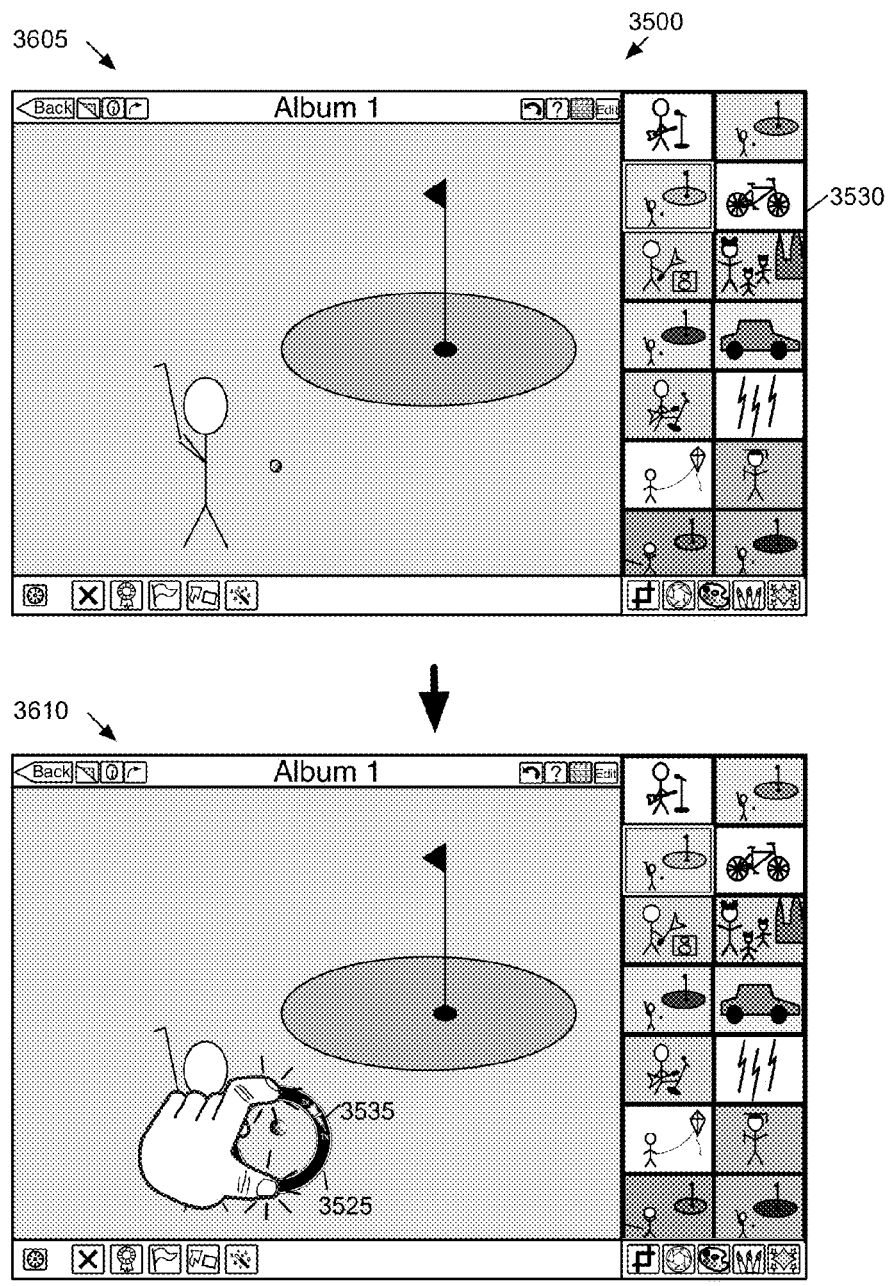
FIG. 36 illustrates an example of invoking a zoom tool through the GUI when the GUI is in a left-handed mode.

FIG. 36 illustrates an example of invoking a circular zoom tool through the GUI 3500 when the GUI is in a left-handed mode at two stages 3605 and 3610. As shown, the first stage 3605 is identical to the first stage 3505 of FIG. 35, except that the GUI 3500 in FIG. 36 is in left-handed mode, with the thumbnail display area 3530 located on the right side of the GUI 3500.

The second stage 3605 illustrates the GUI 3500 after the user has invoked a zoom tool on the image 3555. As mentioned above, the zoom tool can be invoked by providing two separate touch inputs on an image. As shown, the user invokes the zoom tool by tapping two fingers at separate locations over the image 3555, near a location that displays a golf ball.

As a result of the two touch inputs on the image 3555, a zoom ring 3525 is overlaid on the image 3555 centered at the midpoint between the two separate touch inputs (i.e., around a location in the image 3555 that includes a golf ball, now shown as magnified). In addition, since the GUI is in the left-handed mode as indicated by the location of the thumbnail display area 3530, the magnification information 3535 is displayed on the right side of the zoom ring 3525. This magnification information indicates that the current zoom level inside the zoom ring 3525 is 2×. Displaying the magnification information on the right side of the zoom ring 3525 makes this information easily visible to the user while her left hand is over the zoom tool. As will be explained below, the user can use rotation gestures in order to change the magnification level.

With the zoom tool invoked and displayed over an image (i.e., overlaid on the image), the image editing application also allows the user to deselect or de-invoke the zoom tool. Different embodiments of the application provide different manners in which a user can deselect the zoom tool. For instance, the application of some embodiments removes the zoom tool when a touch input is received on the image but outside of the zoom tool.

Referring back to FIG. 35, the third and fourth stages 3515 and 3520 illustrate an example of the deselection of a zoom tool through the GUI 3500. The GUI in the third stage 3515 is identical to the second stage 3510, with the zoom ring 3525 still overlaid on the image 3555, with the golf ball and surrounding grass magnified. The fourth stage 3520 illustrates the GUI 3500 after the user has deselected the zoom tool. As mentioned, a user may deselect a zoom tool by providing a touch input on the image outside of the zoom tool. As shown, the user has deselected the zoom tool 3525 by tapping a finger at a location on the image 3555 outside of the zoom tool 3525. As a result of the single touch input outside of the zoom ring, the application removes the zoom ring 3525 from the GUI 3500. In some embodiments, the application also displays a sound effect (e.g., the sound of a camera shutter closing) as the zoom tool is de-invoked. Some embodiments also display a corresponding animation of a camera shutter closing within the zoom tool as the tool is being removed.

In addition to simply invoking and removing the zoom tool of some embodiments, users can move the zoom tool to different locations in the image in order to zoom in on different sections, modify the magnification level of the region shown within the zoom tool, and perform other operations. These operations will now be described by reference to FIG. 37.

Figure 37:
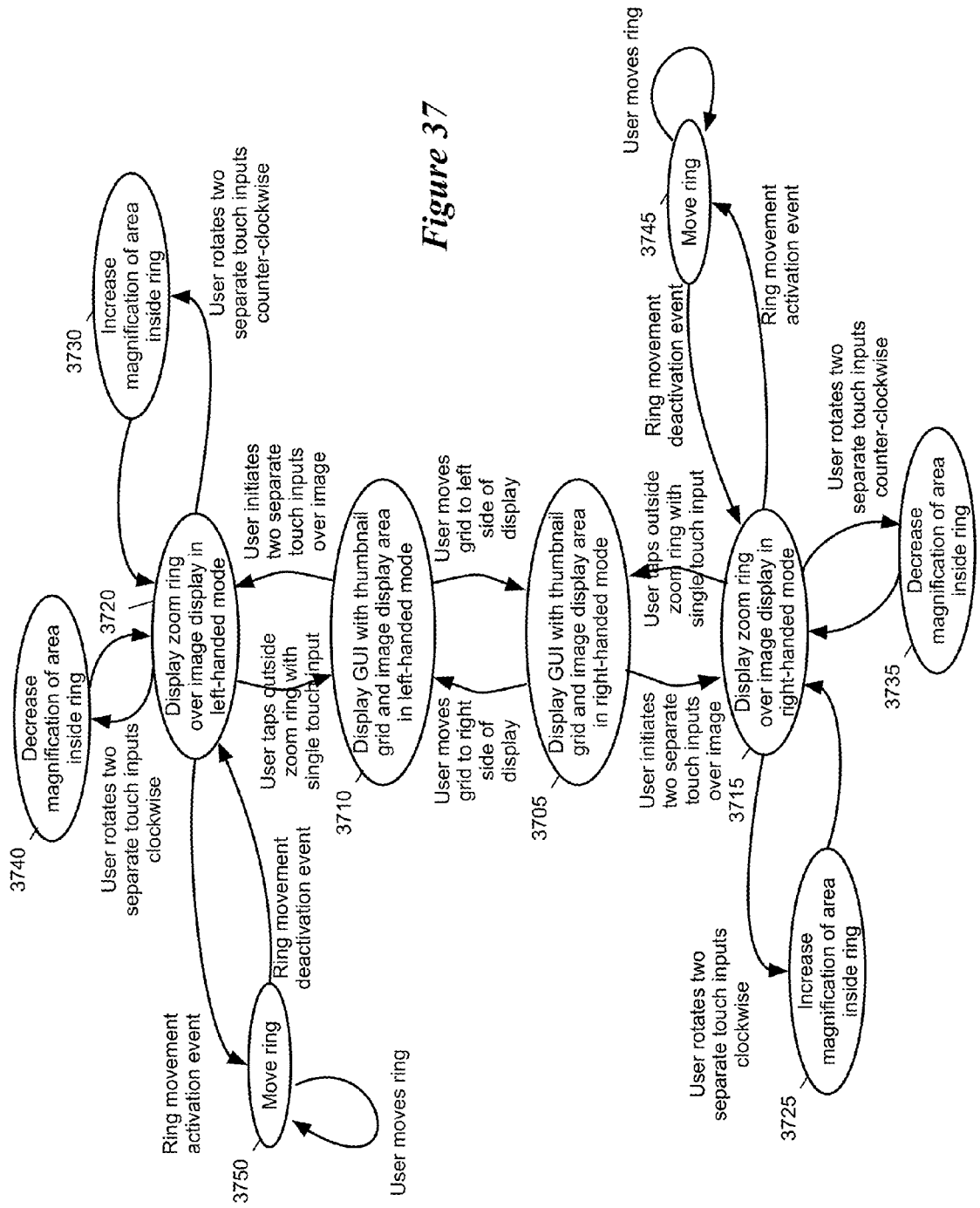
FIG. 37 conceptually illustrates state diagram that presents various operations of a zoom tool in some embodiments.

FIG. 37 conceptually illustrates a state diagram 3700 that presents various operations of the zoom tool within the GUI of some embodiments. One of ordinary skill in the art will recognize that the state diagram 3700 does not encompass every state of the image viewing GUI, or even every state of the zoom tool, but instead only a subset of the zoom tool operations within the image viewing GUI.

Figure 38:
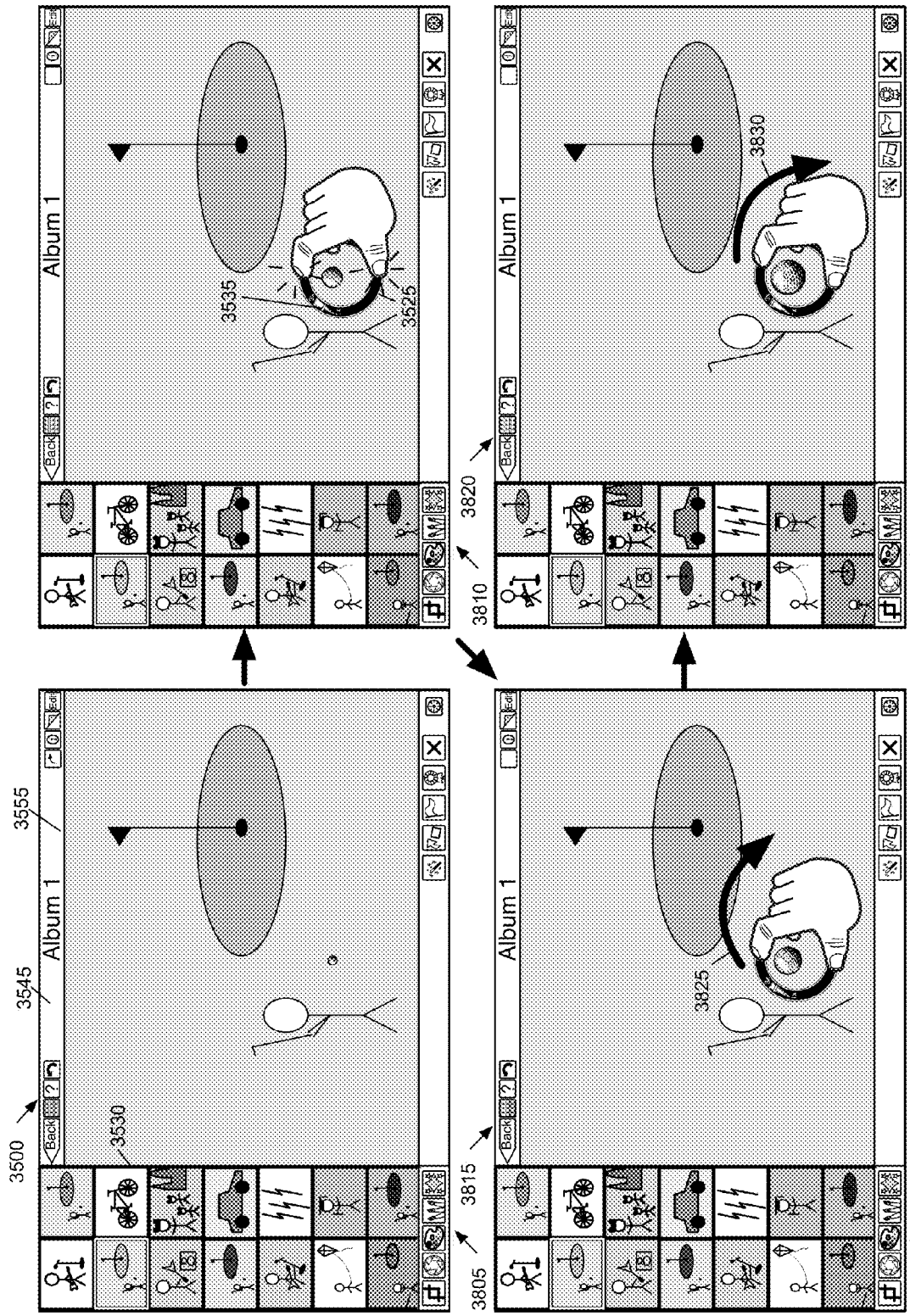
FIG. 38 illustrates the magnification operation of the zoom tool in a right-handed GUI.
Figure 39:
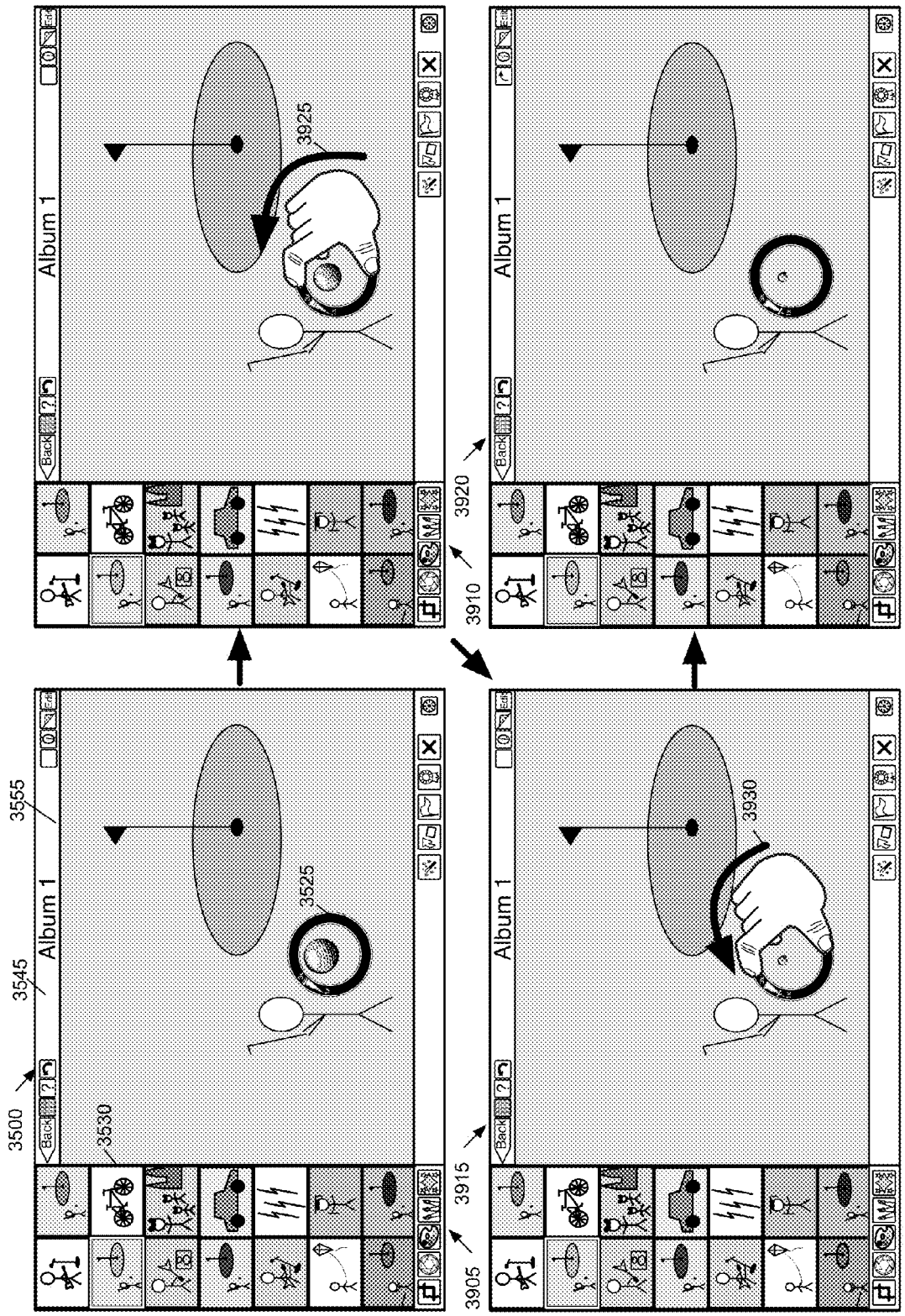
FIG. 39 illustrates the de-magnification operation of the zoom tool in a right-handed GUI.
Figure 40:
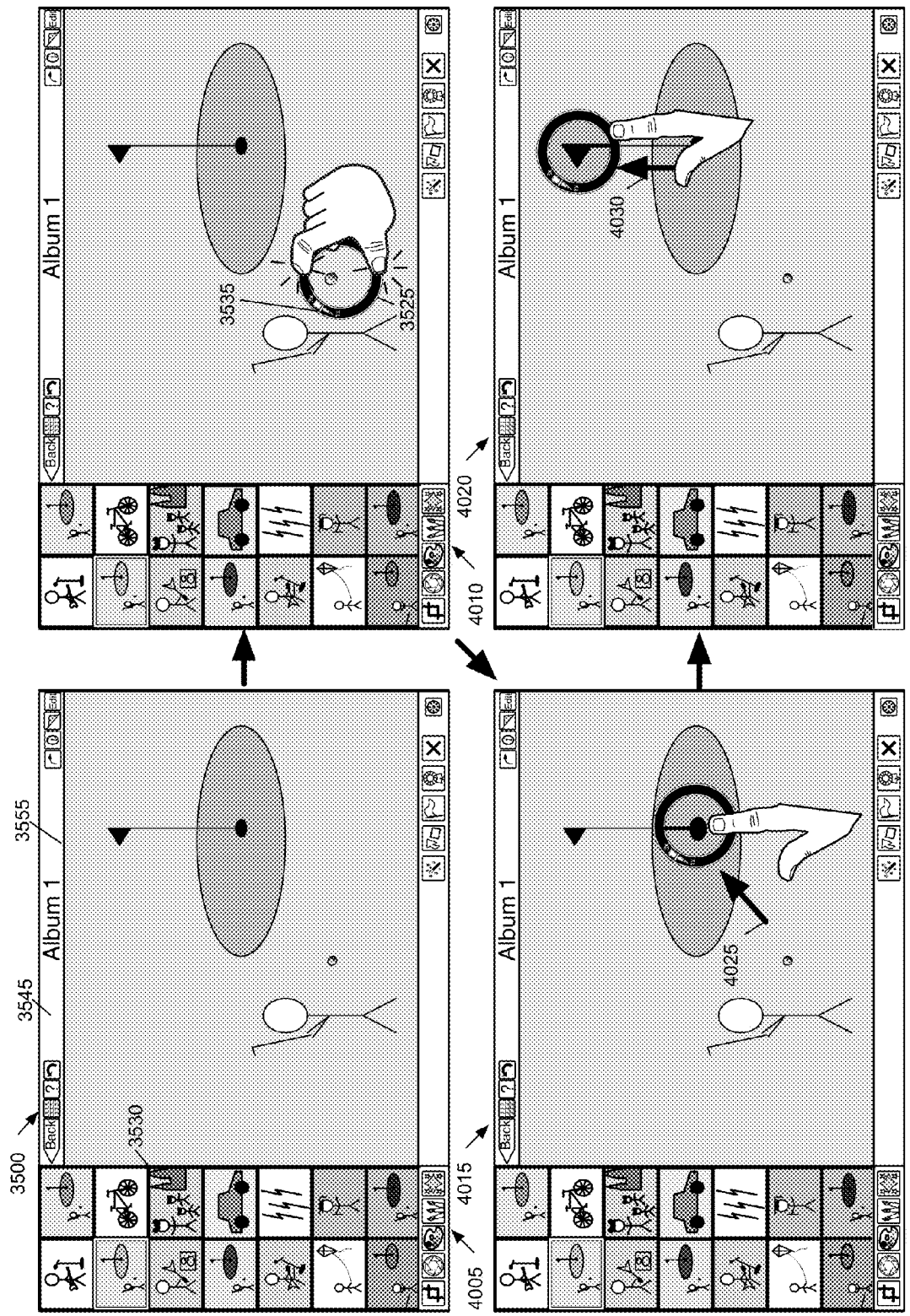
FIG. 40 illustrates the move operation of the zoom tool.
Figure 41:
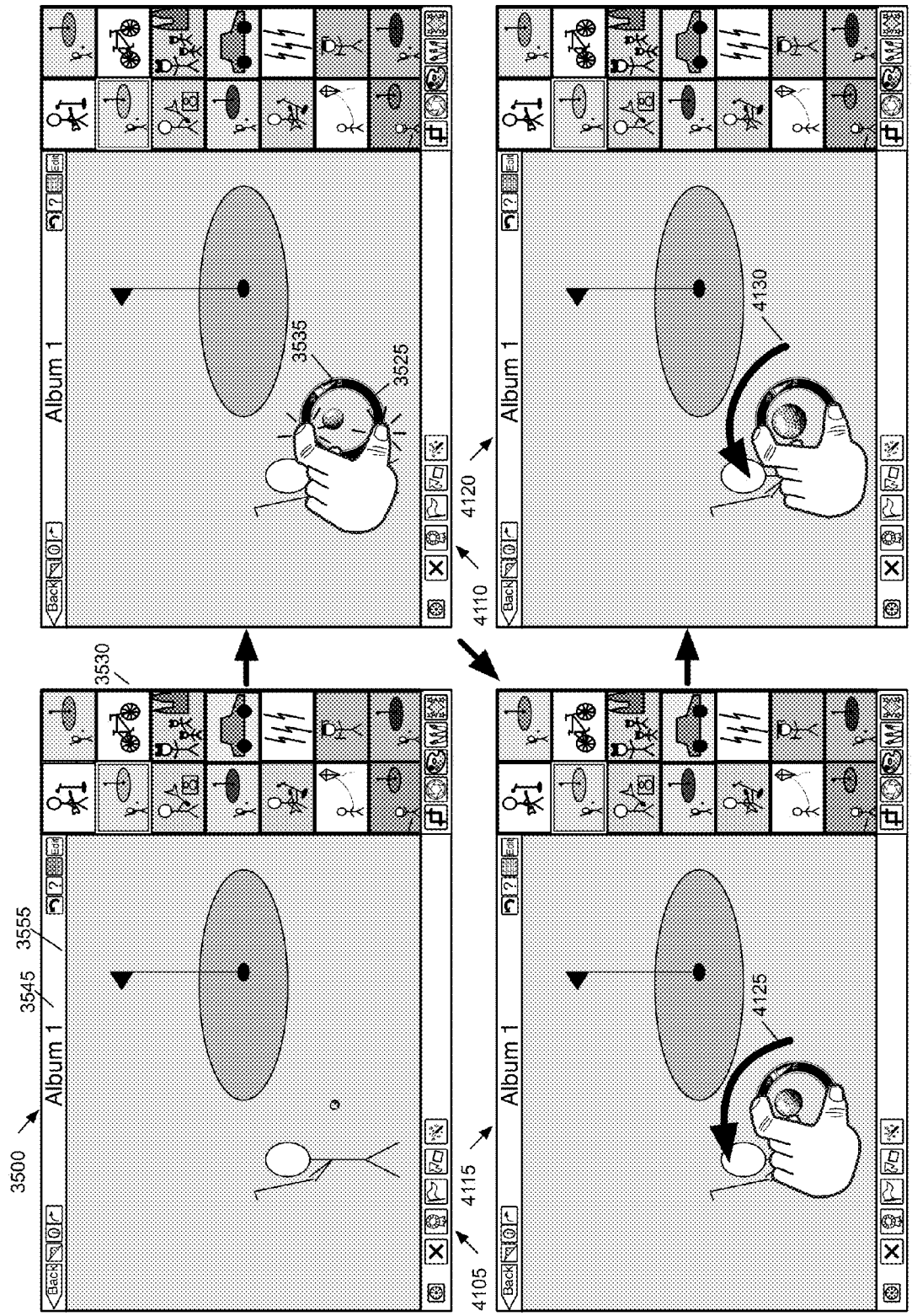
FIG. 41 illustrates the magnification operation of the zoom tool in a left-handed GUI.
Figure 42:
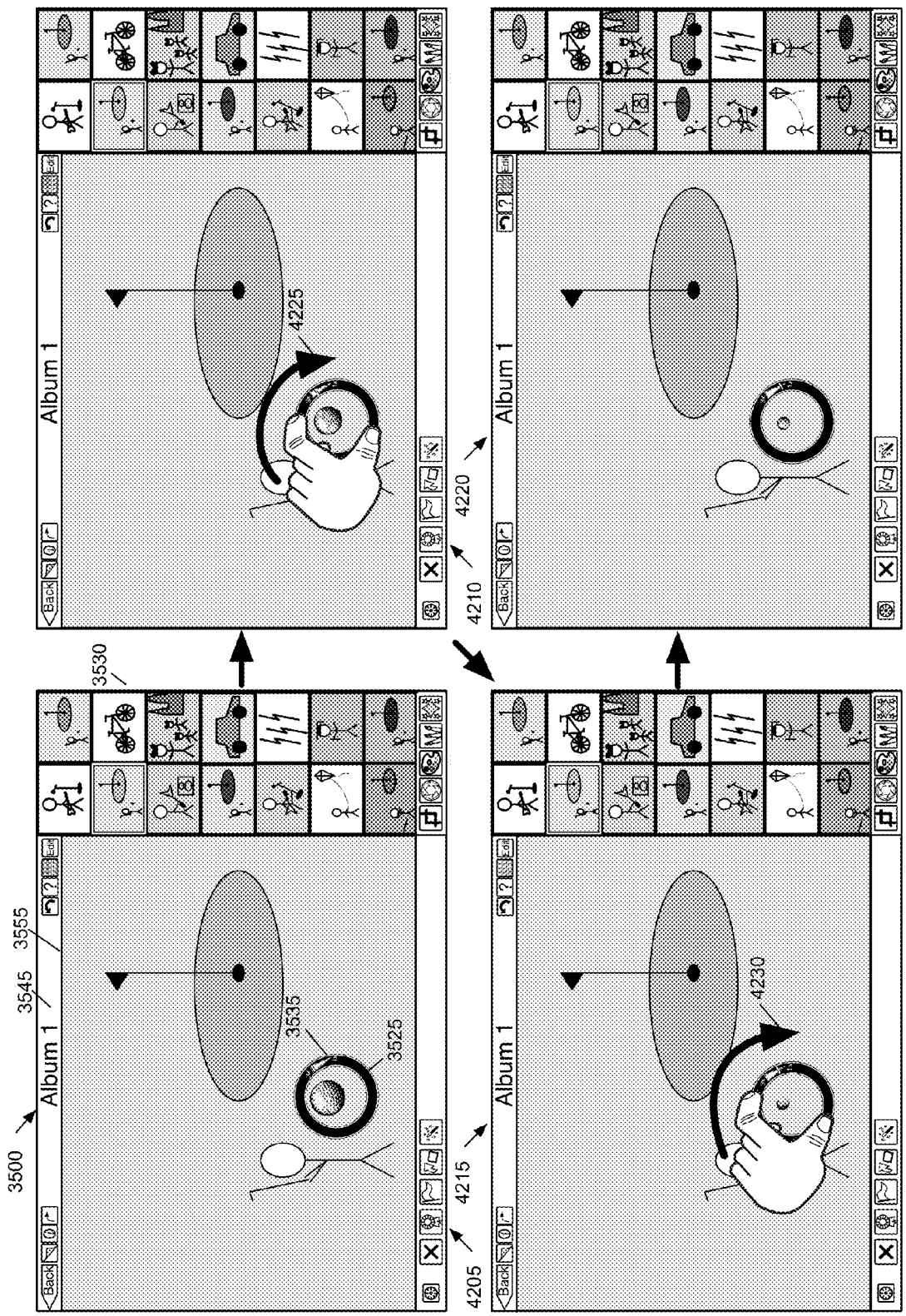
FIG. 42 illustrates the de-magnification operation of the zoom tool in a left-handed GUI.

The state diagram 3700 will be described by reference to the UI examples illustrated in FIGS. 38, 39, 41, 42, and 40. Specifically, FIGS. 38 and 41 show the GUI of the image viewing and editing application of some embodiments in multiple stages related to the magnifying (i.e., zooming in) operation of the zoom tool. FIGS. 39 and 42 show the GUI of the image viewing and editing application of some embodiments in multiple stages related to the de-magnifying (i.e., zooming out) operation of the zoom tool. FIG. 40 shows the GUI of the image viewing and editing application of some embodiments in multiple stages related to the relocation (i.e., moving) of the zoom tool.

As shown in FIG. 37, the GUI has two initial states 3705 and 3710. At the initial state 3705, the GUI displays a thumbnail grid (i.e., a thumbnail display area) and an image displayed in an image display area in the right-handed mode. The state 3710 is identical to the state 3705, with the exception that the GUI is in the left-handed mode instead of a right-handed mode, and thus the thumbnail grid is on the right side of the GUI. The various operations of the zoom tool in right-handed mode will be described first by reference to FIGS. 38, 39, and 40.

When the zoom tool receives two separate touch inputs over the image, the zoom tool transitions from the initial state 3705 to state 3715, at which the GUI displays a zoom ring on the image in the right-handed mode. As described above, the GUI provides two different versions of the zoom ring in some embodiments, one for the right-handed mode and one for the left-handed mode. In some embodiments, the zoom right in the right-handed mode has the magnification information displayed on the left side of the zoom ring. This enables the user to view the magnification information while her right hand is over the zoom ring. The operations of invoking and displaying the zoom ring in the right-handed mode are described in details above by reference to FIG. 35.

The zoom tool stays at state 3715 so long as there is no input provided to affect the zoom ring. However, when a clockwise rotation input is received, the GUI transitions to state 3725 to increase the magnification of the area of the image within the zoom tool. In some embodiments, a user can provide a clockwise rotation input by putting two fingers on the zoom ring and rotating the two fingers in a clockwise direction. Some embodiments identify such input by tracking the location of the inputs and measuring the angle (e.g., the angle off the horizontal) of the line connecting the two locations. When this angle changes in a clockwise manner, the application increases the magnification of the right-handed zoom tool. In some embodiments, the two touch inputs need not be located directly over the zoom tool, though doing so will often help the user visualize the zoom in and zoom out movements. After increasing the magnification of the area of the image that is inside the zoom ring, the GUI returns to state 3715 so long as the user is not continuing to rotate her fingers in a clockwise manner.

FIG. 38 illustrates the magnification operation of the zoom tool through the GUI 3500 at four different stages 3805-3820. The first stage 3805 is identical to the first stage 3505 of FIG. 35, with the thumbnail display area 3530 located on the left side of the GUI 3500, and the image 3555 displayed in the image display area 3545 in viewing mode.

The second stage 3810 illustrates the GUI 3500 after the user has invoked the zoom tool by providing two separate touch inputs on the image 3555. As shown, the user has tapped two fingers on the image 3555 around the location of the golf ball. As a result of the two separate touch inputs, the application overlays a zoom ring 3525 on the image 3555 centered at the midpoint between the two separate touch inputs. In addition, as the GUI is in the right-handed mode, the application displays magnification information 3535 on the left side of the zoom ring 3525. In some embodiments, the default magnification is a 2× zoom, with the magnification variable between 1× and 3×.

The third stage 3815 illustrates the GUI 3500 after the user has started to increase the magnification of the image using the zoom tool. As mentioned, the user can increase the magnification of the area of the image inside the zoom tool by providing clockwise rotation input. As shown, the user has begun to rotate the two fingers in the clockwise direction, as indicated by the arrow 3825. As a result of the clockwise rotation input, the area of the image that is inside the zoom ring 3525 is displayed as further magnified.

The fourth stage 3820 illustrates the GUI 3500 after the user has further increased the magnification of the image using the zoom tool. As shown, the user has continued to rotate the two fingers in the clockwise direction, as indicated by the arrow 3830. As a result of the rotation movement, the area of the image inside the zoom ring 3525 in the fourth stage 3820 is more magnified than the image in the third stage 3815. At this stage, the zoom tool is at the maximum 3× magnification level.

In some embodiments, the zoom tool will not magnify a portion of an image past its full size display. Images on smaller-screen devices are often reduced in size in order to fit within the display of the device. For example, a 1920×1080 image may not be displayed at full size on a 640×480 display screen. Using the zoom tool enables the user to view a portion of an image at closer to its full size. However, when an image is already at its full size (e.g., a 640×480 image on a 1920× 1080 display screen), then some embodiments will not allow a user to invoke the zoom tool, as this would create pixelation within the zoomed area.

Referring back to FIG. 37, when the application receives a counter-clockwise rotation input while at state 3715, the GUI transitions to state 3735 to decrease the magnification of the area of the image within the zoom tool. In some embodiments, a user can provide a counter-clockwise rotation input by putting two fingers on the zoom ring and rotating the two fingers in a counter-clockwise direction. As with the clockwise rotation, some embodiments identify the input by tracking the location of the two inputs and measuring the angle of the line connecting the locations. After decreasing the magnification of the area of the image inside the zoom ring, the GUI returns to state 3715 so long as the user is not continuing to rotate her fingers.

FIG. 39 illustrates the de-magnification operation of the zoom tool through the GUI 3500 at four different stages 3905-3920. The GUI 3500 at the first stage 3905 is identical to the GUI at the fourth stage 3820 of FIG. 38. As shown, the GUI 3500 includes the zoom ring 3525 at 3× magnification and the area of the image inside the zoom ring is magnified.

The second stage 3910 illustrates the GUI 3500 after the user has started to decrease the magnification of the image using the zoom tool. As mentioned, the user can decrease the magnification of the area of the image inside the zoom ring by providing a counter-clockwise rotation input. As shown, the user has begun to rotate the two fingers in the counter-clockwise direction, as indicated by the arrow 3925. As a result of the counter-clockwise rotation input, the application has decreased the magnification of the area of the image that is inside the zoom ring 3525.

The third stage 3915 illustrates the GUI 3500 after the user has further decreased the magnification of the image using the zoom tool. As shown, the user has continued to rotate the two fingers in the counter-clockwise direction, as indicated by the arrow 3930. As a result of the rotation movement, the area of the image inside the zoom ring 3525 in the third stage 3915 is less magnified than at the second stage 3910. The fourth stage 3920 illustrates the GUI 3500 after the user has lifted the two fingers off the zoom ring 3525. As shown, the area of the image inside the zoom ring 3525 remains the same as the area of the image in the third stage 3915 after the user has lifted off the fingers.

In addition to changing the magnification level of the zoom tool, some embodiments allow the user to move the tool around the image, thereby focusing on different areas within an image. Referring back to FIG. 37, when the zoom tool receives a ring movement activation event, the zoom tool transitions to the move ring state 3745. In some embodiments, a ring movement activation event includes a user pressing and holding a finger (i.e., a single touch) on the zoom ring. During the move ring state 3745, the zoom ring follows the movement of the user's input. That is, the zoom ring moves to wherever the user moves the finger. The zoom tool stays in this state until receiving a zoom ring movement deactivation event. In some embodiments, the user can deactivate the zoom ring movement operation by lifting the finger off the zoom ring. Upon receiving the zoom ring movement deactivation event, the zoom tool returns to state 3715.

FIG. 40 illustrates the move operation of the zoom tool through the GUI 3500 at four different stages 4005, 4010, 4015, and 4020. The first stage 4005 is identical to the first stage 3505 of FIG. 35. As shown, the GUI 3500 includes a thumbnail display area 3530 that is located on the left side of the GUI 3500, an image display area 3545, and a menu bar 3540. An image 3555 is displayed in the image display area 3545 in a view mode. In addition, FIG. 40 also shows that the GUI 3500 is in a right-handed mode, as indicated by the thumbnail display area 3530 located on the left side of the GUI 3500.

The second stage 4010 illustrates the GUI 3500 after a user has invoked the zoom tool. As shown, the user has invoked the zoom tool by providing two separate touch inputs on the image 3555. As a result of the two separate touch inputs, the application overlays the zoom ring 3525 on the image 3555 centered at the midpoint between the two separate touch. In addition, as the GUI 3500 is in the right-handed mode (indicated by the location of the thumbnail display area 3530), the GUI displays the magnification information 3535 on the left side of the zoom ring 3525.

The third stage 4015 illustrates the GUI 3500 after the user has started to move the zoom ring 3525 with a touch gesture. In some embodiments, a user can move the zoom ring by placing a single finger on the zoom ring 3525 and dragging the finger to another location on the image. As shown, the user has begun to drag the finger towards the upper right corner of the image 3555, as indicated by the arrow 4025. As a result of the drag movement, the zoom ring 3525 moves toward the upper right corner of the image 3555. The fourth stage 3915 illustrates the GUI 3500 after the user has moved the zoom ring 3525 to another location on the image. As shown, the user has dragged the finger toward the top of the image 3555, as indicated by the arrow 4030. As a result of the drag movement, the zoom ring 3525 now moves toward the top of the image 3555.

In some embodiments, the zoom tool can be deactivated by a zoom tool deactivation event. For example, the zoom tool can be deactivated when a single input is received outside of the zoom ring. Referring back to FIG. 37, when the zoom tool receives an input outside of the zoom ring (e.g., a single touch outside of the zoom ring) while at state 3715, the zoom tool transitions back to the initial state 3705. The deactivation operation of the zoom ring of some embodiments is described in detail above by reference to stages 3515 and 3520 of FIG. 35.

As described in detail above, a user can toggle the image-viewing and editing GUI from right-handed mode to left-handed mode by moving the thumbnail display area (i.e., the thumbnail grid) to the right side of the GUI. Thus, while at the initial state 3705, the zoom tool transitions to the other initial state 3710 when the moves the thumbnail grid to the right side of the display (and vice versa if the user moves the thumbnail grid back to the left side). The various operations of the zoom tool that starts with the initial state 3710 will be now described by reference to FIGS. 41 and 42. These operations are similar to the right-handed operations, except that the magnification and de-magnification operations are caused by rotation in the reverse directions.

When the zoom tool receives two separate touch inputs over the image, the zoom tool transitions from the initial state 3710 to state 3720, at which the GUI displays a zoom ring on the image in the left-handed mode. As described above, the GUI provides two different versions of the zoom ring in some embodiments, one for the right-handed mode and one for the left-handed mode. In some embodiments, the zoom right in the left-handed mode has the magnification information displayed on the right side of the zoom ring. This enables the user to view the magnification information while her left hand is over the zoom ring. The operations of invoking and displaying the zoom ring in the left-handed mode are described in details above by reference to FIG. 36.

The zoom tool stays at state 3720 so long as there is no input provided to affect the zoom ring. However, when a counter-clockwise rotation input is received, the GUI transitions to state 3730 to increase the magnification of the area of the image within the zoom tool. In some embodiments, a user can provide a counter-clockwise rotation input by putting two fingers on the zoom ring and rotating the two fingers in a counter-clockwise direction. Some embodiments identify such input by tracking the location of the inputs and measuring the angle (e.g., the angle off the horizontal) of the line connecting the two locations. When this angle changes in a counter-clockwise manner, the application increases the magnification of the left-handed zoom tool. In some embodiments, the two touch inputs need not be located directly over the zoom tool, though doing so will often help the user visualize the zoom in and zoom out movements. After increasing the magnification of the area of the image that is inside the zoom ring, the GUI returns to state 3720 so long as the user is not continuing to rotate her fingers in a counter-clockwise manner.

FIG. 41 illustrates the magnification operation of the zoom tool through the GUI 3500 at four different stages 4105-4120.

The first stage 4105 is identical to the first stage 3605 of FIG. 36, with the thumbnail display area 3530 located on the right side of the GUI 3500, and the image 3555 displayed in the image display area 3545 in viewing mode.

The second stage 4110 illustrates the GUI 3500 after the user has invoked the zoom tool by providing two separate touch inputs on the image 3555. As shown, the user has tapped two fingers on the image 3555 around the location of the golf ball. As a result of the two separate touch inputs, the application overlays a zoom ring 3525 on the image 3555 centered at the midpoint between the two separate touch inputs. In addition, as the GUI is in the left-handed mode, the application displays magnification information 3535 on the left side of the zoom ring 3525. In some embodiments, the default magnification is a 2× zoom, with the magnification variable between 1× and 3×.

The third stage 4115 illustrates the GUI 3500 after the user has started to increase the magnification of the image using the zoom tool. As mentioned, the user can increase the magnification of the area of the image inside the zoom tool by providing counter-clockwise rotation input. As shown, the user has begun to rotate the two fingers in the counter-clockwise direction, as indicated by the arrow 4125. As a result of the counter-clockwise rotation input, the area of the image that is inside the zoom ring 3525 is displayed as further magnified.

The fourth stage 4120 illustrates the GUI 3500 after the user has further increased the magnification of the image using the zoom tool. As shown, the user has continued to rotate the two fingers in the counter-clockwise direction, as indicated by the arrow 4130. As a result of the rotation movement, the area of the image inside the zoom ring 3525 in the fourth stage 4120 is more magnified than the image in the third stage 3815. At this stage, the zoom tool is at the maximum 3× magnification level.

Referring back to FIG. 37, when the application receives a clockwise rotation input while at state 3720, the GUI transitions to state 3740 to decrease the magnification of the area of the image within the zoom tool. In some embodiments, a user can provide a clockwise rotation input by putting two fingers on the zoom ring and rotating the two fingers in a clockwise direction. As with the counter-clockwise rotation, some embodiments identify the input by tracking the location of the two inputs and measuring the angle of the line connecting the locations. After decreasing the magnification of the area of the image inside the zoom ring, the GUI returns to state 3720 so long as the user is not continuing to rotate her fingers.

FIG. 42 illustrates the de-magnification operation of the zoom tool through the GUI 3500 at four different stages 4205-4220. The GUI 3500 at the first stage 4205 is identical to the GUI at the fourth stage 4120 of FIG. 41. As shown, the GUI 3500 includes the zoom ring 3525 at 3× magnification and the area of the image inside the zoom ring is magnified.

The second stage 4210 illustrates the GUI 3500 after the user has started to decrease the magnification of the image using the zoom tool. As mentioned, the user can decrease the magnification of the area of the image inside the zoom ring by providing a clockwise rotation input. As shown, the user has begun to rotate the two fingers in the clockwise direction, as indicated by the arrow 4225. As a result of the clockwise rotation input, the application has decreased the magnification of the area of the image that is inside the zoom ring 3525.

The third stage 4215 illustrates the GUI 3500 after the user has further decreased the magnification of the image using the zoom tool. As shown, the user has continued to rotate the two fingers in the clockwise direction, as indicated by the arrow 4230. As a result of the rotation movement, the area of the image inside the zoom ring 3525 in the third stage 4215 is less magnified than at the second stage 4210. The fourth stage 4220 illustrates the GUI 3500 after the user has lifted the two fingers off the zoom ring 3525. As shown, the area of the image inside the zoom ring 3525 remains the same as the area of the image in the third stage 4215 after the user has lifted off the fingers.

As with the right-handed zoom tool, the user can move the tool around to different areas of the image in left-handed mode. While the gestures for magnification and de-magnification are in opposite directions for the left-handed and right-handed modes, moving the zoom ring involves the same gesture in either mode in some embodiments. Referring back to FIG. 37, when the zoom tool receives a ring movement activation event, the zoom tool transitions to the move ring state 3750. In some embodiments, a ring movement activation event involves a user pressing and holding a finger (i.e., a single touch input) on the zoom ring. During the move ring state 3750, the zoom ring follows the movement of the user's input. That is, the zoom ring moves to wherever the user moves the finger. The zoom tool stays in this state until receiving a zoom ring movement deactivation event. In some embodiments, the user can deactivate the zoom ring movement operation by lifting the finger off the zoom ring. Upon receiving the zoom ring movement deactivation event, the zoom tool returns to state 3720. When the zoom tool receives an input outside of the zoom ring (e.g., a single touch outside of the zoom ring) while at state 3720, the zoom tool transitions back to the initial state 3710, with the GUI in left-handed mode.

IV. Display of Multiple Images

While many of the above examples show a GUI with only one image in the image display area, some embodiments allow the user to select several images for display at once. In various embodiments, different processes are available to the user in order to display multiple images. The user can select a particular image in a collection (by selecting the corresponding thumbnail with a particular type of selection input) and the application automatically identifies any other images in the collection that are within a threshold similarity of the selected image. In addition, the user can select a block of images in the thumbnail display area (e.g., through separate inputs on a multi-touch device) or several individual images by pressing and holding each thumbnail for a threshold duration. In addition, some embodiments include a settings menu option for selecting multiple images at once.

When multiple images are selected for display in the image display area, some embodiments use a display algorithm that maximizes usage of the display while ensuring that the visual weighting is equal across all the images. In some embodiments, the application identifies the average aspect ratio of the images to display, then divides the image display area into the ideal grid for the number of images, with each rectangular region of the grid having the average aspect ratio. The application then fits each of the images into one of the grid rectangles.

A. Identification and Display of Similar Images

As mentioned, one of the methods for selecting multiple images for display in the image display area is to select an image and cause the application to identify any images in the same collection that are within a threshold similarity of the selected image. In some embodiments, when a user double taps (or double clicks) on a thumbnail, the application automatically compares other images in the collection to the selected image. To perform a comparison between two images, some embodiments use a set of histograms for each of the images, and determine whether the image histograms are within the threshold similarity. Some embodiments use color, texture, and gradient histograms, though other embodiments may use other pixel properties to compare the images. In order to focus the comparison on the more important portions of the image (e.g., the center), some embodiments divide the image into several regions and compare the histograms for corresponding regions. The regions may be overlapping such that some pixels (e.g., those in the center of the image) are used for more regions than other pixels.

Figure 43:
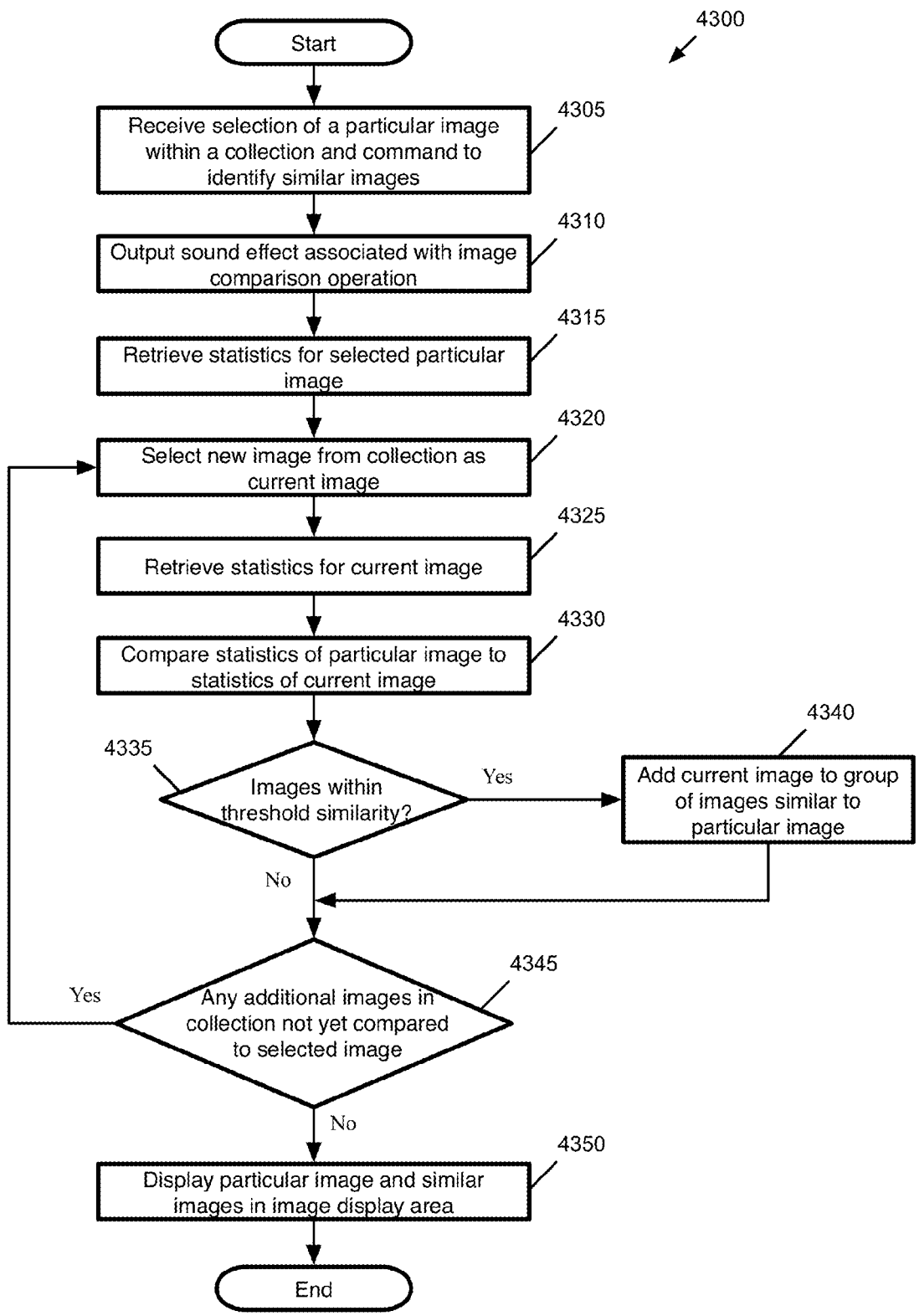
FIG. 43 conceptually illustrates a process of some embodiments for identifying and displaying similar images within a collection.
Figure 44:
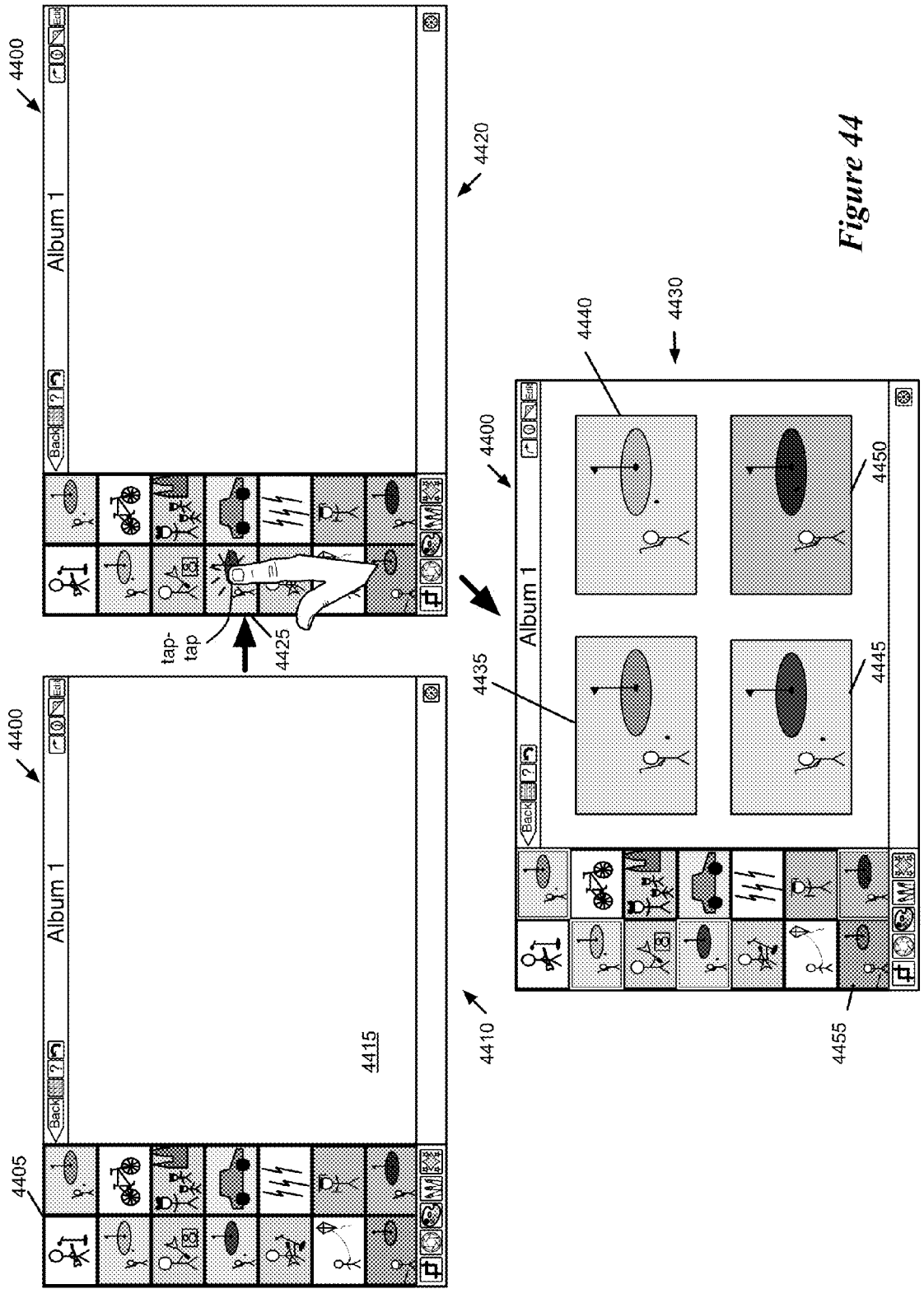
FIG. 44 illustrates a GUI for an image viewing application in which a user selects a particular image and the application identifies the set of images within a collection that are similar to the selected image.

FIG. 43 conceptually illustrates a process 4300 of some embodiments for identifying and displaying similar images within a collection. The image viewing, editing, and organization application of some embodiments performs this process in response to a user command to display the similar images while the application is in viewing mode. The process 4300 will be described in part by reference to FIGS. 44-46. FIG. 44 illustrates a GUI 4400 for an image viewing application over three stages 4410-4430 in which a user selects a particular image and the application identifies the set of images within a collection that are similar to the selected image.

The GUI 4400 includes a thumbnail display area 4405 and an image display area 4415. These display areas are similar to those described above for FIG. 14. As indicated in the bar above the image display area 4415, the thumbnail display area 4405 displays a set of thumbnails for images in the collection "Album 1".

As shown, the process 4300 begins by receiving (at 4305) a selection of a particular image within an album and a command to identify similar images. As mentioned, some embodiments automatically perform this process when a user double taps (i.e., two rapid successive taps within a threshold duration over the same thumbnail) or double clicks on a thumbnail of an image. However, this feature could also be accessed through other GUI interactions, such as selecting a menu option or a separate GUI item with an image selected, typing a set of keystrokes, etc.

The first stage 4410 of FIG. 44 illustrates that none of the thumbnails in the thumbnail display area 4405 are presently selected. In the second stage 4420, the user double taps the thumbnail 4425 with a single finger. This image shows a golfer having just hit a golf ball. As can be seen in the thumbnail display area 4405, the collection includes four other images of this golf scene, as well as various unrelated images.

Next, the process 4300 outputs (at 4310) a sound effect associated with the image comparison operation. One of ordinary skill in the art will recognize that various different embodiments may use different sound effects, and some may not output a sound effect at all. In some embodiments, the sound effect used may be designed to simulate a person shuffling through a large set of physical photographs, or be evocative of a processor performing computations. While the output of the sound effect is conceptually shown in the process 4300 as performed prior to the comparison operations, in many cases the processor on the device that runs the application will perform the computations necessary for the comparison during the time that the device outputs the sound effect.

The process then retrieves (at 4315) statistics for the selected image. In some embodiments, the statistics comprise a set of histograms that provide information about the image. The histograms, in some embodiments, provide information about the distribution of color in the image, the variability of the color within the image, and the shapes present in the image. As described in further detail below by reference to FIG. 47, the application of some embodiments places each pixel into a color range, a texture range, and a gradient range.

The color identifies the location of the pixel in a particular color space, the texture identifies how similar or different a pixel's color data is to that of its neighbors, and the gradient identifies a direction and amount of the pixel's change in intensity relative to its neighbors. In addition to these (and other) histograms, some embodiments also use other information to compare images, such as filenames, user-entered descriptions, Exif data, etc.

Figure 45:
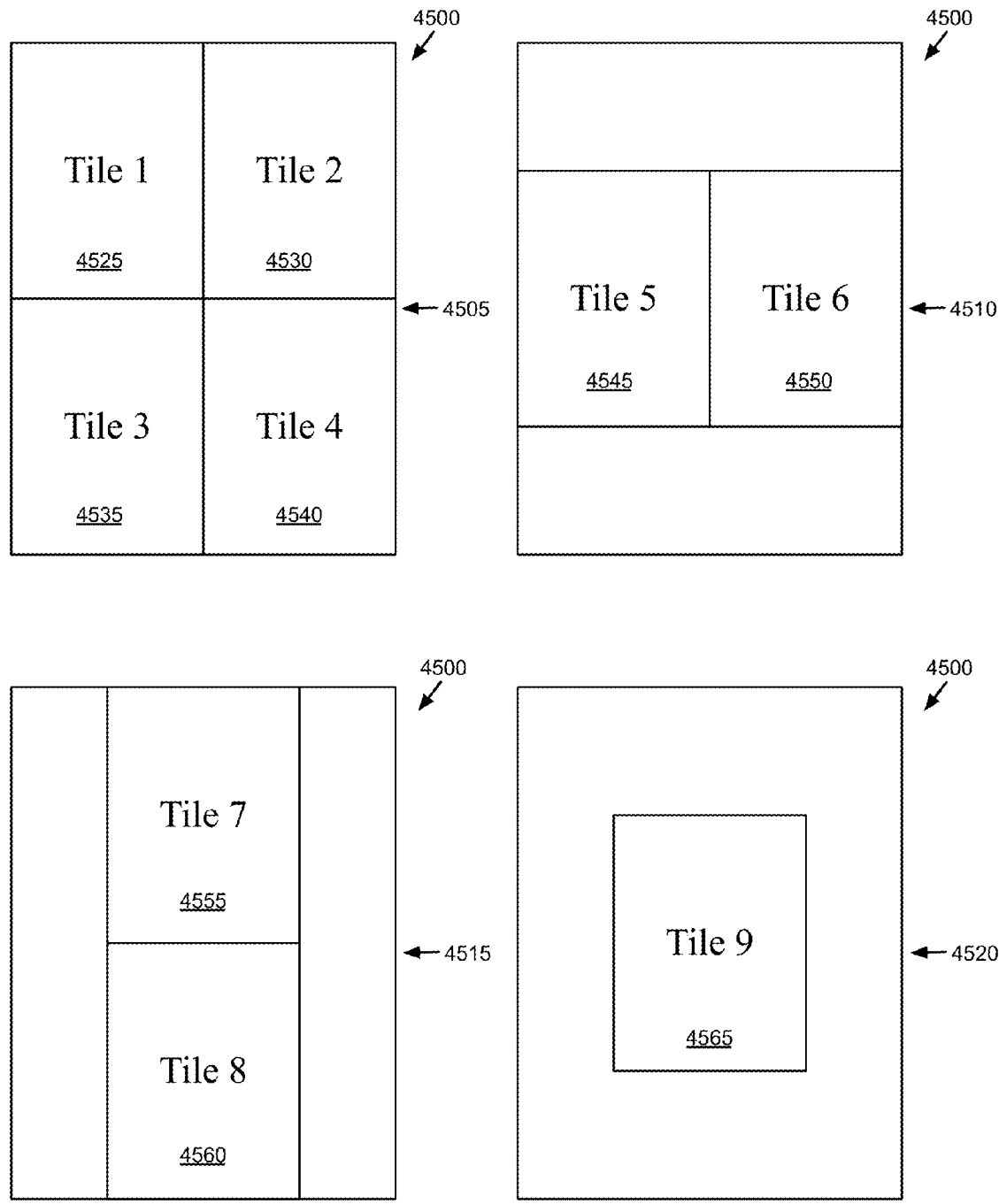
FIG. 45 conceptually illustrates a division of an image into nine different tiles, each of which is one-fourth the size of the image.

In some embodiments, the application divides up the images into several regions and compares histograms for corresponding portions of two images. Different embodiments divide the images differently. FIG. 45 conceptually illustrates one such division of an image 4500 into nine different tiles, each of which is one-fourth the size of the image. FIG. 45 uses four panels 4505-4520 to illustrate the nine tiles 4525-4565. The first four tiles 4525-4540 are the four corner regions of the image 4500. The next two tiles 4545 and 4550, in panel 4510, occupy the vertical center of the image, while the tiles 4555 and 4560, in panel 4515, occupy the horizontal center of the image. Finally, the last panel 4520 has only one tile 4565 that is centered at the actual centerpoint of the image.

Figure 46:
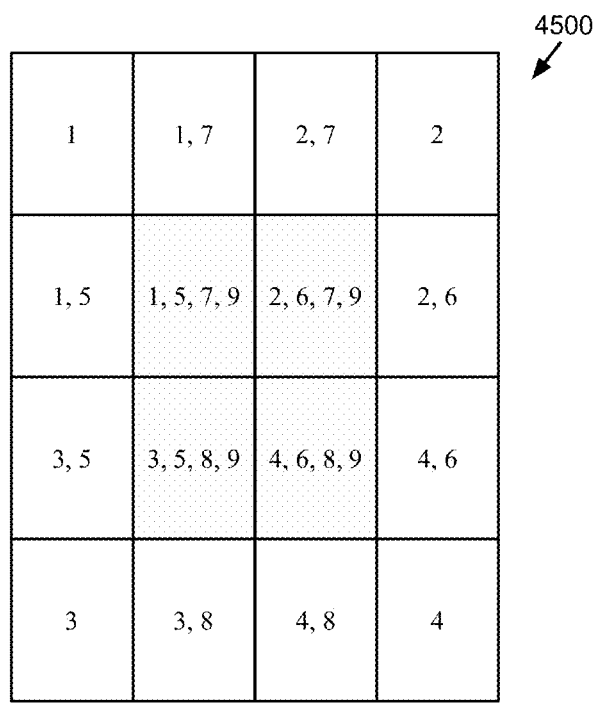
FIG. 46 indicates the sixteen quadrants of pixels that result from this particular division of the image, and which of the tiles include pixels from each quadrant.

Using this particular set of regions gives more weight to some pixels of the image than others, such that these pixels are more important in the comparison of two images. FIG. 46 indicates the 16 quadrants of pixels that result from this particular division of the image 4500, and which of the tiles 4525-4565 include pixels from each quadrant. As shown, the quadrants in the four corners are only included in one of the tiles, and thus these pixels contribute to only one of the nine sets of histograms for the image. The eight quadrants that border only one edge of the image are each included in two tiles, while the four center quadrants are each included in four tiles. Thus, the center pixels will be weighted four times more heavily than the corner pixels in a comparison with a different image.

The application calculates the histograms (and any other statistics) in advance, in some embodiments, rather than performing all of the calculations when asked to identify similar images. Some embodiments generate the histograms for an image when the application first imports the image, and store the histograms for the image with the image (e.g., as part of the additional data in the image data structure 1500 of FIG. 15, described above). With three histograms each for nine tiles, some embodiments store twenty-seven different histograms for each image.

Returning to FIG. 43, the process 4300 then selects (at 4320) a new comparison image from the currently displayed collection (of which the initially selected image is a part). Some embodiments traverse through the images starting at the beginning of the ordered series stored in the collection data structure, while other embodiments start with the next image after the selected image in the ordered series, select the images in the collection randomly, or use another algorithm.

The process then retrieves (at 4325) the statistics for the current comparison image. These statistics are the same statistics as were retrieved for the user-selected image (i.e., histograms of the color, texture, and gradient of the various different regions of the image). As stated above, some embodiments pre-compute these histograms and store the histograms with the data structure for the image.

Next, the process 4300 compares (at 4330) the statistics of the particular user-selected image to the statistics of the current comparison image. Different embodiments perform this comparison differently. Some embodiments compare each histogram of the selected image to the corresponding histogram of the current comparison image. For instance, the Tile 1 color histogram for the first image is compared to the Tile 1 color histogram for the second image, the Tile 5 texture histogram for the first image is compared to the Tile 5 texture histogram for the second image, etc. As such, some embodiments perform twenty-seven different comparisons for use in determining whether two images qualify as similar.

For comparing histograms from different images, different embodiments use different techniques. Each histogram is a set of bins defined by ranges of values. The bins may be one dimensional or multi-dimensional. For instance, texture is defined by a single value, and thus each bin is a range of this texture value. The gradient for a pixel is defined as a vector with both an angle and a length (or, alternatively, an x-direction value and a y-direction value). Thus, each bin will contain pixels that fall within a particular range of angles and a particular length. The color value of a pixel is often a three-dimensional value in a color space (e.g., RGB space, HSL space, YCbCr space, or a different color space). Thus, each bin will have a defined range in each of the three dimensions, as described in further detail below by reference to FIGS. 48-50.

The application compares the number of pixels in each bin of the first image's histogram with the number of pixels in each corresponding bin of the second image's corresponding histogram. Some embodiments use a root mean square function to calculate the difference between two histograms, which takes the square root of the average of the squares of the differences for each bin of the histogram. As a simplified example, if a first histogram has values of [4, 2, 1, 5] and a second histogram has values of [3, 2, 4, 3], then the root mean square function is:

$$Sqrt[\{(4-3)^2+(2-2)^2+(1-4)^2+(5-3)^2\}/4]=Sqrt(3.5)=1.87.$$

The application then compares the root mean square output to the total number of pixels in the histogram (i.e., one-fourth the number of pixels of the image) to determine a comparison score. This comparison score is computed for each of the histograms (i.e., twenty-seven different histograms in the example shown). Rather than a root mean square analysis, some embodiments use a simple average of the deviation between two histograms, or some other algorithm that quantifies the difference between two histograms.

In order to compare histograms of images with different numbers of pixels, some embodiments determine the ratio of the pixel counts and multiply the histogram values of the smaller image by this amount. Other embodiments only compare images with the same number of pixels and aspect ratio.

Some other embodiments divide each histogram value by the total number of pixels in the image (or tile), thus having a histogram of fractions that sums to 1 over the entire histogram. In some such embodiments, the application uses a square root of multiplication function to compare histograms. This function takes the square root of each bin value in a first histogram multiplied by its corresponding bin value in the second histogram, then sums these square roots over the entire set of bins in the histograms. Thus, for a first simple histogram with values of [0.1, 0.4, 0.3, 0.2] and a second histogram with values of [0.35, 0.25, 0.3, 0.1], the score would be Sqrt(0.1*0.35)+Sqrt(0.4*0.25)+Sqrt(0.3*0.3)+Sqrt(0.2*0.1)=0.9447. This comparison method gives a score of 1 if the histograms are identical, and decreases as the histograms become more and more different.

Another method employed by some embodiments uses a summation of overlapped significant bins. This process only counts bins for which the values in both histograms are greater than a particular threshold value. The threshold might be a particular percentage of the total pixels used to generate the histogram, or a function of the number of bins (e.g., 5/N, where N is the number of bins). When the value of a bin for both the first and second histogram is greater than the threshold, these values are added to the total score for the histogram comparison. In this comparison, the scores can range from 0 (if there are no overlapping significant bins) to 2 (if all pixels are in overlapping significant bins). This comparison technique prevents differences in the small (and therefore less meaningful) histogram bins from obfuscating the comparison process.

With the statistics for the two images compared, the process 4300 determines (at 4335) whether the images are within a threshold similarity. In some embodiments, the application averages the comparison scores for each of the histograms and determines whether the average score falls within a threshold. This ensures that smaller differences (e.g., the presence vs. absence of an item in the corner of the image) do not prevent two otherwise similar images from being identified as such.

Other embodiments perform a first average over the color histogram differences, a second average over the texture histogram differences, and a third average over the gradient histogram differences. Some such embodiments require all three average comparison scores to fall within the threshold, while others only require two of the three average scores to meet the threshold. In yet other embodiments, the application compares each of the histogram comparison scores to a threshold, and requires a particular number of the scores (e.g., all of them, eighteen of the twenty-seven, etc.) to meet the threshold in order for the two images to be considered similar.

In some embodiments, the application uses different threshold similarities for the color, gradient, and texture histograms. For instance, the application might allow greater variability in the color histograms than the gradient histograms, as doing so would allow for different exposure images or cloudy vs. sunny images to be considered similar when they have the same shape.

The similarity thresholds, in some embodiments, are based on a machine-learning decision tree technique. This technique uses sample image pairs that have been previously classified as either similar or not similar, and calculates different comparison scores for the images (e.g., using one or more of the comparison techniques described above). These scores are then analyzed for the similar and non-similar pairs in order to identify useful threshold values or combinations of thresholds for the comparison scores.

When the images are within the threshold similarity, the process adds (at 4340) the current comparison image to the group of images classified as similar to the particular image. That is, the current comparison image becomes one of the selected images that will be displayed in the image display area along with the user-selected image and any other similar images.

The process 4300 next determines (at 4345) whether the current collection contains any additional images that the process has not yet compared to the particular user-selected image. As mentioned, the application traverses through the entire collection, even if the collection includes all of the images imported by the application. When additional images remain, the process returns to 4320 to set the next image as the current comparison image.

Once all images in the current collection have been compared to the user-selected image, the process displays (at 4350) the particular user selected image and its similar images in the image display area. Returning to FIG. 44, the third stage 4430 shows the result of the user selecting the thumbnail 4425 with a double-tap input. In this stage, the application displays four images 4435-4450 in the image display area. These are four of the five images that show the golfer. The fifth image, thumbnail 4455 is dissimilar enough to not be considered similar (e.g., because the different location of the golf club causes enough of a gradient difference or because the darkness of the image causes enough of a color difference). The thumbnails for the images 4435-4450 now have a highlighted border in order to indicate that these images are selected for viewing. Some embodiments display the images in the image display area 4415 according to an algorithm that maintains an equal visual weighting across all of the images (although that is not an issue in this case because the aspect ratio is equal for the images).

Figure 47:
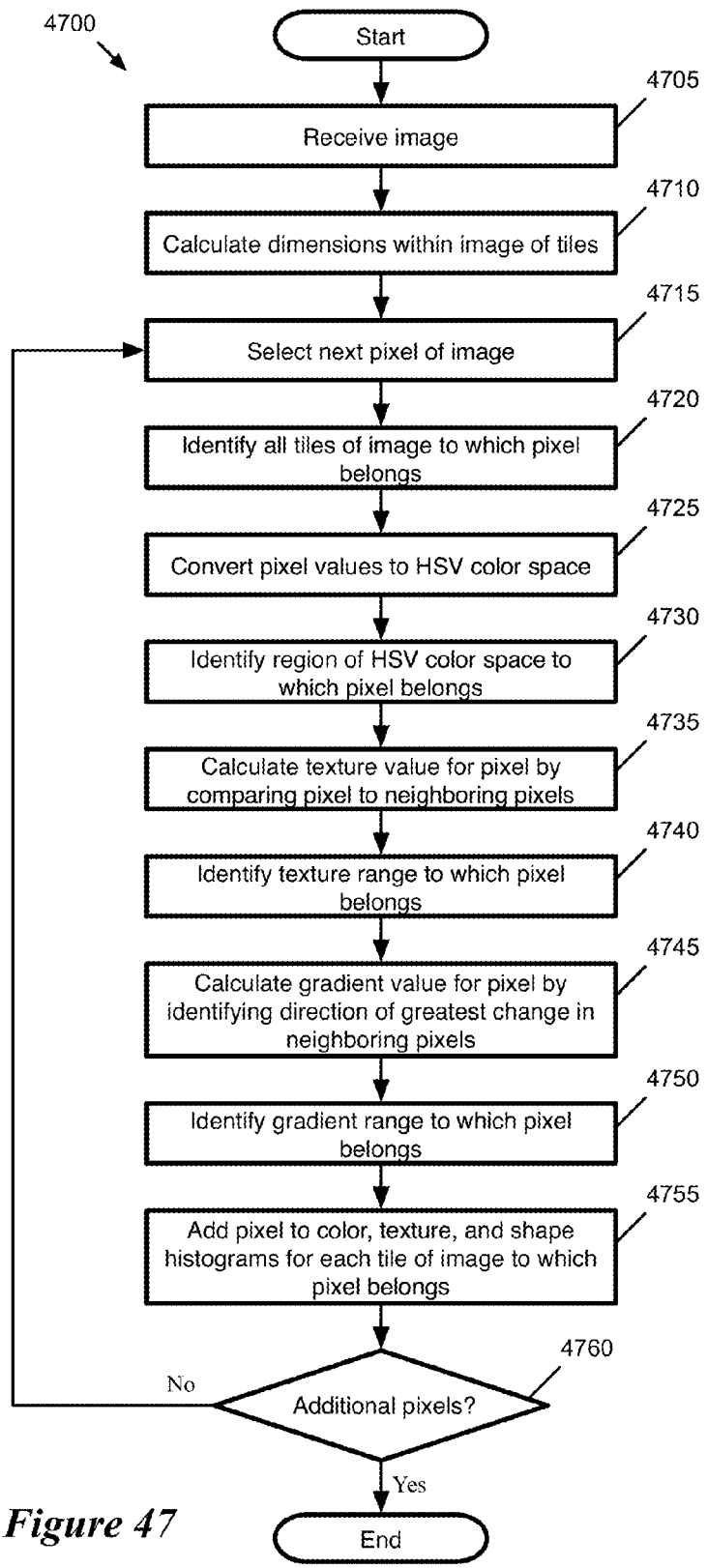
FIG. 47 conceptually illustrates a process 4700 for generating a set of histograms according to some embodiments of the invention.

The process 4300 of FIG. 43 describes how the application performs a comparison between multiple images by comparing various histograms for the image. FIG. 47 conceptually illustrates a process 4700 for generating a set of histograms according to some embodiments of the invention. As stated, some embodiments pre-compute the histograms (e.g., generate the histograms at the time of import of the image, and save them with the image), and thus perform the process 4700 or a similar process for each image when the image is imported into the application. The process 4700 will be described in part by reference to FIGS. 48-50, which conceptually illustrate a color space commonly used by the application to generate a set of color histograms for an image.

As shown, the process 4700 begins (at 4705) by receiving an image. Typical images comprise a set of pixels arranged in a rectangle. Each pixel is generally defined by (i) a set of color values in a particular color space and (ii) a location in the rectangle. The image may be in an encoded form, in which case the application decodes the image in order to identify the color values for the pixels of the image.

The process calculates (at 4710) the dimensions within the image of the different tiles for which it will generate histograms. As described above by reference to FIGS. 45 and 46, some embodiments generate three histograms for each of nine different tiles. The process determines the pixel dimensions of each of the tiles. For instance, if an image has pixel dimensions of 640×480 (i.e., 640 pixels in the horizontal direction and 480 pixels in the vertical direction), the Tile 1 4525 will use the rectangle of pixels with corners at (1, 1) (the left corner of the image) and (320, 240) (the center of the image), while Tile 9 4565 will use the rectangle from pixel location (161, 121) to (480, 360).

The process then selects (at 4715) the next pixel of the image. Some embodiments traverse each row of pixels, starting at pixel (1, 1) in the top left corner, traversing along top row first, and then down to the next row, etc. Other embodiments select pixels in a different manner (e.g., randomly, column first, etc.).

Next, the process 4700 identifies (4720) all tiles of the image to which the selected pixel belongs. Using the tiling scheme shown in FIGS. 45 and 46, pixels located towards the corners will only belong to one region of the image, while pixels located in the center will belong to four regions. Using this scheme, pixels in quadrants near only one edge belong to two regions.

The process next begins generating the histograms. In this example process 4700, the application generates the color value first, then the texture value, and finally the gradient value. However, one of ordinary skill in the art will recognize that different embodiments will perform these computations in a different order, or perform them in parallel.

The process converts (at 4725) the pixel values to hue-saturation-value (HSV) color space. The stored pixel values are often in a device-specific RGB color space, and conversion to HSV entails only a simple transformation. FIG. 48 conceptually illustrates the HSV color space 4800, which is a cylindrical coordinate system designed to be more intuitive and perceptually relevant than the Cartesian RGB coordinate system. As shown, in the color space 4800, hue is represented by the angular dimension, with the red primary commonly situated at angle 0, the green primary at 120°, and the blue primary at 240°. The radial dimension represents saturation, ranging from zero saturation (achromatic) at the center to fully saturated (pure colors) at the outside edge. The vertical axis represents lightness, ranging in the center from black (at lightness=0) to white (at lightness=1).

The HSV color space is only one possible color space that could be used to generate the color histogram. Some embodiments use a different color space, such as the HSL (hue-saturation-lightness) color space, YCbCr (luminance-chroma) color space, or other developer-defined color spaces. Other embodiments do not perform a color conversion, and just use the device's gamma-corrected RGB space in which the pixels are already defined.

With the pixel values converted, the process 4700 then identifies (at 4730) the region of HSV color space to which the currently selected pixel belongs. Each region is a three-dimensional region in the color space. However, in some embodiments, the regions have different sizes in the color space so that each region covers a similar volume of human-differentiable color space. That is, in areas of the color space where the human eye has trouble differentiating between different color values, the regions are larger as compared to areas of the color space where the human eye easily differentiates between different color values.

For instance, two regions might have different hue ranges, different saturation ranges, and/or different value ranges. FIG. 49 illustrates a circular cross section 4900 of the HSV color space (i.e., at a constant value), with two regions defined. The first region 4905 is in the red portion of the hue dimension, while the second region 4910 is in the blue portion of the hue dimension. In general, the human eye can more easily differentiate between shades of blue than shades of red, so some embodiments use regions with smaller hue ranges in the blue portion of color space than in the red portion of the color space, as shown in this example.

FIG. 50 illustrates a three-dimensional portion 5000 of the HSV color space divided into two regions 5005 and 5010. In this case, the saturation and hue of the two regions are equal, but the value range is different. One of ordinary skill in the art will recognize that these regions are merely examples, and that the regions may have any arbitrary shape in the color space. While not shown in either FIG. 49 or FIG. 50, within a particular hue and value, multiple regions could be defined for different saturation ranges. Furthermore, the regions need not be of constant ranges in all dimensions. For instance, a particular region might have a first hue range at its outer saturation and a second, different hue range at its innermost saturation, so long as the regions account for the entirety of the color space.

Returning to FIG. 47, the process 4700 calculates (at 4735) a texture value for the currently selected pixel by comparing the pixel to neighboring pixels within the image. Some embodiments use a texture calculation that compares a pixel's brightness values to those of the surrounding pixels to determine a single texture value for the pixel. To determine the pixel brightness, some embodiments perform a calculation on the RGB pixel values. Other embodiments compare a different property of the pixel (other than brightness) to that of the neighboring pixel.

The novel texture calculation algorithm used by some embodiments is described by reference to FIG. 51. This figure illustrates nine pixels used by some embodiments to calculate the texture for the center pixel (P0). Initially, some embodiments calculate an intensity value (similar to a brightness, luminance, or value) for each pixel. This is essentially a weighted average of the RGB values, which may give more weight to one or the other color channel values. For instance, some embodiments place more weight on the red color channel.

The pixels in FIG. 51 have intensity values of $I_0$ (for pixel P0) through $I_8$ (for pixel P8). The texture calculation of some embodiments uses a set of condition checks to determine a texture value. One of ordinary skill will recognize that the texture values do not correspond to a physical quantity, but rather are simply different bins. The texture calculation of some embodiments is as follows:

- if P0 has the largest intensity in the window, assign a texture of 0 to P0;
- if P0 has the smallest intensity in the window, assign a texture of 1 to P0;
- if P0 does not have either the smallest or largest intensity, but $I_0, I_1, \ldots I_8$ are all within a threshold of each other (i.e., they all have same or similar intensities), assign a texture of 2 to P0.

If none of these three conditions are satisfied, the application computes the following differences:

$(I_1+I_2+I_3)-(I_6+I_7+I_8)$;
$(I_3+I_5+I_8)-(I_1+I_4+I_6)$;
$(I_1+I_2+I_4)-(I_5+I_7+I_8)$;
$(I_2+I_3+I_5)-(I_4+I_6+I_7)$.

The application then determines which of these differences has the greatest absolute value, as this is indicative of the direction of greatest intensity change within the window around the pixel P0. The first difference corresponds to vertical change in intensity, the second difference to horizontal change in intensity, the third difference to change from top right to bottom left, and the fourth difference to change from bottom right to top left.

If the first inequality is the largest, the application assigns one of the following two texture values:

- if $(I_1+I_2+I_3)>(I_6+I_7+I_8)$, assign a texture of 3 to P0;
- if $(I_1+I_2+I_3)<=(I_6+I_7+I_8)$, assign a texture of 4 to P0.

If the second inequality is the largest, the application assigns one of the following two texture values:

- if $(I_3+I_5+I_8)>(I_1+I_4+I_6)$, assign a texture of 5 to P0;
- if $(I_3+I_5+I_8)<=(I_1+I_4+I_6)$, assign a texture of 6 to P0.

If the third inequality is the largest, the application assigns one of the following two texture values:

- if $(I_1+I_2+I_4)>(I_5+I_7+I_8)$, assign a texture of 7 to P0;
- if $(I_1+I_2+I_4)<=(I_5+I_7+I_8)$, assign a texture of 8 to P0.

Finally, if the fourth inequality is the largest, the application assigns one of the following two texture values:

- if $(I_2+I_3+I_s)>(I_4+I_6+I_7)$, assign a texture of 9 to P0;
- if $(I_2+I_3+I_s)<=(I_4+I_6+I_7)$, assign a texture of 10 to P0.

Thus, the application assigns each pixel to one of the eleven different texture bins, based on the inequality. One of ordinary skill will recognize that while this example shows a 3×3 pixel window, some embodiments will use a 5×5 window, with each inequality having ten pixel intensities on either side rather than three.

With the texture for the selected pixel calculated, the process 4700 then identifies (at 4740) the texture range to which the pixel belongs. As texture is a one-dimensional value, each bin of the texture histogram represents a particular range along that one dimension. As with the color histogram, the different texture ranges may not necessarily be of equal length.

The process 4700 also calculates (at 4745) the gradient value by identifying the direction of greatest change in the neighboring pixels. Some embodiments use a gradient calculation that identifies the direction and amount of change in a pixel's intensity both horizontally and vertically. For instance, some embodiments use a gradient that measures only the relative intensity change (i.e., the vertical change compared to the horizontal change). Some embodiments use the formula that the gradient $\Theta$=a tan 2 ($\delta I/\delta y, \delta I/\delta x$), where I is again the intensity (the same values used for the texture calculation given above).

Referring again to FIG. 51, the gradient for P0 is $\Theta$=a tan 2 $(I_2-I_7, I_1-I_5)$. The a tan 2 function is a function that gives, for any real arguments (y, x) that are not both equal to zero, the angle in radians between the positive x-axis of the Cartesian plane and the point given by the coordinates (x, y) on the plane. Thus, the gradient of some embodiments is an angle that relates to the relative difference between the vertical intensity change and the horizontal intensity change.

With the gradient calculated, the process then identifies (at 3850) the gradient range to which the pixel belongs. The gradient given above is a one-dimensional value (i.e., just an angle). In some embodiments, the gradient is a two-dimensional value (represented, e.g., as an x-y vector or an angle and length). Thus, each bin of the gradient histogram represents a particular range of x and y gradient values. As with the color histogram, different gradient ranges may not necessarily be of equal size in the Cartesian x-y space.

With the ranges identified for the three different properties of the pixel, the process adds (at 4755) the pixel to the color, texture, and shape (gradient) histograms for each tile of the image to which the pixel belongs, as determined at operation 4720. As indicated, for the tiling scheme shown in the above figures, this may be three different histograms, six different histograms, or twelve different histograms, depending on the location of the pixel.

Having analyzed the currently selected pixel, the process 4700 determines (at 4760) whether any additional pixels in the image remain unanalyzed. When additional pixels remain, the process 4700 returns to operation 4715 to select the next pixel. Once all of the pixels have been analyzed, the process ends.

Figure 52:
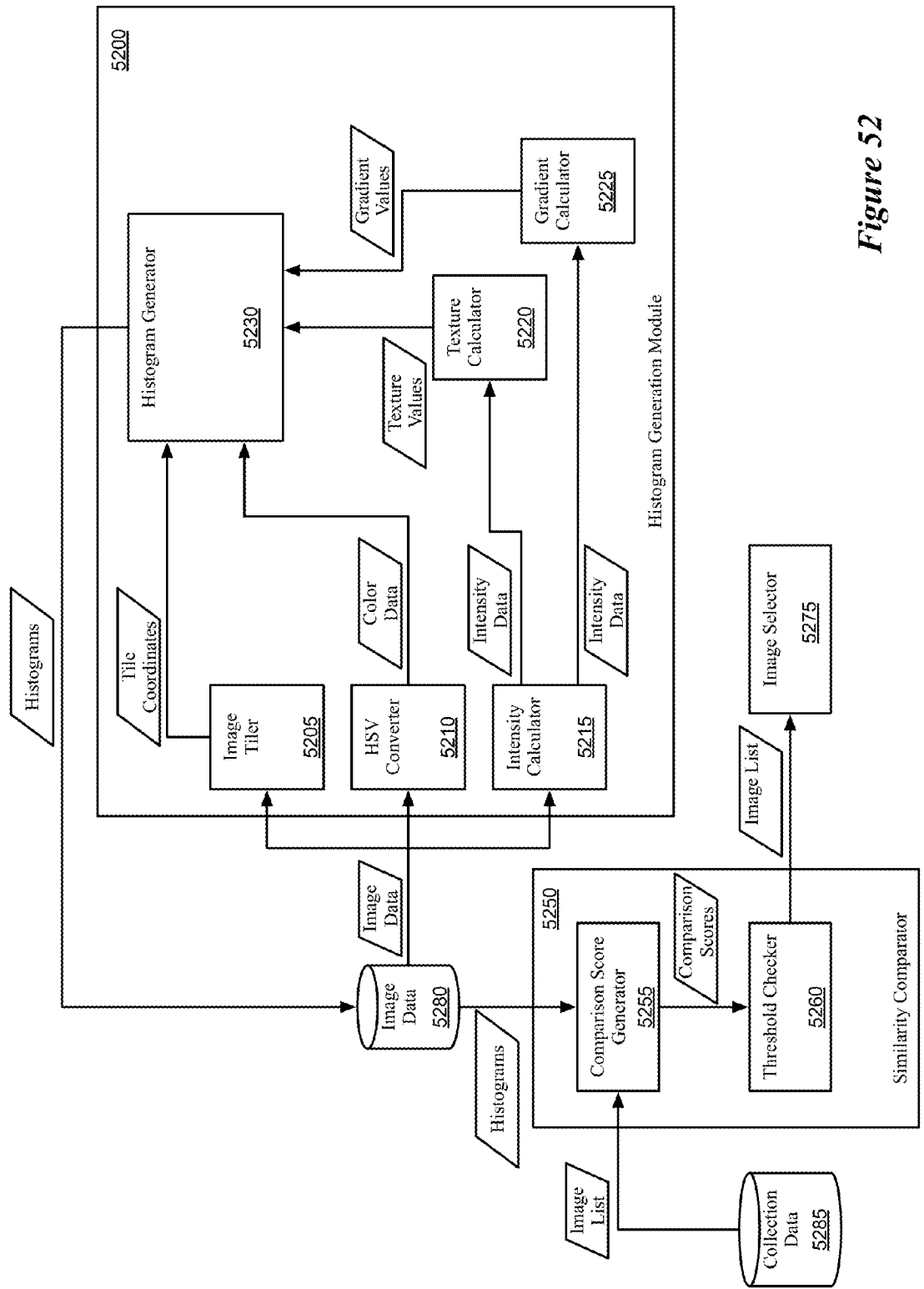
FIG. 52 conceptually illustrates the software architecture of portions of the image viewing, editing, and organization application of some embodiments that generate histograms and compare images for similarity.

FIG. 52 conceptually illustrates the software architecture of portions of the image viewing, editing, and organization application of some embodiments that generate histograms and compare images for similarity. FIG. 52 illustrates a histogram generation module 5200, a similarity comparator 5250, and an image selector 5275. In addition, this figure illustrates image data 5280 (i.e., the image data structures and image files stored by the application) and collection data 5285 (i.e., the collection data structures stored by the application).

The histogram generation module 5200 receives an image (e.g., an image that the image viewing application is importing) and generates color, texture, and shape histograms for various regions of the image, then stores these histograms with the image. The histogram generation module 5200 includes an image tiler 5205, an HSV converter 5210, an intensity calculator 5215, a texture calculator 5220, a gradient calculator 5225, and a histogram generator 5230.

As shown, the image tiler 5205, the HSV converter 5210, and the intensity calculator 5215 receive image data. The image tiler 5205 receives an image, identifies the dimensions of the image, and calculates the coordinates in the image (i.e., the pixel coordinates) for the different regions for which the histogram generation module 5200 will generate histograms. The image tiler 5205 passes these tile coordinates to the histogram generator 5220.

The HSV converter 5210 receives the pixel data for an image and converts each pixel into the HSV color space (e.g., from RGB space). One of ordinary skill will recognize that different embodiments may use different versions of the RGB to HSV conversion, or may use a different color space entirely. The HSV converter passes this color space data for each pixel of the image to the histogram generator 5220.

The intensity calculator 5215 also receives pixel data for the image and calculates the intensity value for each pixel. As with the HSV converter, different embodiments may use different calculations to derive the intensity from the RGB pixel values. The intensity calculator 5215 provides this intensity data to the texture calculator 5220 and the gradient calculator 5225.

The texture calculator 5220 calculates a texture value for each pixel (e.g., using the texture algorithm described above, or a different process) and provides these values to the histogram generator 5220. The gradient calculator 5225 calculates a gradient value for each pixel (e.g., using the gradient algorithm described above, or a different process) and provides the gradient values to the histogram generator 5220.

The histogram generator 5220 uses the color data, texture values, and gradient values to generate histograms for each of the tiles received from the image tiler 5205. The histogram generator 5220 receives, e.g., a texture value for each pixel. For a particular pixel, the histogram generator identifies, based on the pixel coordinates, to which (possibly more than one) of the tiles the pixel belongs. The generator then adds the texture value to the appropriate bin of the histogram for the one or more tiles. The histogram generator 5220 stores these histograms in the image data 5280 for the image.

The similarity comparator 5250 identifies images similar to a particular user-selected image. As shown, the similarity comparator 5250 includes a comparison score generator 5255 and a threshold checker 5260. When a user requests similar images for a particular image, the similarity comparator 5250 receives a list of images from the collection data 5285 (e.g., a list of the images in a particular collection). The similarity comparator 5250 retrieves the histograms for the images and calculates one or more comparison scores for each pair of images.

The threshold checker 5260 receives the comparison scores and determines whether each pair of images qualifies as similar. The threshold checker, as described above, may perform various different checks on the different scores (in some embodiments, there are 27 different comparison scores). The threshold checker 5260 outputs the list of similar images to the image selector 5275, which manages the selection of the particular images for the GUI.

B. User Selections of Multiple Images

As mentioned, some embodiments provide various other methods for selecting multiple images in order to simultaneously view the selected images. For example, the application may operate on a multi-touch capable device (i.e., a device capable of recognizing multiple different points of contact with a touchscreen, touchpad, etc.) and translate multi-touch input over the thumbnail display area into a block selection of thumbnails. Furthermore, some embodiments allow users to press and hold thumbnails in order to add the thumbnail to a set of selected images.

Figure 53:
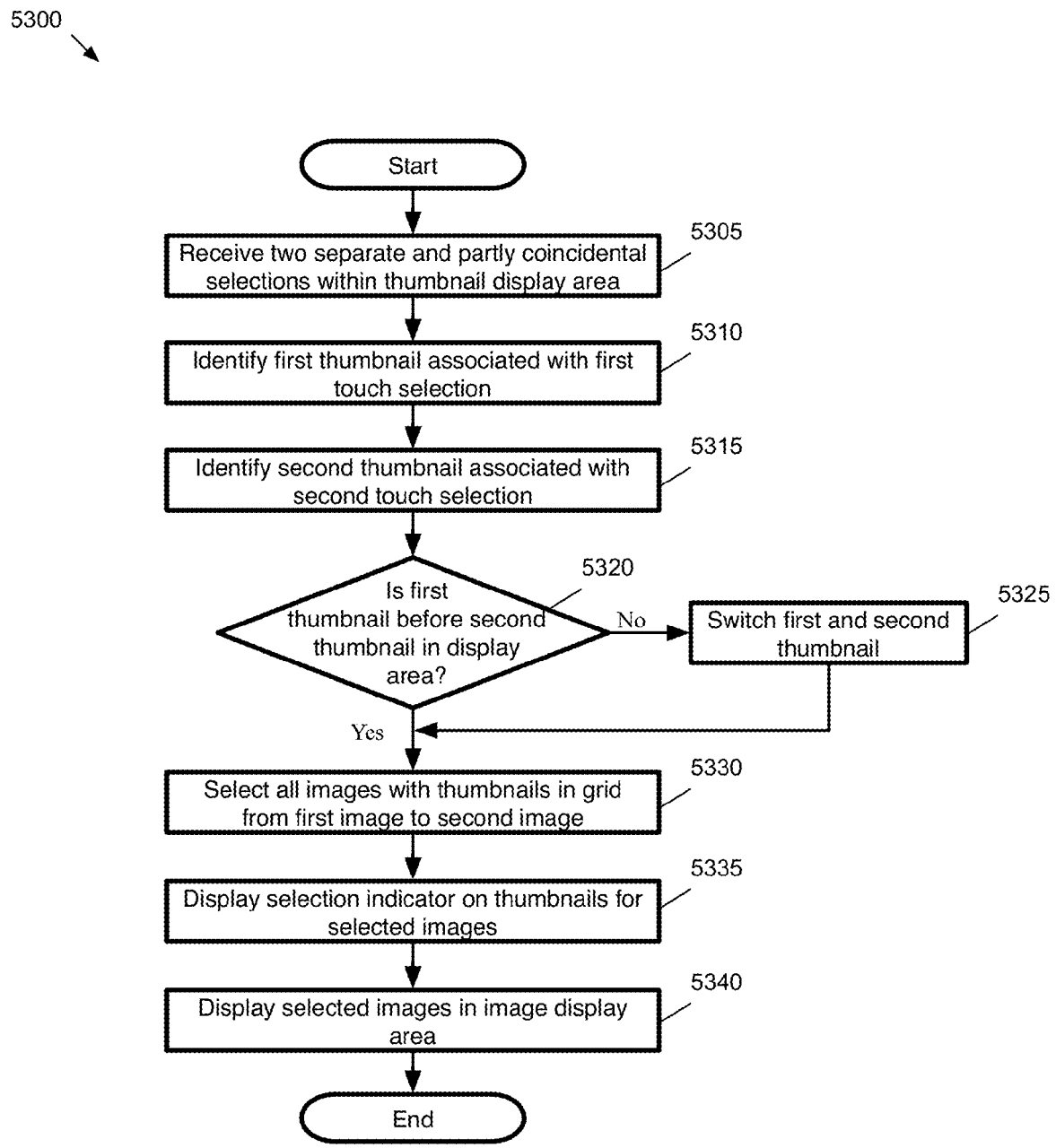
FIG. 53 conceptually illustrates a process of some embodiments for selecting a block of thumbnails within the image display area.

FIG. 53 conceptually illustrates a process 5300 of some embodiments for selecting a block of thumbnails within the image display area. In some embodiments, the application receives a multi-touch selection in order to select this block. FIG. 53 will be described by reference to FIGS. 54 and 55, which illustrate examples of the selection of such blocks of thumbnails. Both of these figures illustrate three stages of a GUI 5400, which includes a thumbnail display area 5405 and an image display area 5415, similar to the corresponding display areas in the GUIs described above. The first stage 5410 of FIG. 54 and the first stage 5510 of FIG. 55 both illustrate the GUI 5400 with no images selected.

As shown, the process 5300 begins by receiving (at 5305) two separate and at least partly coincidental selections within the thumbnail display area. The application may receive these selections from the touchscreen of a device capable of translating multi-touch inputs. For instance, a user might use two fingers to press down on two separate thumbnails in the thumbnail display area. Because users are unlikely to make an initial contact with a touchscreen at the exact same time with two fingers, some embodiments only require that the inputs be partially coincidental.

The process then identifies (at 5310) a first thumbnail in the thumbnail display area associated with the first touch selection and (at 5315) a second thumbnail associated with the second touch selection. Some embodiments associate each thumbnail with a particular two-dimensional array of screen pixels, which changes as the thumbnails scroll through the display area. When a user touches the screen over the thumbnail grid, this touch input is translated into a set of pixel values (e.g., a circle of a particular radius, a square with a particular side length, etc.). The application then compares these pixel values to those of the thumbnails in order to determine which thumbnail the user is selecting. Some embodiments identify the thumbnail that corresponds to the greatest portion of the touch input pixels.

Figure 54:
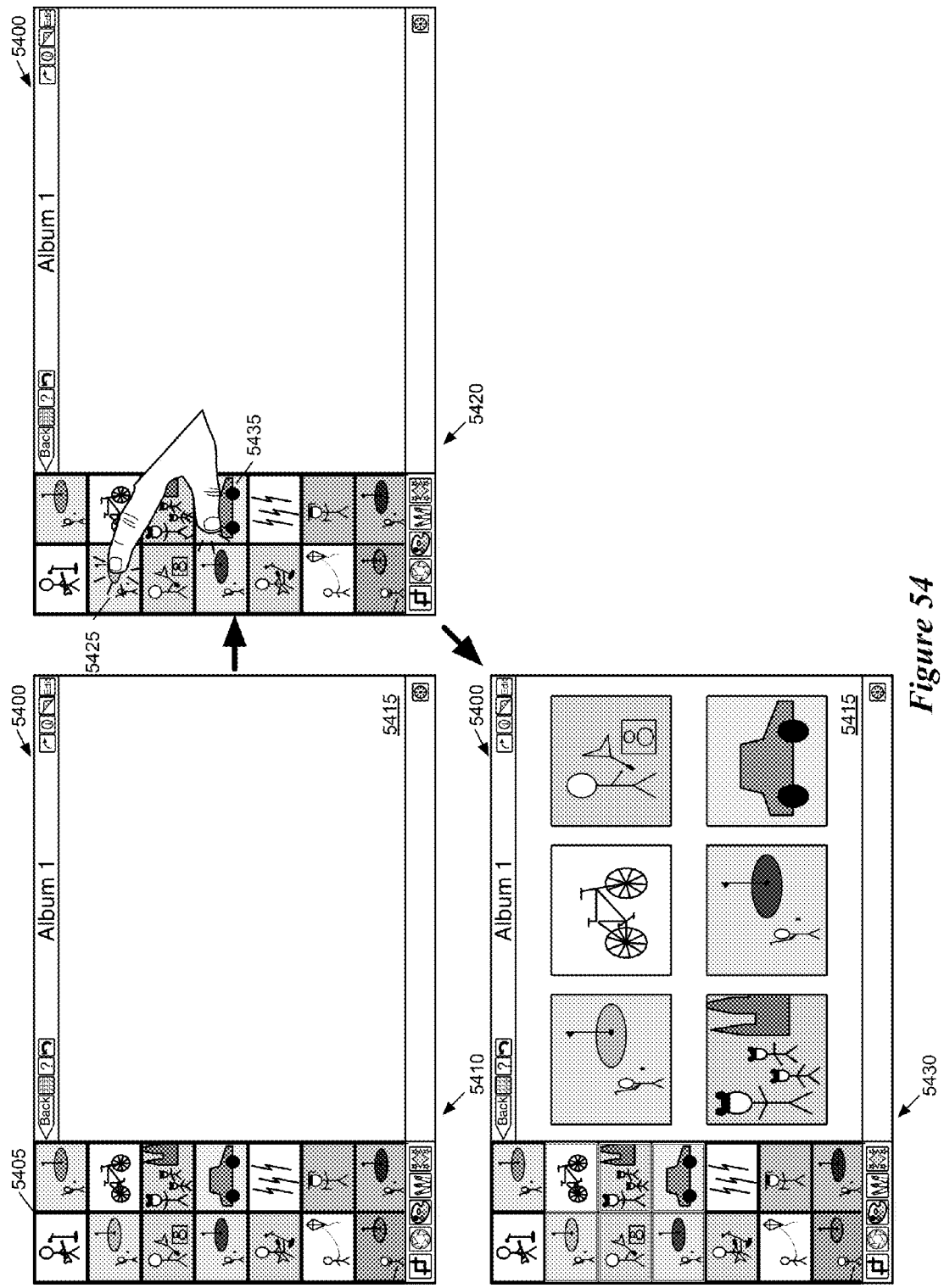
FIGS. 54 and 55 illustrate examples of the selection of blocks of thumbnails.

The second stage 5420 of FIG. 54 illustrates a user tapping a first thumbnail 5425 with her index finger and a second thumbnail 5435 with her thumb. Assuming that the top left thumbnail represents the first image in the collection, these are the third and eighth thumbnails in the ordered collection of images. In the second stage 5520 of FIG. 55, the user taps a first thumbnail 5505 (the fourth thumbnail in the ordered collection) and the same second thumbnail 5435.

With the boundary thumbnails for the selection identified, the process 5300 determines (at 5320) whether the first thumbnail is before the second thumbnail in the display area. The order may be determined from an order value in the collection data structure (e.g., an array index of the reference to the image data structure that stores the thumbnail) or relative order may be derived from the screen pixels to which the thumbnails are displayed.

Some embodiments use the first input received as the first thumbnail and the second input received as the second thumbnail. However, in order to define the selection properly, the application needs the first thumbnail to come before the second thumbnail in order. As such, when the first thumbnail is after the second thumbnail, the process switches (at 5325) the first and second thumbnails so that the first thumbnail comes first in the order.

Next, the process selects (at 5330) all images with thumbnails in the grid from the first thumbnail to the second thumbnail. For instance, in FIG. 54, thumbnails three and eight are the first and second thumbnails. As such, all of thumbnails three through eight will be selected by this user action. Similarly, in FIG. 55, thumbnails four through eight will be selected.

The process then displays (at 5335) a selection indicator on the selected thumbnails. Some embodiments use two different forms of selection indicator to indicate whether a selected thumbnail corresponds to a secondary selected image (i.e., one of several selected images) or a primary selected image (i.e., an active image that is the only image shown in the image display area).

Accordingly, the process 5300 also displays (at 5340) the selected images in the image display area. When multiple images are selected in block form with process 5300, some embodiments always display all of the images in the image display area. In some embodiments, the application displays all of the images using a same visual weighting by using an approximately equal number of pixels for each of the images. The process of some embodiments for identifying the ideal display will be described below in subsection C of this section.

Figure 55:
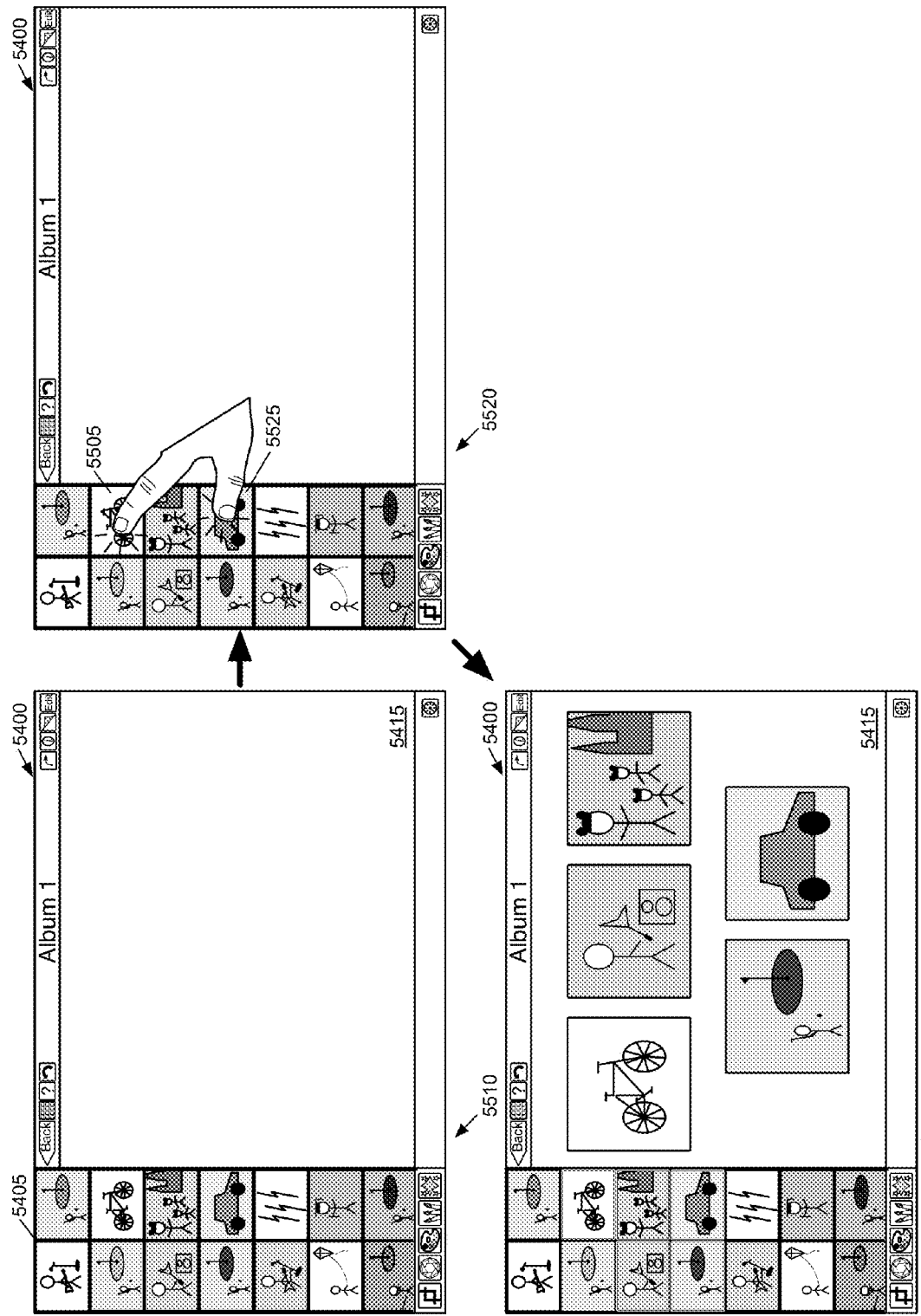

The third stages 5430 of FIGS. 54 and 5530 of FIG. 55 illustrate the resulting display of the respective multi-touch block selections. In stage 5430, all six thumbnails from thumbnail 5425 to thumbnail 5435 are displayed with a thin highlight. In addition, the application displays the six images in the image display area with equal size. Stage 5530 illustrates the same result with one fewer thumbnail selected. Because the application only displays five images in the image display area 5415, two of the images are displayed centered along the bottom row, but have the same size as the other images displayed along the top row. As is apparent from these two images, some embodiments display the images in the image display area in the order that the thumbnails are shown in the thumbnail display area (which, in turn, is the order the images are stored in the collection data structure).

In addition to the multi-touch block selection, some embodiments allow users to press and hold a thumbnail in order to select the thumbnail as one of a group of selected images. When the user merely taps a thumbnail, that causes the selection of the corresponding image to be the sole selected image. On the other hand, when the user holds down the input (e.g., presses down on the touchscreen for a threshold duration), the application maintains selection of any previously-selected images and adds the thumbnail to the set of selected images.

Figure 56:
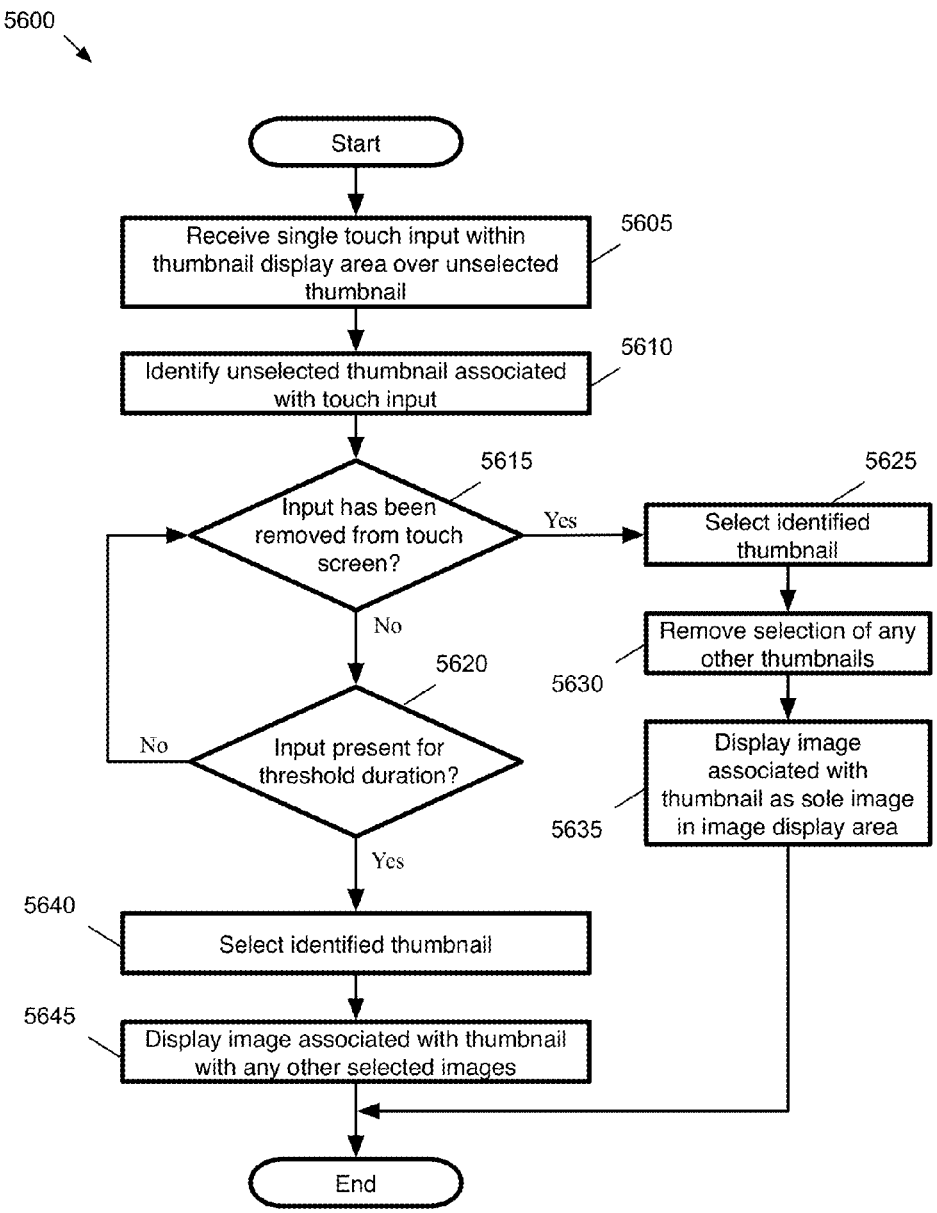
FIG. 56 conceptually illustrates a process of some embodiments for translating user input over an unselected thumbnail into a selection of the thumbnail.

FIG. 56 conceptually illustrates a process 5600 of some embodiments for translating user input over an unselected thumbnail into a selection of the thumbnail. Users may also tap or press and hold an already-selected thumbnail (which may be the primary selection or a secondary selection), and these inputs are described below by reference to FIG. 66. In addition, while this process is described as responding to touchscreen input, one of ordinary skill in the art will recognize that some embodiments implement a similar process for non-touchscreen input (e.g., with mouse clicks instead of taps and the press and hold of a mouse button instead of pressing and holding on a touchscreen). FIG. 56 will be described by reference to FIG. 57, which illustrates various selection inputs in the GUI 5400 over six stages 5710-5760.

As shown, the process 5600 begins by receiving (at 5605) a single touch input within the thumbnail display area over an unselected thumbnail. In some embodiments the application has a single process for resolving all input over the thumbnail display area. In other embodiments, the application receives the multi-touch information from the touchscreen device in a form that gives an input type (e.g., tap, hold, swipe, etc.) and a screen location. The application then resolves this event (input and location) into an action to take (e.g., select item, slide display area, perform edit, etc.) based on its current state. However, this conceptual process deals only with the receipt of a single touch input (i.e., either a tap or a hold) over an unselected thumbnail in the thumbnail display area.

The process then identifies (at 5610) an unselected thumbnail associated with the touch input. As described above by reference to FIG. 53, some embodiments associate each thumbnail with a particular two-dimensional array of screen pixels, which changes as the thumbnails scroll through the display area. When a user touches the screen over the thumbnail grid, this touch input is translated into a set of pixel values (e.g., a circle of a particular radius, a square with a particular side length, etc.). The application then compares these pixel values to those of the thumbnails in order to determine which thumbnail the user is selecting. Some embodiments identify the thumbnail that corresponds to the greatest portion of the touch input pixels.

The process then determines (at 5615) whether the input has been removed from the touchscreen. In this conceptual process, the application is left to make the determination between a tap and a hold, while the touchscreen device provides the application with the basic data that a particular portion of the touchscreen is receiving a touch input. As mentioned, in some embodiments, the difference between a tap and a hold is made at the device level (e.g., by a framework within the operating system of the device), and the application would actually have several different event-driven processes for dealing with these different inputs.

When the input has not yet been removed from the touchscreen, the process determines (at 5620) whether the input has been present for a threshold duration. This duration is the length of time that a user has to maintain contact with the touchscreen in order for the input to qualify as a press and hold rather than a tap. When the threshold duration for a hold has not yet been reached, the application returns to 5615. In essence, these two operations form a determination between a tap (if the process determines that the user has removed the input from the touchscreen before the threshold duration is reached) and a hold (if the duration is reached with the input still present). As stated, some embodiments receive this determination from a framework of the device on which the application operates.

When the input is removed from the touchscreen before the threshold duration, the process selects (at 5625) the identified thumbnail and removes (at 5630) the selection of any other thumbnails. That is, the application makes the identified thumbnail the only selected thumbnail. The process then displays (at 5635) the image associated with the thumbnail as the sole image in the image display area. The process then ends.

Figure 57:
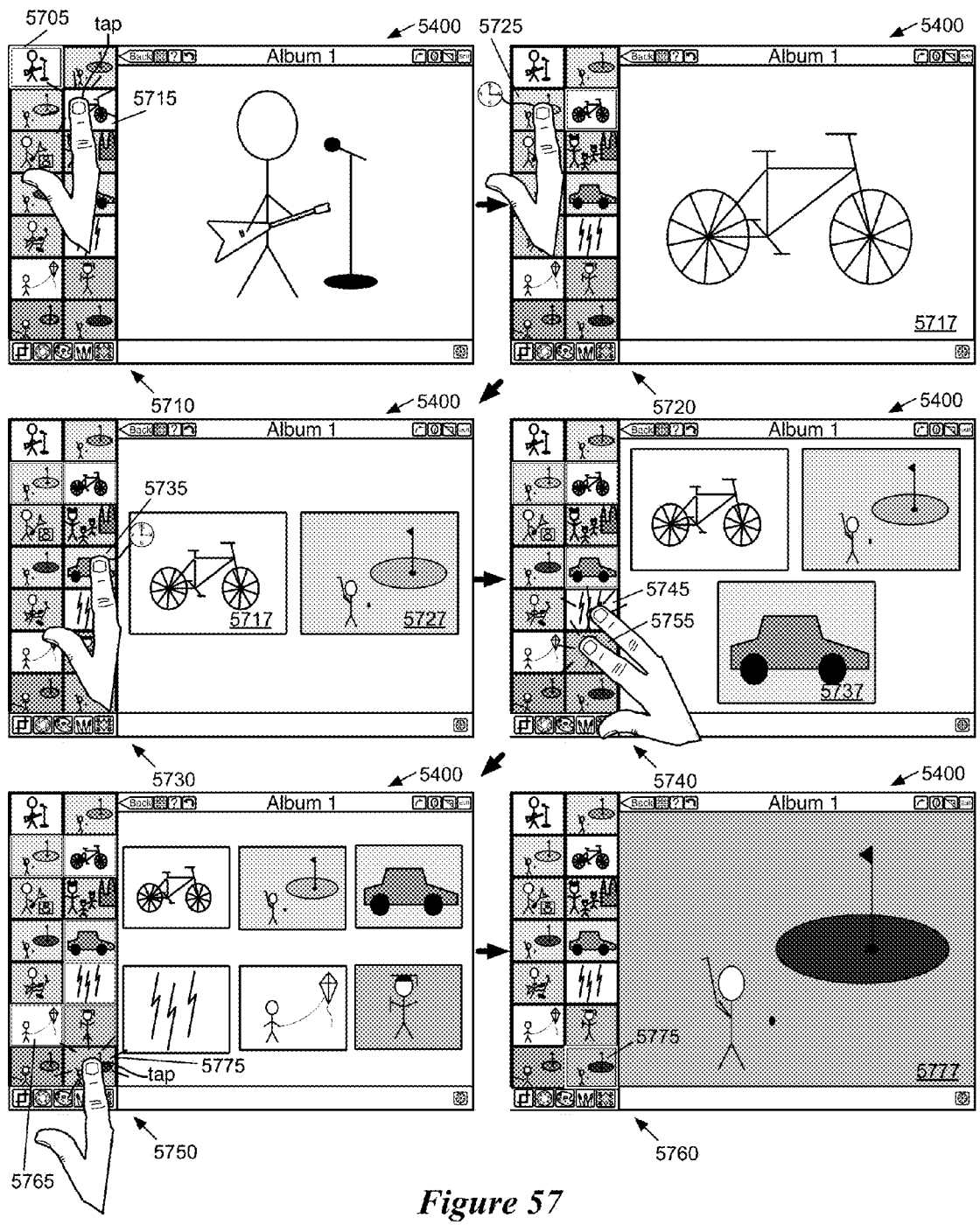
FIG. 57 illustrates various selection inputs in the GUI of some embodiments.

The first stage 5710 of FIG. 57 illustrates the GUI 5400 with a first image displayed in the image display area 5415 and its corresponding thumbnail 5705 highlighted as the primary selection. As shown, at this stage the user selects a thumbnail 5715 with a tap input. The second stage 5720 illustrates that the result of this tap selection is that the application now highlights the thumbnail 5715 as the primary selection, with the thumbnail 5705 no longer highlighted. In addition, the image 5717 corresponding to thumbnail 5715 is displayed in the image display area 5415, as this is the only selected image.

Returning to FIG. 56, when the input is present over the thumbnail for the threshold duration, the application selects (at 5640) the identified thumbnail. The application then displays (at 5645) the image associated with the thumbnail along with any other selected images. That is, one or more images might have already been selected, and the application displays all of these images in the image display area. The process then ends.

The second stage 5720 shows a user selecting a thumbnail 5725 with a press and hold selection (indicated by the small clock icon, which is shown conceptually and is not part of the GUI). As a result, in the third stage 5730 the application displays both the image 5717 and the image 5727 (which corresponds to the thumbnail 5725). Furthermore, both the thumbnail 5715 and the thumbnail 5725 are highlighted as selected. However, the application uses a lighter selection indication highlight, in order to indicate that both of these thumbnails are secondary selections and that there is no primary selection at this time. The two images 5717 and 5727 are displayed in such a way as to maintain the aspect ratio (i.e., without distorting or cropping the image) and maximize the image size, as will be explained below in subsection C.

The third stage 5730 also illustrates that the user again performs a press and hold selection, this time over the thumbnail 5735. In stage 5740, the application adds the image 5737 to the image display area, rearranging the other images in the display area as needed. Furthermore, the thumbnail 5735 is now highlighted with a secondary selection highlight, the same as the other two thumbnails.

In addition, the user performs a multi-touch block selection at this stage, tapping thumbnails 5745 and 5755. As shown in stage 5750, this causes the selection of the thumbnail 5765 in addition to the two tapped thumbnails. As a result, in stage 5750, six thumbnails are now highlighted with the lighter selection indication, and the corresponding six images are displayed in the image display area. The application has reduced the size of these images as compared to the previous stages in order to fit six images into the display area with the same visual weighting.

At stage 5750, the user taps an unselected thumbnail 5775. Stage 5760 illustrates the result of this selection, with the image 5777 displayed on its own in the image display area. The selection of the other six thumbnails is removed, and the application displays a thicker selection indication highlight on the thumbnail 5775.

Figure 58:
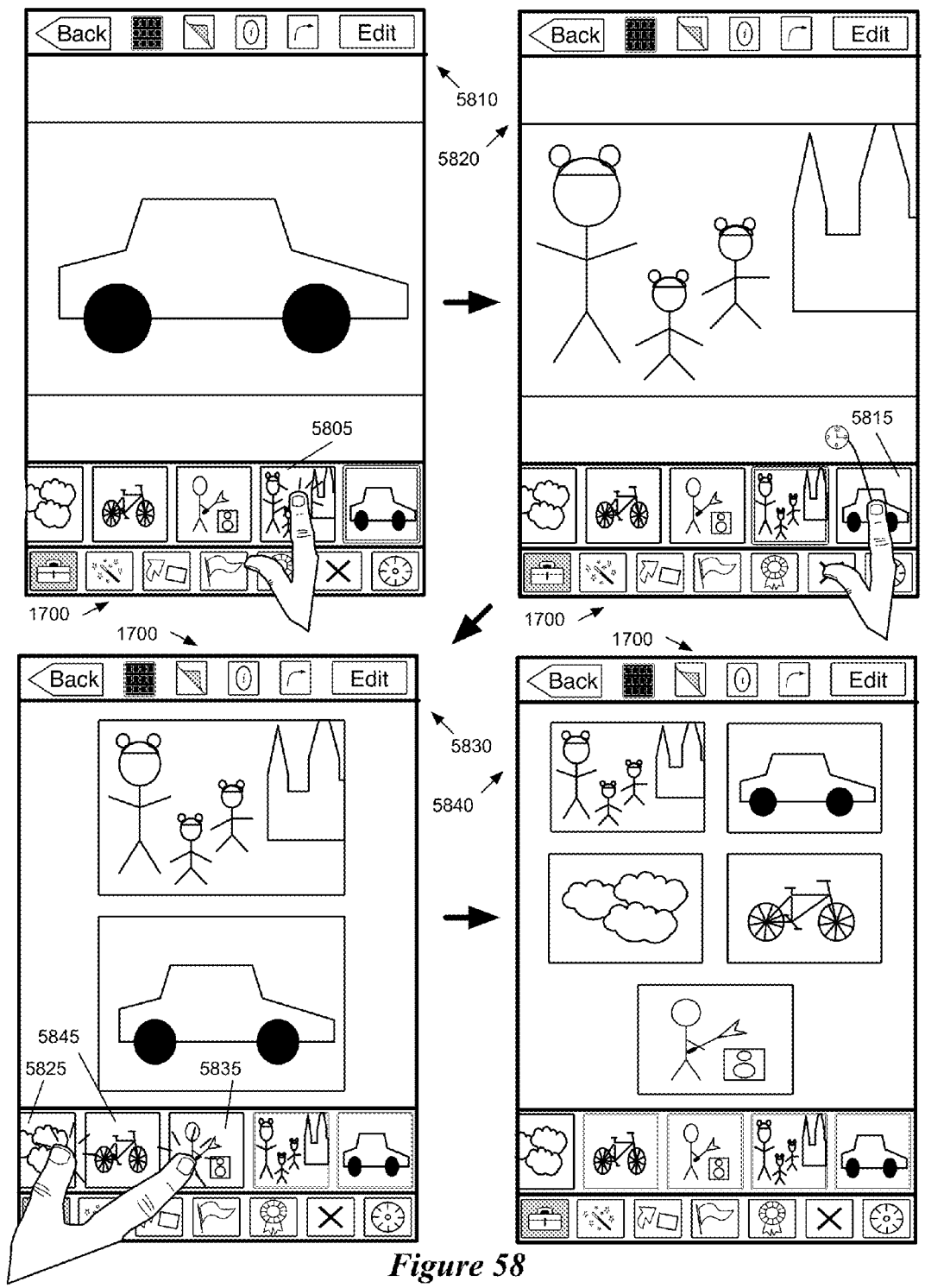
FIG. 58 illustrates a similar set of selection operations in the mobile phone and media player GUI of some embodiments.

FIG. 58 illustrates a similar set of selection operations in the mobile phone and media player GUI 1700 of some embodiments. The first stage 5810 illustrates the user making a tap selection of a thumbnail 5805, resulting in the display of the corresponding image in the display area 1715. The second stage 5820 illustrates a press and hold selection of the thumbnail 5815, so that the corresponding image is then added to the image display area. Next, the user makes a simultaneous tap selection of the thumbnails 5825 and 5835, so that the images corresponding to these thumbnails as well as the thumbnail 5845 in between them are all added to the image display area.

C. Displaying Multiple Images

The above subsections described different actions available in some embodiments in order to select multiple images for simultaneous display in the image display area. As described briefly, when displaying multiple images within the image display area, some embodiments maintain the aspect ratio of each of the images while also giving each image the same visual weight (e.g., number of screen pixels).

Figure 59:
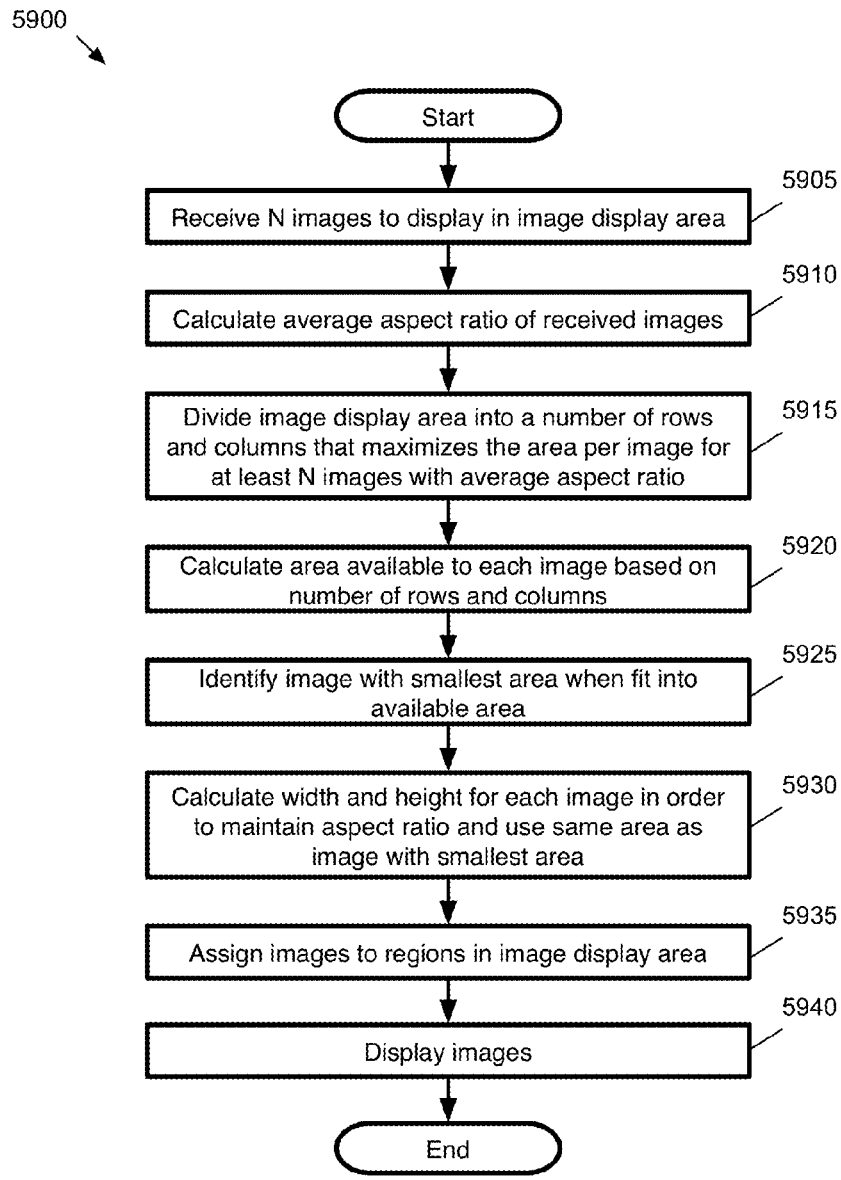
FIG. 59 conceptually illustrates a process of some embodiments for displaying multiple images simultaneously within an image display area.

FIG. 59 conceptually illustrates a process 5900 of some embodiments for displaying multiple images simultaneously within an image display area. FIG. 59 will be described by reference to FIGS. 60-65, which conceptualize the calculations performed by some embodiments in order to display four images that have different aspect ratios with the same visual weighting.

As shown, the process 5900 begins by receiving (at 5905) N images to display in the image display area. In this case, N is a non-zero positive integer (i.e., 1, 2, 3, etc.). When there is only a single image, some embodiments do not perform the process 5900, although the process does produce a correct result of the one image displayed at full size. These images may be received through any of the user interactions described in the above subsections (e.g., a block selection, a request to identify similar images, or other selections that result in the selection and display of multiple images), as well as any other interactions not described herein.

Figure 60:
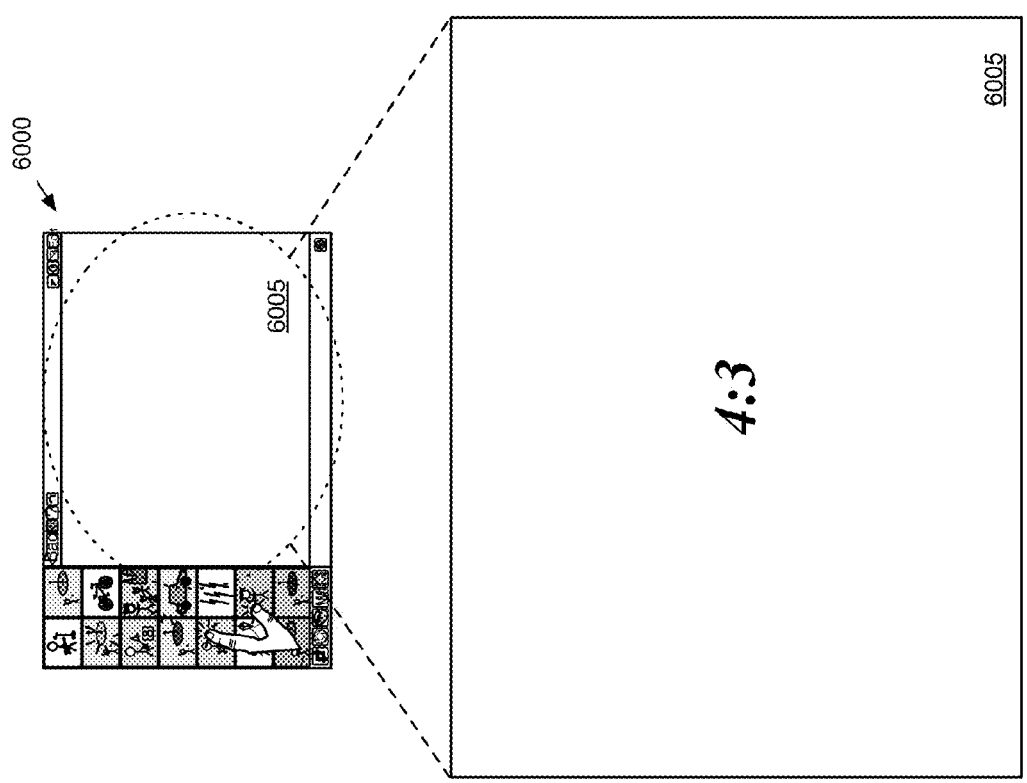
FIG. 60 illustrates a GUI in which the user makes a block selection of four thumbnails.

FIG. 60 illustrates a GUI 6000 with a user making a block selection of four thumbnails. The GUI 6000 includes an image display area 6005, which is shown in the expanded view as having a 4:3 aspect ratio. In some embodiments, the image display area will vary in size (i.e., number of pixels) and aspect ratio depending on the resolution and screen aspect ratio of the display screen of the device on which the GUI is displayed, the size of the thumbnail display area, whether other GUI areas occupy portions of the display, etc.

Figure 61:
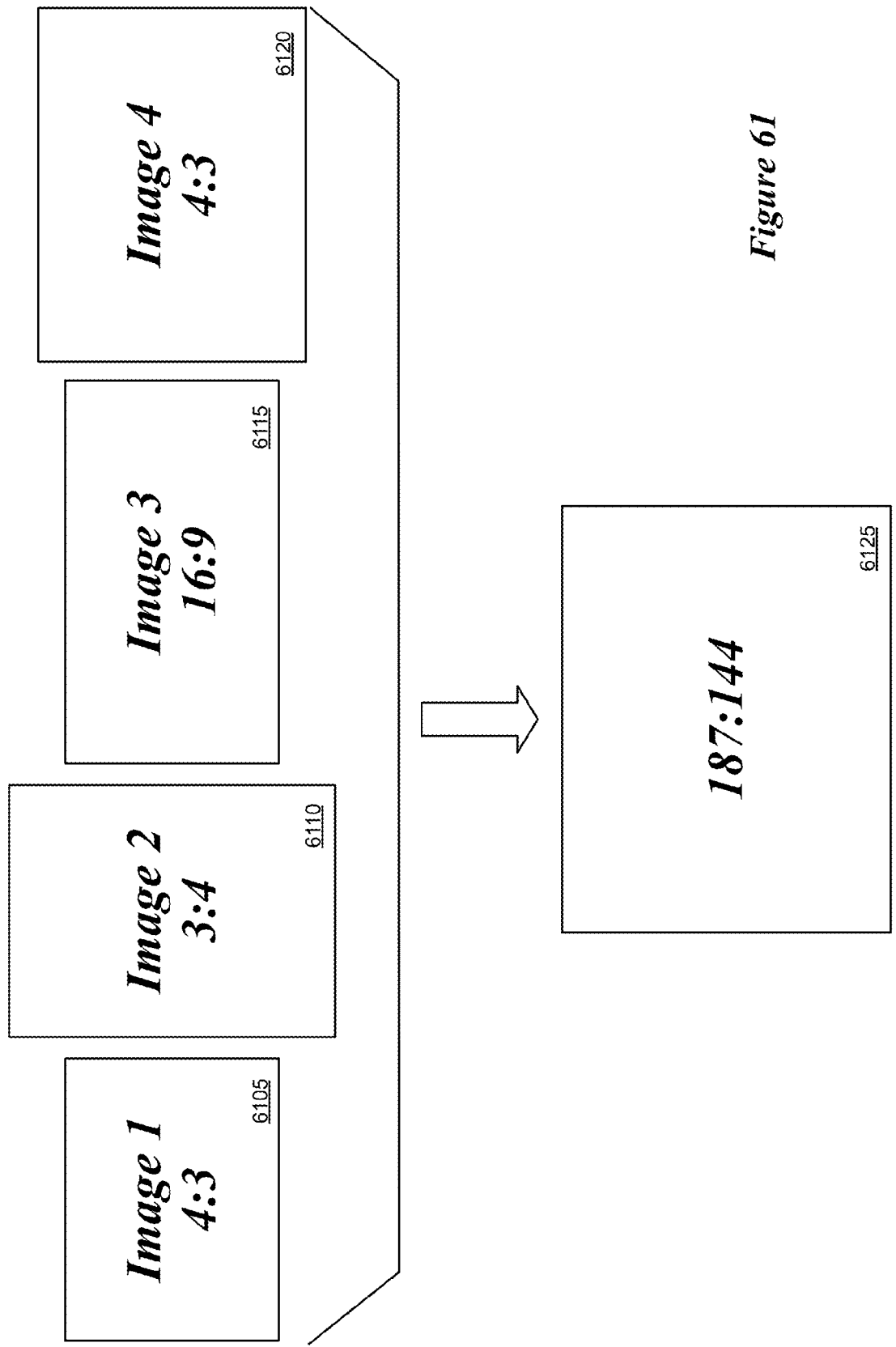
FIG. 61 illustrates the average aspect ratio region of the four selected images.

Upon receiving the command to display the images in the image display area, the process calculates (at 5910) the average aspect ratio of the received images. This average aspect ratio is used as the aspect ratio for a set of regions in the image display area into which the images will be fit. As FIG. 61 illustrates, the four selected images 6105-6120 have aspect ratios of 4:3, 3:4, 16:9, and 4:3. Images 6105 and 6120 have the same aspect ratio, but different sizes. In many cases, the images will all have a resolution (i.e., number of defined pixels) larger than the number of screen pixels available, especially when multiple images are displayed. Thus, each image is allocated a smaller portion of the screen. The average aspect ratio of the images 6105-6120 is [(4/3)+(3/4)+(16/9)+(4/3)]/4=187/144, as shown by the region 6125.

The process 5900 then divides (at 5915) the image display area into a number of rows and columns that maximizes the screen area per image for at least N images with the calculated average aspect ratio. As the display regions will all have the same dimensions, the most efficient way to pack in the regions will be in grid form. Thus, if there are five images, the grid of regions might be a 3×2 grid, a 2×3 grid, or if the images are extremely elongated a 1×5 or 5×1 grid.

In order to identify the optimal solution, some embodiments test through the space of possible row/column combinations that can be used to hold the N images in order to determine which combination gives the maximum possible area per region with the average aspect ratio. Some embodiments begin with one column and iterate up to the number of images to display (though some embodiments put a cap on the number of columns).

For a particular number of columns, the application determines the number of rows needed to display all of the images. For example, for three columns and five images, two rows will be needed, though one of the regions would not be used. The application then calculates the width of a maximally sized region for the particular number of columns and rows as the total width of the viewing area divided by the number of columns (possibly subtracting out a constant to ensure that there will be at least a small gap between images in the display). The application also calculates the height of the maximally sized region as the total height of the viewing area divided by the number of rows (again, possibly subtracting out a constant). The application then determines the dimensions of a region having the average aspect ratio that fits within this maximal region. The number of columns used is that which maximizes the area of this region.

Figure 62:
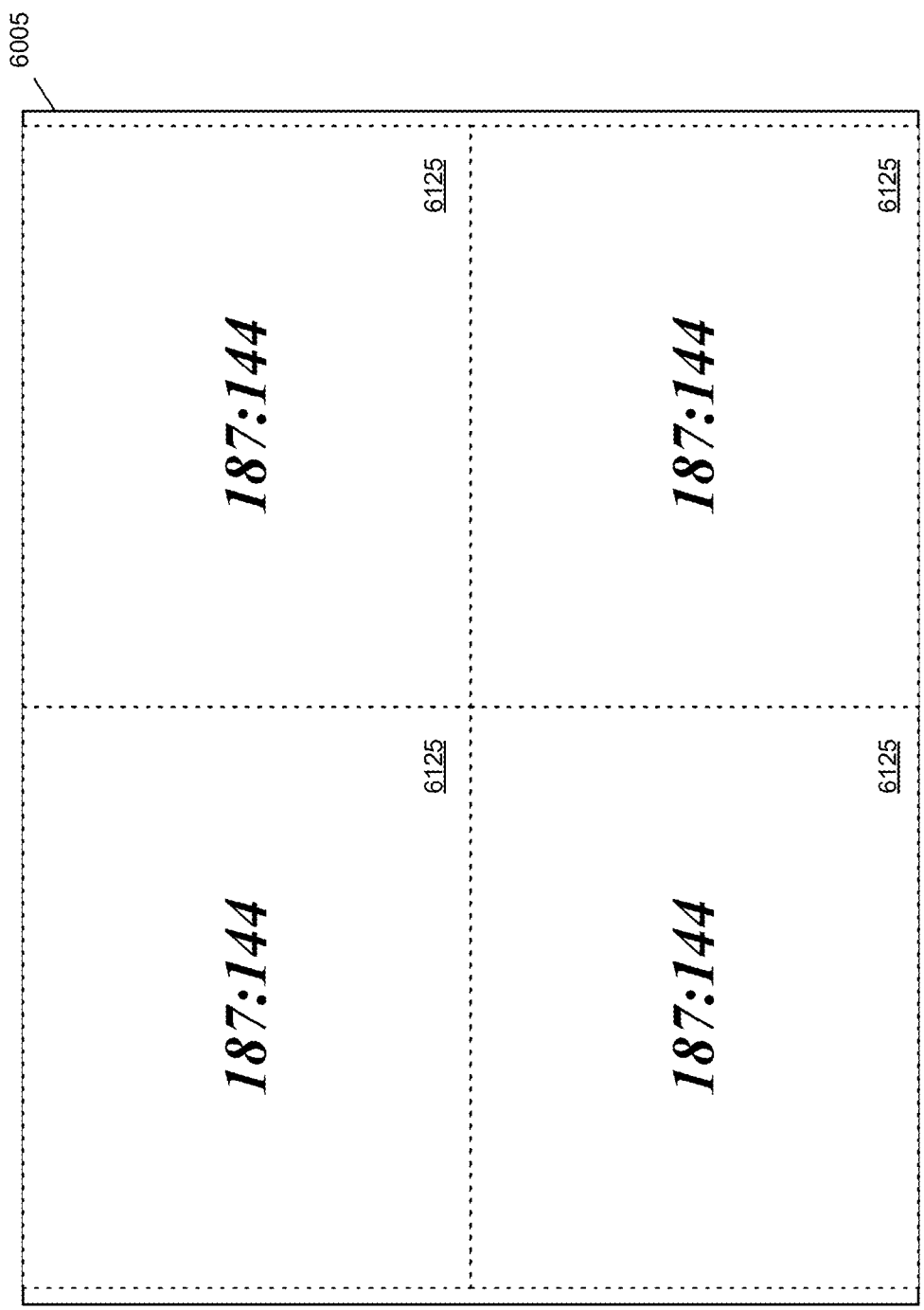
FIG. 62 illustrates that the ideal number of columns for a 187:144 aspect ratio region within the 4:3 image display area 6005 is two, with two rows.

FIG. 62 illustrates that the ideal number of columns for the 187:144 aspect ratio region 6125 within the 4:3 image display area 6005 is two, with two rows. In fact, because 187:144 is very close to 4:3, this grid nearly fills the total area.

Next, the application calculates (at 5920) the area available to each of the images based on the number of rows and columns. This calculation, in some embodiments, is the maximally sized region used to determine the number of rows and columns in operation 5915 as described in the prior paragraphs. In the example, this area is the area of the region 6125 within the image display area 6005.

The application then identifies (at 5925) the image that will have the smallest area when fit into the available area (i.e., the size of the grid regions). This will generally be the image having an aspect ratio that differs the most from the average aspect ratio. In some embodiments, to identify this image, the application calculates the height and width of each image in order to maintain the image's aspect ratio and fit the entire image within the grid region. For images with a larger aspect ratio than the average, the width will equal that of the grid region while the height will be reduced from that of the grid region. For images with a smaller aspect ratio than the average, the height will equal that of the grid region while the width is reduced from that of the grid region.

FIG. 63 illustrates the different aspect ratio images within the grid region 6125. The 4:3 image 6105 occupies 97% of the grid region (and the other 4:3 image 6120 occupies the same portion), the 16:9 image 6115 occupies 73% of the grid region, and the 3:4 image 6110 occupies 58% of the grid region. Accordingly, the image 6110 is identified as that with the smallest area when fit into the grid region. Accordingly, in order for each image to use the same number of pixels, each image will occupy 58% of the grid region area.

The process then calculates (at 5930) the width and height for each image in order to maintain the aspect ratio and use the same area within the grid region as the image with the smallest area, as determined at operation 5925. For a particular image, some embodiments calculate the width as square root of the product of the minimum area and the aspect ratio of the image. The height of the particular image is then calculated as the width divided by the aspect ratio.

FIG. 64 illustrates the sizes of the images 6105 (which is equivalent in size to image 6120) and 6115 when fit to occupy the same area in the image display area as the image 6110. Both of these images are sized down to only occupy 58% of the region 6125. To use example numbers, if the region 6125 has a width of 374 pixels and a height of 288 pixels, then the size of image 6105 for display would be approximately 288 pixels×216 pixels. The size of image 6115 would be approximately 333 pixels×187 pixels. The size of image 6110, shown in FIG. 63, would be approximately 216 pixels×288 pixels.

The process 5900 assigns (at 5935) each of the images to their region in the display area. The application, in some embodiments, takes the images in order (e.g., their order within the thumbnail display area, which in turn is determined by their order within the collection) and assigns them to grid regions. In addition, when some of the grid regions in the last row are not used, the application removes these grid regions and centers the grid regions of the bottom row.

Figure 65:
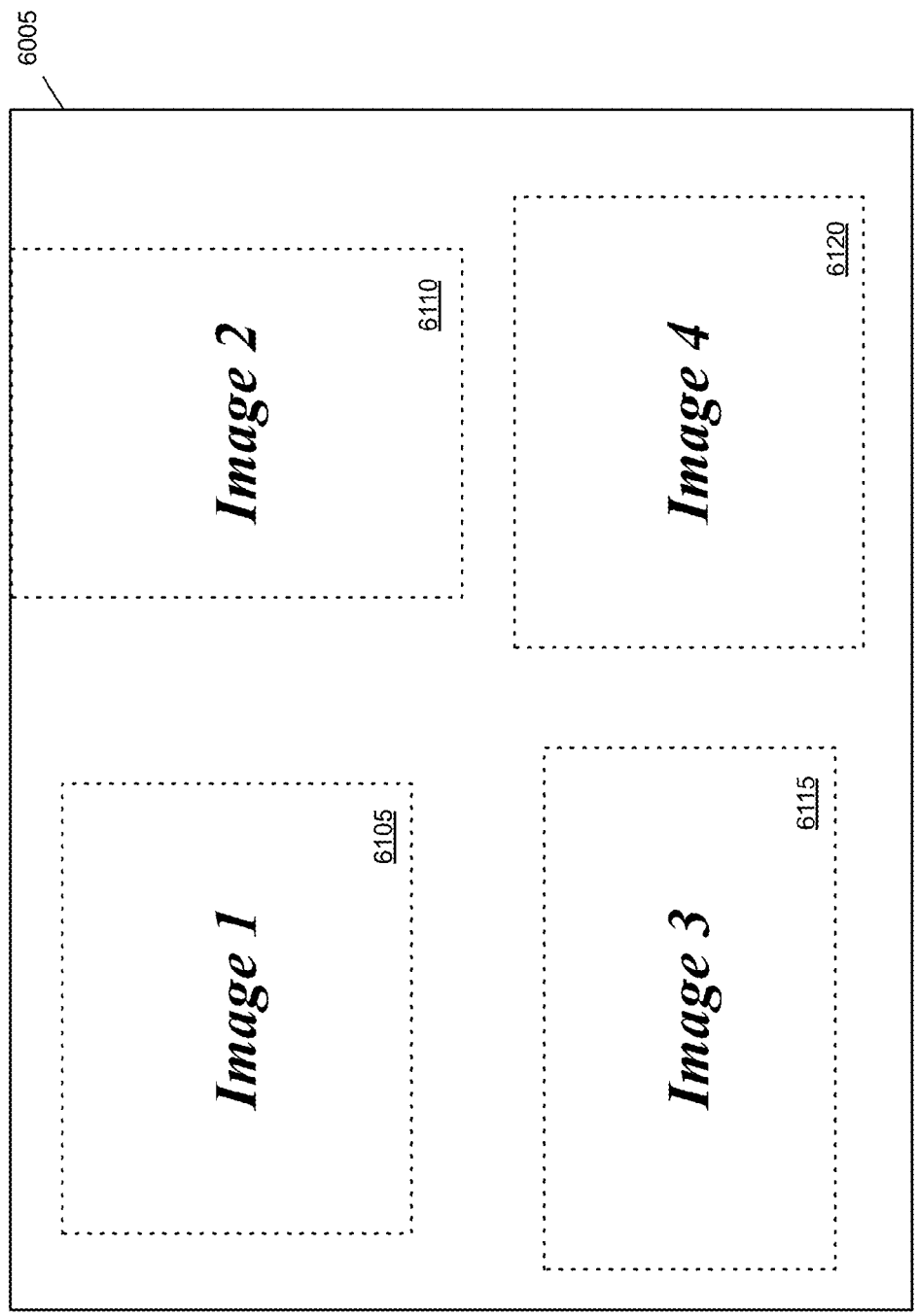
FIG. 65 illustrates the four images displayed within the image display area.

Finally, the process displays (at 5940) the images within the image display area in the assigned regions at the assigned size. FIG. 65 illustrates the images 6105-6120 displayed within the image display area 6005. As can be seen, the images all appear (e.g., to a human observer) to be the same size, because they each have the same number of pixels. This gives the beneficial result that none of the images appear more preferable in a comparison of the images simply on account of being larger than the other images. As a common use of the multiple image display feature is for a user to determine which of several photos of the same scene to keep, having images appear the same size provides a significant benefit to the user.

V. Operations on One or More Images

The above Section IV describes various techniques available in some embodiments in order to select one or more images, including automatically identifying groups of similar images, block selections of thumbnails, and pressing and holding thumbnails in order to add the corresponding image to a group of selected images. The following section describes various operations that may be used in order to apply tags to images, cycle through images in a selection, as well as select and deselect individual images.

A. Selection and Deselection Operations

Figure 66:
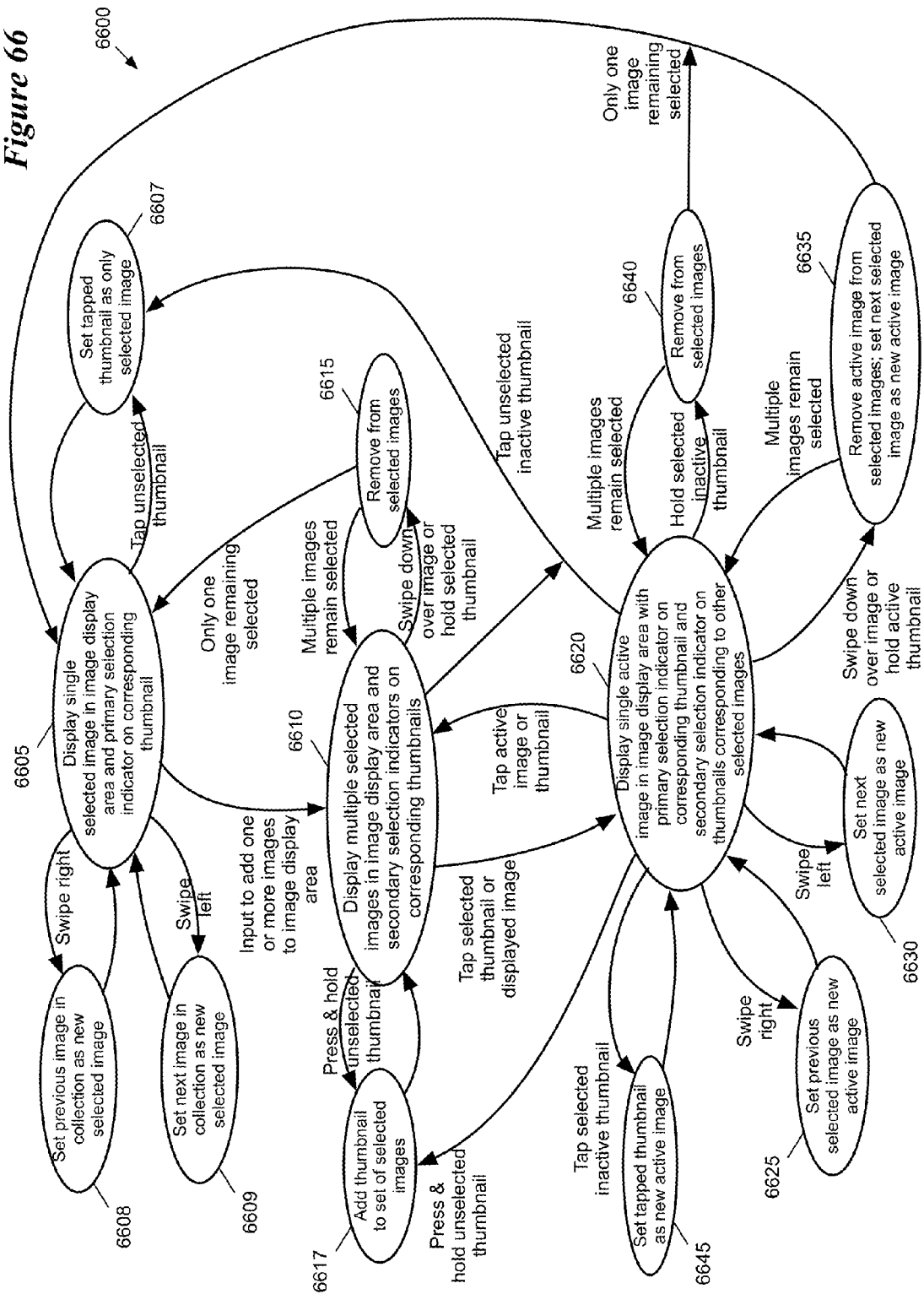
FIG. 66 conceptually illustrates a state diagram that describes different states and transitions between these states of the GUI of some embodiments relating to the selection/deselection of images and viewing of selected images.

FIG. 66 conceptually illustrates a state diagram 6600 that describes different states and transitions between these states of the GUI of some embodiments relating to the selection/deselection of images and viewing of selected images. One of ordinary skill in the art will recognize that the GUI of some embodiments will have many different states relating to all different types of input events, and that the state diagram 6600 is specifically focused on a subset of these events. The state diagram 6600 will be described in part by reference to FIGS. 67-71, which illustrate various selection and deselection operations. The state diagram 6600, as well as the accompanying figures, describe and illustrate touch interactions for changing states of the GUI. One of ordinary skill in the art will recognize that various other interactions, such as cursor controller gestures and button clicks, keyboard input, or touchpad/trackpad input may also be used for similar selection operations. Within the figure, many of the transition conditions are shown as user interactions (e.g., "swipe left"). One of ordinary skill in the art will recognize that the state transitions occur in response to the receipt of such user input by the image viewing and editing application.

When only one image is selected, the GUI is in state 6605, displaying the single selected image in the image display area and displaying a primary selection indicator on the corresponding thumbnail. As shown in the previous section, some embodiments use a primary selection indicator on thumbnails to indicate when only one image is displayed in the image display area, while also using a secondary selection indicator on thumbnails to indicate when the thumbnail is one of multiple selected images. In some embodiments, both selection indicators are highlights around the border of the thumbnail, with the primary selection indicator being a thicker highlight than the secondary selection indicator.

With one image selected, users can select a different image by tapping on an unselected thumbnail. When a user taps an unselected thumbnail (in this case, any other thumbnail than the one that corresponds to the displayed image), the application transitions to state 6607 to set the tapped thumbnail (and its corresponding image) as the new selected image, then transitions back to state 6605. In addition, users can cycle through the images with left and right swipe gestures. As shown, when the application receives a rightward swipe gesture, the application transitions to state 6608 to set the previous image in the collection as the new selected image. Similarly, when the application receives a leftward swipe gesture, it transitions to state 6609 to set the next image in the collection as the new selected image. After either such change, the application transitions back to 6605, with the new selected image displayed in the image display area. When receiving one of these swipe gestures, some embodiments use a slide animation to show the previously selected image sliding off the display with the new selected image either sliding onto the display (from the right side if a leftward gesture, and from the left side if a rightward gesture). Other embodiments use other animation to illustrate the change in image, or just replace the image in the image display area without any animation at all. FIG. 33 illustrates an example of such a swipe gesture to cycle through the images in a collection.

With the GUI in state 6605, the user can add one or more images to the image display area. These may replace the currently selected image (e.g., if the user double taps on an unselected image to display all images similar to that image), or be added alongside the currently selected image (e.g., if the user presses and holds down over a thumbnail. When the user performs one of these actions to add one or more images to the preview display area, the GUI transitions to state 6610 and displays the multiple selected images in the image display area and displays secondary selection indicators on the corresponding thumbnail. Numerous examples of such a transition are shown in the above section (e.g., FIGS. 44, 54, 55, and 57).

Once in the state 6610 (with multiple images selected and displayed), if the user taps an unselected thumbnail, then the GUI transitions to state 6607 to set the tapped thumbnail as the only selected image and then back to state 6605, as illustrated by stages 5750 and 5760 of FIG. 57. In addition, while in state 6610, the user can press down and hold one of the thumbnails in the thumbnail display area. When the particular thumbnail is one of the previously selected thumbnails, the application transitions to state 6615 to remove the particular thumbnail from the set of selected thumbnails. If only one thumbnail remains selected, then the GUI transitions to state 6605 to display only the one selected image. Otherwise, the GUI transitions back to state 6610 to display the selected images, which no longer include the particular thumbnail. In addition, if the user performs a downward swipe gesture over a particular image in the image display area, then this will have the same effect of removing the particular image from the selected set. On the other hand, as shown in the previous section, when the particular thumbnail is presently unselected, then the application transitions to 6617 to add the image corresponding to the thumbnail to the current set of selected images, then transitions back to 6610 with an additional image shown in the image display area. Stages 5730 and 5740 of FIG. 57 illustrate such an operation.

Figure 67:
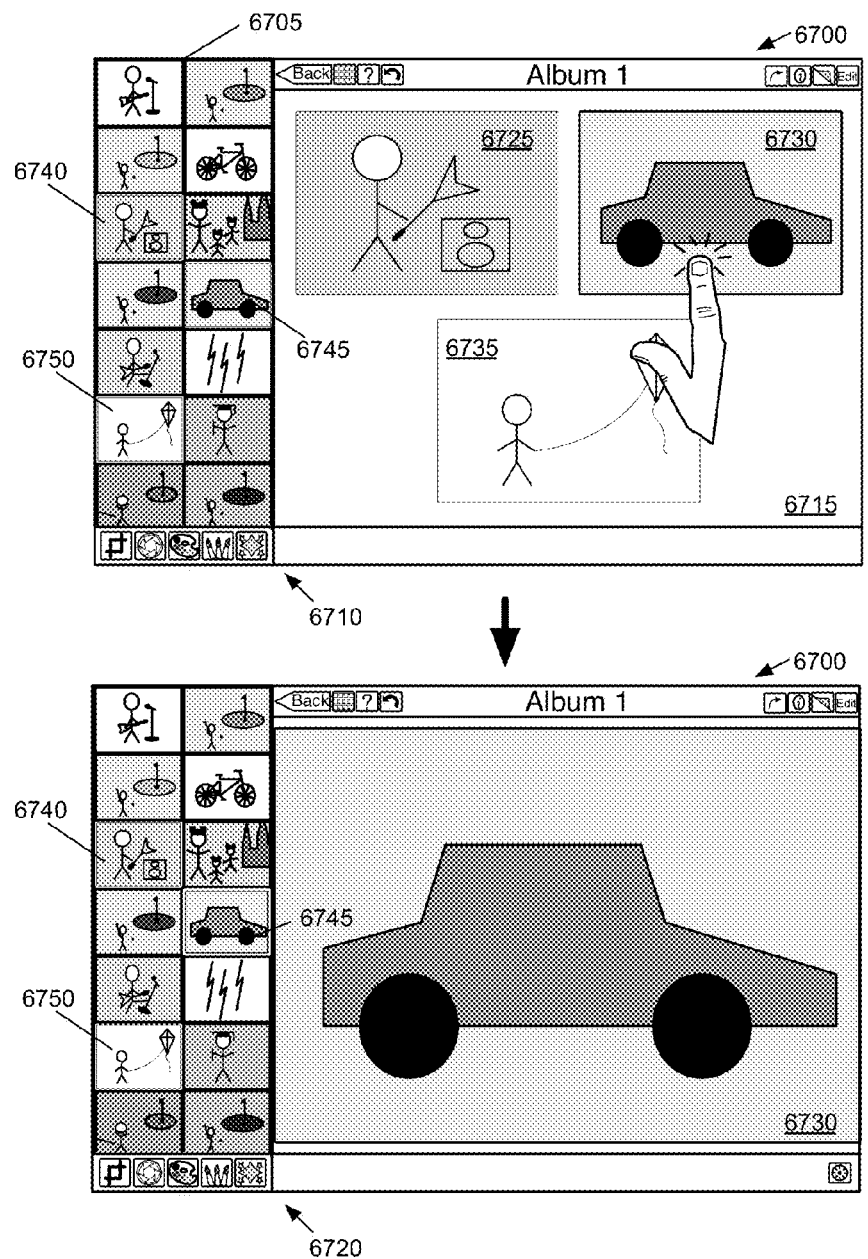
FIG. 67 illustrates a transition from displaying multiple selected images in the GUI to displaying one of the selected images as the active image.

In addition, from state 6610, when the user taps one of the selected thumbnails or one of the displayed images in the image display area, the GUI transitions to state 6620. At state 6620, the application displays a single active image in the preview area with a primary selection indicator on its corresponding thumbnail and a secondary selection indicator on the thumbnails corresponding to the other selected images. FIG. 67 illustrates this transition over two stages 6710 and 6720 of a GUI 6700. The GUI 6700 includes a thumbnail display area 6705 and an image display area 6715. At the first stage 6710, the GUI displays three images 6725-6735 in the image display area 6715, with the corresponding thumbnails 6740-6750 highlighted in the thumbnail display area 6705.

Also in the first stage 6710, the user taps the image 6730. The second stage 6720 illustrates the result of this interaction, with the image 6730 occupying the entirety of the image display area 6715. Furthermore, the thumbnail 6745 that corresponds to the image 6730 now is bordered by a heavier highlight than the thumbnails 6740 and 6750, which remain selected. Some embodiments animate this transition. For instance, in some embodiments, the application displays the image expanding from its position among multiple displayed images into the larger image that uses the full image display area in at least one direction. In addition, while the second stage 6720 of FIG. 67 illustrates the image 6730 occupying nearly the entire image display area, in some embodiments the application displays a faded, darker version of the other selected images behind the primary displayed image. When the primary displayed image does not occupy portions of the image display area (e.g., because of differences in aspect ratio between the image and the display area), portions of the other selected images (in the faded, darker form) will be visible within the display.

In the following discussion, the primary selected image will be referred to as the active image, while all of the images in the selection, whether the primary selection or one of the secondary selections, will be referred to as selected. With the GUI in state 6620, the user can perform various actions to cycle through the images (e.g., if comparing various photos to identify the best of a set). As shown, when the application receives a swipe right gesture over the image display area, the GUI transitions to state 6625 to set the previous selected image in the collection order as the new active image, before transitioning back to the state 6620 to display the new active image. Some embodiments animate this transition; for instance, by minimizing the previously active image back into its position in the image display area (i.e., the location the image would occupy if all selected images were displayed at once) while expanding the new active image into its larger display.

Other embodiments use various forms of a sliding animation. In some embodiments, the application slides this new active image onto the display while sliding the previous active image off. In other embodiments, the new active image appears to be underneath the previous active image, so that more of the image appears as the previous image slides off. Still other embodiments slide the new active image onto the display over the old active image. In some embodiments, the choice of how the application displays this transition is left up to the user.

Figure 68:
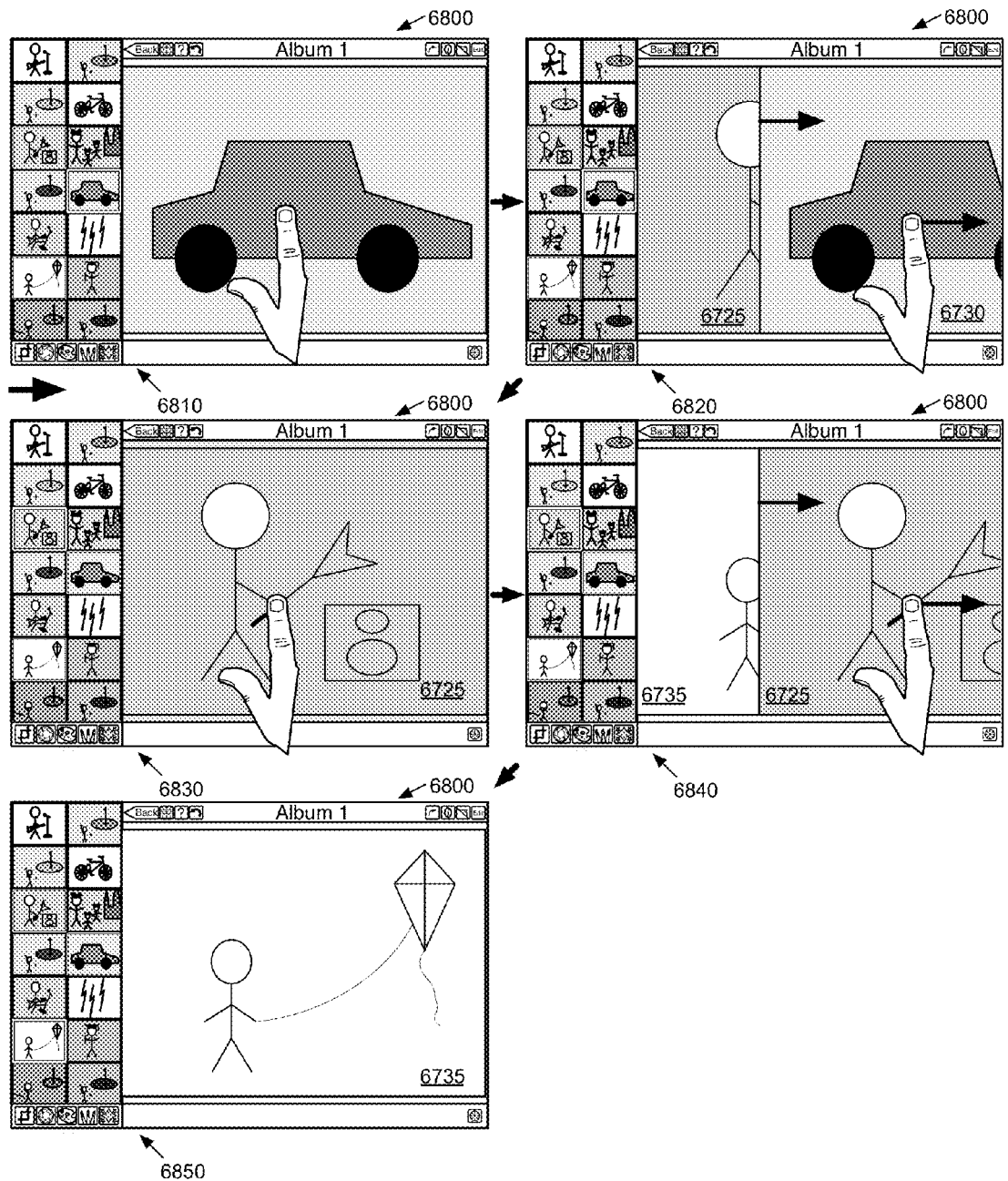
FIG. 68 illustrates a series of rightward swipe gestures in the GUI in order to cycle between selected images.

FIG. 68 illustrates a series of such rightward swipe gestures in the user interface 6700 over five stages 6810-6850. The first stage 6810 illustrates the GUI 6700 in the same state as stage 6720 of FIG. 67. As shown, the user has begun to contact the touchscreen with one finger. In the next stage 6820, the user has started sweeping her finger to the right, causing the image 6730 to slide to the right off of the screen and revealing the image 6725 below. The result of this swipe gesture is shown in stage 6830, with the image 6725 now displayed in the image display area 6715. In addition, the corresponding thumbnail 6740 is now bordered with a thick highlight, indicating the primary selection, while the other selected thumbnails are bordered with a thinner highlight.

In addition, at this stage, the user again contacts the touchscreen, and the fourth stage 6840 illustrates that the user makes another swipe gesture to the right. This causes the image 6725 to slide to the right off of the screen, revealing the image 6735 below. The result of this swipe gesture is shown in stage 6850, with the image 6735 now displayed in the image display area 6715. In addition, the corresponding thumbnail 6750 is now bordered with the thick highlighting of the primary selection indicator, while the other selected thumbnails are bordered with a thinner highlight.

Similar to the swipe right gesture, when the application is in state 6620 and receives a swipe left gesture over the image display area, the GUI transitions to state 6630 to set the next selected image in the collection order as the new active image, before transitioning back to the state 6620 to display the new active image. Some embodiments animate this transition; for instance, by minimizing the previously active image back into its position in the image display area (i.e., the location the image would occupy if all selected images were displayed at once) while expanding the new active image into its larger display.

Other embodiments use various forms of a sliding animation. In some embodiments, the application slides this new active image onto the display while sliding the previous active image off. In other embodiments, the new active image appears to be underneath the previous active image, so that more of the image appears as the previous image slides off. Still other embodiments slide the new active image onto the display over the old active image. In some embodiments, the choice of how the application displays the cycling through the images is left up to the user.

Figure 69:
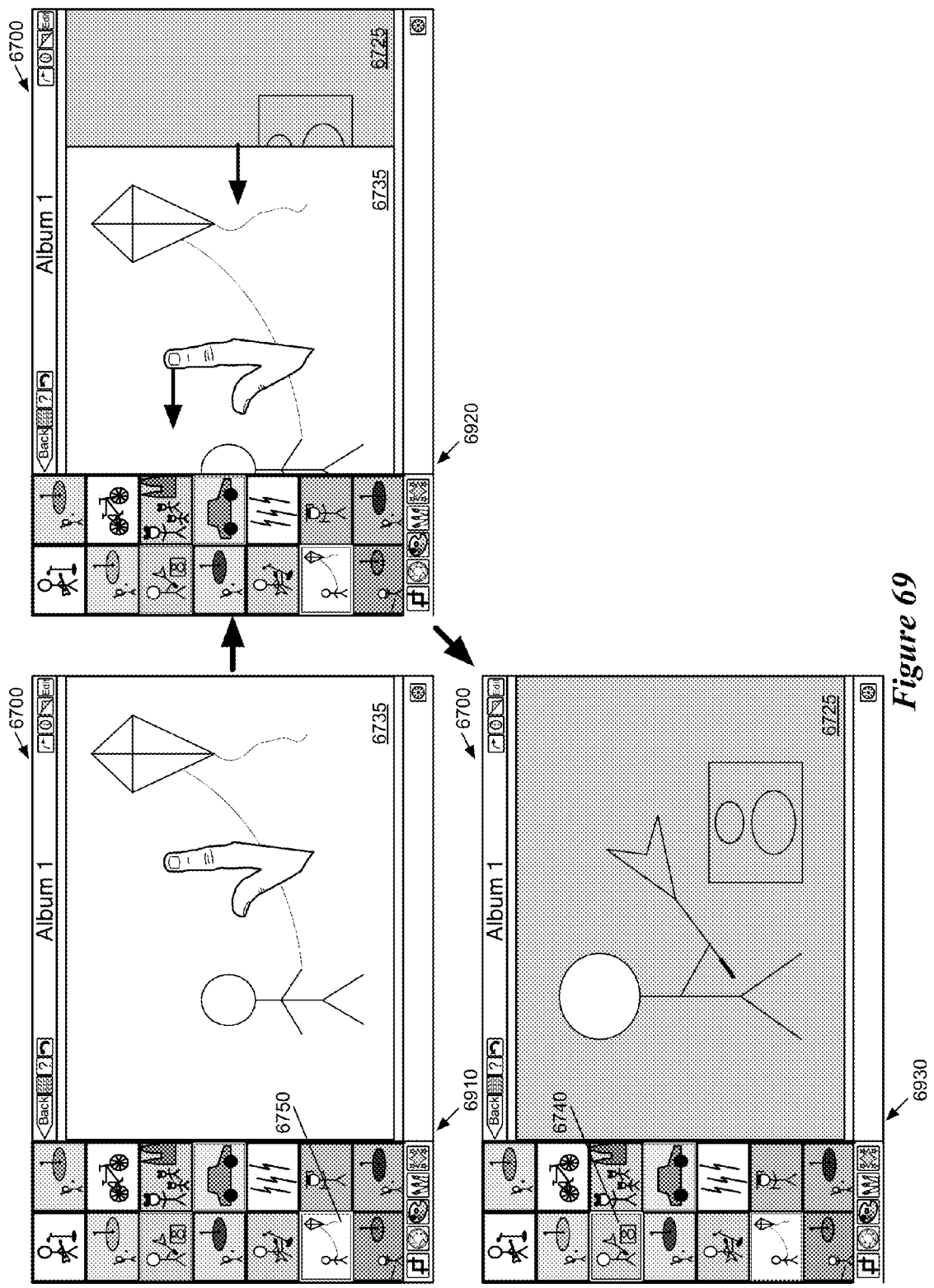
FIG. 69 illustrates a leftward swipe gesture in the GUI in order to cycle between selected images.

FIG. 69 illustrates such a leftward swipe gesture in the GUI 6700 over three stages 6910-6930. The first stage 6910 illustrates the GUI 6700 in the same state as stage 6850 of FIG. 68, with the image 6735 as the active image in the image display area and its corresponding thumbnail 6750 selected with a heavy highlight. As shown, the user has begun to contact the touchscreen with one finger. In the next stage 6920, the user has started sweeping her finger to the left, causing the image 6735 to slide to the left off of the screen and revealing the image 6725 below. The result of this swipe gesture is shown in stage 6930, with the image 6725 now displayed in the image display area 6715. In addition, the corresponding thumbnail 6740 is now bordered with a thick highlight, indicating the primary selection, while the other selected thumbnails are bordered with a thinner highlight.

As these figures illustrate, in some embodiments the application will allow the user to cycle through a set of selected images with the sweep gestures, including swiping from the last image in the set to the first image in the set, rather than preventing a swipe gesture in one direction once the user reaches the end of the set.

In addition to cycling through a set of selected images in response to users swiping left and right, some embodiments also allow users to remove images from the set via a swipe gesture. As shown in the state diagram 6600, when the application receives a swipe down gesture while in state 6620, the GUI transitions to state 6635 to remove the active image from the set of selected images and set the next image in the set of selected images as the new active image. Much like the right and left swipe gestures, in some embodiments the application animates the transition; e.g., by minimizing the previously active image while expanding the new active image into the larger display.

Other embodiments use various forms of sliding animation; In some embodiments, the application slides the new active image onto the display while sliding the previous active image off the bottom of the display. In other embodiments, the new active image appears to be underneath the previous active image, so that more of the image appears as the previous image slides off. Still other embodiments slide the new active image onto the display over the old active image. In some embodiments, the choice of how the application displays this transition is left up to the user.

When there were only two images in the set of selected images, a swipe down will leave only one selected image, in which case the GUI transitions back to state 6605 with the single selected image displayed in the image display area. On the other hand, when at least two images remain selected after removing the active image, then the GUI returns to the state 6620 with the next image in the set as the active image. For the selected images, some embodiments of the application recalculate their size and location in the image display area and displays the faded, darker versions of the inactive selected images in their new positions behind the active image.

Figure 70:
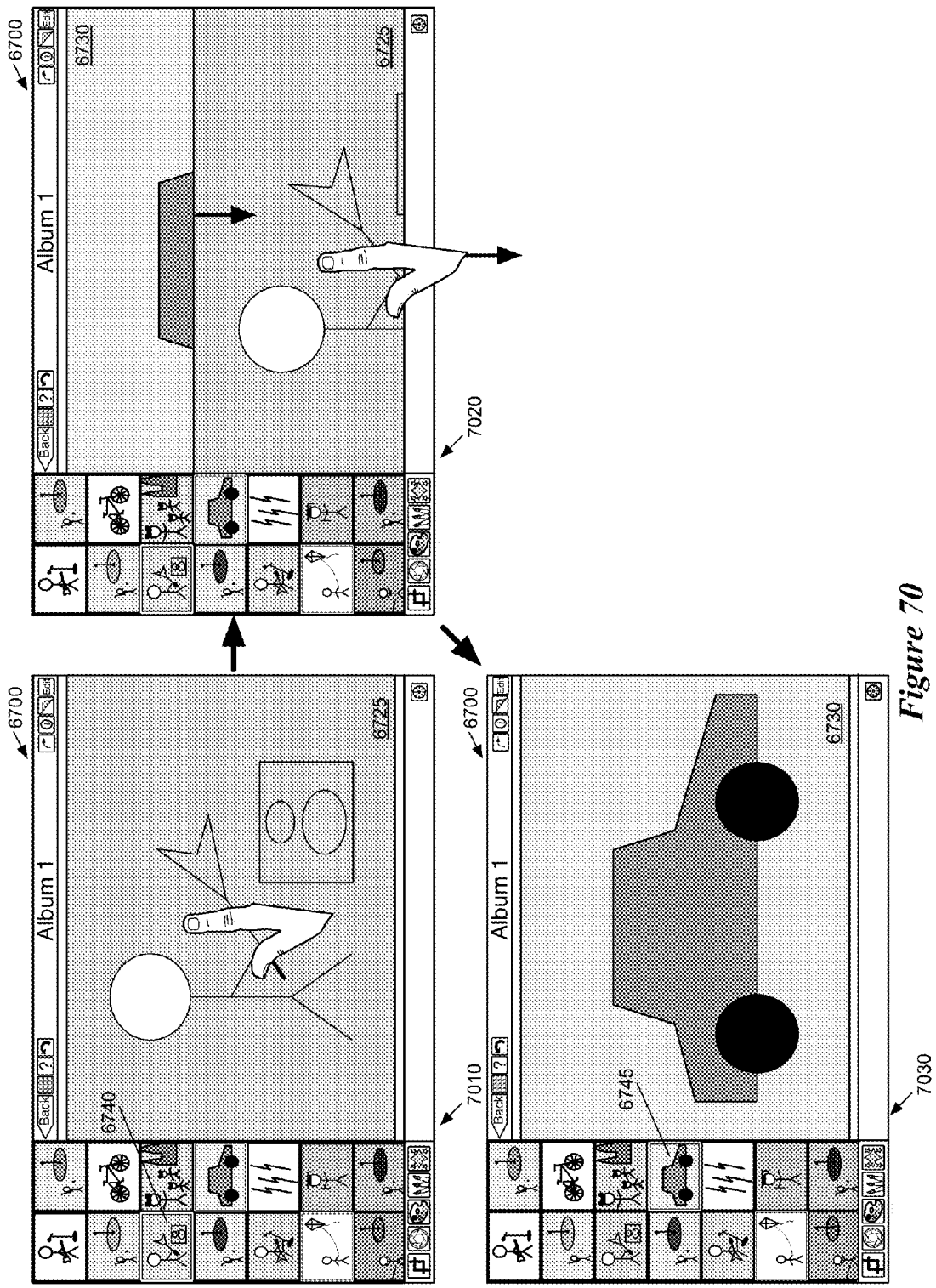
FIG. 70 illustrates a downward swipe gesture in the GUI of some embodiments.

FIG. 70 illustrates such a downward swipe gesture in the user interface 6700 over three stages 7010-7030. The first stage 7010 illustrates the GUI 6700 in the same state as stage 6930 of the previous figure, with the image 6725 as the active image in the image display area and its corresponding thumbnail 6740 selected with a heavy highlight. As shown, the user has begun to contact the touchscreen with one finger. In the next stage 7020, the user has started sweeping her finger downwards, causing the image 6725 to slide downwards off of the screen and revealing the image 6730 below. The result of this swipe gesture is shown in stage 7030, with the image 6730 now displayed in the image display area 6715. In addition, the corresponding thumbnail 6745 is now bordered with a thick highlight, indicating the primary selection, while the thumbnail 6740 is no longer highlighted as it has been deselected.

As shown, in some embodiments, the user pressing and holding the thumbnail of the active image has the same effect of causing the GUI to transition to state 6635 to remove the active image from the set of selected images and set the next image in the set as the active image. In addition, when the user presses and holds a selected but inactive thumbnail (i.e., the corresponding image is not the image displayed), the application transitions to 6640 to remove the corresponding image from the set of selected images. As at stage 6635, the application either transitions to state 6605 (if only the active image remains selected) or back to state 6620 (if multiple images remain selected). When the application transitions back to state 6620, some embodiments of the application recalculate the size and location in the image display area of the images that remain selected and displays the faded, darker versions of the inactive selected images in their new positions behind the active image.

In addition, when the user presses and holds an unselected thumbnail, the application transitions to state 6617, to add the corresponding image to the set of selected images. As shown, some embodiments also transition back to state 6610 when the user adds a new image to the set. On the other hand, some embodiments select the image but maintain the full-viewer display of the active image.

As illustrated in FIG. 66, with the GUI in state 6620, when the user taps an unselected thumbnail, the application removes the selection of all of the other images and transitions to state 6607, to set the newly selected image (corresponding to the tapped thumbnail) as the sole selected image. The application then transitions back to state 6605 to display the newly selected image in the image display area. When the user taps the active thumbnail, this causes the GUI to transition back to state 6610 with all of the selected images displayed in the image display area, removing the active designation from the image corresponding to the tapped thumbnail. Finally, some embodiments allow the user to switch the active image between different images in the set by tapping a selected thumbnail that corresponds to one of the inactive images. As shown, when the user taps a selected but inactive thumbnail, the application transitions to state 6645 to set the image corresponding to the tapped thumbnail as the new active image, then transitions back to state 6620.

Figure 71:
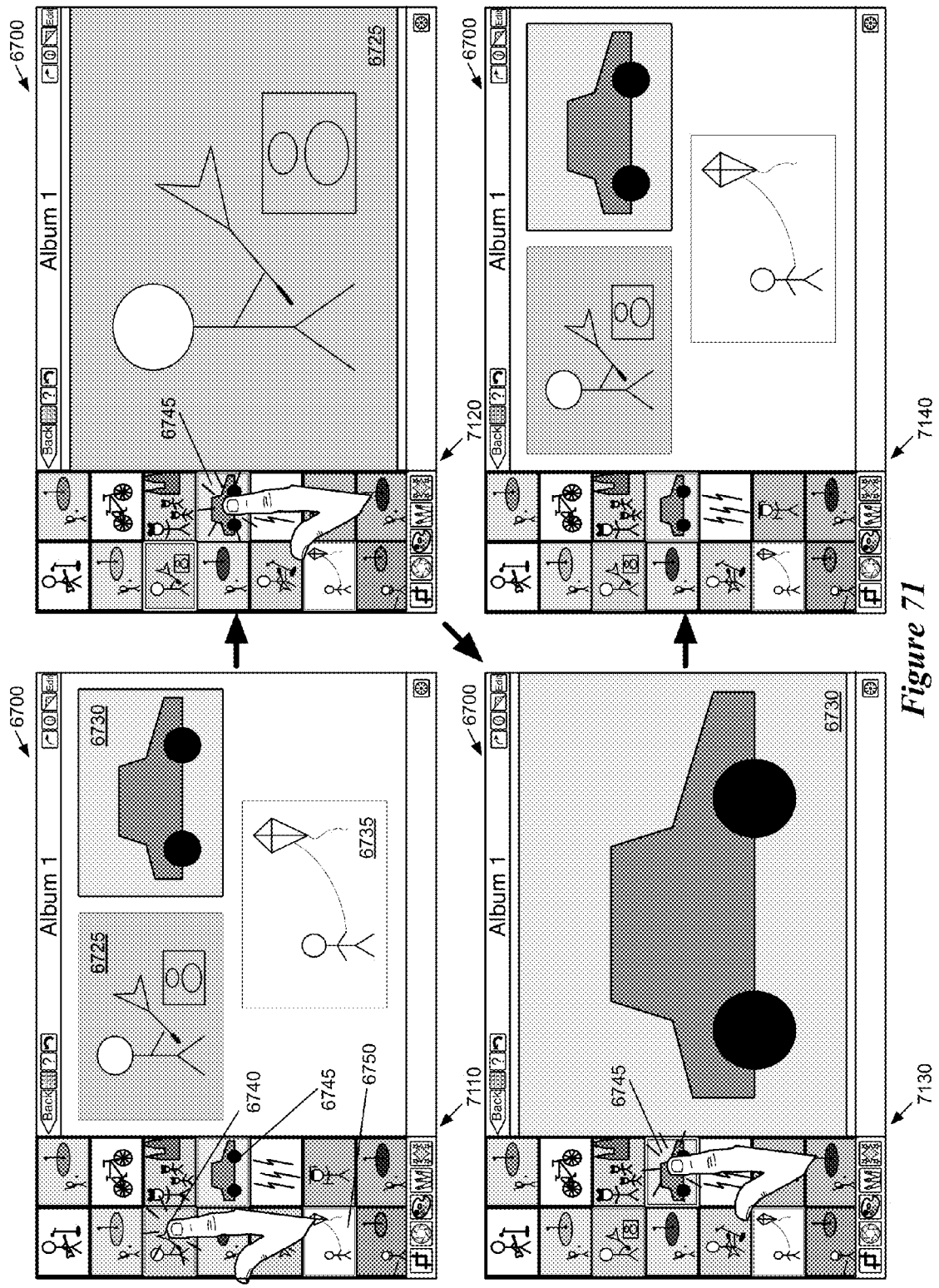
FIG. 71 illustrates examples of a user tapping on the selected thumbnails in the GUI.

FIG. 71 illustrates examples of a user tapping on the selected thumbnails in the GUI 6700 over four stages 7110-7140. The first stage 7110 illustrates the GUI 6700 in the same state as the first stage 6710 of FIG. 67, with the three images 6725-6735 all displayed in the image display area and their corresponding thumbnails 6740-6750 selected with a lighter highlight.

Also in this stage 7110, the user taps the touchscreen over the thumbnail 6740. The second stage 7120 illustrates the result of this interaction, with the corresponding image 6725 now the active image occupying the entirety of the image display area 6715. In addition, the thumbnail 6740 that the user tapped is now displayed as bordered with a heavier highlight than the other selected thumbnails.

At this stage 7120, the user taps the touchscreen over the thumbnail 6745. The third stage 7130 illustrates the result of this interaction, with the corresponding image 6730 now the active image occupying the entirety of the image display area 6715. In addition, the thumbnail 6745 that the user tapped is now displayed as bordered with a heavier highlight. These stages illustrate that whether the GUI is in state 6610 or state 6620, tapping a selected but not active thumbnail will make the corresponding image the active image.

In addition, at stage 7130, the user again taps the thumbnail 6745 of the active image. The result of this interaction is shown in stage 7140, with the application again displaying all three images 6725-6735 with no active image, and therefore no primary selection indicator for any of the thumbnails. This pair of stages illustrates the transition from state 6620 to state 6610, with multiple images displayed at once.

B. Tagging Images

Figure 72:
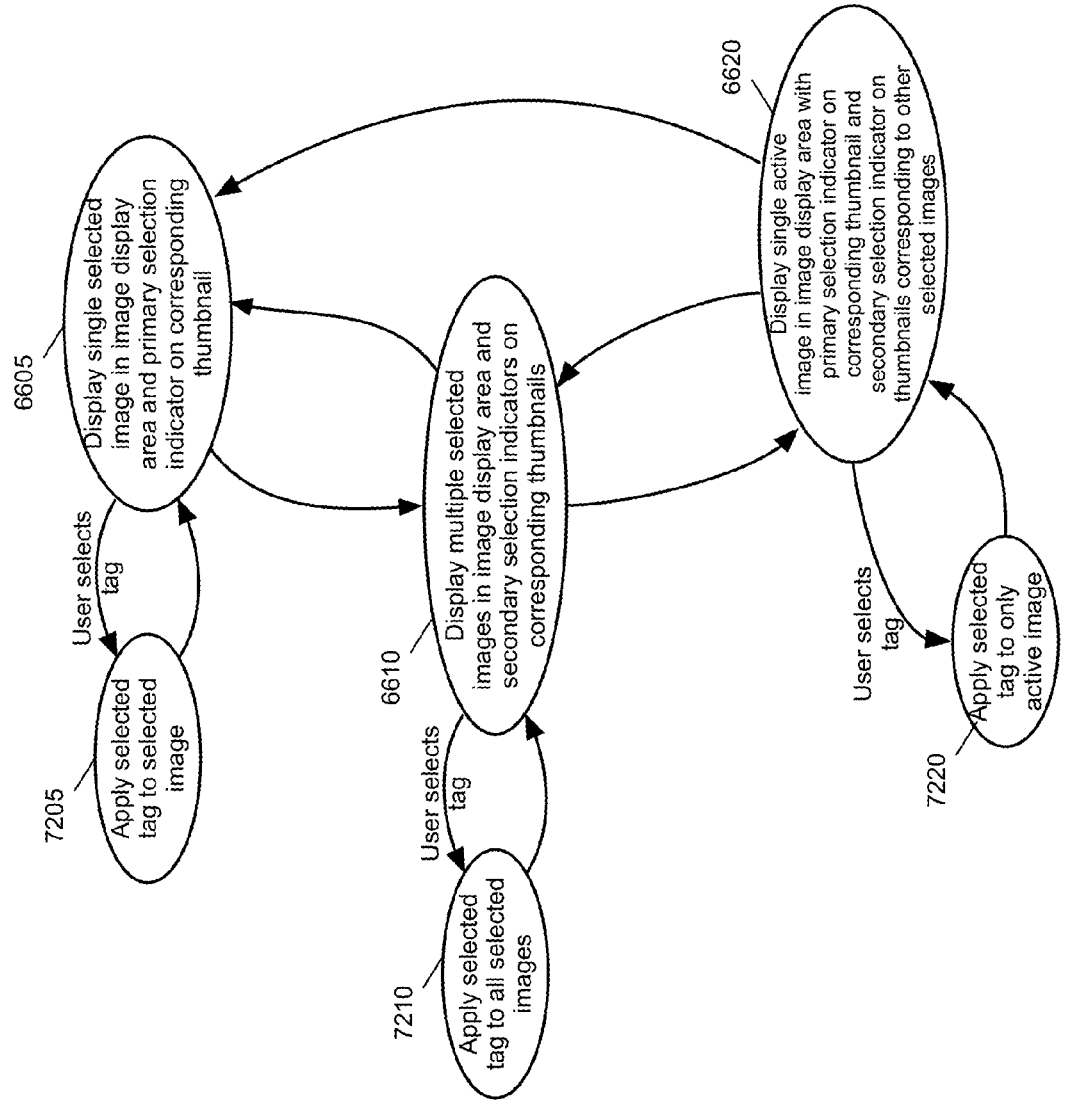
FIG. 72 conceptually illustrates a state diagram for the GUI of some embodiments relating to the application of a tag in three different states.

The above section describes various selection and deselection operations performed with one or more images in the image-viewing application of some embodiments. The state diagram 6600 included three primary selection states 6605, 6610, and 6620. In some embodiments, the images to which the application applies a user-selected tag depend on which of these three states the GUI is in when the user selects the tag. FIG. 72 conceptually illustrates a state diagram for the GUI of some embodiments relating to the application of a tag in these three different states. FIG. 72 will be described by reference to FIGS. 73-77, which illustrate the application of different tags to one or more images.

As shown, the state diagram illustrates the states 6605 (only one image selected), 6610 (multiple images selected and displayed), and 6620 (multiple images selected, only active image displayed), as well as transitions between these states (described above by reference to FIG. 66). In addition, FIG. 72 displays the states resulting from the selection of a tag UI item in these three different states. As mentioned above by reference to FIG. 14, some embodiments include a set of GUI items for applying different tags to one or more images. These tags may include a favorites tag (i.e., to indicate an image that the user especially likes), a flag (i.e., to indicate an image that the user wants to review again later), and a hide tag (i.e., to remove an unwanted image from the set of images shown in the thumbnail display area). These tags, in some embodiments are stored with the data structure for the tagged image, and may be used to populate specific albums for images with that tag.

As shown in FIG. 66, when the GUI is in state 6605 and the user selects a tag to apply to an image, the GUI transitions to state 7205 to apply the selected tag to the sole currently selected image. The GUI then transitions back to the state 6605. In some embodiments, when the tag is a hide image tag, the GUI also removes the image from display and selects the next image in the collection to select and display. Other embodiments do not immediately remove a hidden image from the display, instead waiting for the user to first view a different image.

When the GUI is in state 6610 and the user selects a tag to apply, the GUI transitions to state 7210 to apply the selected tag to all of the currently selected images. The GUI then transitions back to the state 6610. Lastly, when the GUI is in state 6620 and the user selects a tag to apply, the GUI transitions to state 7220 to apply the selected tag to only the active image rather than all of the currently selected images. The GUI then transitions back to the state 6620.

Figure 73:
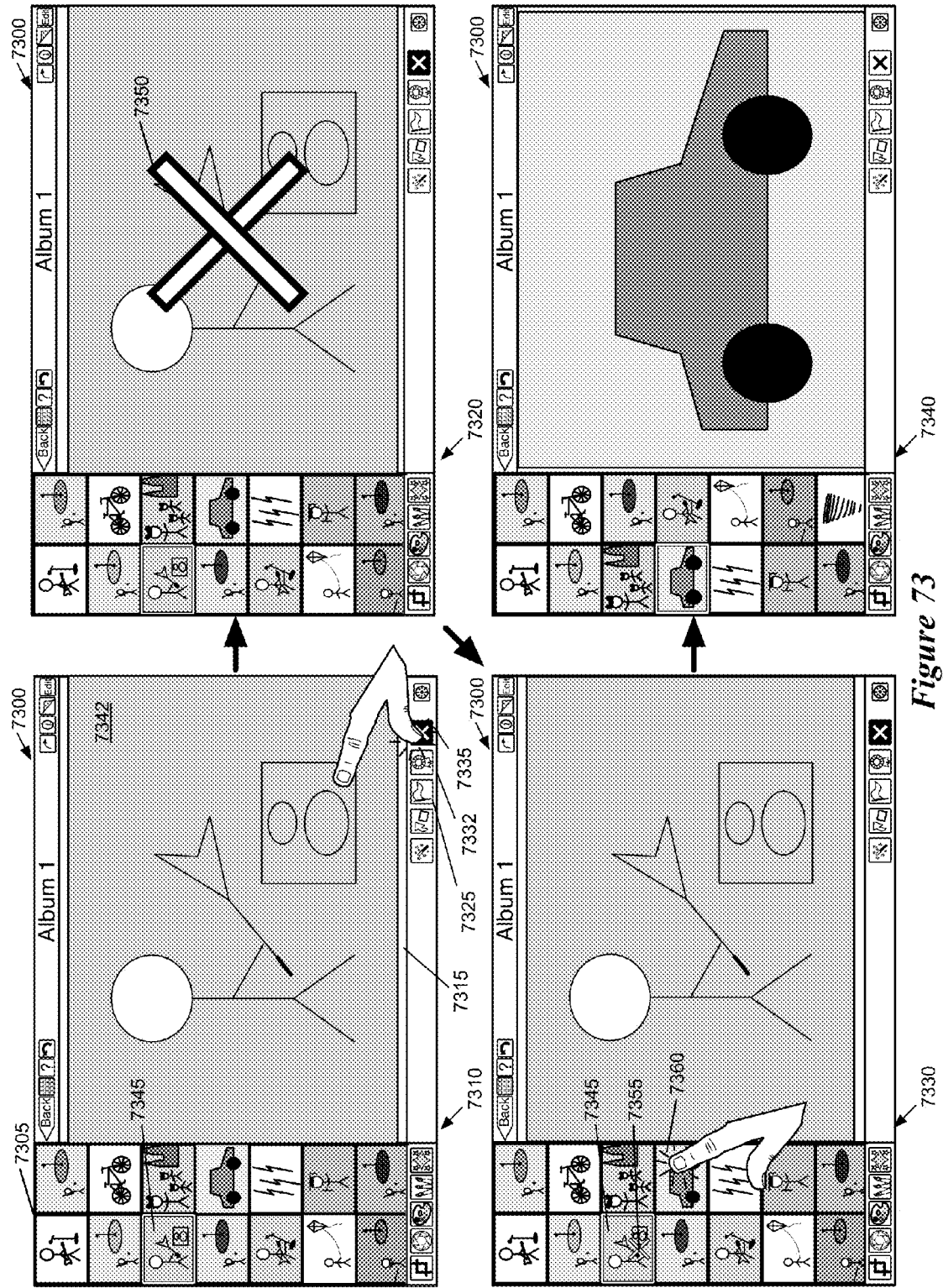
FIG. 73 illustrates the application of the hide image tag to an image.

FIGS. 73-78 illustrate the application of various tags to images within the image viewing application of some embodiments. FIG. 73 illustrates the application of the hide image tag over four stages 7310-7300 of a GUI 7300. The GUI 7300 includes an image display area 7305 and an image display area 7315, in addition to various sets of GUI items. These GUI items include a flag button 7325, a favorites button 7332, and a hide image button 7335.

In the first stage 7310, an image 7342 is displayed in the image display area 7315 and the corresponding thumbnail 7345 is selected. At this stage, the user selects the hide image button 7335, causing the button to become highlighted. In some embodiments, the application animates the application of the hide tag to an image. The second stage 7320 illustrates the animation used by some embodiments to indicate the application of the hide image tag to the image in the image display area. A hide image icon 7350 (an X) is shown as coming out of the image, then receding back into the image (i.e., to become a property of the image).

The third stage 7330 illustrates that the application marks the corresponding thumbnail 7345 of the hidden image 7342 with a hide icon 7355 (an X) overlaid on the thumbnail. In addition, at this stage, the user selects a different thumbnail 7360. The fourth stage 7340 illustrates that the image corresponding to the thumbnail 7360 is now displayed. In addition, the application has removed the thumbnail 7345 of the hidden image from the thumbnail display area 7305 and rearranged the thumbnails in the display area accordingly. As shown, in some embodiments, the application waits until the user has navigated to a different thumbnail to remove the hidden thumbnail from the displayed set of thumbnails.

Figure 74:
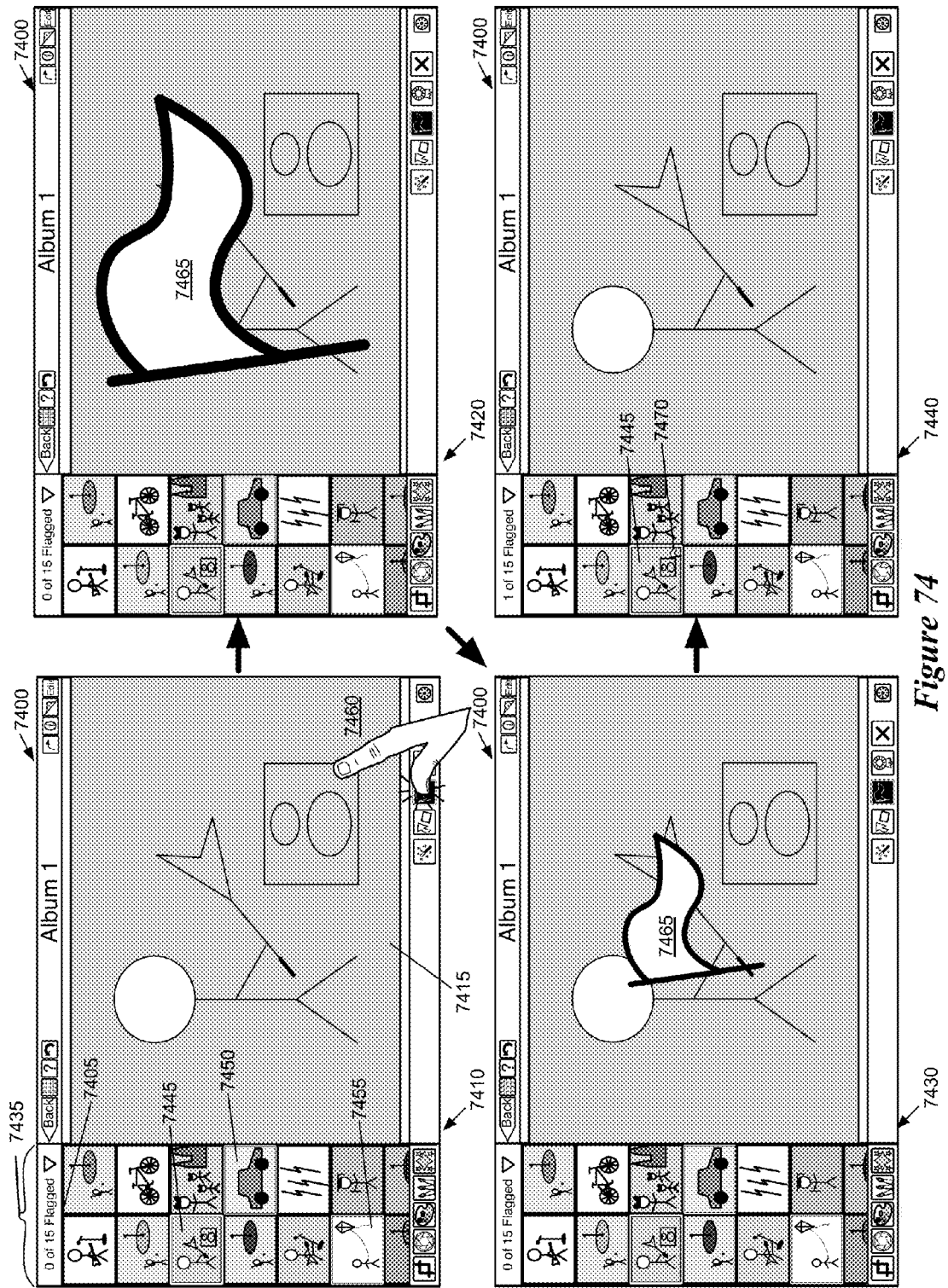
FIG. 74 illustrates the application of a flag image tag to an image.

FIG. 74 illustrates the application of a flag image tag over four stages 7410-7440 of a GUI 7400. The GUI 7400 includes the same features as the GUI 7300—a thumbnail display area 7405, an image display area 7415, and the various GUI items, including the flag button 7425. In addition, the GUI includes a tag filtering button 7435, which currently indicates that none of the fifteen images in the currently selected collection are tagged. This button 7435, in some embodiments, is used to identify which images in a collection the application should present within the thumbnail display area. At the moment, three images are selected (corresponding to thumbnails 7445-7455), but only one of the selected images (the image 7460) is displayed in the image display area.

At the first stage 7410, the user selects the flag button 7425, causing the button to become highlighted. In some embodiments, the application animates the application of the flag images tag to an image. Furthermore, as indicated above by reference to FIG. 66, when multiple images are selected and one of the selected images is active, the application applies tags to only the active image (in this case, the image 7460).

The second and third stages 7420 and 7430 illustrate the animation used by some embodiments to indicate the application of the flagged tag to the image in the image display area. The flag icon 7465 is shown as coming out of the active image, then receding back into the image (i.e., becoming a property of the image).

In the fourth stage 7440, the application displays a small flag icon 7470 over the thumbnail 7445, to indicate that this image is flagged. When displaying thumbnails in the thumbnail display area, some embodiments check the image data structure for the images in the collection in order to determine whether the images have any tags. If the flagged tag is present for the image, then the application displays the flag over the image's thumbnail. The flag button 7425 remains highlighted to indicate that the currently active image is flagged. In some embodiments, users can select the flag button when in this state in order to unflag the active image. In addition, at this stage, the tag filtering button 7435 now indicates that one of the fifteen images in the collection has been flagged.

Figure 75:
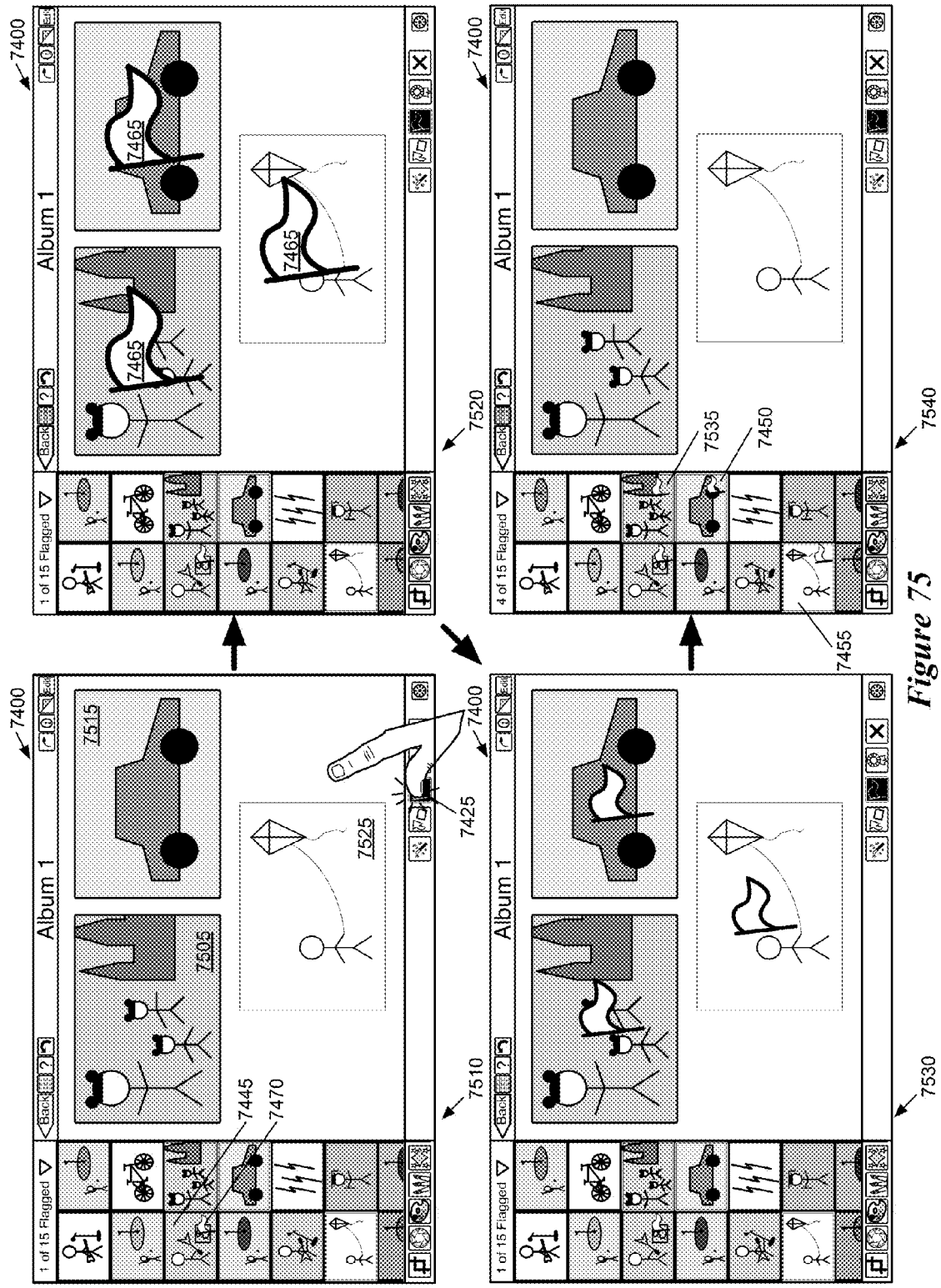
FIG. 75 illustrates the application of the flag image tag to multiple images.

FIG. 75 illustrates the application of the flag image tag to multiple images over four stage 7510-7540 of the GUI 7400. As shown, at the first stage 7510, a flag icon 7470 is displayed over the thumbnail 7445. The image display area, however, displays three selected images 7505, 7515, and 7525, and the thumbnails corresponding to these images are selected. At this stage, the user selects the flag button 7425. As indicated above by reference to FIG. 66, when multiple images are displayed in the image display area, the application applies tags to all of these selected images. In some embodiments, the application animates the application of the flag images tag to the images.

The second and third stages 7520 and 7530 illustrate the animation of some embodiments to indicate the application of the flag image tag to the images in the image display area. The application displays multiple instances of the flag image tag, with one instance shown coming out of each displayed image, then receding back into the image (i.e., becoming a property of the image).

In the fourth stage 7540, the application now displays a small flag icon 7570 over each of the thumbnails 7535, 7450, and 7455, to indicate that the images 7505, 7515, and 7525 are flagged. The flag button 7425 remains highlighted to indicate that the currently displayed images are all flagged. In addition, the tag filtering button 7435 now indicates that four of the fifteen images in the collection have had the flag tag applied.

Figure 76:
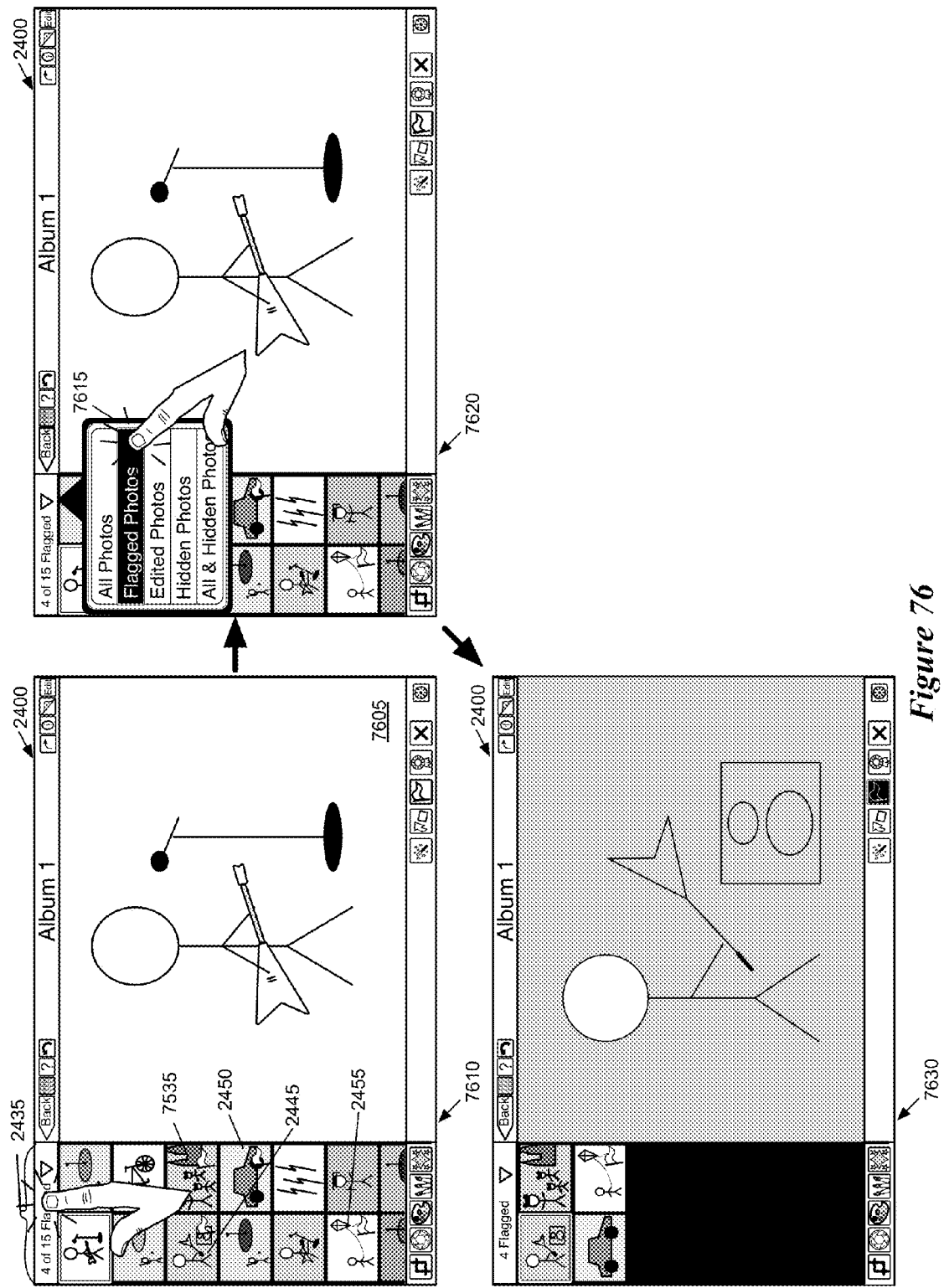
FIG. 76 illustrates the use of the tag filtering button.

FIG. 76 illustrates the use of the tag filtering button 7435 over three stages 7610-7630 of the GUI 7600. In the first stage 7610, the button 7435 indicates that four of the fifteen images are flagged, and the application displays flag icons over the four thumbnails 7445, 7535, 7450 and 7455. An unflagged image 7605 is currently displayed in the image display area, and therefore the application does not highlight the flag button 7425. In the first stage 7610, the user taps the button 7435.

As shown in the second stage 7620, this causes the display of a menu 7615. This menu allows the user to select between different sets of images within the selected collection based on the tags applied to the images. The options, as shown, are "All Photos" (which, in some embodiments, does not include the hidden photos), "Flagged Photos", "Edited Photos", "Hidden Photos", and "All & Hidden Photos". The flagged, edited, and hidden photos options cause the display of only images with those tags, while the all and hidden photos option makes the hidden images viewable along with the rest of the collection.

In the second stage 7620, the user selects the "Flagged Photos" option. The third stage 7630 illustrates the result of this selection, with the application displaying only the thumbnails 7445, 7535, 7450, and 7455 for the flagged images. Essentially, the application applies a filter to the images in the collection, with only the images that have the flagged tag making it through the filter. The application also now displays the image 7460, which is one of the tagged images, in the image display area.

Figure 77:
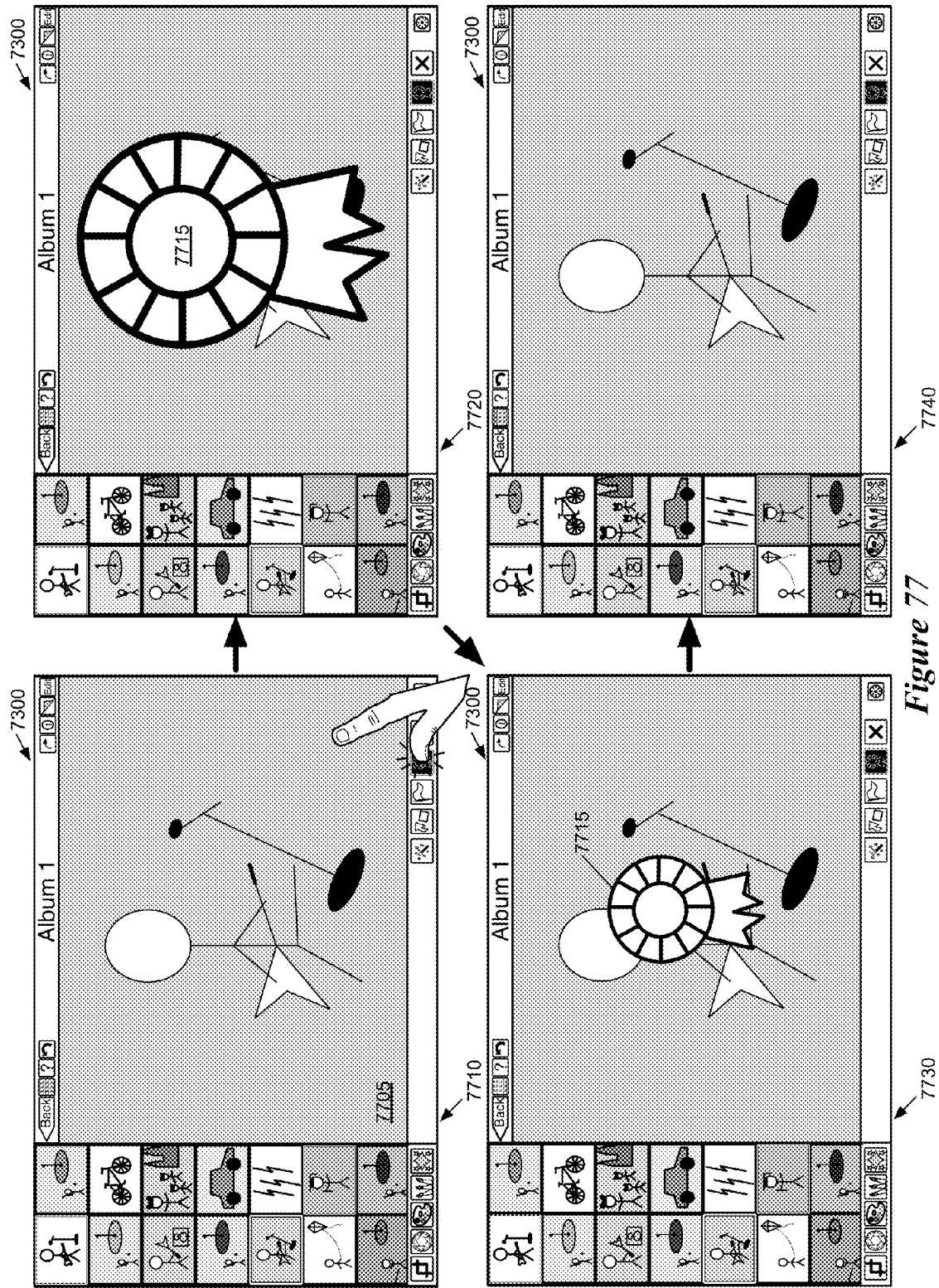
FIG. 77 illustrates the application of the favorites tag to an image.

FIG. 77 illustrates the application of the favorites tag to an image over four stages 7710-7740 of the GUI 7300, which is described above by reference to FIG. 73. In this case, the image 7705 is active as one of two selected images. At the first stage 7710, the user selects the favorites button 7332, causing the button to become highlighted. In some embodiments, the application animates the application of the favorites tag to an image. Furthermore, as indicated by reference to FIG. 66, when multiple images are selected and one of the selected images is active, (as is the case in this figure), the application applies tags to only the active image.

The second and third stages 7720 and 7730 illustrate the animation used by some embodiments to indicate the application of the favorites tag to the image in the image display area. The favorites icon 7715 is shown as coming out of the active image, then receding back into the image (i.e., becoming a property of the image).

In the fourth stage 7740, the favorites button 7332 remains highlighted to indicate that the active image is a favorite. As with the flagged image tag, users can select the favorites button when in this state in order to remove the favorites tag from the active image. In some embodiments, the application does not display an icon over the thumbnails to indicate which images are favorites (as shown in this figure). However, as will be described below, the application does keep a separate collection of favorite images and adds images tagged with the favorites tag to this collection.

In some embodiments, the application prevents an image from being tagged with both the favorites tag and the hide image tag. When a user selects the favorites button for an image tagged as hidden, the application applies the favorites tag while also removing the hide image tag. Similarly, when a user hides a favorite image, the application removes the favorites tag from the image.

Figure 78:
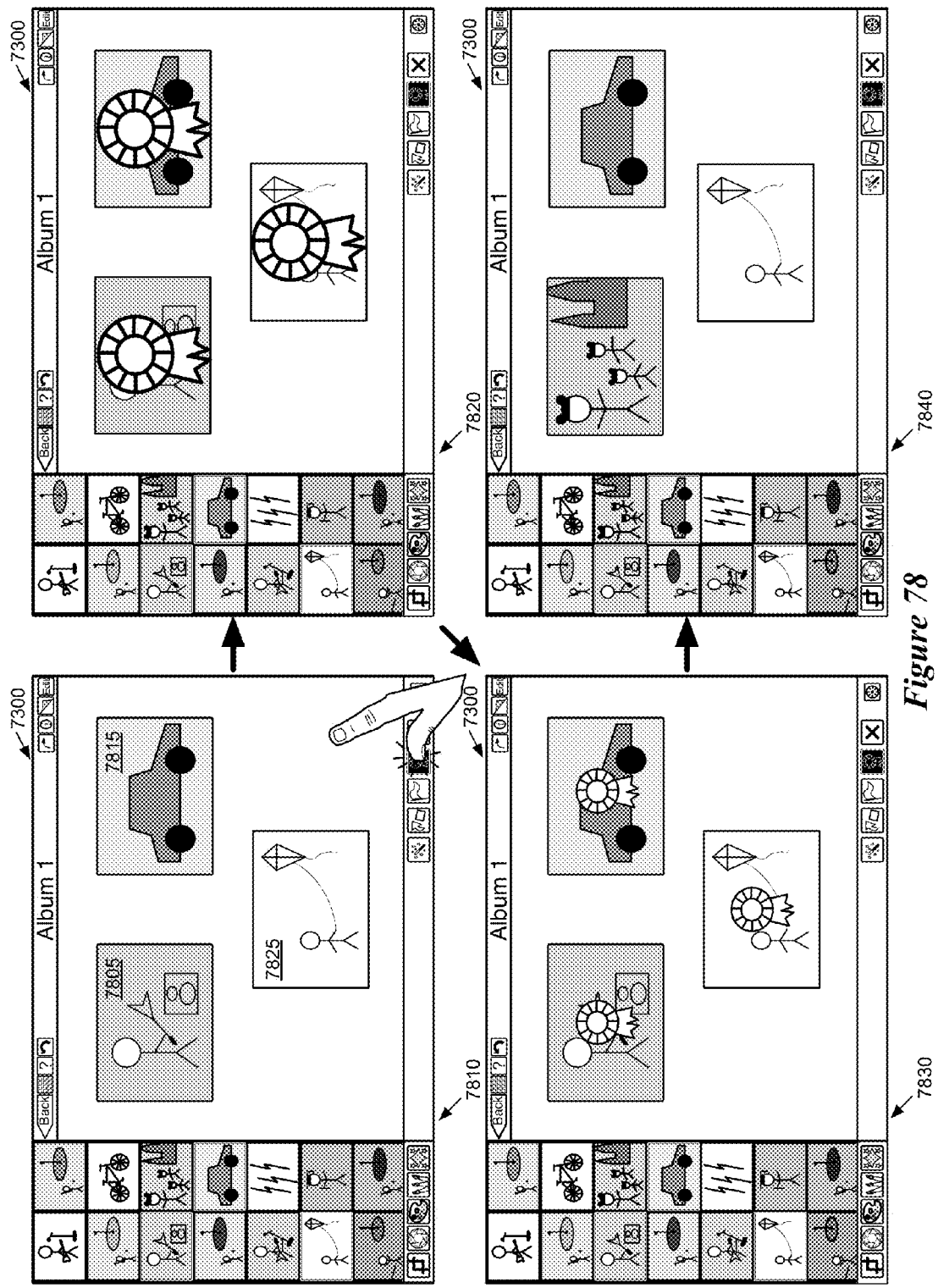
FIG. 78 illustrates the application of the favorites tag to multiple images.

FIG. 78 illustrates the application of the favorites tag to multiple images over four stages 7810-7840 of the GUI 7800. As shown, at the first stage 7810 the application displays the images 7805, 7815, and 7825 in the image display area, with the corresponding thumbnails selected. At this stage, the user selects the favorites button 7332. As indicated above by reference to FIG. 66, when multiple images are displayed in the image display area, the application applies tags to all of these selected images. In some embodiments, the application animates the application of the favorites images tag to the images.

The second and third stages 7820 and 7830 illustrate the animation of some embodiments to indicate the application of the favorites tag to the images in the image display area. The application displays multiple instances of the favorites tag, with one instance shown coming out of each displayed image, then receding back into the image (i.e., becoming a property of the image). In the fourth stage 7340, the favorites button 7332 remains highlighted to indicate that the selected images are marked as favorites. As in the above figure, the thumbnail display is not affected by the favorites tag.

As mentioned with reference to the favorites tag, some embodiments create separate collections for some or all of the tags that the application can apply to the images. In some embodiments, only a favorites collection is created, while other embodiments create collections for favorite images, flagged images, hidden images, and edited images, or some combination thereof.

Figure 79:
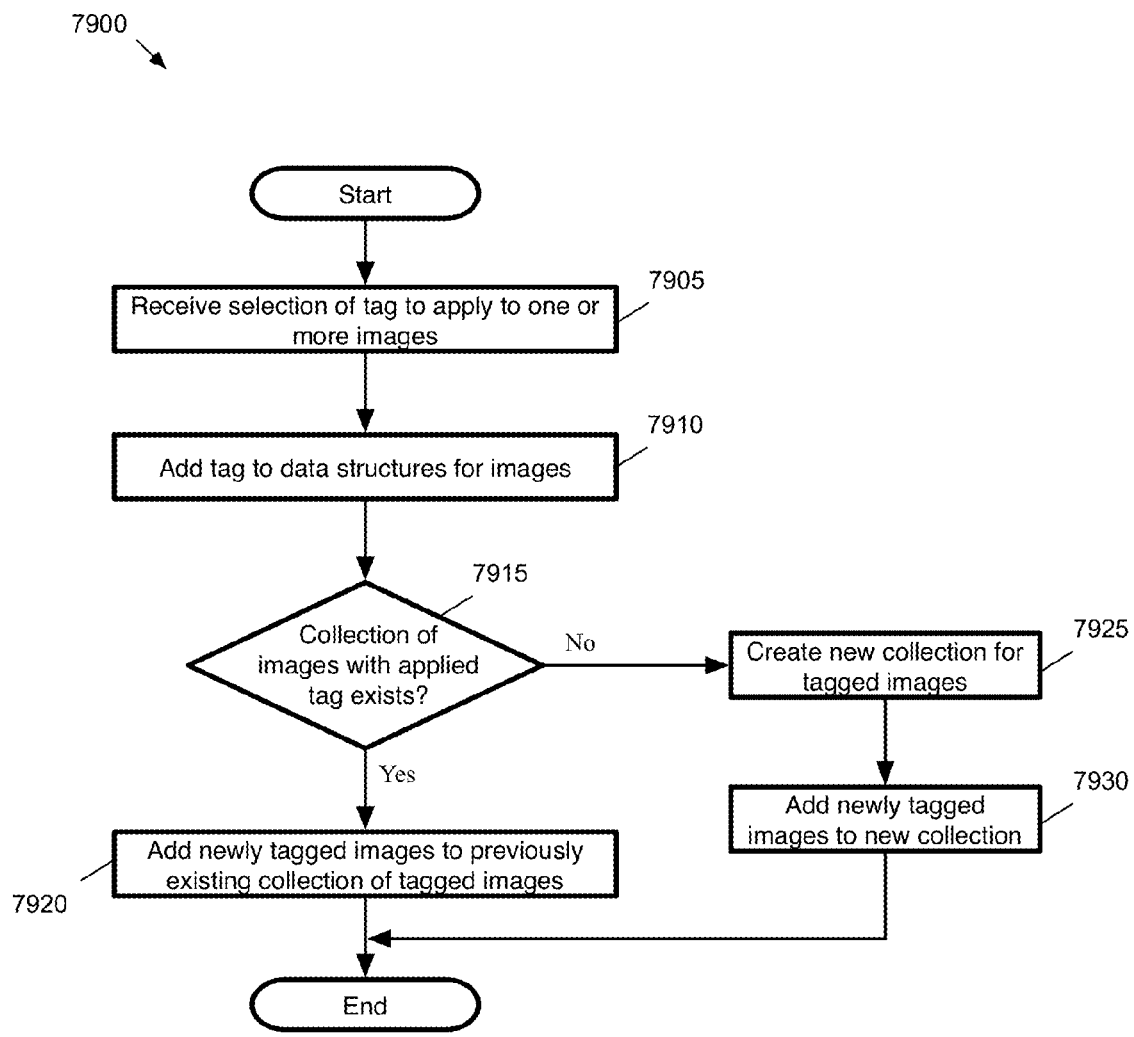
FIG. 79 conceptually illustrates a process performed by the application of some embodiments upon receipt of a tag to apply to an image.

FIG. 79 conceptually illustrates a process 7900 performed by the application of some embodiments upon receipt of a tag to apply to an image. As shown, the process 7900 begins by receiving (at 7905) a selection of a tag to apply to one or more images. In some embodiments, the selection of a tag may occur by the user selecting one of the tagging buttons (e.g., to flag an image, hide an image, or mark the image as a favorite) or by editing a previously unedited image.

The process then adds (at 7910) the selected tag to the data structures for the images. As shown above in FIG. 15, the data structure for an image stored by the application of some embodiments includes fields for any tags applied to the image. In some embodiments, to apply the tag the application switches the value of a variable for the particular tag from 0 to 1.

The process then determines (at 7915) whether a collection of images with the selected tag already exists. In some embodiments, the application does not create empty collections, and thus, e.g., the favorites album does not exist until at least one image has been marked as a favorite. Other embodiments, however, always store collections for each possible tag irrespective of whether the application has at least one image or is empty.

When the collection for the selected tag already exists, the process adds (at 7920) the newly tagged images to the previously existing collection of images with the particular tag. In some embodiments, the images are added to the collection at the end of the ordered series of images for the collection. In other embodiments, the application stores an overall order for the images (e.g. their order within the All Photos collection, and this order is maintained within the tagged images collection.

On the other hand, when the collection does not yet exist for the particular tag, the process 7900 creates (at 7925) a new collection for the tagged images. The process then adds (at 7930) the newly tagged images to the new collection. In some embodiments, the application creates a new collection data structure for the particular tag, with a name such as "Favorites". The application then adds references to the image data structures for the newly tagged images to the newly created data structure. In some embodiments, the different collections of tagged images appear as albums.

Figure 80:
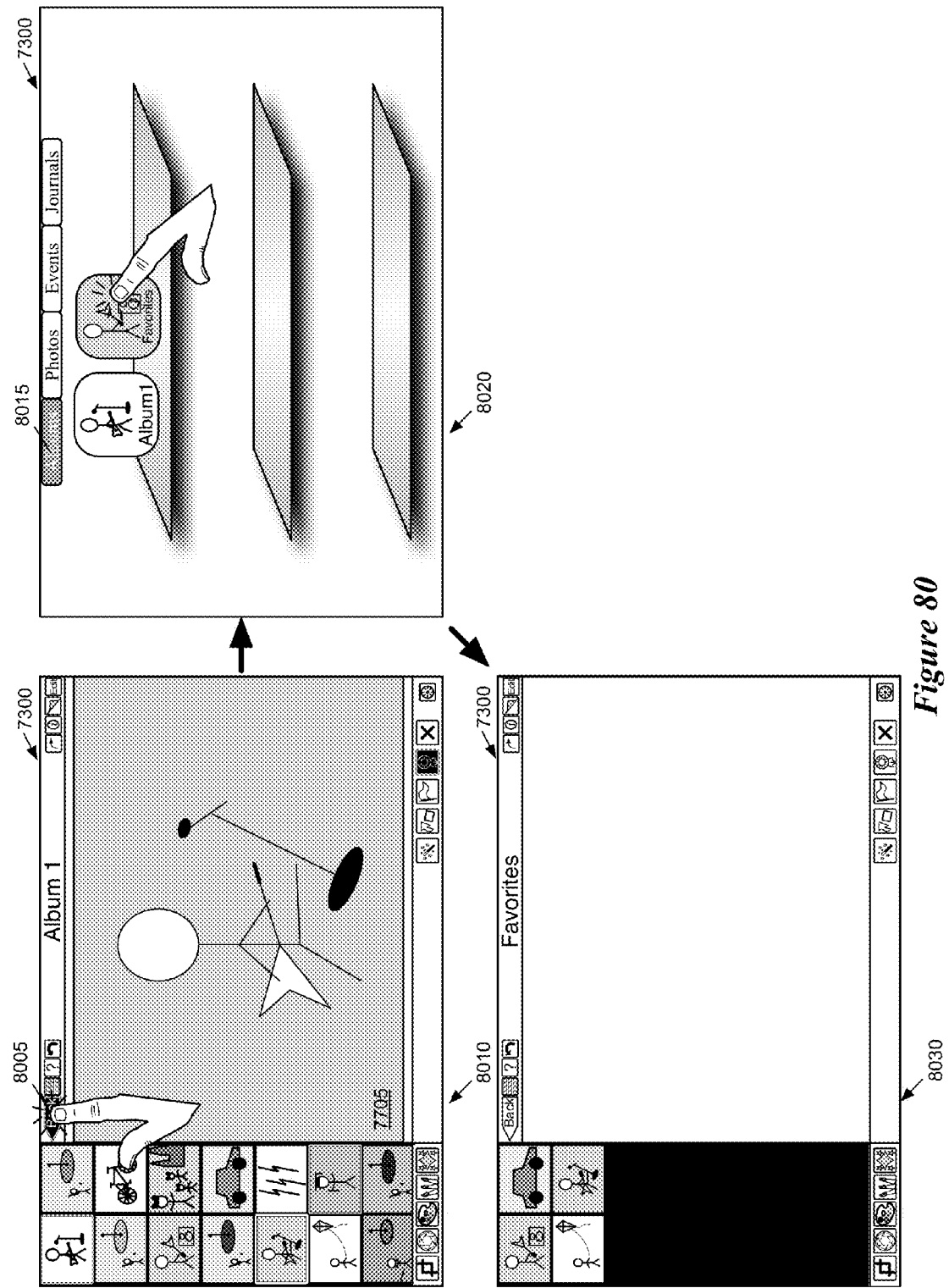
FIG. 80 illustrates a user navigating from an album to a collection of favorite images.

FIG. 80 illustrates a user navigating from an album to the collection of favorite images over three stages 8010-8030 of the GUI 7300. In the first stage 8010, the application displays the image 7705, to which the favorites tag has been applied, as indicated by the highlighted favorites button 7735. Also at this stage, the user selects the back button 8005.

As a result, the second stage 8020 illustrates that the application now displays a collection organization GUI 8000, with the albums tab 8015 highlighted. The application currently stores two albums, "Album 1" and the Favorites album. As shown, the user selects the Favorites album at this stage. The third stage 8030 illustrates the GUI 7300 with the Favorites as the selected collection. As only four images have been marked as favorites, the collection only includes these four images. In some embodiments, when a user views the favorites album, selects an image, and then selects the (highlighted) favorites button, the application not only removes the favorites tag from the selected image, but also removes the image from the favorites collection and no longer displays the image (such that the tag functions like a hide image tag for the specific collection).

C. Viewing Image Information

In some embodiments, a user may wish to view information about one or more images. Some embodiments provide a GUI item (or provide a keyboard shortcut, a menu option, etc.), the selection of which causes the image viewing application to present information about the image. In some embodiments, the application stores this information in the data structure for the image or uses information from the data structure to access the displayed information. When multiple images are selected and displayed in the image display area, some embodiments display separate information for each of the selected images, while other embodiments display only the information that all of the selected images have in common.

Figure 81:
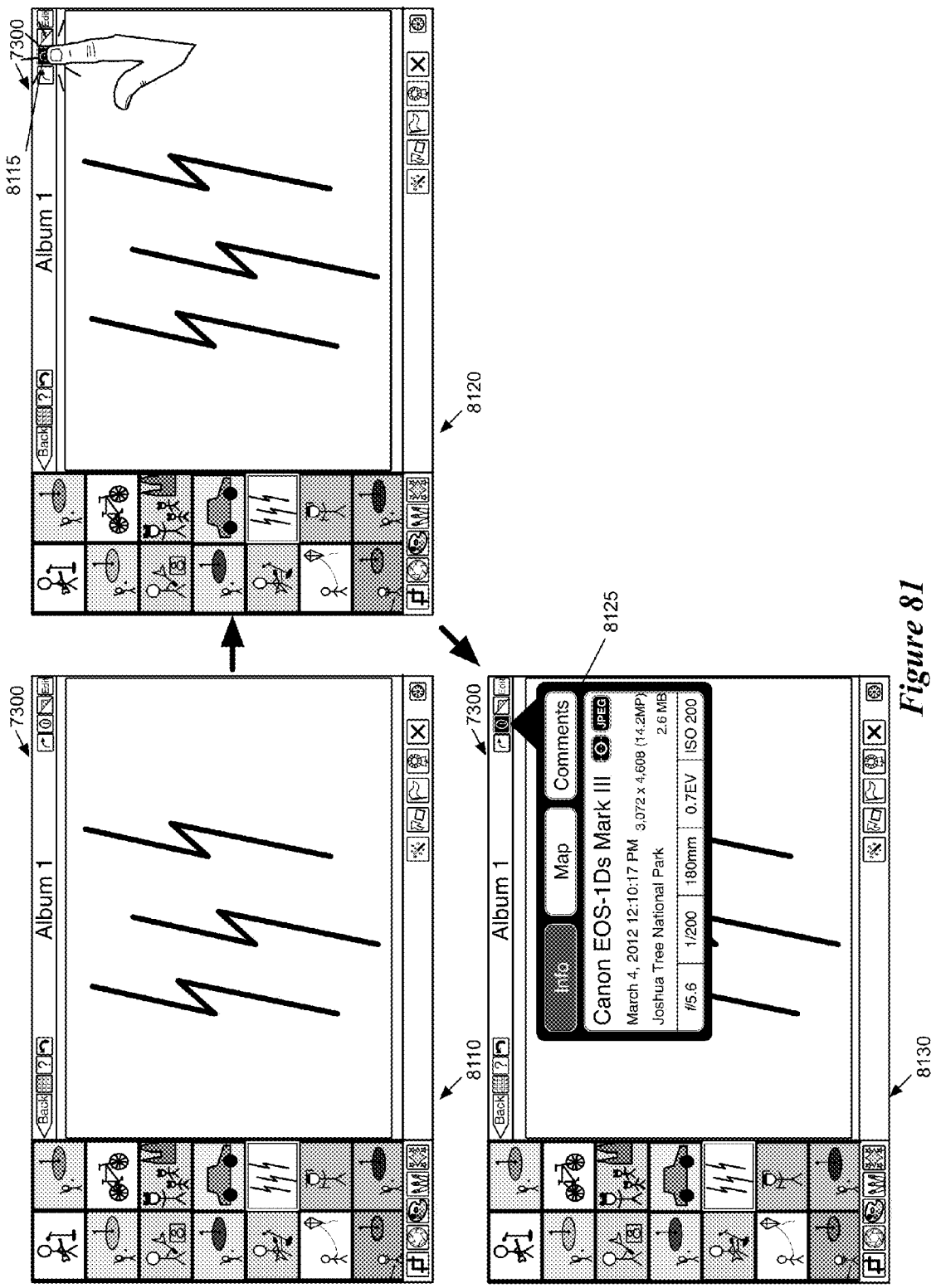
FIGS. 81-83 illustrate the access of image information for one or more images in the GUI.

FIG. 81 illustrates the access of such information in the GUI 7300 for an image 8105 over three stages 8110-8130 according to some embodiments of the invention. As shown, at the first stage 8110, the application currently displays the image 8105. In the second stage 8120, the user selects the information button 8115.

The third stage 8130 illustrates the information window 8125 that appears when the user selects the information button 8115. As shown, the window 8125 has three tabs: an info tab, a map tab, and a comments tab. The info tab displays information about the selected image, primarily using Exif data. When the image has GPS data, the user can select the map tab in order to view a map showing the location at which the image was captured. In some embodiments, the application uses the GPS data to access a database of map data and downloads a particular region of map data around the GPS location. This database may be either a database local to the device running the application or a remote database accessed through a network, such as the Internet. The comments tab, as will be described below in Section VI, can be used to view others' comments on the image when the image has been uploaded to a social media or photo sharing website, as well as make additional comments on the shared image.

Within the info tab, the application of some embodiments displays the device with which the image was captured (Canon EOS-1Ds Mark III), the type of image file used to store the image data (JPEG), the resolution (3072×4608) and file size (2.6 MB) of the image, the time and date the image was captured (Mar. 4, 2012 at 12:10:17 PM), and the location at which the image was captured (Joshua Tree National Park). In some embodiments, the location is automatically resolved based on GPS data, while in other embodiments the user enters this data. At the bottom of the window 8125, the application displays camera settings information, including the aperture (f/5.6), shutter speed (1/200), focal length (180 mm), exposure (0.7EV), and film speed (ISO 200).

Figure 82:
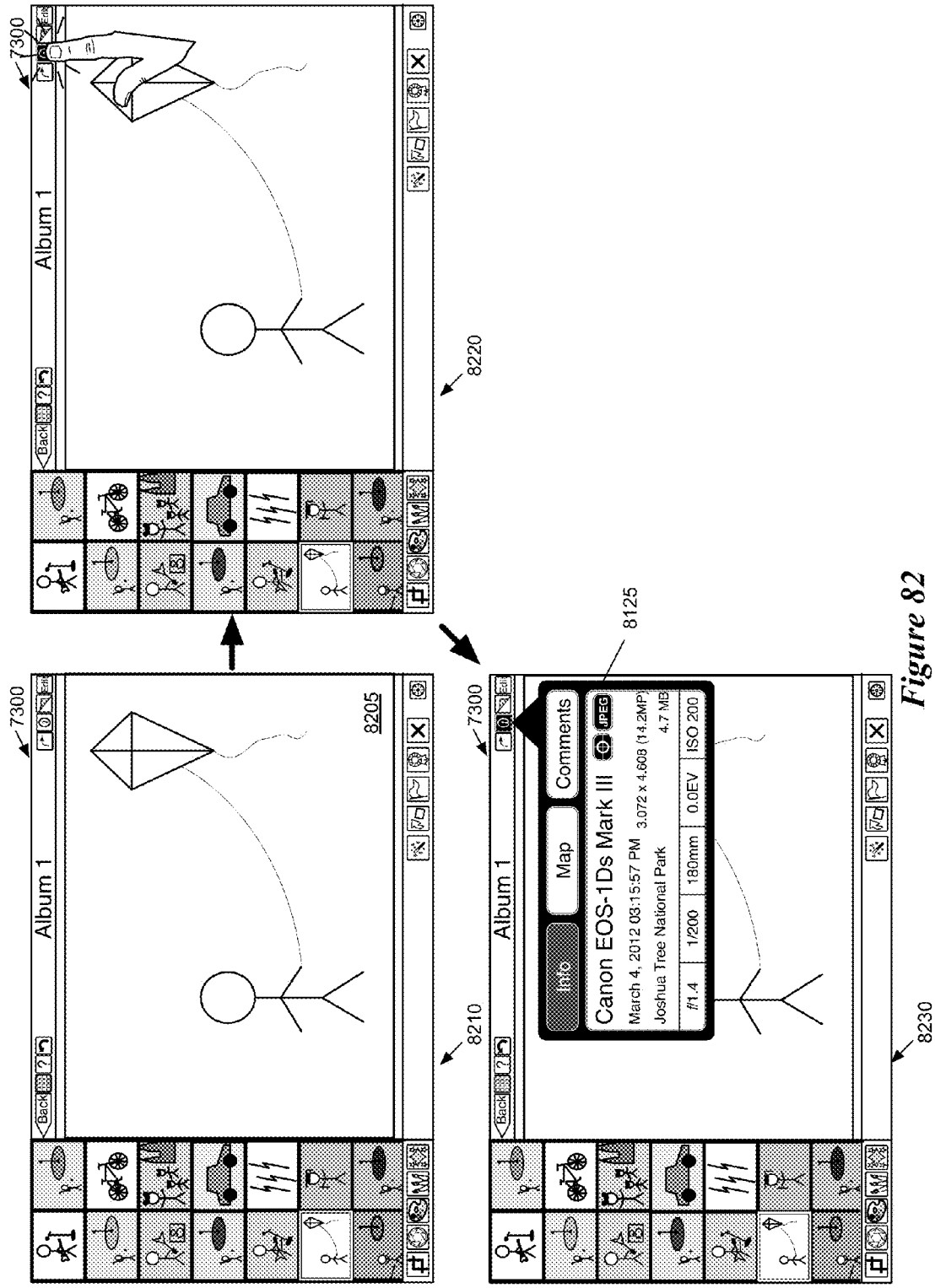

FIG. 82 illustrates a user accessing information for an image 8205 in the GUI 7300 over three stages 8210-8230 according to some embodiments of the invention. With the exception of the different image 8205 in the image display area, the first two stages 8210 and 8220 are the same as shown above for FIG. 81. In the third stage, the information window 8125 displays different values for the information, as some of it differs from that of image 8105. For example, the timestamp (3:15:57 PM) is later on the same day, and the file size as well as some of the camera settings are different.

Figure 83:
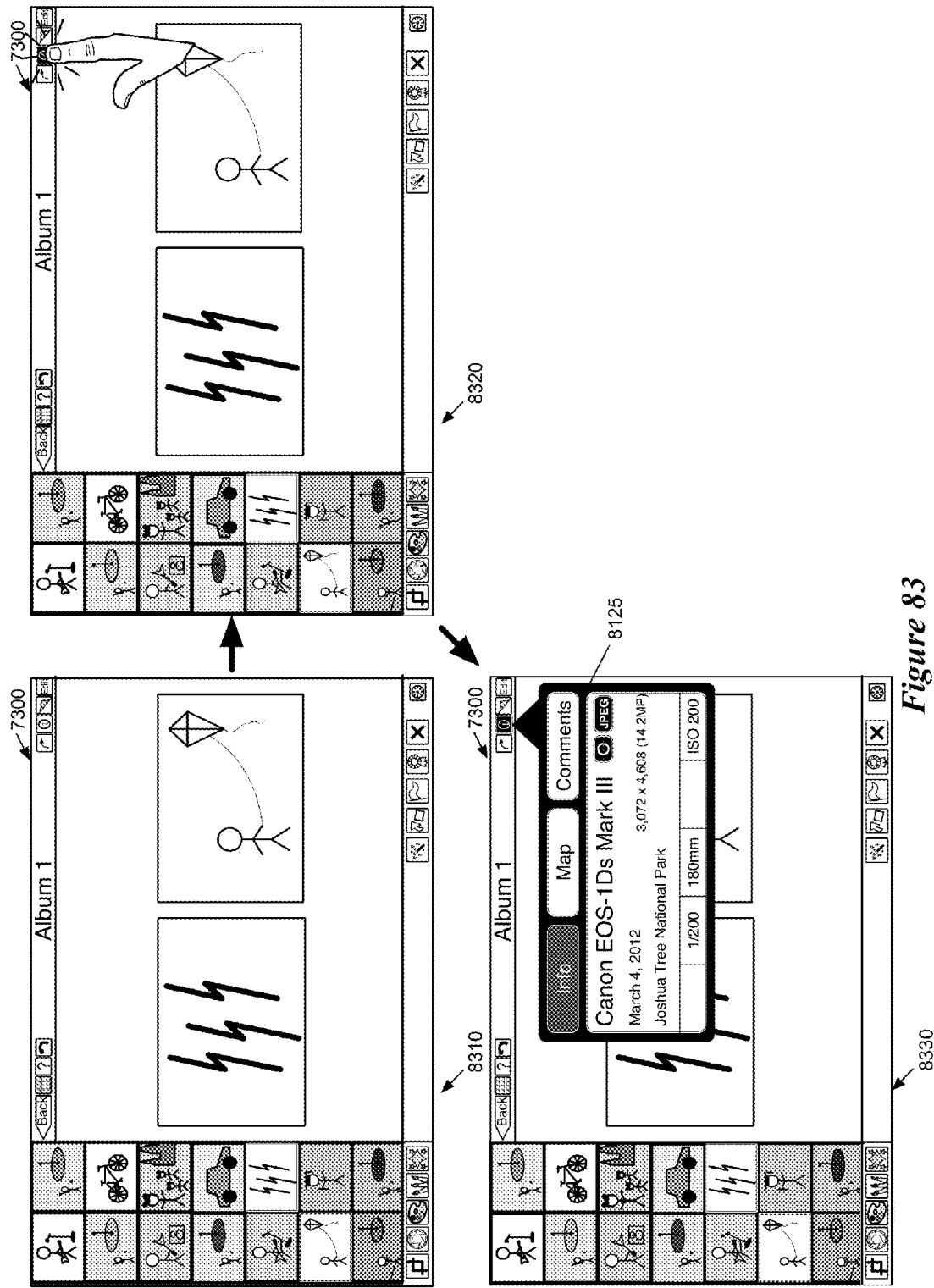

FIG. 83 illustrates the selection of the information window with both of the images 8105 and 8205 selected over three stages 8310-8330 of the GUI 7300. Again, the first two stages of the figure are similar to those of the previous two figures, except that in this case the application displays both images 8105 and 8205 in the image display area. In the third stage 8330, the information window 8125 only displays information that all of the selected images have in common. In this case, the images are both JPEG files with 14.2 MP, but have different file sizes (which are therefore not shown). Furthermore, both of the images' GPS data resolves to Joshua Tree National Park, and while the timestamps are different, both images were captured on March 4 (at different times). In the image settings, the shutter speed, focal length, and film speed settings were the same for the two images, but because the photographer had different settings between the two images for the aperture and exposure compensation, the application does not display this information.

VI. Sharing Images

As briefly mentioned in the previous section, some embodiments allow the user to share images directly from the image editing, viewing, and organizing application by uploading the images to a social media or photo sharing website through the user's account on the site. When the user requests to share the image, the application instructs the device on which it operates to connect to the website (e.g., through the Internet), then automatically uploads it to the user's account on the website. In some embodiments, the application additionally identifies when other users of the website have commented on the image, and displays these comments to the user of the application.

Figure 84:
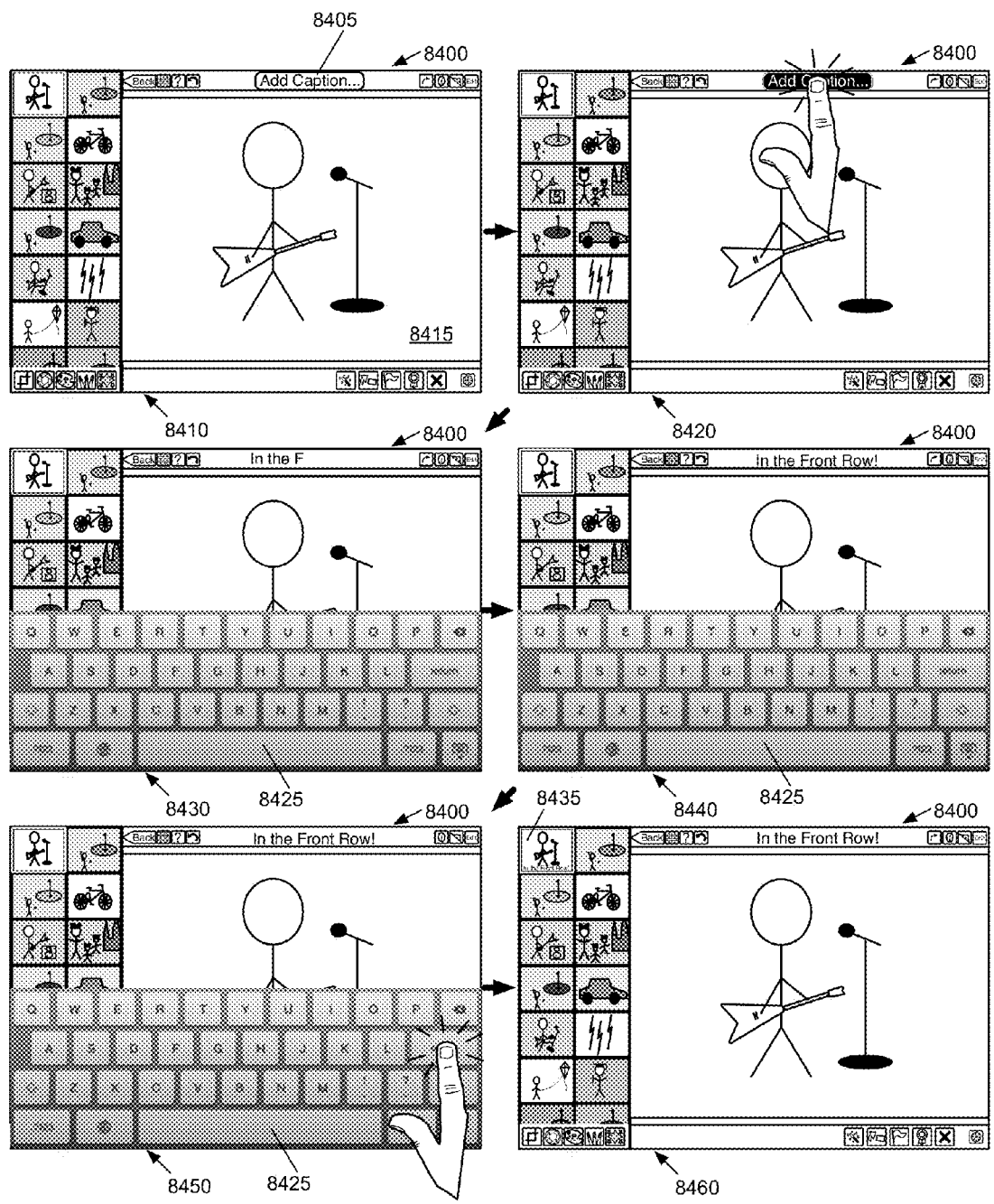
FIG. 84 illustrates a user adding a caption to an image.

Some embodiments provide the functionality for a user to add a caption to the image. When a user wants to share an image on a photo hosting website, the user may wish to have a caption with the image. In some embodiments, the user can add this caption within a dialog for sharing the image to the website, in addition to or as an alternative to using the caption stored for the image within the application. Within the application, this caption is stored in the data structure for the image, as shown in FIG. 15 above. FIG. 84 illustrates a user adding a caption to an image over six stages 8410-8460 of a GUI 8400. The GUI 8400 is similar to the previous GUIs (e.g., GUI 3500), but also includes an add caption button 8405 at the center of the top toolbar. In the first stage 8410, the application displays a selected image 8415 in the image display area.

In the second stage 8420, the user taps the add caption button 8405 in order to add a caption to the selected image 8415. The third stage 8430 illustrates that the application overlays a touchscreen keyboard 8425 over some or all of the touchscreen in order for the user to enter a caption. In some embodiments, the keyboard is provided by the operating system of the device, and the application sends a request for the keyboard to the operating system when the user provides the input to add a caption.

In addition, in some embodiments the touchscreen device can be connected to a separate keyboard that the user may use to enter the caption. Furthermore, one of ordinary skill in the art will recognize that the image viewing application might operate on a non-touchscreen device with which the user interacts using a cursor controller (or other device) in order to select the add caption button and then a keyboard to type in the caption.

The third and fourth stages 8430 and 8440 illustrate the GUI 8400 as the user types in a caption "In the Front Row!" for the image 8405. As the user types, the caption appears in the upper header area above the image display area. In the fifth stage 8450, the user selects the "return" button on the keyboard in order to complete the caption. The sixth stage 8460 illustrates the GUI 8400 after the user has entered the caption. The application now displays the caption atop the image instead of the add caption button. In addition, the application overlays the caption in small text over the thumbnail 8435 The application will now have stored the entered caption with the data structure for the image 8415.

Figure 85:
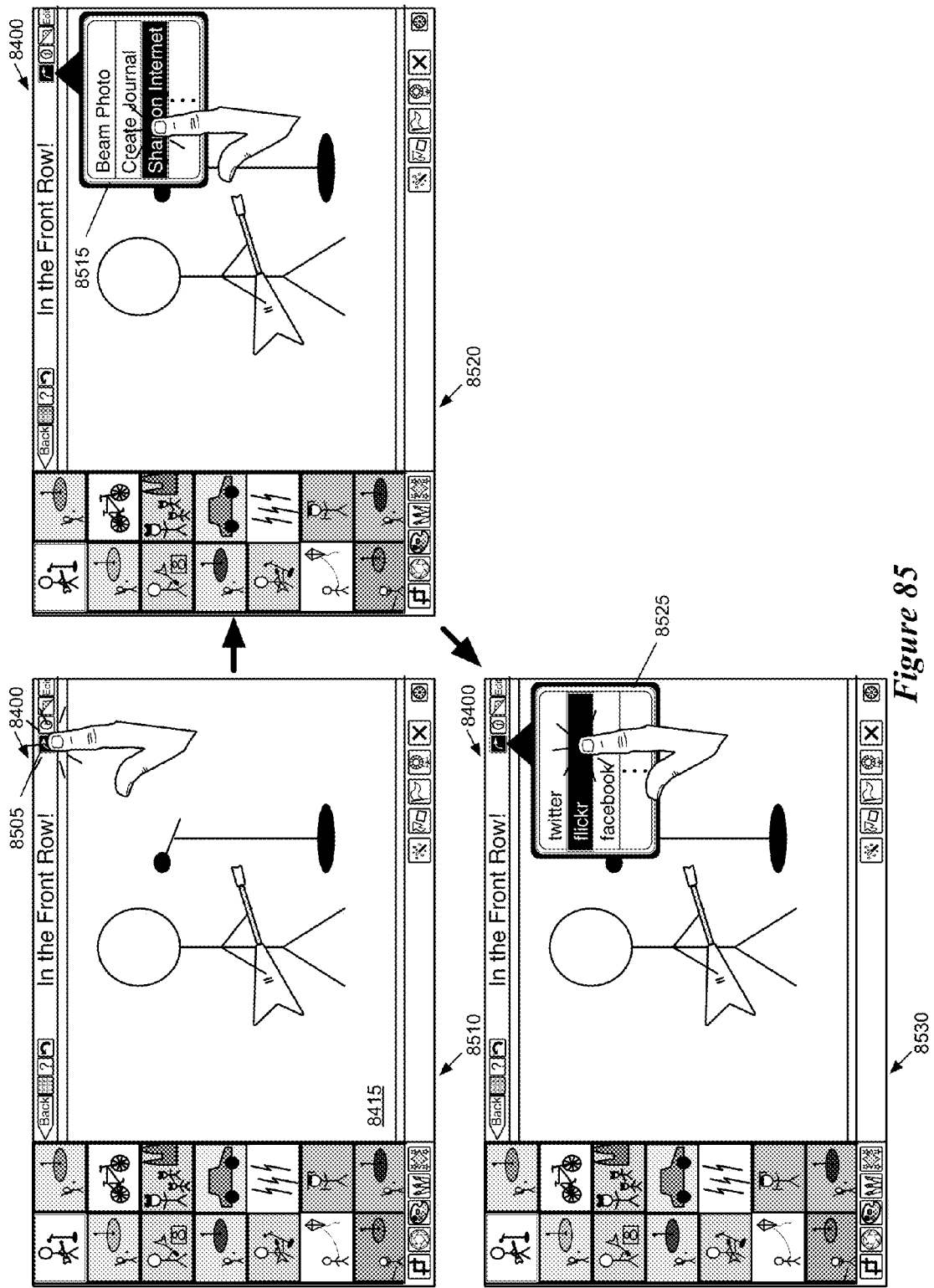
FIG. 85 illustrates user interaction with a GUI in order to share an image via a social media site according to some embodiments.

As stated, whether or not an image has a caption, in some embodiments a user can use the image viewing and editing application to upload the image to a social media or photo sharing website. FIG. 85 illustrates user interaction with the GUI 8400 in order to share the image 8405 via the social media site Facebook® according to some embodiments. In the first stage 8510, the user selects the sharing button 8505, which provides options for sharing selected images in a variety of manners. As shown in the second stage 8520, the application displays a sharing menu 8515 with the options to beam the image, create a journal using selected images, and share the image on the Internet. In some embodiments, beaming an image entails directly sharing the image with another device on the same local network (e.g., a Bluetooth network, a Wi-Fi network, etc.). A journal, in some embodiments, is a shareable arrangement of a set of images to which users can add text notes, graphics, and other information.

In the second stage 8520, the user selects the "Share on Internet" option. The third stage 8530 illustrates that the application now displays a new menu 8525 with three photo sharing website options (Twitter®, Flickr®, and Facebook®), although other embodiments may include different websites to which users can share images. In this example, the user selects the Facebook® option in order to share the image to their Facebook® account. At this point, the application begins attempting to upload the image to the user's Facebook® account.

In some embodiments, the different social media/photo sharing websites are part of the menu 8515, along with creating a journal, beaming an image, and various other sharing options. In addition, after a user selects the website with which to share the image, the application then provides options for the user to choose which images (i.e., the selected image or images, all the images in the current album, a new set of images from the current album, etc.) to upload to the photo sharing website.

Figure 86:
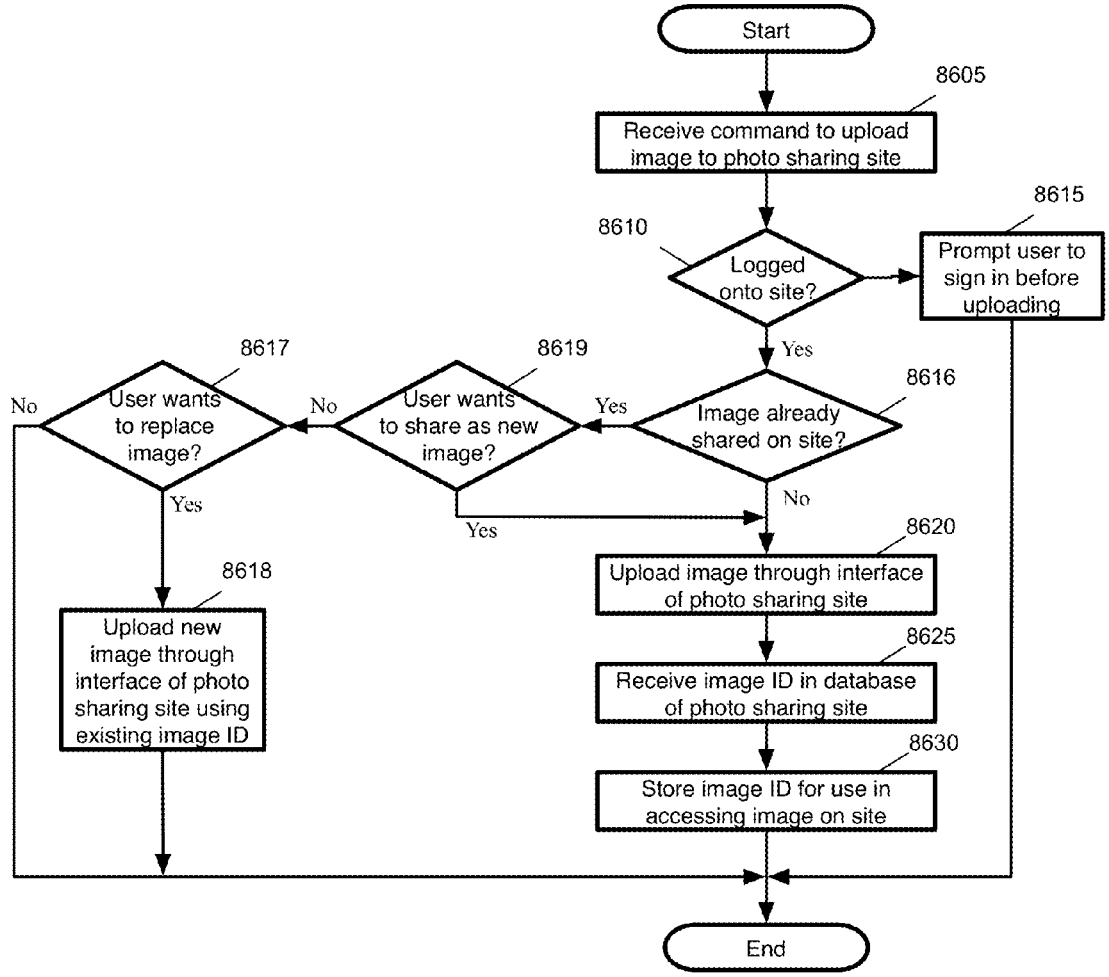
FIG. 86 conceptually illustrates a process of some embodiments for sharing an image via a social media or photo sharing website.

FIG. 86 conceptually illustrates a process 8600 of some embodiments for sharing an image via a social media or photo sharing website. While FIG. 86 refers to a "photo sharing" site, this could be a site specifically designed for photo sharing, such as Flickr®, or a broader social media website such as Facebook® or Twitter®. As shown, the process 8600 begins by receiving (at 8605) a command to upload an image to a photo sharing website. The application may receive this command through the set of user interactions shown in FIG. 85, or through a variation thereof.

The process then determines (at 8610) whether a user account is logged onto the selected photo sharing site from the device on which the application operates. Some embodiments of the application operate on a device that includes specific applications for different social media and photo sharing sites through which the device automatically logs on to the website as necessary. In this case the application will not have an issue with logging onto the website. In other embodiments, the user has to affirmatively log on (either through an site-specific application or through a web browser) to the sites.

When the user is not logged on, the process 8600 prompts (at 8615) the user to sign in to the website before uploading the image, then ends. Once the user logs on, the application again begins the process 8600. In some embodiments, the image viewing application displays an interface through which the user logs on to the website, while other embodiments require the user to switch to a different application (e.g., a dedicated application for the site or a web browser) in order to log on.

When the user has logged on to the requested photo sharing site, the process determines (at 8616) whether the image has already been uploaded to the site. In some embodiments, the application checks the data structure for the image to determine whether an image ID is already stored for the image for the particular photo-sharing website. In addition, some embodiments determine whether the image still exists on the website, by querying the website database. Some embodiments perform this check for some websites but not others.

When the image is already shared, the process 8600 then determines (at 8619) whether the user wants to share the image as a new image. The user might want to add the image to a different album within the photo-sharing website. In addition, the user might have edited the image, and wants to add the edited image as a new image (e.g., to show the image both before and after editing. When the user adds the image as a new image, the process proceeds to 8620, described below.

Otherwise, the process also determines (at 8617) whether the user wants to replace the uploaded image on the photo sharing site. For instance, the user might have edited the image and wants to replace the shared image with the new version. To implement operations 8619 and 8617, some embodiments provide a prompt to the user, that allows the user to choose whether to cancel an upload, share an image as a new image, or replace the existing version of the image on the photo-sharing site. When the user does not want replace the image or share a new image, the process ends without uploading the image.

When the user wants to replace a shared image, the process uploads (at 8618) the new image through the interface of the photo sharing site using the existing image ID for the image to be replaced, then ends. When the image is not yet shared, then the process uploads (at 8620) the image through the interface of the photo sharing site. In some embodiments, the image viewing and editing application uses the site-specific application (e.g., a Facebook® application) on the device to perform the upload operation. In other embodiments, the application transacts with the website itself. In order to upload the image, some embodiments generate a full-size image with the edit instructions applied (as described above, some embodiments store only the original full-size image along with edit instructions for generating an edited image from the original).

After uploading the image through the interface of the photo sharing site, the process 8600 receives (at 8625) an ID for the uploaded image in the database of the photo sharing site. The process stores (at 8630) the image ID for use in accessing the image on the web site, then ends. This image ID enables the application to contact the website and request information about the uploaded image (e.g., in order to download the comments). In some embodiments, the application stores the image ID in the image data structure, as shown above by reference to FIG. 15.

Figure 87A:
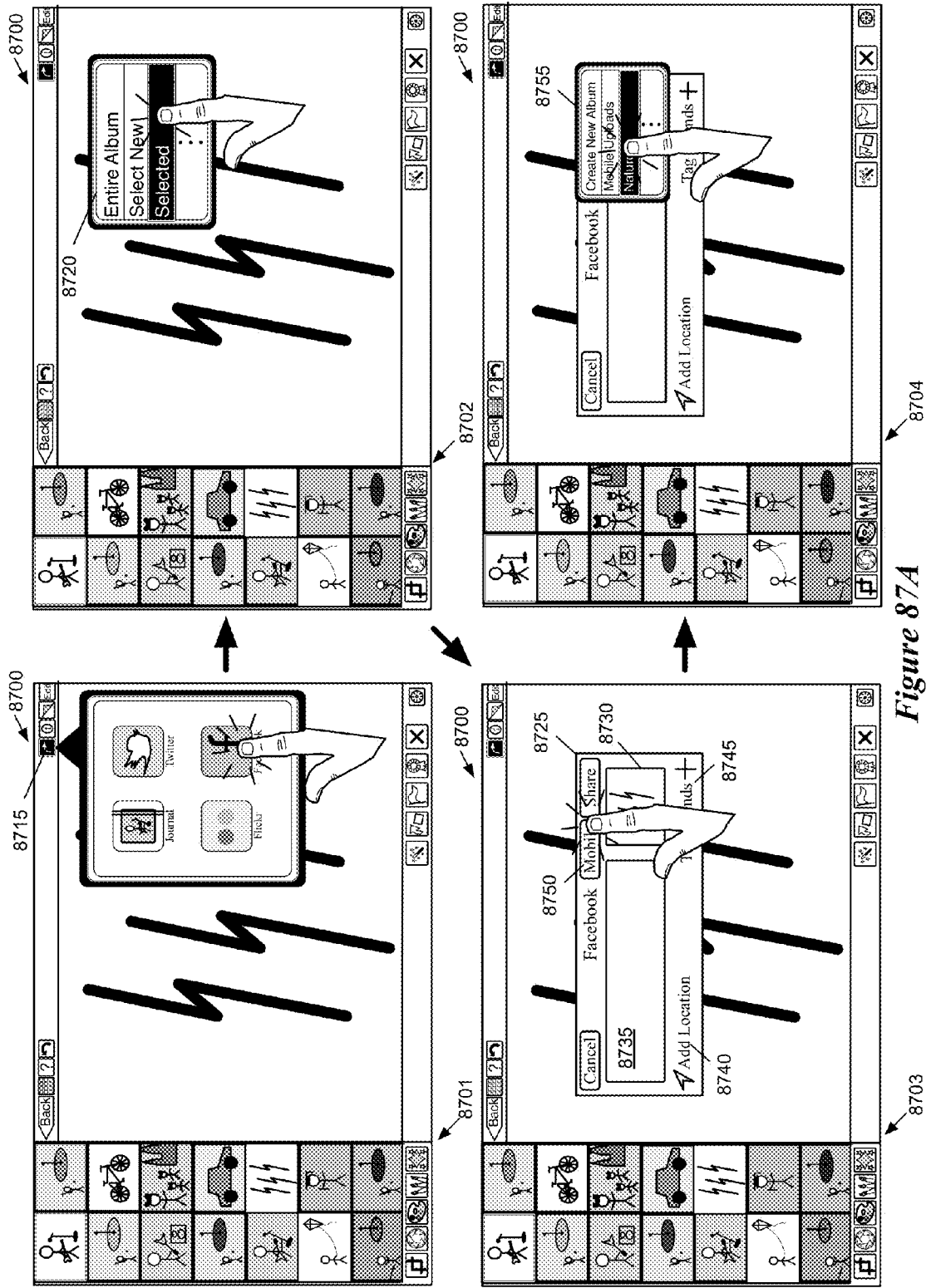
Figure 87B:
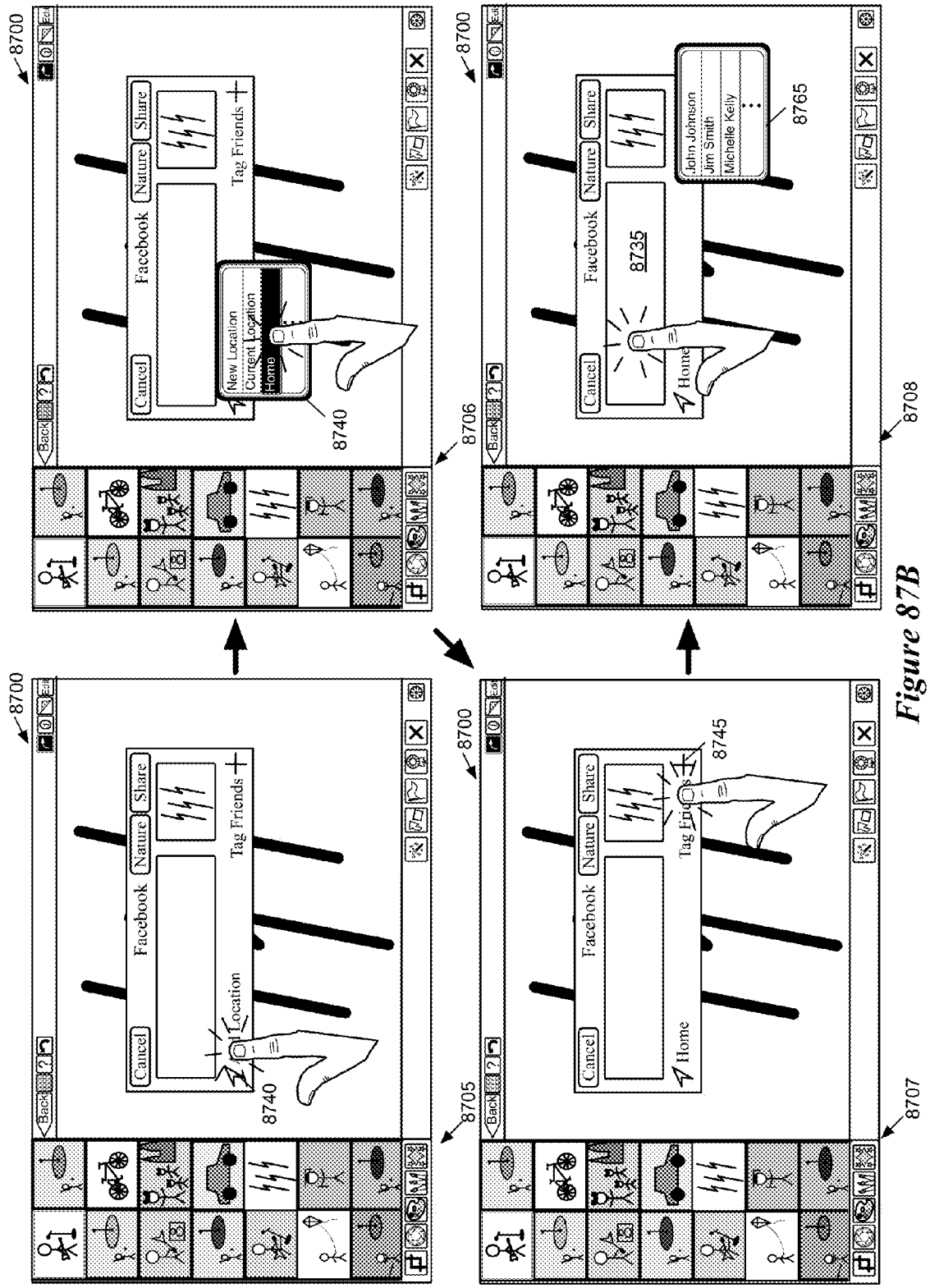

In the process 8600 of some embodiments, when the user chooses to upload an image, the application automatically uploads the image to the photo-sharing website without any further interaction. However, some embodiments allow the user to further customize the upload. FIGS. 87A-87C illustrate a user uploading an image to Facebook® over ten stages 8701-8710 of the GUI 8700. The GUI 8700 is similar to the previously shown GUI 8400 of some embodiments, including a sharing button 8705. The first stage 8705 illustrates that the user has already selected the sharing button 8715, causing the application to display a menu of various different sharing options. In this case, the menu includes several icons, for various different photo-sharing/social media websites, as well as creating a journal. In some embodiments, this menu includes additional sharing options such as beaming the image to another device, e-mailing the image, etc. As shown, the user selects the "Facebook" icon at stage 8701.

The selection of this option causes the application to display an additional menu 8720 in the GUI 8700 at the second stage 8702. This menu 8720 allows the user to determine which images should be shared. The user can select to share the entire album currently displayed in the thumbnail display area, the presently selected images, or a third option to select new images, which in some embodiments brings up a dialog box through which the user can select a set of images from the current album (or different albums, in some such embodiments) for sharing. In this case, the user chooses to share the one selected image.

In the third stage 103, the GUI 8700 now includes an image-sharing dialog box 8725 that enables the user to customize the upload of an image to the particular selected photo-sharing website (in this case, Facebook®). The dialog box 8725 includes a thumbnail image 8730, a caption box 8735, an add location item 8740, and a friend tagging item 8745. In some embodiments, when a user shares multiple images, the application displays these items for each image selected for sharing. In addition, the dialog box 8725 includes a cancel option and a share option, enabling the user to cancel the sharing operation or begin actually uploading the images, respectively. Finally, the dialog box 8725 includes an album selection button 8750, that enables the user to select between different albums on the photo-sharing website (as opposed to albums within the image viewing and editing application) as destinations for the shared images. As shown, in the third stage 8703, the user selects the album selection button 8750.

This selection results in the display of a menu (or picker) 8755 from which the user can select different albums in the fourth stage 8704. In some embodiments, the application (or the device on which the application operates) logs into the user's account on the photo-sharing website (necessary to upload the images, as described above), and retrieves a list of the different albums the user has created on the website. When the user selects button 8750 (or its equivalent), the application displays a list of the user's albums, as well as an option to create a new album. Some embodiments pre-populate the picker with a particular number of the most recent albums that the user has either created or uploaded images to. In this case, the user selects the "Nature" album option, so that the photo of lightning will be uploaded to this album on Facebook®.

In the fifth stage 8705, the user selects the add location item 8740. As shown in the sixth stage 8706, this selection results in the display of a menu (or picker) 8760 from which the user can select different locations with which to tag the image. In some embodiments, the application (or the device on which the application operates) retrieves a list of different locations with which the user has previously tagged images on the photo sharing website. As shown, the menu 8760 includes options to choose a previously created "Home" location, a new location, or the current location. In some embodiments, the image viewing and editing application, or another application on the device that operates the image viewing and editing application, uses a location detection mechanism (e.g., GPS) to identify the user's location, and then correlates this location with a list of places (e.g., a restaurant, address, etc.) within a particular distance (e.g., 1 kilometer, 1 mile, etc.) of the identified current location. In addition, some embodiments use the GPS data stored with the image (e.g., within the Exif data) to determine a location, and list places within a particular distance of the location at which the image was captured. The application then provides this as a current location option within the menu 8760. Some embodiments pre-populate the picker with a particular number of the most recent locations with which a user has tagged images. In this case, the user selects the "Home" location tag.

In the seventh stage 8707, the user selects the friend tagging item 8745. As shown in the eighth stage 8708, this selection results in the display of a menu (or picker) 8765 that lists the user's friends within the context of the photo sharing website. Various photo-sharing/social media websites allow users to have a network of friends, and some embodiments retrieve the list of these friends so that the user can tag their friends in images through the interface of the image viewing and editing application. Some embodiments pre-populate the picker with a particular number of the most recently tagged friends of the user. In some embodiments, the user can tag any number of friends that they would like to. However, in this example, the user does not tag any friends, but instead selects within the caption box 8735.

The ninth stage 8709 illustrates that when the user selects within the caption box (e.g., by tapping) the application overlays a touchscreen keyboard 8770 in order for the user to enter a caption for the image. In some embodiments, the keyboard is provided by the operating system of the device, and the application sends a request for the keyboard to the operating system when the user taps within the caption box. In this case, the user has used the keyboard 8770 to type "Right outside my house!" within the caption box 8735, and selects the "return" button on the keyboard in order to complete the caption. In the tenth stage 8710, the user selects the share button in order to share the photo along with the caption. In some embodiments, this caption is used for the photo-sharing site, but is not stored with the image within the image viewing and editing application.

As described above by reference to FIG. 86, when a user selects an image for sharing to a photo-sharing website to which the image has previously been uploaded, some embodiments allow the user to either upload the image as a new image or replace the older image on the website. In addition, when replacing an image, some embodiments retrieve the caption, tags, and/or other information from the website in order for the user to update this accompanying information.

Figure 88:
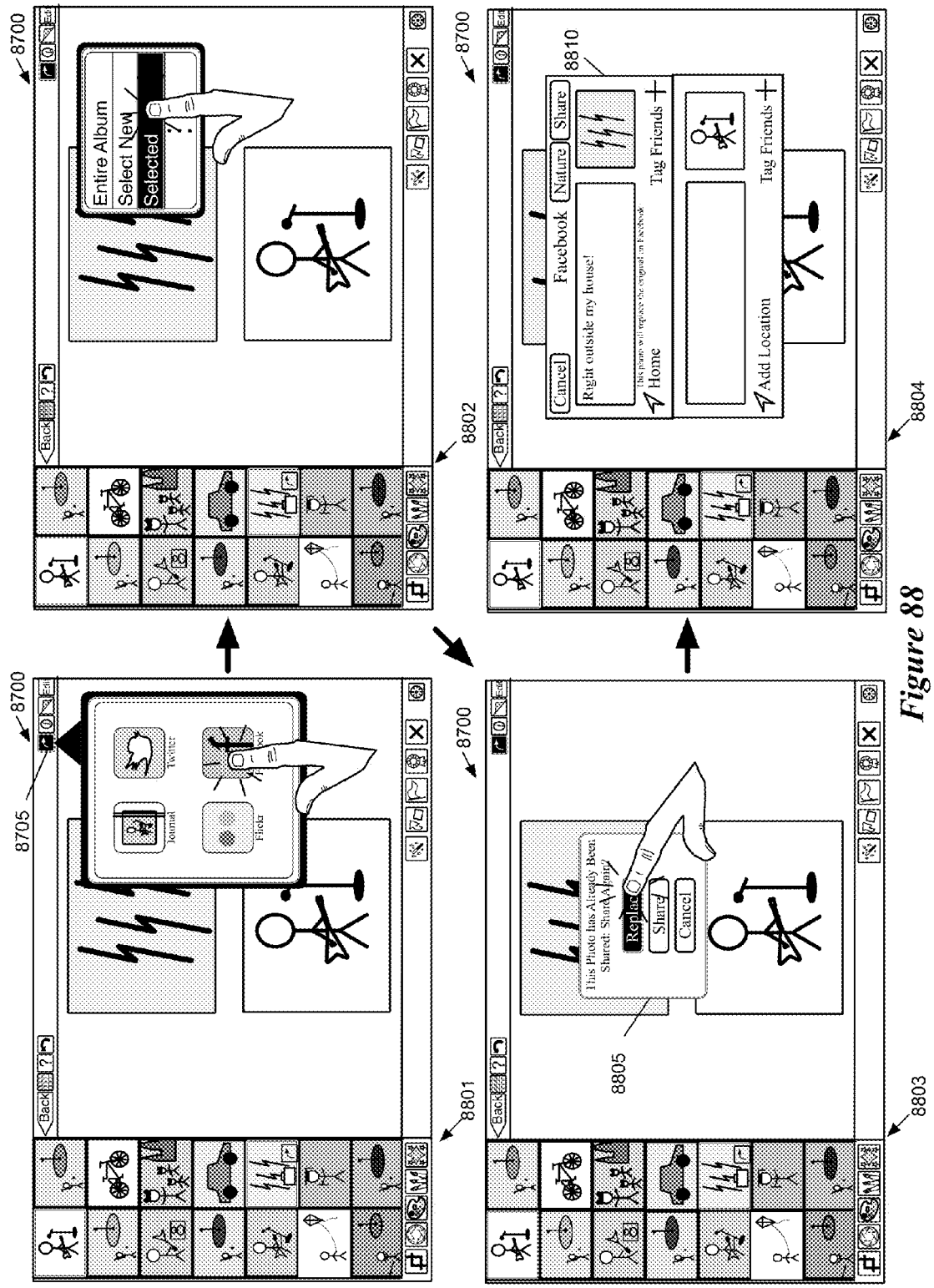
FIG. 88 illustrates a user selecting two images for upload to Facebook®, including an edited version of the image uploaded in FIGS. 87A-87C.

FIG. 88 illustrates a user selecting two images for upload to Facebook®, including an edited version of the image uploaded in FIGS. 87A-87C, over four stages 8801-8804 of the GUI 8700. The first two stages 8801 and 8802 are the same as stages 8701 and 8702, except that in this case the photo of the lightning has been edited (as indicated by the toolbox icon overlaid on its thumbnail) and a second image is also selected. In addition, the photo of the lightning has an icon overlaying its thumbnail indicating that it is already shared to at least one photo-sharing website.

After the user chooses to upload the selected images, the application determines whether any of the images are already uploaded. The data structure for the images (e.g., as described by reference to FIG. 15 above) indicates any locations to which the image is shared. Because one of the images selected in this example is already shared to Facebook®, the application displays a dialog box 8805 indicating that the photo has already been shared, and allowing the user to choose whether to replace the image, share the image (as a new image within the context of the photo-sharing website), or cancel the upload. In this case, the user chooses to replace the image. In some embodiments, however, the application only brings up the dialog box 8805 if the user attempts to upload the image to the same album of the photo-sharing website as the previous version.

As a result, in the fourth stage the application brings up an image-sharing dialog box 8810. This is similar to the dialog box 8725, but includes two separate sets of caption box, thumbnail, add location item, and friend tagging item. For the lightning bolt image, the application retrieves the caption and tagging information from the photo-sharing website and displays this information as editable within the dialog box 8810. In this case, the caption and the location are displayed as editable information.

Figure 89:
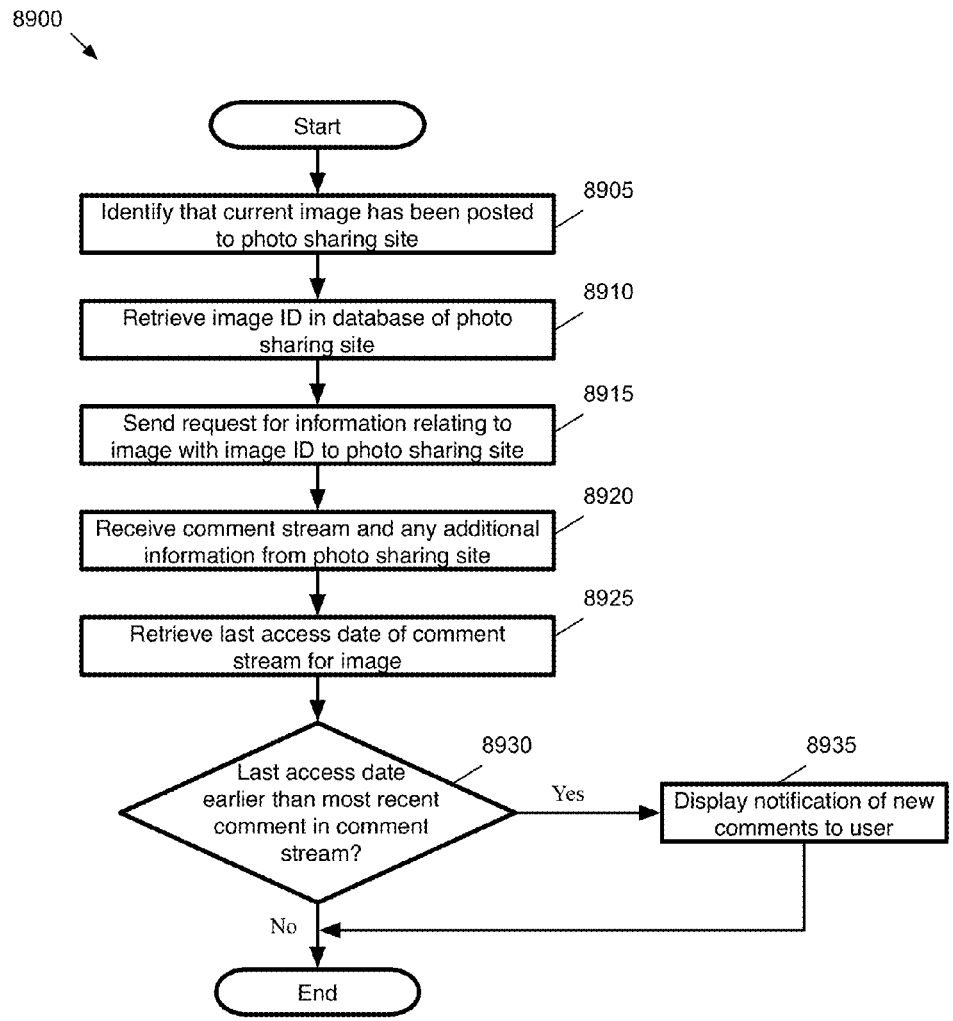
FIG. 89 conceptually illustrates a process of some embodiments for retrieving comments posted to an image on a photo sharing or social media website.

For images uploaded to photo-sharing websites, some embodiments automatically retrieve interactions with the images from those websites. FIG. 89 conceptually illustrates a process 8900 of some embodiments for retrieving comments posted to an image on a photo sharing or social media website. The application of some embodiments performs the process 8900 when an image currently displayed in the image display area of the application's GUI has been posted to a photo sharing site. Some embodiments only perform the comment retrieval process after displaying the image in the display area for a set period of time (e.g., one second, five seconds, one minute, etc.).

As shown, the process 8900 begins by identifying (at 8905) that the currently displayed image has been posted to a photo sharing website. Some embodiments wait a particular time duration while displaying an image, then determine whether the image is shared anywhere. When the image is not shared, the process 8900 will not be performed. Furthermore, when the image has been shared to several different sites, some embodiments perform the process 8900 or a variation thereof for each site, or a subset of the sites.

The process 8900 retrieves (at 8910) the image ID used for the image in the database of the photo sharing website. The application retrieves this image ID from the data structure of the displayed image, in some embodiments. The process then sends (at 8915) a request for information relating to the image to the photo sharing site, using the retrieved image ID to identify the image in the site's database. In some embodiments, this image ID is an object ID that identifies an object created for the image in the site's database, and the application requests certain properties of that object.

In response to sending the request, the process receives (at 8920) a comment stream and any additional requested information from the photo sharing site. In some embodiments, the comment stream is received as a series of comments that each includes a user making the comment, the user's profile thumbnail, the comment text itself, and a timestamp. Other embodiments, however, receive and parse the tree structure of nested comments. In addition, for images posted on Facebook® or sites with similar features, some embodiments receive the number of "Likes" a posted image has received, as well as who liked the image.

With this information received, the process 8900 retrieves (at 8925) the last access date of the comment stream for the image. The retrieved date and time is the last time that the user viewed any comments for the image within the image-viewing application. If the user has not viewed any comments on the image after uploading the image, then the retrieved time will be that of upload. In some embodiments, whether the user has viewed the comments on the image directly through the photo sharing site does not affect the last access date.

The process then determines (at 8930) whether the retrieved last access date is earlier than the most recent comment in the comment stream. The process compares the last access date to the timestamp for the most recent comment, and determines which is earlier. When the last access date is earlier, the process displays (at 8935) a notification to the user that new comments are available. In some embodiments, the notification consists of a small icon, or badge, over the information button (used to access the comments). Some embodiments use a notification button that simply indicates that new comments are available, while other embodiments provide an indication (e.g., a number inside the icon) of the number of new comments. In order to determine the number of new comments, some embodiments compare the last access date to each successively older comment until reaching a comment prior to the last access date. After displaying the notification, if necessary, the process 8900 then ends.

Users can view these comments, in some embodiments, by accessing the comments tab in the information window. Through this window, some embodiments also allow users to respond with additional comments that are posted to the photo sharing website.

Figure 90:
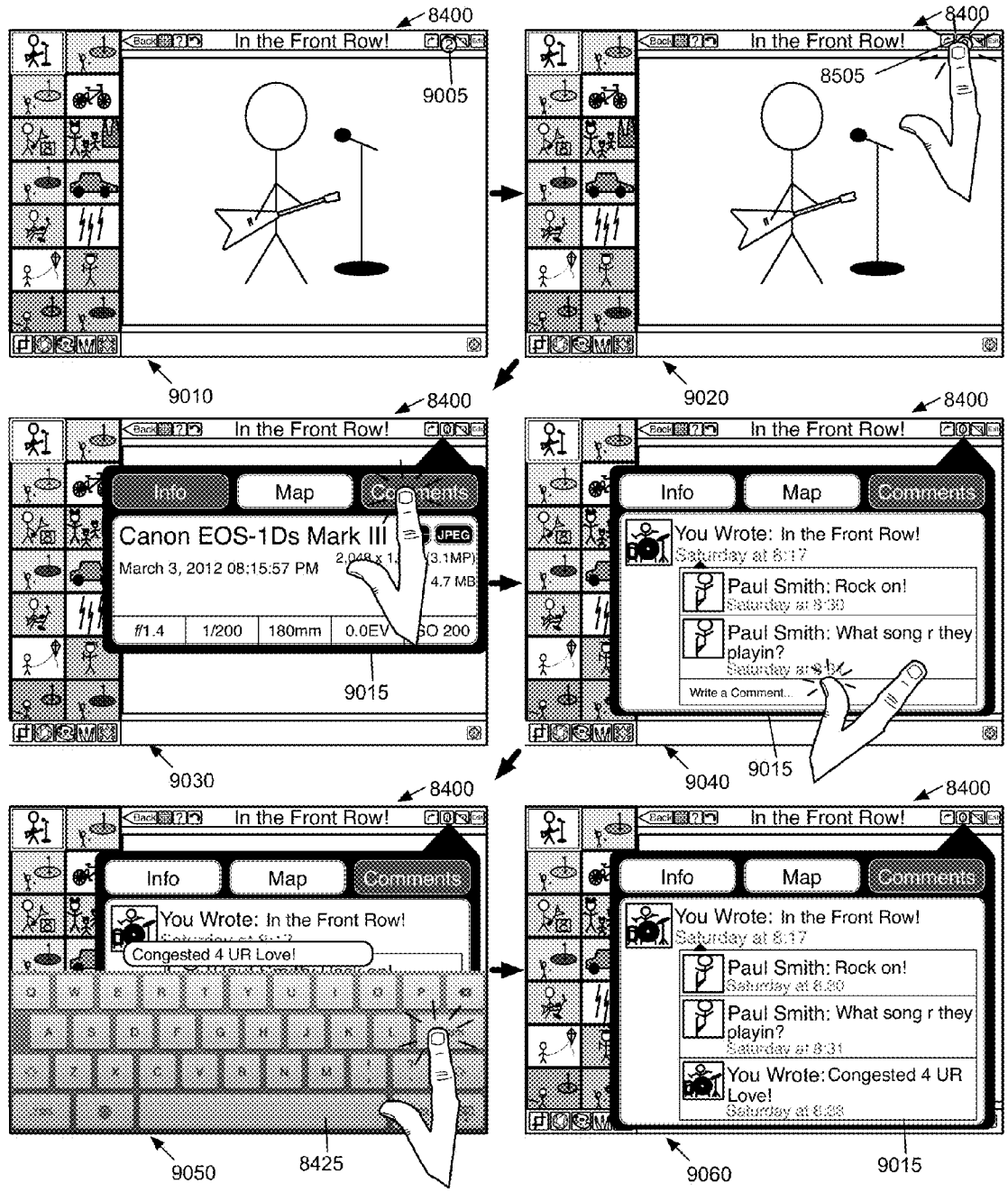
FIG. 90 illustrates a user posting a comment to a shared image through the information window in the GUI of some embodiments.

FIG. 90 illustrates a user posting such a comment through the information window over six stages 9010-9060 of the GUI 8400 of some embodiments. In the first stage 9010, the application displays the image 8415, which the user had previously captioned and posted to Facebook®. In addition, the application displays a small icon 9005 over the info button 8505. This small icon indicates that the displayed image has received two new comments. Some embodiments use the same icon for different photo sharing websites, without differentiating between the different sites. Other embodiments use different icons for Facebook®, Flickr®, etc. (e.g., different colors, different icon shapes, etc.).

In the second stage 9020, the user selects the info button 8505. As in FIGS. 81-83, this causes an information window 9015 to appear over the display in stage 9030. The user then selects the comments tab. The fourth stage 9040 displays the comments tab. As shown, the information window 9015 now displays the Facebook® comments that "Paul Smith" has written on the user's image. This figure shows the info tab initially displayed and the user then selecting the comments tab. However, some embodiments automatically display the comments tab in response to a user selecting the info button with a notification icon displayed, on the assumption that the user most likely wants to view the new comments. The information window 9015 is larger in stage 9040 than in stage 9030, in order to display all of the comments. In some embodiments, rather than expanding, the information window 9015 stays the same size and automatically displays the comments with the first new comment at the top of the window, with the user able to scroll through the comment stream.

In stage 9040, the comment stream also includes a section into which the user can enter a comment. The user taps this section, and the fifth stage 9050 illustrates a touchscreen keyboard 8425 that appears as a result. This allows the user to type a comment to post to Facebook® for the image. After the user types her response, the information window 8415 displays the new comment at the end of the comment stream in stage 9060, indicating that the comment has been posted to Facebook®. In order to post user comments, the application transmits the user comment with the stored image ID to the photo sharing website along with the user information. In some embodiments, the application awaits a confirmation from the website before displaying the comment in the application GUI.

VII. Context-Sensitive Help

Some embodiments also include a context-sensitive help feature that provides indications for various user interface tools as to the function of the tool. In some embodiments, the application determines for which user interface features the help information should be provided based on the current active tools of the application. For instance, when a user selects a particular set of editing tools, the application removes some of the help information from the display while adding information specifically for the selected set of editing tools to the display.

Figure 91:
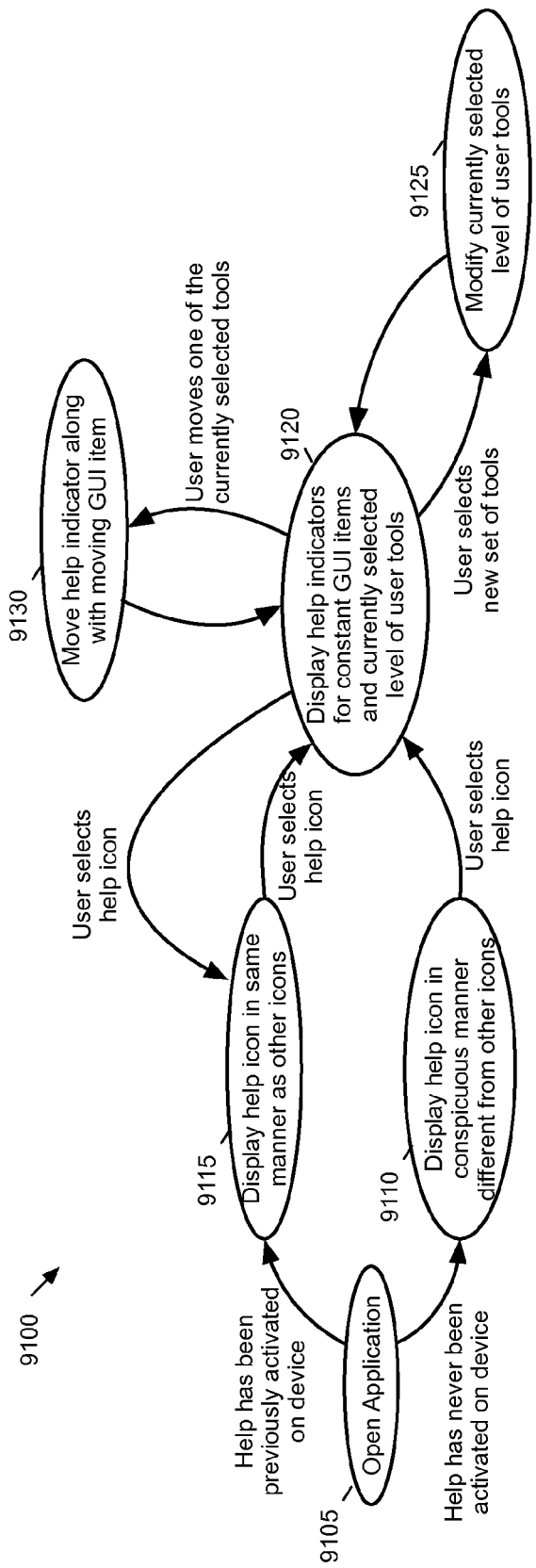
FIG. 91 conceptually illustrates a state diagram that presents various operations of the help feature in some embodiments.

FIG. 91 conceptually illustrates a state diagram 9100 of the GUI of some embodiments that presents various operations of the help feature. One of ordinary skill in the art will recognize that the state diagram 9100 does not encompass every state of the image viewing and editing GUI, or even every state related to the context-sensitive help feature, but instead only a subset of the help feature operations within the GUI.

Figure 92:
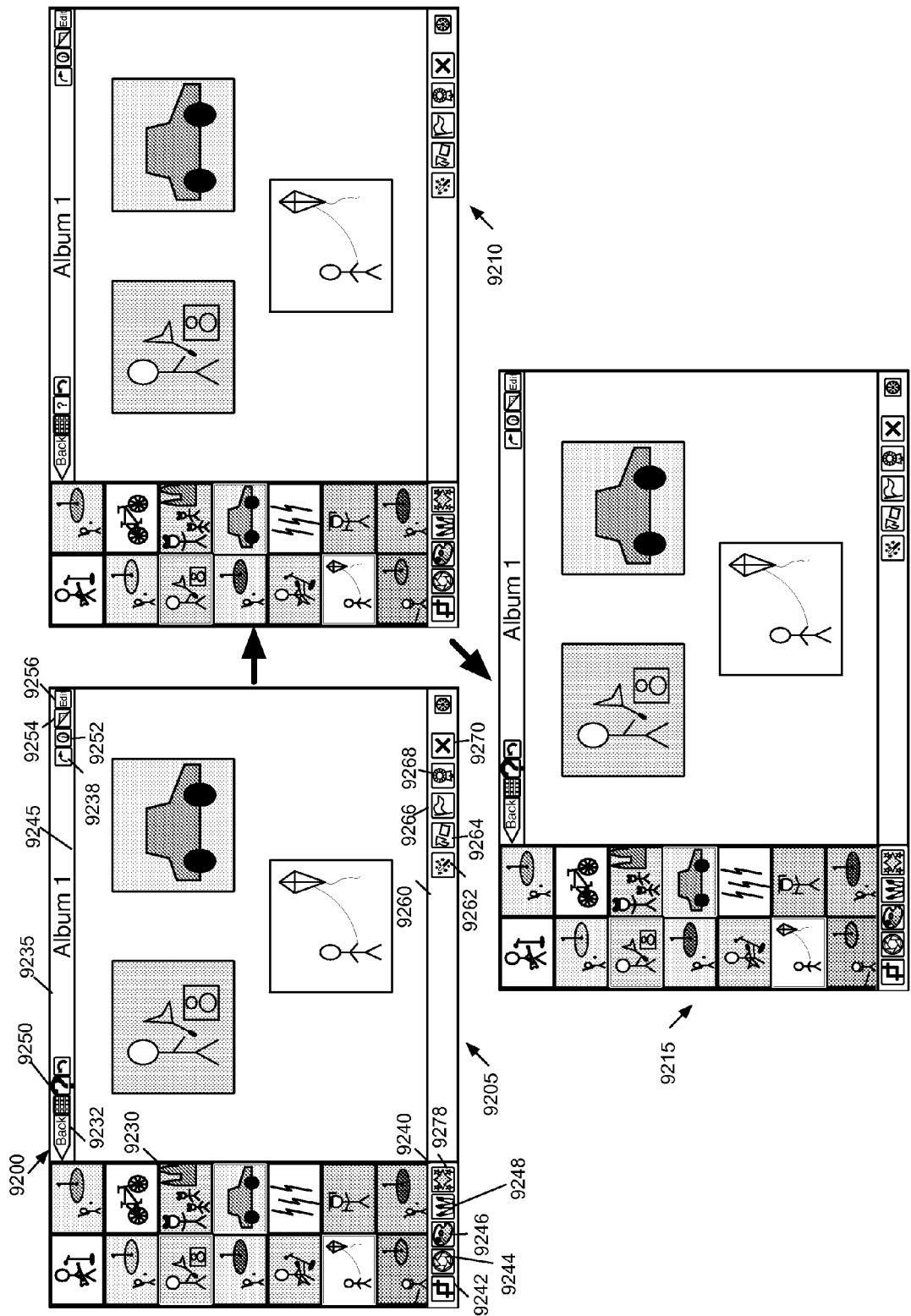
FIG. 92 illustrates an example of displaying the help icon in a conspicuous manner according to some embodiments.

The state diagram 9100 will be described by reference to the UI examples illustrated in FIGS. 92-96. Specifically, FIG. 92 illustrates a GUI 9200 of the image editing application of some embodiments in multiple stages related to the appearance of a help icon. FIGS. 93-96 illustrate the GUI 9200 over multiple stages relating to the activation and display of the help feature as the user performs various operations within the GUI.

As shown in FIG. 91, the state diagram 9100 begins when a user opens the image viewing, organizing, and editing application at state 9105. As the application opens, it transitions to either state 9110 or state 9115, depending on whether the help tool has previously been activated on the device on which the application operates. In some embodiments, the image editing application stores a parameter with two states (e.g., 1 or 0) on the device. Upon first being loaded on a device, the application initializes the parameter in a first state (e.g., 0). Once a user has activated the help tool on the device, the application switches the parameter to the other state (e.g., 1). This way, the application determines whether the help tool has been activated on the device by checking the parameter.

If the help tool has never been activated on the device (e.g., the parameter has a value of 0), then the GUI transitions to state 9110 upon the application opening, at which the application displays the help icon in a conspicuous manner different from other GUI items of the application. In some embodiments, the help icon is a selectable UI item, which a user can select to activate the help tool. Different embodiments of the help tool implement the conspicuous display of the help icon differently. For instance, some embodiments display the help icon in a conspicuous manner by using a blinking help icon, or an icon that appears as pulsating. The application displays the help icon as changing between a small first state and a larger second state—either blinking between the two, or expanding and contracting to switch between the two states.

FIG. 92 illustrates an example of the display of the help icon in a conspicuous manner in the GUI 9200 over three stages 9205-9215. As shown, the GUI 9200 includes a thumbnail display area 9230, an image display area 9245, a menu bar 9240, a UI control display area 9260, and a tool bar 9235. The menu bar 9240 includes a set of selectable UI items for invoking different sets of image editing tools, including a selectable UI item 9242 for invoking a set of image cropping tools, a selectable UI item 9244 for invoking a set of exposure adjustment tools, a selectable UI item 9246 for invoking a set of color adjustment tools, a selectable UI item 9248 for invoking a set of brush tools, and a selectable UI item 9250 for invoking a set of special effect tools. The UI control display area 9260 is for displaying different sets of UI controls when they are invoked. In this example, the UI control display area 9260 includes the default set of UI items for the image viewing GUI, including a selectable UI item 9262 for initiating an auto enhance operation on the image, a selectable UI item 9264 for initiating a rotate operation on the image, a selectable UI item 9266 for flagging the image, a selectable UI item 9268 for marking the image as favorite, and a selectable UI item 9270 for hiding the image.

The tool bar 9235 includes additional selectable items, including a selectable UI item 9232 for navigating back to the collection organization GUI, a selectable UI item 9250 (i.e., the help icon) for invoking the help tool, a selectable UI item 9252 for displaying invoking the information window for a displayed image, and a selectable UI item 9254 for toggling between original and edited versions of the displayed image.

In FIG. 92, the help tool has never been activated on the device, and therefore the application displays the help icon in a conspicuous manner. In this example, the application displays the help icon 9250 as throbbing, or pulsing. As shown, the help icon includes a question mark graphic. This question mark expands and contracts in order to create the pulsating appearance. At the first stage 9205, the help icon has a large question mark that extends beyond the borders of the icon.

The second stage 9210 illustrates the GUI 9200 with the help icon 9250 at its smallest state. As shown, the help icon 9250 is no longer highlighted, as indicated by a small question mark on the icon that is completely enclosed by the border of the help icon 9250. To get from the first stage 9205 to the second stage 9210, the application quickly decreases the size of the question mark part of the icon. In some embodiments, the second stage 9210 occurs only within a very short period of time (e.g., 0.5 seconds) after the first stage 9205.

The third stage 9215 illustrates the GUI 9200 after the application has again increased the size of the question mark in the help icon 9250 to its largest point, similar to at stage 9205. In some embodiments, the time for the application to get from the first stage 9205 to the second stage 9210 is the same as the time to get from the second stage 9210 to the third stage 9215. The application, in some embodiments, shrinks the size of the help icon, then quickly expands the size of the icon, and so on. In some embodiments, the application displays the help icon in this manner until the user has invoked the help feature at least once.

Referring back to FIG. 91, if the application determines that the help tool has been previously invoked on the device as the application opens, the help tool transitions to state 9115, where the GUI displays the help icon in the same manner as other icons. That is, the help icon appears in a normal state, similar to that shown in the second stage 9210 of FIG. 92.

While at either state 9110 or state 9115, when the application receives a selection of the help icon, the GUI transitions to state 9120, to display help indicators for (i) constant GUI items and (ii) the currently selected level of user tools. The GUI items, in some embodiments, include different sets of user tools. For example, some embodiments include the default tools (auto-enhance, rotate, flag, favorites, hide) as a first set, and then various sets of editing tools (e.g., crop tools, exposure tools, color adjustment tools, brush tools, and special effects tools). When the default tools are shown in the GUI, some embodiments display help indicators for the default tools as well as for the various edit activation items (for activating the different sets of editing tools). When one of the sets of editing tools is activated, the application displays these tools in place of the default tools. If the help feature has been invoked, some embodiments do not display help indicators for the different edit activation items, and instead only display help indicators for the selected editing tools. In some embodiments, the constant GUI items include items that are always present in the GUI, irrespective of which items are selected. These items may include the toggle original button, the sharing button, the info button, and other GUI items.

In some embodiments, the application remains at state 9120 unless (1) the user selects a new set of editing tools, (2) the user moves one of the currently selected editing tools, or (3) the user selects the help icon to deactivate the help feature. When a user selects a new set of tools, the application transitions to state 9125 to modify the currently selected level of user tools, then transitions back to state 9120 to display help indicators for the new currently selected level of tools.

Figure 93:
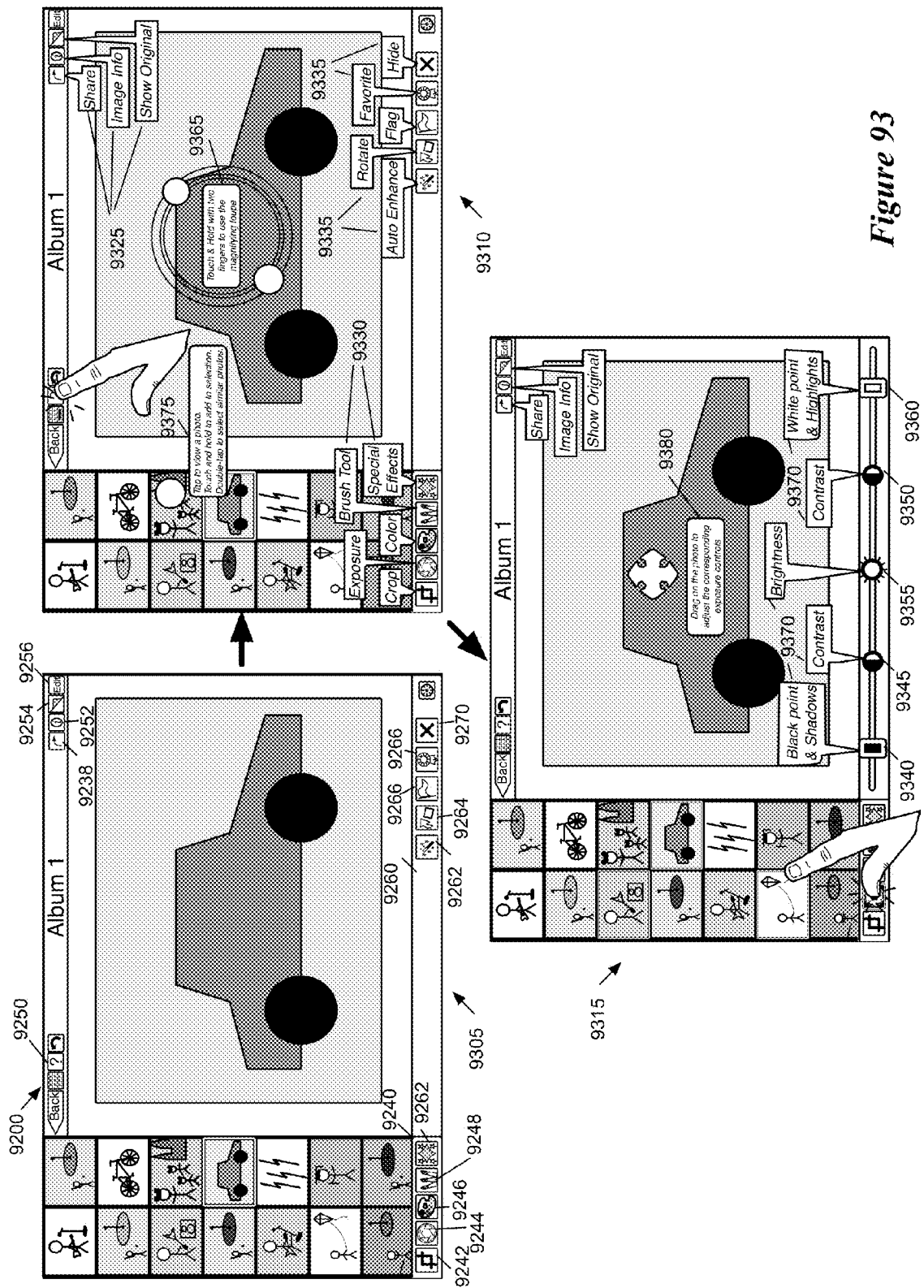
FIG. 93 illustrates an example of invoking the help tool.

FIG. 93 illustrates an example of invoking the context-sensitive help tool and changing the selected set of user tools in the GUI 9200 over three different stages 9305-5715. The first stage 9305 is similar to the first stage 9205 of FIG. 92, except that the image display area 9245 only includes a single image. The second stage 9310 illustrates the GUI 9200 after the user has activated the help tool. In some embodiments, the help tool can be activated by a selection of the help icon. As shown, the user has activated the help tool by tapping a finger on the help icon 9250. As a result of the selection, the application overlays various help indicators over the GUI. These help indicators display short bits of explanatory information for various GUI items.

In the second stage 9310, the application displays help indicators 9325 for the constantly displayed GUI items 9238, 9252, and 9254 within the tool bar 9235. These help indicators are labeled "Share" for the sharing button 9238, "Image info" for the information button 9252, and "Show Original" for the toggle original button 9254, though various embodiments may use different descriptions for one or more of the items. In addition, some embodiments only display the help indicators for items that are selectable; when the user has not yet edited the displayed image, the toggle original button will have no effect and therefore some embodiments do not display its help indicator. Some embodiments display the help indicators for different items in the toolbar 9235 (e.g., the undo button).

The help tool also displays a set of indicators 9335 for the currently selected level of user tools ("Auto-Enhance", "Rotate", "Flag", "Favorite", and "Hide"). In addition, when at this level of tools (the default set of user tools, shown when none of the edit activation items have been selected), the application displays help indicators 9330 for the edit activation items 9242, 9244, 9246, 9248, and 9262, that indicate to the user the different editing options ("Crop", "Exposure", "Color", "Brush Tool", and "Special Effects"). As with the constantly present GUI items, different embodiments may use different descriptions for the same item, or have a different set of GUI items. In some embodiments, the sets of help indicators are selectable UI items. In such embodiments, when a user selects a help indicator, the application overlays more detailed information about the functions and operations of the corresponding GUI item.

Some embodiments display directions for use within the help indicators for some of the items. For instance, in some embodiments, the "Rotate" indicator includes further information, such as "Rotate 90°. Touch and hold for more options". As shown, the help indicators that the application overlays at 9310 include an indicator 9365 for the zoom tool in the center of the image display area that gives directions on using the zoom tool and an indicator 9375 for the thumbnail display area describing different types of selection inputs.

The third stage 9315 of FIG. 93 illustrates an example of the user selecting a new set of tools in the GUI 9200. As shown in the third stage 9315, the user has selected the selectable UI item 9244 in the menu bar 9240 for invoking a set of exposure adjustment tools. As a result, the application displays a set of exposure adjustment tools in the UI control display area 9260, replacing the auto-enhance, rotate, and tagging UI items. The set of exposure adjustment tools includes a shadows adjustment tool 9340, a set of contrast adjustment tools 9345 and 9350, a brightness adjustment tool 9355, and a highlights adjustment tool 9360. As a result of the user selecting a new set of tools, the overlays a new set of help indicators 9370 ("Black point & Shadows", "Contrast", "Highlights", "Contrast", and "White point & Highlights") for the newly displayed set of tools while removing the help indicators 9330 for the various edit activation tools 9242, 9244, 9246, 9248, and 9262. The application also overlays the indicator 9380 within the image display area to indicate that the user can adjust the exposure data for the image by touching and dragging over the image itself. In addition, the help indicators 9325 for the share, image info, and toggle original buttons remain, irrespective of which set of GUI tools the user selects.

Figure 94:
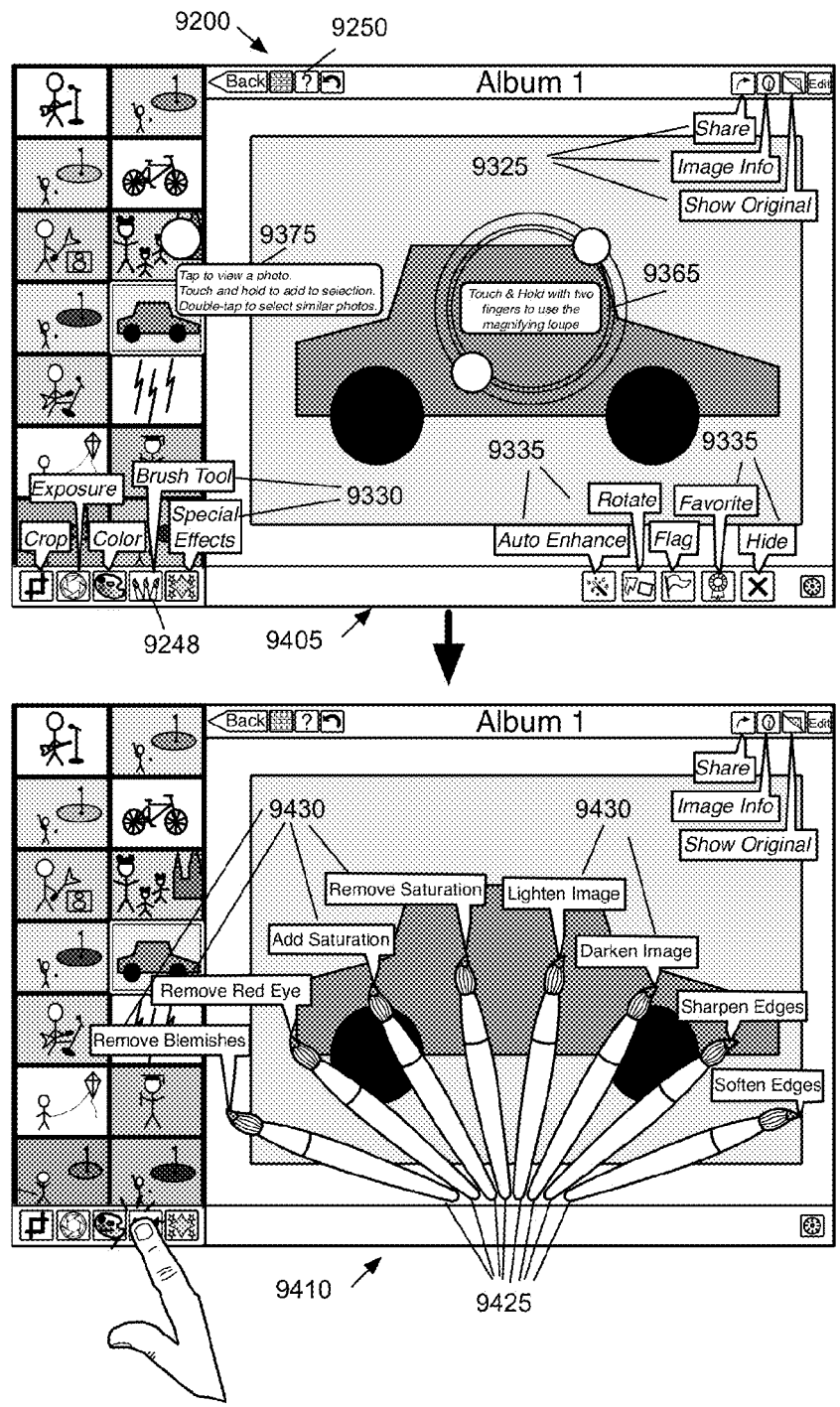
FIG. 94 illustrates an example of modifying the help tool level when the user selects a new set of tools within the GUI.

FIG. 94 illustrates another example of the modification of the help feature when the user selects a new set of tools within the GUI 9200 at two different stages 9405 and 9410. The first stage 9405 is identical to the second stage 9310 of FIG. 93. As shown, the help tool has been activated, as indicated by the appearance of the sets of help indicators 9325, 9330, 9335, 9365, and 9375 in the GUI 9200. The second stage 9410 illustrates the GUI 9200 after the user has selected a new set of tools for display in the GUI 9200. In this case, the user has selected the selectable UI item 9248 within the menu bar 9240 for invoking a set of brush tools. As such, the application displays the set of brush tools 9425 for invoking different image adjustment operations in the GUI 9200. As a result of the user selecting a new set of tools, the help tools also displays a new set of help indicators 9430 for the new set of brush tools 9425, while removing the set of help indicators 9330 for the different edit activation tools.

Returning to the stage diagram 9100 of FIG. 91, when the user moves one of the currently selected tools while the application is at state 9120, the application transitions to state 9130 to move the help indicator along with the moving GUI tool. For instance, when the user moves a slider, that slider's help indicator moves along with it.

Figure 95:
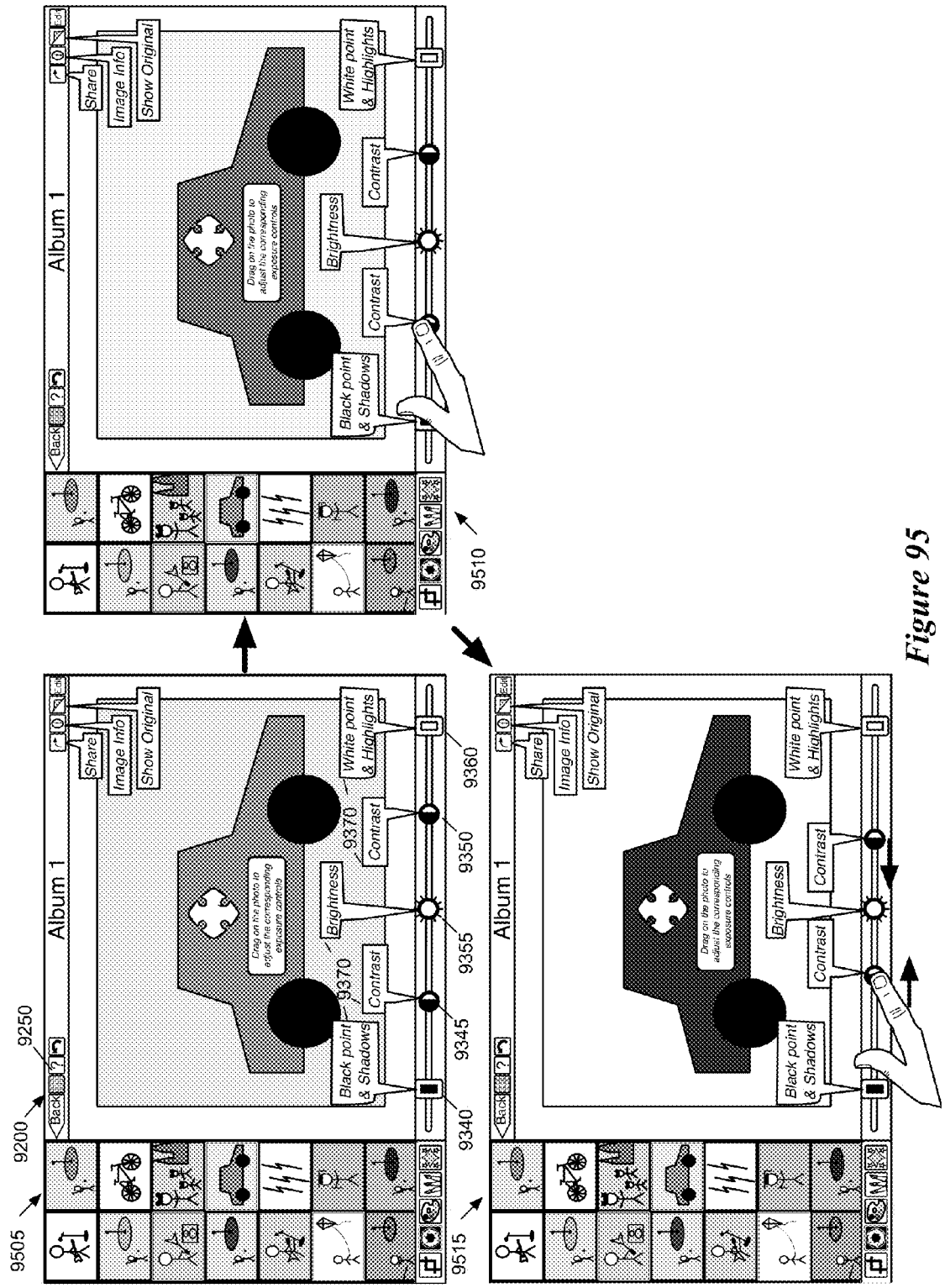
FIG. 95 illustrates an example of the application automatically moving a help indicator along with a corresponding tool.

FIG. 95 illustrates an example of the application automatically moving a help indicator along with a corresponding edit tool at three stages 9505-9515. The first stage 9505 is identical as the third stage 9315 of FIG. 93, with the help tool activated and the exposure adjustment tools selected. As shown, the application displays the set of help indicators 9370 for the set of exposure adjustment tools 9340-9360. The second stage 9510 illustrates the GUI 9200 as the user begins to contact the touchscreen in order to move one of the exposure adjustment sliders. The third stage 9515 illustrates the movement of the contrast adjustment tool 9345 by the user. As a result of this movement, the help indicator 9370 (labeled "Contrast") moves along with the tool to the right. In addition, moving one of the contrast tools causes the other contrast tool to move as well, and as such the other contrast slider 9350 moves to the left along with its help indicator. As a result of this movement, the contrast of the displayed image is modified.

Referring back to FIG. 91, when the user selects the help icon again after the help tool is activated, the help tool removes all the help indicators from the GUI. In addition, since the user has already activated the help tool on the device, the help tool returns to state 9115, where the help tool displays the help icon in the same manner as other icons, as shown in stage 9305 of FIG. 93.

As mentioned above, when a user selects one of the help indicators, some embodiments display a detailed help article about the selected feature. Some embodiments either download these help articles from an external location (e.g., via the Internet) or store them with the application.

Figure 96:
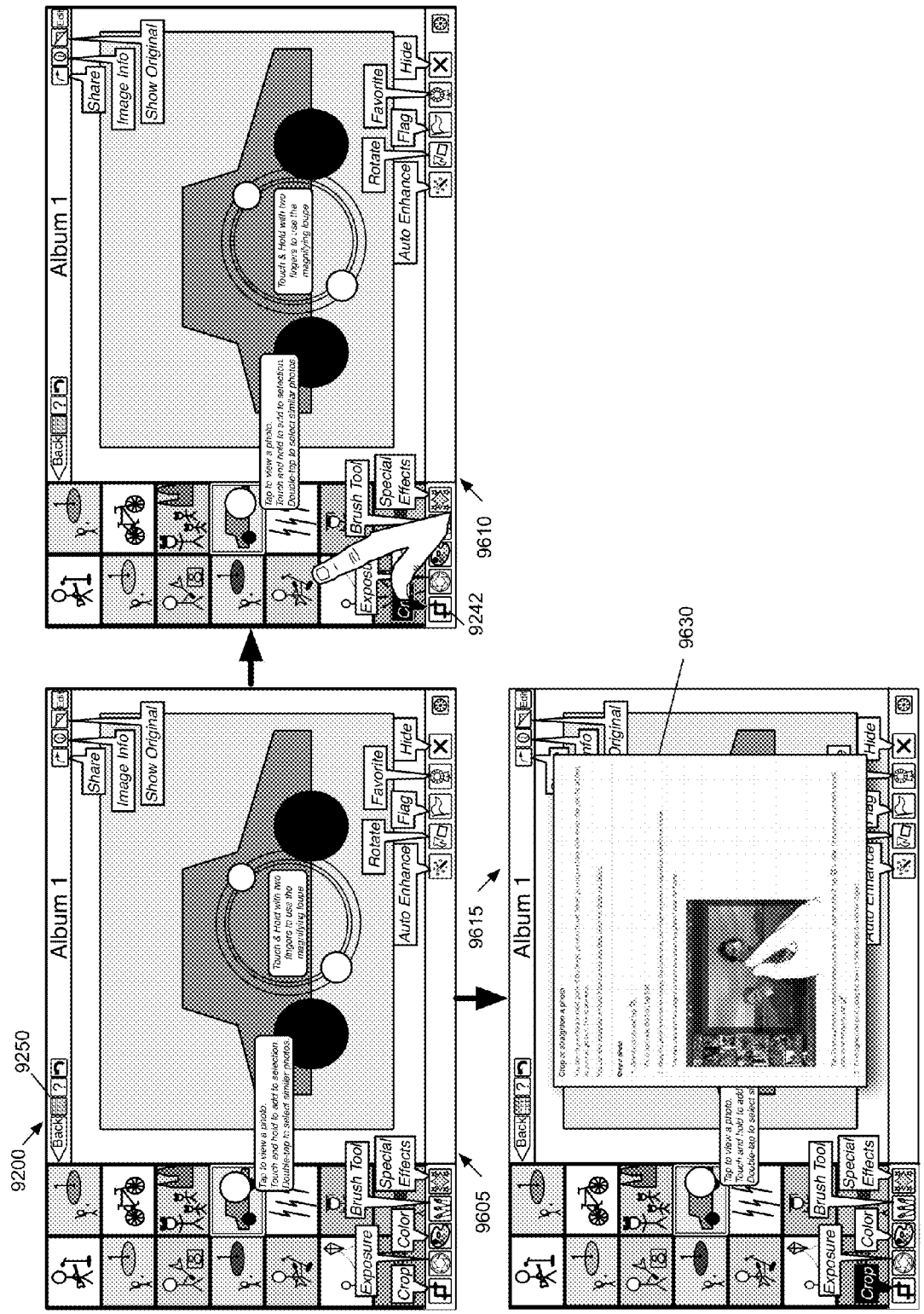
FIG. 96 illustrates an example of displaying a detailed help article related to one of the GUI items.

FIG. 96 illustrates an example of displaying a detailed help article related to one of the GUI items through the GUI 9200 through three different stages 9605-9610. The first stage 9605 is identical to the first stage 9405 of FIG. 94, with the help tool activated, as indicated by the display of the help indicators for the GUI items shown on the GUI 9200. When a user selects one of the help indicators, the application displays more detailed information about the functions and operations that are related to the corresponding GUI item.

The second stage 9410 illustrates the user selecting one of the help indicators. Specifically, the user selects (e.g., via a tap as shown, via a click selection, etc.) the help indicator for the crop item 9242, causing the application to highlight the crop indicator.

As a result of the selection, the application overlays detailed help information 9630 for the crop tools over the GUI 9200 at stage 9615. As stated, in some embodiments, the content of the detailed help information is stored on the device on which the image editing application is executed. In these embodiments, when the user selects a help indicator, the application retrieves the corresponding help information from the device before displaying the information on GUI 9200. In other embodiments, the detailed help information is stored at one or more remote locations to which the device connects through a network (e.g., the Internet). In these embodiments, when the user selects a help indicator, the application retrieves the detailed help information from one of these remote locations through the network before displaying the information on GUI 9200.

Figure 97:
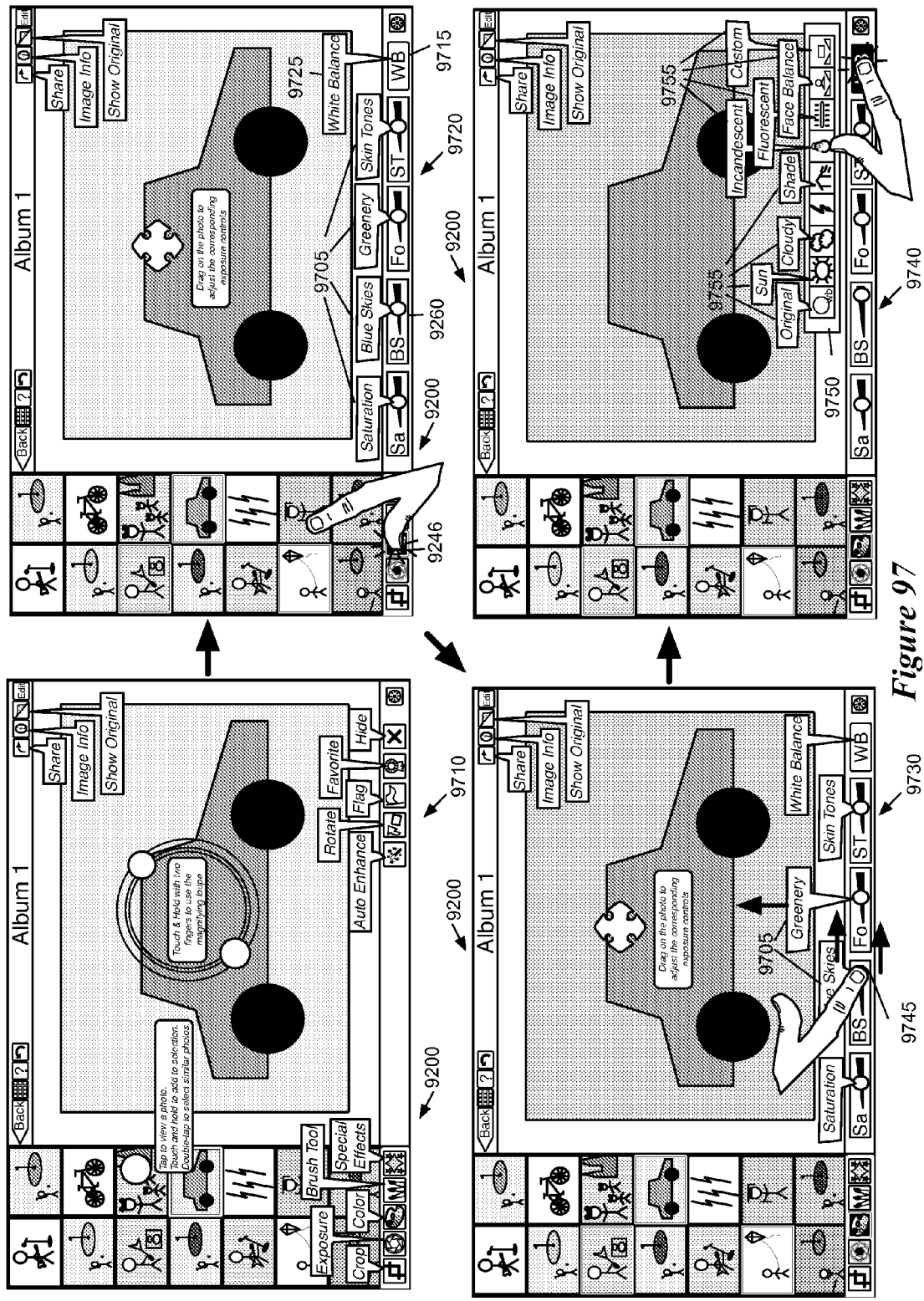
FIG. 97 illustrates another example of the display of help indicators for different GUI items in some embodiments.

FIG. 97 illustrates another example of the display of help indicators for different GUI items in some embodiments. Specifically, FIG. 97 illustrates the movement of help indicators as well as multiple levels of help indicators for color adjustment tools over four stages 9710-9740 of the GUI 9300. The first stage 9710 is identical to the first stage 9405 of FIG. 94, with the help tool activated, as indicated by the display of the help indicators for the GUI items shown in the GUI 9200.

The second stage 9720 illustrates the GUI 9200 after the user selects the color adjustment activation item 9246. This causes the application to display four color adjustment sliders in the toolbar 9260. As shown by help indicators 9705, these sliders enable the user to adjust the saturation, sky colors, green colors, and skin tones of the displayed image. In addition, the color adjustment tools include a white balance item 9715, indicated by the help indicator 9725.

At the third stage 9730, the user moves the blue skies slider 9745 to the right, in order to increase saturation in the sky colors of the image. This also causes the help indicator 9705 for the slider 9745 to move to the right. In doing so, the indicator begins to overlap with the help indicator for the greenery slider. As a result, the application automatically moves the greenery slider help indicator upwards (using a longer stem), so that the user can see the entire help indicator.

The fourth stage 9740 illustrates the result of the user selecting the white balance item 9715. As shown, the application overlays a toolbar 9750 that provides numerous selectable white balancing options. With these items displayed, the application removes the help indicators 9705 for the color adjustment sliders, and instead overlays the indicators 9755 for the different white balance items.

VIII. Software Architecture

Figure 98:
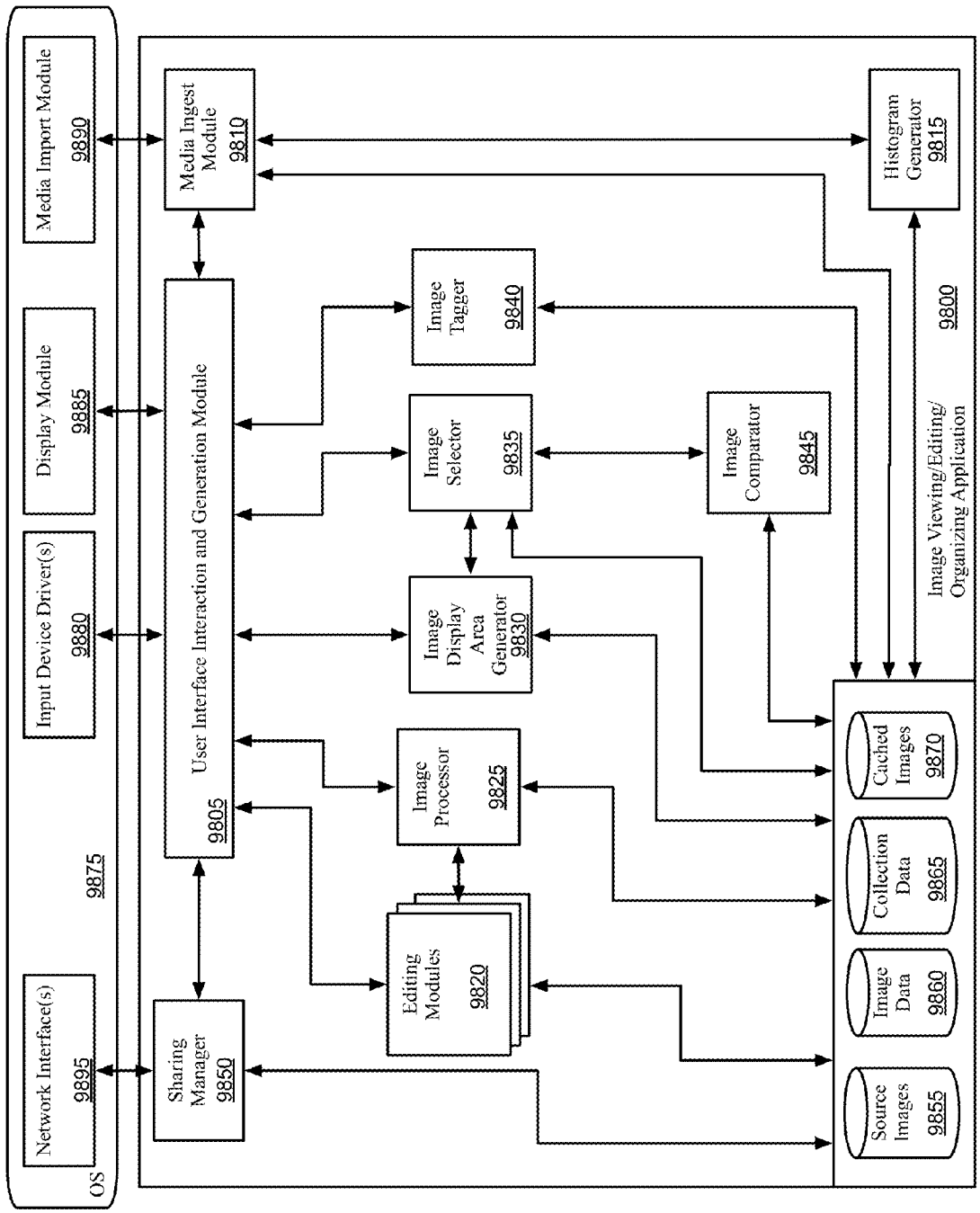
FIG. 98 conceptually illustrates the software architecture of an image viewing, editing, and organization application of some embodiments.

In some embodiments, the processes described above are implemented as software running on a particular machine, such as a computer or a handheld device, or stored in a machine-readable medium. FIG. 98 conceptually illustrates the software architecture of an image viewing, editing, and organization application 9800 of some embodiments. In some embodiments, the image viewing, editing, and organization application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The image viewing, editing, and organization application 9800 includes a user interface (UI) interaction and generation module 9805, a media ingest module 9810, a histogram generator 9815, editing modules 9820, an image processor 9825, an image display area generator 9830, an image selector 9835, an image tagger 9840, an image comparator 9845, and a sharing manager 9850. The figure also illustrates stored data associated with the application 9800: source images 9855, image data 9860, collections data 9865, and cached images 9870.

In some embodiments, the source images 9835 store image files (and, possibly, video files or other media) imported into the application (i.e., the local image database). In some embodiments, the image files may be associated with another image viewing and organization application with which the application 9800 communicates. The image data 9860 stores the image data structures of some embodiments, while the collection data 9865 stores the collection data (e.g., albums, events, journals, etc.). The cached images 9870 stores cached versions of the images (e.g., thumbnails, display size images, etc.). In some embodiments, the four sets of data 9855-9870 are stored in one physical storage (e.g., an internal hard drive, external hard drive, solid state memory, etc.). In some embodiments, the data may be split between multiple physical storages.

FIG. 98 also illustrates an operating system 9875 that includes input device driver(s) 9880, display module 9885, media import module 9890, and network interface(s) 9895. In some embodiments, as illustrated, the device drivers 9880, display module 9885, media import module 9890, and network interface 9895 are part of the operating system even when the media editing application 9800 is an application separate from the operating system.

The input device drivers 9860 may include drivers for translating signals from a touchscreen, as well as a keyboard, mouse, touchpad, tablet, etc. A user interacts with one or more of these input devices, which send signals to their corresponding device driver. The device driver then translates the signals into user input data that is provided to the UI interaction and generation module 9805.

The present application describes a graphical user interface that provides users with numerous ways to perform different sets of operations and functionalities. In some embodiments, these operations and functionalities are performed based on different commands that are received from users through different types of touchscreen devices. For example, the present application illustrates the use of touchscreen input (e.g., with one or more fingers) to control (e.g., select, move) objects in the graphical user interface. However, in some embodiments, objects in the graphical user interface can also be controlled or manipulated through other controls, such as a cursor. In some embodiments, cursor control is implemented through an input device that moves a cursor to different locations on the display of the device. Based on the location of the cursor, different input (e.g., mouse button clicks, etc.) can be used to perform different actions (e.g., selection of a GUI item). Thus, while many of the figures above do not illustrate a cursor, some embodiments perform the same actions with the use of a cursor (with or without touch control). The display module 9885 translates the output of a user interface for a display device.

That is, the display module 9885 receives signals (e.g., from the UI interaction and generation module 9805) describing what should be displayed and translates these signals into pixel information that is sent to the display device. The display device may be an LCD, plasma screen, CRT monitor, touchscreen, etc. In some touchscreen embodiments, the display module 9885 and the input device driver(s) 9880 are part of a single touchscreen driver.

The media import module 9890 receives media files (e.g., image files, etc.) from external storage devices (e.g., external drives, recording devices, etc.) through one or more ports (e.g., a USB port, Firewire port, etc.) of the device on which the media-editing application 9800 operates and translates this media data for the application 9800 or stores the data directly onto a storage of the device.

The UI interaction and generation module 9805 of the media editing application 9800 interprets the user input data received from the input device drivers and passes it to various modules, including the media ingest module 9810, the editing modules 9820, the image processor 9825, the image display area generator 9830, the image selector 9835, and the image tagger 9840. The UI interaction module also manages the display of the media-editing application GUI, and outputs this display information to the display module 9865. This UI display information may be based on information from the editing modules 9815, the timeline generator 9820, the angle viewer generator 9827, the playback module 9830, the data 9835-9850, etc. In addition, the module 9805 may generate portions of the UI based solely on user input—e.g., when a user moves an item in the UI that only affects the display rather than any of the other modules, such as moving a window from one side of the UI to the other or modifying the relative size of the clip browser and clip library. In some embodiments, the UI interaction and generation module 9805 generates a basic GUI and populates the GUI with information from the other modules and stored data.

The media ingest module 9810 manages the import of source media into the application 9800. Some embodiments, as shown, receive source media from the media import module 9890 of the operating system 9875. The media ingest module 9810 receives instructions through the UI module 9805 as to which files should be imported, then instructs the media import module 9890 to enable this import (e.g., from an external drive, an external camera, a camera of the device on which the application operates, a different application on the device, etc.). The media ingest module 9810 of some embodiments stores these images in the source images 9855. In some embodiments, the media ingest module 9810 also manages the creation of image data structures upon import of source images.

The histogram generator 9815 generates color, texture, and shape histograms for each imported image in some embodiments. The histogram generator 9815 of some embodiments is described in detail above by reference to FIG. 52.

The editing modules 9815 include a variety of modules for editing images. The editing modules 9815 generate various editing GUI tools and translate input from these tools into edit instructions for an image (e.g., crop instructions, rotation instructions, color adjustment instructions, etc.). The image processor 9825 applies edit instructions to an image when the image needs to be output. For instance, when a user adds an edit to a displayed image, the appropriate one of the editing modules 9820 modifies the edit instructions for the image, and the image processor 9825 applies these instructions in order to generate the desired image.

The image display area generator 9830 handles the generation of the image display area. The image display area generator 9830 receives (e.g., from the UI interaction and generation module 9805 or the image selector 9835) a set of images to display. The generator 9830 of some embodiments calculates the average aspect ratio of the images, defines a grid in the image display area, calculates the number of pixels to use for displaying the images, and calculates the size for each image.

The image selector 9835 translates various user interactions into selections of one or more images to send to the image display area generator 9830. When the user requests a set of similar images to a particular image, the image selector uses the image comparator 9845 to identify the similar images. The image comparator 9845 of some embodiments is described above by reference to FIG. 52. The image tagger 9840 receives user input to tag one or more images and modifies the data structures of the images accordingly.

The sharing manager 9850 manages the sharing of images on various photo sharing websites (e.g., Facebook®, Twitter®, Flickr®, etc.). In some embodiments, the sharing manager 9850 connects to these websites through the network interface(s) 9895 in order to upload images, receive and store the object ID for an uploaded image, and receive/upload comments on the image.

While many of the features of media-editing application 9800 have been described as being performed by one module (e.g., the UI interaction and generation module 9805, the media ingest module 9810, etc.), one of ordinary skill in the art will recognize that the functions described herein might be split up into multiple modules. Similarly, functions described as being performed by multiple different modules might be performed by a single module in some embodiments (e.g., the image display area generator 9830 and image selector 9835 might be part of the UI interaction and generation module 9805).

IX. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 99:
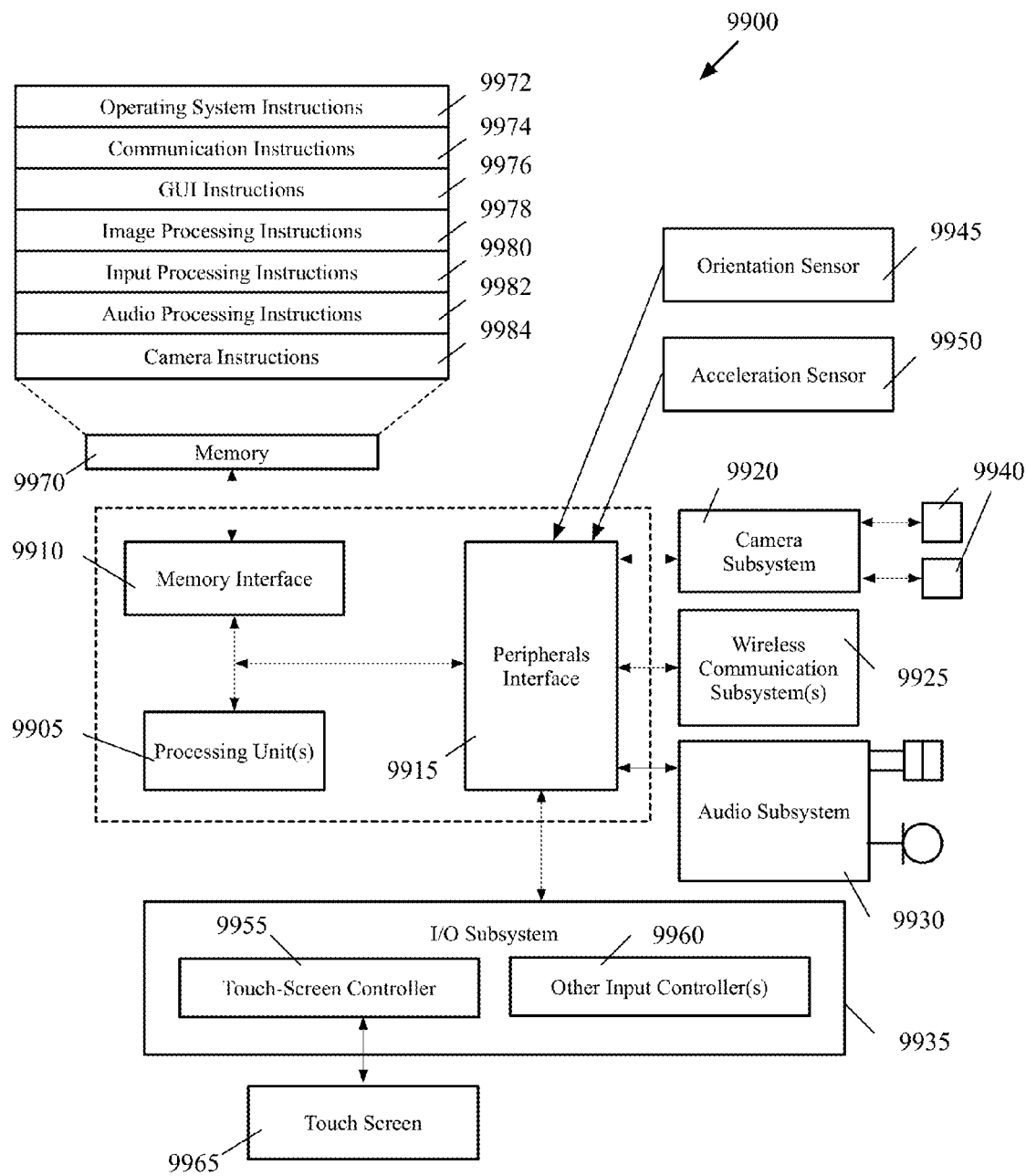
FIG. 99 is an example of an architecture of a mobile computing device on which some embodiments are implemented.

The image editing and viewing applications of some embodiments operate on mobile devices. FIG. 99 is an example of an architecture 9900 of such a mobile computing device. Examples of mobile computing devices include smartphones, tablets, laptops, etc. As shown, the mobile computing device 9900 includes one or more processing units 9905, a memory interface 9910 and a peripherals interface 9915.

The peripherals interface 9915 is coupled to various sensors and subsystems, including a camera subsystem 9920, a wireless communication subsystem(s) 9925, an audio subsystem 9930, an I/O subsystem 9935, etc. The peripherals interface 9915 enables communication between the processing units 9905 and various peripherals. For example, an orientation sensor 9945 (e.g., a gyroscope) and an acceleration sensor 9950 (e.g., an accelerometer) is coupled to the peripherals interface 9915 to facilitate orientation and acceleration functions.

The camera subsystem 9920 is coupled to one or more optical sensors 9940 (e.g., a charged coupled device (CCD) optical sensor, a complementary metal-oxide-semiconductor (CMOS) optical sensor, etc.). The camera subsystem 9920 coupled with the optical sensors 9940 facilitates camera functions, such as image and/or video data capturing. The wireless communication subsystem 9925 serves to facilitate communication functions. In some embodiments, the wireless communication subsystem 9925 includes radio frequency receivers and transmitters, and optical receivers and transmitters (not shown in FIG. 99). These receivers and transmitters of some embodiments are implemented to operate over one or more communication networks such as a GSM network, a Wi-Fi network, a Bluetooth network, etc. The audio subsystem 9930 is coupled to a speaker to output audio (e.g., to output different sound effects associated with different image operations). Additionally, the audio subsystem 9930 is coupled to a microphone to facilitate voice-enabled functions, such as voice recognition, digital recording, etc.

The I/O subsystem 9935 involves the transfer between input/output peripheral devices, such as a display, a touch screen, etc., and the data bus of the processing units 9905 through the peripherals interface 9915. The I/O subsystem 9935 includes a touch-screen controller 9955 and other input controllers 9960 to facilitate the transfer between input/output peripheral devices and the data bus of the processing units 9905. As shown, the touch-screen controller 9955 is coupled to a touch screen 9965. The touch-screen controller 9955 detects contact and movement on the touch screen 9965 using any of multiple touch sensitivity technologies. The other input controllers 9960 are coupled to other input/control devices, such as one or more buttons. Some embodiments include a near-touch sensitive screen and a corresponding controller that can detect near-touch interactions instead of or in addition to touch interactions.

The memory interface 9910 is coupled to memory 9970. In some embodiments, the memory 9970 includes volatile memory (e.g., high-speed random access memory), non-volatile memory (e.g., flash memory), a combination of volatile and non-volatile memory, and/or any other type of memory. As illustrated in FIG. 99, the memory 9970 stores an operating system (OS) 9972. The OS 9972 includes instructions for handling basic system services and for performing hardware dependent tasks.

The memory 9970 also includes communication instructions 9974 to facilitate communicating with one or more additional devices; graphical user interface instructions 9976 to facilitate graphic user interface processing; image processing instructions 9978 to facilitate image-related processing and functions; input processing instructions 9980 to facilitate input-related (e.g., touch input) processes and functions; audio processing instructions 9982 to facilitate audio-related processes and functions; and camera instructions 9984 to facilitate camera-related processes and functions. The instructions described above are merely exemplary and the memory 9970 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 99 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 99 may be split into two or more integrated circuits.

B. Computer System

Figure 100:
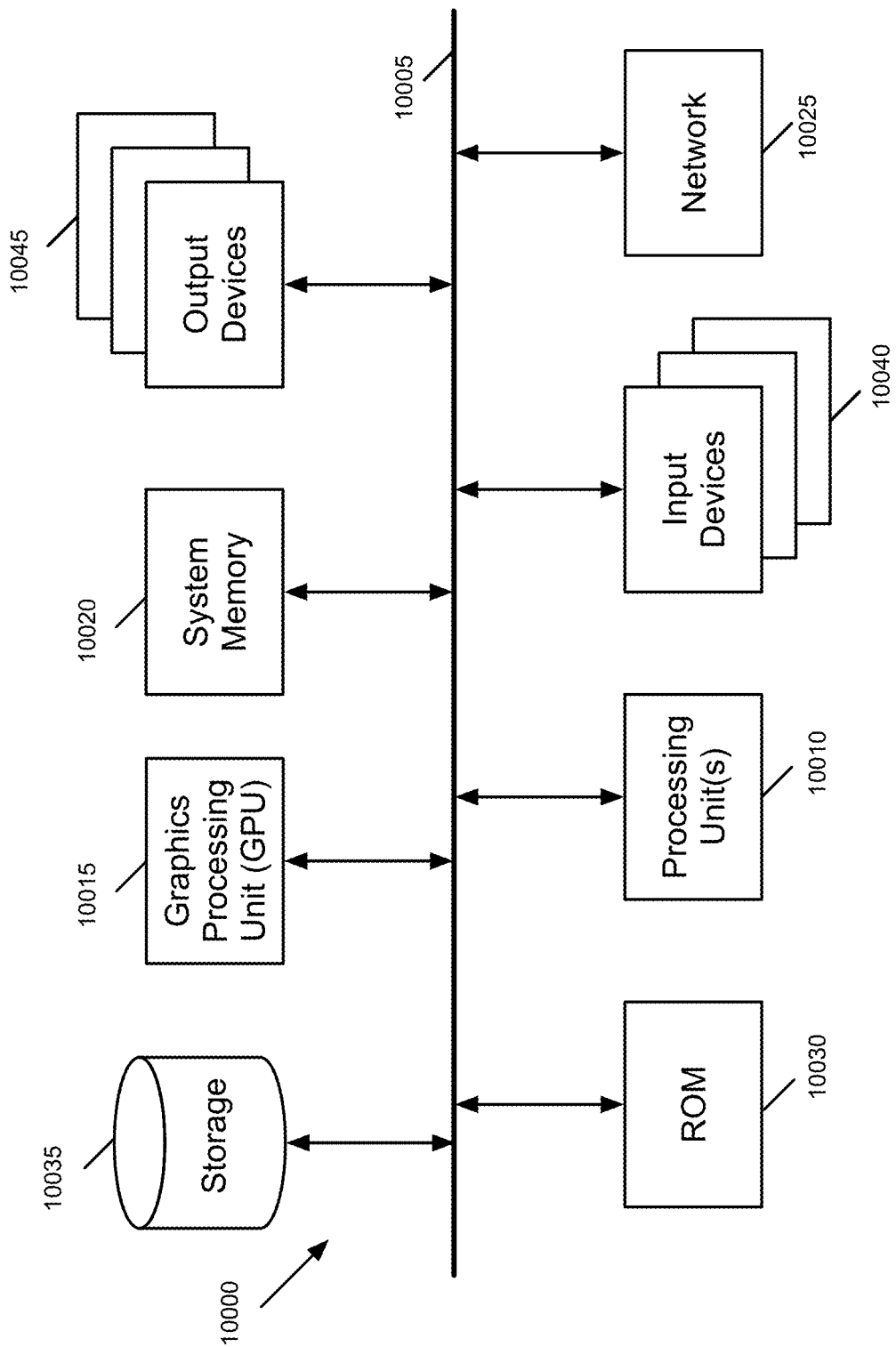
FIG. 100 conceptually illustrates an electronic system with which some embodiments are implemented.

FIG. 100 conceptually illustrates another example of an electronic system 10000 with which some embodiments of the invention are implemented. The electronic system 10000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 10000 includes a bus 10005, processing unit(s) 10010, a graphics processing unit (GPU) 10015, a system memory 10020, a network 10025, a read-only memory 10030, a permanent storage device 10035, input devices 10040, and output devices 10045.

The bus 10005 collectively represents all system, peripheral, and chipset buses that communicatively connect the numerous internal devices of the electronic system 10000. For instance, the bus 10005 communicatively connects the processing unit(s) 10010 with the read-only memory 10030, the GPU 10015, the system memory 10020, and the permanent storage device 10035.

From these various memory units, the processing unit(s) 10010 retrieves instructions to execute and data to process in order to execute the processes of the invention. The processing unit(s) may be a single processor or a multi-core processor in different embodiments. Some instructions are passed to and executed by the GPU 10015. The GPU 10015 can offload various computations or complement the image processing provided by the processing unit(s) 10010. In some embodiments, such functionality can be provided using CoreImage's kernel shading language.

The read-only-memory (ROM) 10030 stores static data and instructions that are needed by the processing unit(s) 10010 and other modules of the electronic system. The permanent storage device 10035, on the other hand, is a read-and-write memory device. This device is a non-volatile memory unit that stores instructions and data even when the electronic system 10000 is off. Some embodiments of the invention use a mass-storage device (such as a magnetic or optical disk and its corresponding disk drive) as the permanent storage device 10035.

Other embodiments use a removable storage device (such as a floppy disk, flash memory device, etc., and its corresponding drive) as the permanent storage device Like the permanent storage device 10035, the system memory 10020 is a read-and-write memory device. However, unlike storage device 10035, the system memory 10020 is a volatile read-and-write memory, such a random access memory. The system memory 10020 stores some of the instructions and data that the processor needs at runtime. In some embodiments, the invention's processes are stored in the system memory 10020, the permanent storage device 10035, and/or the read-only memory 10030. For example, the various memory units include instructions for processing multimedia clips in accordance with some embodiments. From these various memory units, the processing unit(s) 10010 retrieves instructions to execute and data to process in order to execute the processes of some embodiments.

The bus 10005 also connects to the input and output devices 10040 and 10045. The input devices 10040 enable the user to communicate information and select commands to the electronic system. The input devices 10040 include alphanumeric keyboards and pointing devices (also called "cursor control devices"), cameras (e.g., webcams), microphones or similar devices for receiving voice commands, etc. The output devices 10045 display images generated by the electronic system or otherwise output data. The output devices 10045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 100, bus 10005 also couples electronic system 10000 to a network 10025 through a network adapter (not shown). In this manner, the computer can be a part of a network of computers (such as a local area network ("LAN"), a wide area network ("WAN"), or an Intranet, or a network of networks, such as the Internet. Any or all components of electronic system 10000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 7, 34, 43, 47, 53, 59, 79, 86, and 89) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory machine readable medium storing an image-viewing application for execution by at least one processing unit, the image-viewing application comprising sets of instructions for:
   calculating a first average aspect ratio of a plurality of images for display in an image viewing area, wherein a first image in the plurality of images has a first aspect ratio and a second image in the plurality of images has a second, different aspect ratio;
   determining a number and size of regions of the image viewing area for displaying the plurality of images, the regions having the calculated first average aspect ratio, wherein each image is for display in a different one of the regions; and
   displaying the plurality of images in the regions of the image viewing area, each displayed image having a first same visual weighting, wherein the first image is displayed at the first aspect ratio and the second image is displayed at the second aspect ratio
   when a third image is added to the plurality of images, calculating a second average aspect ratio of the plurality of images, including the third image, for display in the image viewing area, wherein the third image has a third aspect ratio, different than the first and second aspect ratios;
   performing said determining and displaying for the plurality of images, including the third image, in order for each displayed image to have a second same visual weighting, wherein each of the first, second, and third images are displayed at the first, second, and third aspect ratios, respectively.

2. The non-transitory machine readable medium of claim 1, wherein displaying the images with the first same visual weighting results in the first image displayed with a same size in a first direction as the size of the regions and the second image displayed with a smaller size than the size of the regions in both the first direction and a second direction.

3. The non-transitory machine readable medium of claim 1, wherein the set of instructions for determining the number and size of regions of the image viewing area comprises determining an optimal number of columns and rows based on an average aspect ratio of the plurality of images and a number of images to display.

4. The non-transitory machine readable medium of claim 1, wherein the image-viewing application further comprises a set of instructions for receiving a selection of the plurality of images.

5. The non-transitory machine readable medium of claim 4, wherein the application executes on a touchscreen device and the selection of the plurality is received as a block selection using two separate touch inputs on the touchscreen.

6. A method for displaying images, the method comprising:
   receiving a first selection of a plurality of images for display in an image display area, each image having an aspect ratio;
   identifying an optimal grid of image display regions in the image display area, the image display regions in the grid each having a same particular size and aspect ratio;
   assigning each of the images to an image display region; and
   calculating a size for displaying the images within the assigned image display regions such that each image is displayed entirely within its assigned image display region at the calculated size while maintaining its aspect ratio
   receiving a second selection of an additional image to add to the image display area;
   identifying a new optimal grid of image display regions in the image display area, the image display regions in the new grid having a different size and aspect ratio that accounts for an aspect ratio of the additional image;
   assigning each of the images, including the additional image, to an image display region in the new grid; and
   calculating a new size for displaying the images, including the additional image, within the new assigned image display regions such that each image is displayed entirely within its new assigned image display region at the newly calculated size while maintaining its aspect ratio.

7. The method of claim 6, wherein identifying the optimal grid of image display regions comprises:
   calculating an average aspect ratio of the plurality of images, wherein each of the image display regions in the grid have the average aspect ratio; and
   identifying a number of rows and columns of image display regions that maximizes the size of the image display regions within a set of constraints.

8. The method of claim 7, wherein the set of constraints requires that the grid have at least as many image display regions as images in the plurality of images and that all of the image display regions fit within the image display area.

9. The method of claim 6, wherein assigning each of the images to an image display region comprises:
   assigning each image to a different image display region starting with a top row in the grid;
   removing any image display regions in a bottom row in the grid to which an image is not assigned; and
   centering any remaining image display regions in the bottom row.

10. A non-transitory machine readable medium storing an image-viewing application for execution by at least one processing unit, the image-viewing application comprising a graphical user interface, the GUI comprising:

a thumbnail display area for displaying a plurality of selectable thumbnails that correspond to images in the image-viewing application, each image having a particular aspect ratio; and an image display area for displaying one or more images the corresponding thumbnails of which are selected, the image display area for dividing into a first set of equally-sized regions to which the images are assigned for display such that each image is displayed using approximately a first number of pixels while maintaining its particular aspect ratio within its assigned region, wherein when an additional image, having another aspect ratio, is added for display, the image display area is divided into a second set of equally-sized regions to which the images, including the additional image, are assigned for display such that each image is displayed using approximately a second number of pixels while maintaining its aspect ratio within its assigned region.

11. The non-transitory machine readable medium of claim 10, wherein the GUI is for display on a touchscreen device and the thumbnails are selectable through touch interactions with the touchscreen.

12. The non-transitory machine readable medium of claim 10, wherein the first number of pixels for displaying each image is a number of pixels for displaying a particular one of the images at a largest size within one of the equally-sized regions while maintaining the aspect ratio of the particular image.

13. The non-transitory machine readable medium of claim 12, wherein the particular image is an image with an aspect ratio most different from an aspect ratio of the equally-sized regions of the first set of equally sized regions.

14. The non-transitory machine readable medium of claim 10, wherein the GUI further comprises a set of editing tools for editing the images.

15. The non-transitory machine readable medium of claim 10, wherein the GUI further comprises a set of selectable GUI items for tagging the images.

16. The non-transitory machine readable medium of claim 10, wherein the thumbnail display area and the image display area together occupy a fixed region in the GUI, wherein a size of the thumbnail display area is modifiable.

17. The non-transitory machine readable medium of claim 16, wherein modifications to the size of the thumbnail display area correspondingly modify a size of the image display area.

18. The non-transitory machine readable medium of claim 17, wherein modifications to the size of the image display area result in a modification to a size of the equally-sized regions and a corresponding modification to the number of pixels used to display each image.

19. A non-transitory machine readable medium storing an image-viewing application for execution by at least one processing unit, the image-viewing application comprising sets of instructions for:

dividing an image display area into a first plurality of image display regions that each have an average aspect ratio of a set of images for display in the image display area;

identifying a size of a particular image in the set when fit within one of the first plurality of image display regions;

for each image in the set, calculating dimensions for displaying the image to maintain an aspect ratio of the image and match the identified size of the particular image when fit within the image display region; and displaying the images in the image display area using the calculated dimensions for each image in the set;

when an additional image is added to the set of images, dividing the image display area into a second plurality of image display regions that each have a second average aspect ratio of the set of images and the additional image for display in the image display area;

performing said identifying, calculating, and displaying for the second set of images in order to maintain an aspect ratio of each image in the second set and fit within the second plurality of image display regions.

20. The non-transitory machine readable medium of claim 19, wherein the size is a total number of screen pixels to use for displaying the image.

21. The non-transitory machine readable medium of claim 19, wherein the particular image is the image that uses a smallest percentage of one of the image display regions when fit within the image display region.

22. A method for storing an image-viewing application for execution by at least one processing unit, the image-viewing application comprising sets of instructions for:

dividing an image display area into a first plurality of image display regions that each have an average aspect ratio of a set of images for display in the image display area;

identifying a size of a particular image in the set when fit within one of the first plurality of image display regions;

for each image in the set, calculating dimensions for displaying the image to maintain an aspect ratio of the image and match the identified size of the particular image when fit within the image display region; and displaying the images in the image display area using the calculated dimensions for each image in the set;

when an additional image is added to the set of images, dividing the image display area into a second plurality of image display regions that each have a second average aspect ratio of the set of images and the additional image for display in the image display area;

performing said identifying, calculating, and displaying for the second set of images in order to maintain an aspect ratio of each image in the second set and fit within the second plurality of image display regions.

23. The method of claim 22, wherein the size is a total number of screen pixels to use for displaying the image.

24. The method of claim 22, wherein the particular image is the image that uses a smallest percentage of one of the image display regions when fit within the image display region.

* * * * *